US012552767B2

(12) United States Patent
Bogen et al.

(10) Patent No.: US 12,552,767 B2
(45) Date of Patent: Feb. 17, 2026

(54) 3-HETEROARYL PYRROLIDINE AND PIPERIDINE OREXIN RECEPTOR AGONISTS

(71) Applicant: Merck Sharp & Dohme LLC, Rahway, NJ (US)

(72) Inventors: Stephane L. Bogen, Somerset, NJ (US); Ping Chen, Edison, NJ (US); Dane James Clausen, Rahway, NJ (US); Xianhai Huang, Warren, NJ (US); Michael T. Rudd, Collegeville, PA (US); Shawn P. Walsh, Bridgewater, NJ (US); Lan Wei, Berkeley Heights, NJ (US); Dexi Yang, Livingston, NJ (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 482 days.

(21) Appl. No.: 18/254,190

(22) PCT Filed: Dec. 1, 2021

(86) PCT No.: PCT/US2021/061344
§ 371 (c)(1),
(2) Date: May 24, 2023

(87) PCT Pub. No.: WO2022/119888
PCT Pub. Date: Jun. 9, 2022

(65) Prior Publication Data
US 2024/0002359 A1  Jan. 4, 2024

Related U.S. Application Data

(60) Provisional application No. 63/120,967, filed on Dec. 3, 2020.

(51) Int. Cl.
| | | |
|---|---|---|
| *C07D 401/04* | (2006.01) |
| *C07D 401/14* | (2006.01) |
| *C07D 403/04* | (2006.01) |
| *C07D 405/14* | (2006.01) |
| *C07D 413/14* | (2006.01) |
| *C07D 417/04* | (2006.01) |

(52) U.S. Cl.
CPC ......... *C07D 401/04* (2013.01); *C07D 401/14* (2013.01); *C07D 403/04* (2013.01); *C07D 405/14* (2013.01); *C07D 413/14* (2013.01); *C07D 417/04* (2013.01)

(58) Field of Classification Search
CPC .. C07D 401/04; C07D 401/14; C07D 403/04; C07D 405/14; C07D 413/14; C07D 417/04
See application file for complete search history.

(56) References Cited

U.S. PATENT DOCUMENTS 12,331,018 B2 * 6/2025 Bogen ................ C07D 207/14
2017/0267718 A1  9/2017 Zheng et al.

FOREIGN PATENT DOCUMENTS

WO       2010048010 A1    4/2010
WO    WO-2014176142 A1 * 10/2014 ........... C07D 401/10

OTHER PUBLICATIONS

Yukitake, Pharmacology, Biochemistry and Behavior, 187, 2019 (Year: 2019).*
Chemelli, Richard M. et al., Narcolepsy in orexin Knockout Mice: Molecular Genetics of Sleep Regulation, Cell, 1999, 437-451, 98.
Harris, Glenda C. et al., Arousal and reward: a dichotomy in orexin function, Trends in Neurosciences, 2006, 571-577, 29(10).
Peyron, Christelle et al., Neurons Containing Hypocretin (Orexin) Project to Multiple Neuronal Systems, The Journal of Neuroscience, 1998, 9996-100150, 18(23).
Pubchem, Substance Record for SID 229778569, Available Date: Feb. 12, 2015 [retrieved on Apr. 20, 2022]. Retrieved from the Internet: URL: https://pubchem.ncbi.nlm.nih.gov/substance/229778569. entire document.
Pubchem, Substance Record for SID 311509149, Available Date: Feb. 23, 2016 [retrieved on Feb. 15, 2022]. Retrieved from the Internet: URL: https://pubchem.ncbi.nlm.nih.gov/substance/311509149. entire document.
Sakurai, Takeshi et al., Orexins and Orexin Receptors: A Family of Hypothalamic Neuropeptides and G Protein-Coupled Receptors that Regulate Feeding Behavior, Cell, 1998, 573-585, 92.

* cited by examiner

*Primary Examiner* — Andrew D Kosar
*Assistant Examiner* — Phillip Matthew Rzeczycki
(74) *Attorney, Agent, or Firm* — Patricia A. Shatynski; John C. Todaro

(57) ABSTRACT

The present invention is directed to 3-heteroaryl pyrrolidine and piperidine compounds which are agonists of orexin receptors. The present invention is also directed to uses of the compounds described herein in the potential treatment or prevention of neurological and psychiatric disorders and diseases in which orexin receptors are involved. The present invention is also directed to compositions comprising these compounds. The present invention is also directed to uses of these compositions in the potential prevention or treatment of such diseases in which orexin receptors are involved.

13 Claims, No Drawings

3-HETEROARYL PYRROLIDINE AND PIPERIDINE OREXIN RECEPTOR AGONISTS

CROSS-REFERENCE TO RELATED APPLICATIONS

This application is a National Stage application of International Patent Application No. PCT/US2021/061344, filed Dec. 1, 2021, which claims priority to U.S. Provisional Patent Application No. 63/120,967, filed Dec. 3, 2020.

BACKGROUND OF THE INVENTION

The orexins (hypocretins) comprise two neuropeptides produced in the hypothalamus: orexin A (OX-A) (a 33 amino acid peptide) and the orexin B (OX-B) (a 28 amino acid peptide) (Sakurai T. et al., Cell, 1998, 92, 573-585). Orexins regulate states of sleep and wakefulness opening potentially novel therapeutic approaches for narcolepsy, idiopathic hypersomnia, excessive daytime sleepiness, shift work disorder, obstructive sleep apnea and insomnia (Chemelli R. M. et al., Cell, 1999, 98, 437-451). Orexins are found to stimulate food consumption in rats suggesting a physiological role for these peptides as mediators in the central feedback mechanism that regulates feeding behavior (Sakurai T. et al., Cell, 1998, 92, 573-585). Orexins have also been indicated as playing a role in arousal, emotion, energy homeostasis, reward, learning and memory (Peyron, et al., Journal Neurosci., 1998, 18(23):9996-100150, Harris, et al., Trends Neurosci., 2006, 29 (10), 571-577). Two orexin receptors have been cloned and characterized in mammals. They belong to the super family of G-protein coupled receptors (Sakurai T. et al., Cell, 1998, 92, 573-585): the orexin-1 receptor (OX or OX1R) is partially selective for OX-A and the orexin-2 receptor (OX2 or OX2R) is capable of binding OX-A as well as OX-B with similar affinity. The physiological actions in which orexins are presumed to participate are thought to be expressed via one or both of OX1 receptor and OX2 receptor as the two subtypes of orexin receptors.

SUMMARY OF THE INVENTION

The present invention is directed to 3-heteroaryl pyrrolidine and piperidine compounds which are agonists of orexin receptors. The present invention is also directed to uses of the compounds described herein in the potential treatment or prevention of neurological and psychiatric disorders and diseases in which orexin receptors are involved. The present invention is also directed to compositions comprising these compounds. The present invention is also directed to uses of these compositions in the potential prevention or treatment of such diseases in which orexin receptors are involved.

DETAILED DESCRIPTION OF THE INVENTION

The present invention is directed to compounds of the formula I:

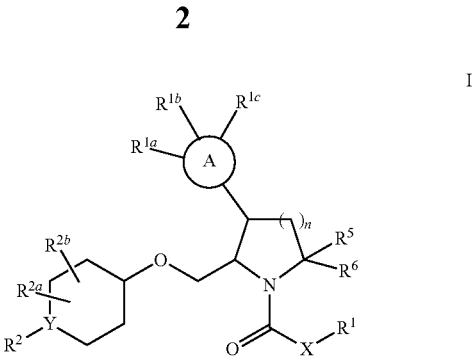

wherein:
n is 1 or 2;
A is a furanyl, imidazolyl, isoquinolinyl, isothiazolyl, isoxazolyl, oxadiazolyl, phenyl, pyrazinyl, pyrazolyl, pyridinyl, pyrimidinyl, pyrrolopyridinyl, furopyridinyl, isoxazolopyridinyl, tetrazolyl, 1,3,4-thiadiazol, thiazolyl, thiophenyl or triazolyl ring, or an N-oxide thereof;
X is —O— or —NH—, or X may be a direct bond to $R^1$;
Y is N or CH;
$R^1$ is selected from:
  (1) —$C_{1-6}$alkyl, where the alkyl is unsubstituted or substituted with one to six substituents independently selected from $R^4$, and
  (2) —$C_{3-6}$cycloalkyl, where the cycloalkyl is unsubstituted or substituted with one to six substituents independently selected from $R^4$;
  (3) —$CH_2$—$C_{3-6}$cycloalkyl, where the cycloalkyl is unsubstituted or substituted with one to six substituents independently selected from $R^4$;
  (4) —$C_{2-6}$alkenyl, and
  (5) —$C_{2-6}$alkynyl;
$R^{1a}$, $R^{1b}$ and $R^{1c}$ as present are independently selected from:
  (1) hydrogen,
  (2) halogen,
  (3) hydroxyl,
  (4) $C_{1-6}$alkyl, which is unsubstituted or substituted with substituents selected from: hydroxy, fluoro and phenyl,
  (5) —O—$C_{1-6}$alkyl, which is unsubstituted or substituted with substituents selected from: fluoro and phenyl,
  (6) $C_{3-6}$cycloalkyl,
  (7) $C_{2-6}$alkynyl,
  (8) —$NH_2$,
  (9) —$NH(C_{1-6}alkyl)$,
  (10) —$N(C_{1-6}alkyl)_2$,
  (11) —(CO)—O—$C_{1-6}$alkyl,
  (12) keto,
  (13) tetrahydropyranyl,
  (14) -phenyl,
  (15) -pyridyl, and
  (16) —CN;
$R^2$ is selected from:
  (1) hydrogen,
  (2) —$C_{1-6}$alkyl, where the alkyl is unsubstituted or substituted with one to six substituents independently selected from $R^4$,
  (3) —$C_{3-6}$cycloalkyl, where the cycloalkyl is unsubstituted or substituted with one to six substituents independently selected from $R^4$, (4) -phenyl, where the phenyl is unsubstituted or substituted with one to three substituents independently selected from $R^4$, and (5) -heteroaryl, where the heteroaryl is selected from: pyridyl, pyrimidinyl, and pyrazinyl, and the heteroaryl is unsubstituted or substituted with one to three substituents independently selected from $R^4$;

$R^{2a}$ and $R^{2b}$ are independently selected from:
(1) hydrogen,
(2) hydroxyl,
(3) halogen, and
(4) —$C_{1-6}$alkyl, where the alkyl is unsubstituted or substituted with one to six substituents independently selected from halogen;

$R^4$ is selected from:
(1) hydroxyl,
(2) halogen,
(3) $C_{1-6}$alkyl, which is unsubstituted or substituted with one to six fluoro,
(4) —$C_{3-6}$cycloalkyl,
(5) —O—$C_{1-6}$alkyl,
(6) —O(C=O)—$C_{1-6}$alkyl,
(7) —(C=O)—$C_{1-6}$alkyl,
(8) —$NH_2$,
(9) —NH—$C_{1-6}$alkyl,
(10) —$NO_2$,
(11) oxetanyl,
(12) phenyl, which is unsubstituted or substituted with one to three halo,
(13) pyridyl,
(14) oxazolyl, which is unsubstituted or substituted with —$C_{1-6}$alkyl,
(15) oxomorpholinyl, which is unsubstituted or substituted with —$C_{1-6}$alkyl,
(16) —$CO_2H$, and
(17) —CN;

$R^5$ and $R^6$ are independently selected from:
(1) hydrogen,
(2) $C_{1-6}$alkyl, where the alkyl is unsubstituted or substituted with one to six substituents independently selected from $R^4$, and
(3) —$C_{3-6}$cycloalkyl, where the cycloalkyl is unsubstituted or substituted with one to six substituents independently selected from $R^4$, or $R^5$ and $R^6$ are joined together with the carbon atoms to which they are attached to form a —$C_{3-6}$cycloalkyl ring, where the cycloalkyl is unsubstituted or substituted with one to six substituents independently selected from $R^4$;

or a pharmaceutically acceptable salt thereof.

An embodiment of the present invention includes compounds of the formula Ia:

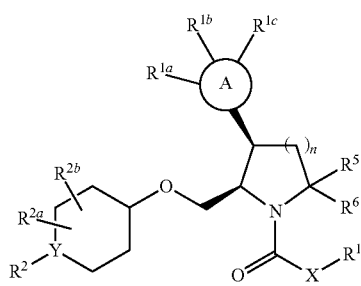

Ia wherein A, n, Y, X, $R^1$, $R^{1a}$, $R^{1b}$, $R^{1c}$, $R^2$, $R^{2a}$, $R^{2b}$, $R^5$ and $R^6$ are defined herein; or a pharmaceutically acceptable salt thereof.

An embodiment of the present invention includes compounds of the formula Ib:

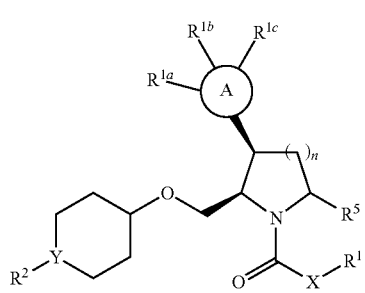

Ib wherein A, n, Y, X, $R^1$, $R^{1a}$, $R^{1b}$, $R^{1c}$, $R^2$ and $R^5$ are defined herein; or a pharmaceutically acceptable salt thereof.

An embodiment of the present invention includes compounds of the formula Ib':

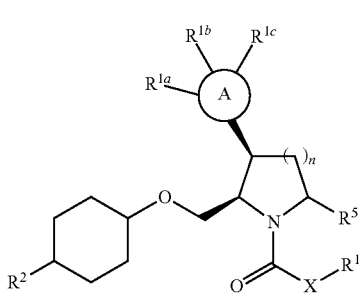

Ib' wherein A, n, X, $R^1$, $R^{1a}$, $R^{1b}$, $R^{1c}$, $R^2$ and $R^5$ are defined herein; or a pharmaceutically acceptable salt thereof.

An embodiment of the present invention includes compounds of the formula Ib":

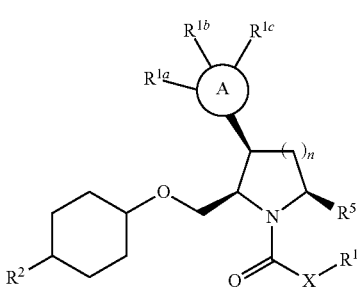

Ib"

wherein A, n, X, $R^1$, $R^{1a}$, $R^{1b}$, $R^{1c}$, $R^2$ and $R^5$ are defined herein; or a pharmaceutically acceptable salt thereof.

An embodiment of the present invention includes compounds of the formula Ib'":

Ib'''

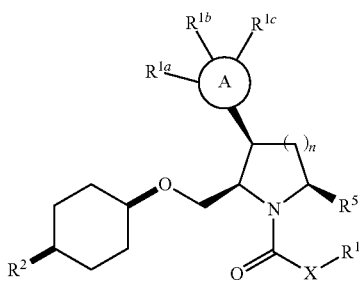

wherein A, n, X, R$^1$, R$^{1a}$, R$^{1b}$, R$^{1c}$, R$^2$ and R$^5$ are defined herein; or a pharmaceutically acceptable salt thereof.

An embodiment of the present invention includes compounds of the formula Ic:

Ic

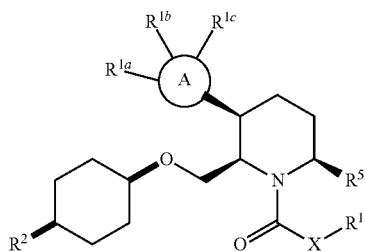

wherein A, X, R$^1$, R$^{1a}$, R$^{1b}$, R$^{1c}$, R$^2$ and R$^5$ are defined herein; or a pharmaceutically acceptable salt thereof.

An embodiment of the present invention includes compounds of the formula Id:

Id

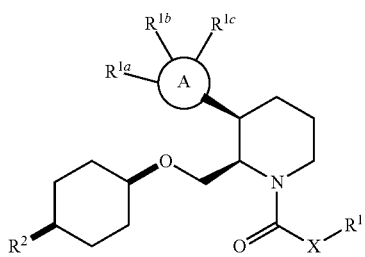

wherein A, X, R$^1$, R$^{1a}$, R$^{1b}$, R$^{1c}$ and R$^2$ are defined herein; or a pharmaceutically acceptable salt thereof.

An embodiment of the present invention includes compounds of the formula Id':

Id'

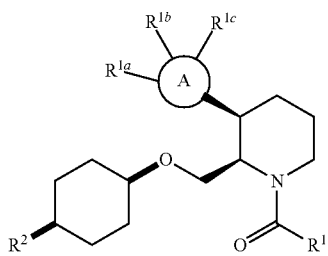

wherein A, R$^1$, R$^{1a}$, R$^{1b}$, R$^{1c}$ and R$^2$ are defined herein; or a pharmaceutically acceptable salt thereof.

An embodiment of the present invention includes compounds of the formula Id":

Id"

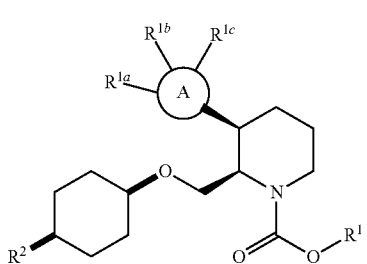

wherein A, R$^1$, R$^{1a}$, R$^{1b}$, R$^{1c}$ and R$^2$ are defined herein; or a pharmaceutically acceptable salt thereof.

An embodiment of the present invention includes compounds of the formula Id''':

Id'''

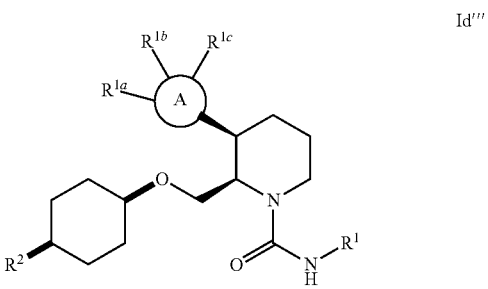

wherein A, R$^1$, R$^{1a}$, R$^{1b}$, R$^{1c}$ and R$^2$ are defined herein; or a pharmaceutically acceptable salt thereof.

An embodiment of the present invention includes compounds wherein n is 1 (to form a pyrrolidine ring). An embodiment of the present invention includes compounds wherein n is 2 (to form a piperidine ring).

An embodiment of the present invention includes compounds wherein A is a furan-2-yl, imidazol-2-yl, imidazol-5-yl, isoquinolin-4-yl, isothiazol-5-yl, isoxazol-3-yl, 1,3,4-oxadiazol-2-yl, phenyl, pyrazin-2-yl, pyrazol-4-yl, pyridin-2-yl, pyridin-3-yl, pyridin-4-yl, pyridin-5-yl, pyrimidin-2-yl, pyrimidin-4-yl, pyrimidin-5-yl, pyrrolo[3,2-b]pyridin-6-yl, tetrazol-5-yl, 1,3,4-thiadiazol-2-yl, 1,2,4-thiadiazol-5-yl, thiazol-2-yl, thiazol-4-yl, thiazol-5-yl, thiophen-3-yl, 1,2,4-triazol-3-yl, 1,2,3-triazol-4-yl, or 1,2,4-triazol-5-yl ring.

An embodiment of the present invention includes compounds wherein A is a pyrazol-3-yl, pyrazol-4-yl, pyrazol-5-yl, thiazol-4-yl, or 1,2,4-triazol-5-yl ring.

An embodiment of the present invention includes compounds wherein A is a pyrazolyl ring. An embodiment of the present invention includes compounds wherein A is a pyrazol-3-yl ring.

An embodiment of the present invention includes compounds wherein X is —O—. An embodiment of the present invention includes compounds wherein X is —NH—. An embodiment of the present invention includes compounds wherein X is a direct bond to R$^1$.

An embodiment of the present invention includes compounds wherein Y is N. An embodiment of the present invention includes compounds wherein Y is CH.

An embodiment of the present invention includes compounds wherein $R^1$ is selected from:
(1) —$C_{1-6}$alkyl, which is unsubstituted or substituted with fluoro or —O(C=O)—$C_{1-6}$alkyl,
(2) —$C_{3-6}$cycloalkyl, which is unsubstituted or substituted with fluoro or $C_{1-6}$alkyl, and
(3) —$CH_2$—$C_{3-6}$cycloalkyl, which is unsubstituted or substituted with fluoro or $C_{1-6}$alkyl.

An embodiment of the present invention includes compounds wherein $R^1$ is selected from:
(1) methyl,
(2) ethyl,
(3) —$CH_2OH$,
(4) —$CH_2CF_3$,
(5) —$CH_2CHF_2$,
(6) —$CH(CH_3)_2$,
(7) —$CH_2CH_2CH_2F$,
(8) cyclopropyl,
(8) cyclopropyl-$CH_3$,
(9) —$CH_2$-cyclopropyl,
(10) —$CH_2$-cyclobutyl, and
(11) —$CH_2O(C=O)CH_3$.

An embodiment of the present invention includes compounds wherein $R^1$ is selected from:
(1) methyl, and
(2) ethyl.

An embodiment of the present invention includes compounds wherein $R^{1a}$, $R^{1b}$ and $R^{1c}$ as are present are independently selected from:
(1) hydrogen,
(2) fluoro,
(3) chloro,
(4) hydroxyl,
(5) $C_{1-3}$alkyl, which is unsubstituted or substituted with hydroxy or one or more fluoro,
(6) —O—$C_{1-3}$alkyl, which is unsubstituted or substituted with one or more fluoro, (7) $C_{3-6}$cycloalkyl,
(8) —$NH_2$,
(9) —$NH(C_{1-3}$alkyl),
(10) —$N(C_{1-3}$alkyl)$_2$,
(11) keto, and
(12) -phenyl.

An embodiment of the present invention includes compounds wherein $R^{1a}$, $R^{1b}$ and $R^{1c}$ as are present are independently selected from:
(1) hydrogen,
(2) fluoro,
(3) hydroxyl,
(4) —$CH_3$,
(5) —$CHF_2$,
(6) —$CF_3$,
(7) —$CH_2OH$,
(8) —$CH_2CH_3$,
(9) —$C(CH_3)OH$,
(10) —$OCH_3$,
(11) —$OCHF_2$,
(12) —$OCH_2CH_2F$,
(13) —$N(CH_3)_2$,
(14) cyclopropyl, and
(15) phenyl.

An embodiment of the present invention includes compounds wherein $R^{1c}$ is hydrogen and $R^{1a}$ and $R^{1b}$, as are present, are independently selected from:
(1) hydrogen,
(2) fluoro,
(3) hydroxyl,
(4) —$CH_3$,
(5) —$CHF_2$,
(6) —$CF_3$,
(7) —$CH_2OH$,
(8) —$CH_2CH_3$,
(9) —$C(CH_3)OH$,
(10) —$OCH_3$,
(11) —$OCHF_2$,
(12) —$OCH_2CH_2F$,
(13) —$N(CH_3)_2$,
(14) cyclopropyl, and
(15) phenyl.

An embodiment of the present invention includes compounds wherein $R^{1c}$ and $R^{1b}$, as are present, are hydrogen and $R^{1a}$ and are independently selected from:
(1) hydrogen,
(2) fluoro,
(3) hydroxyl,
(4) —$CH_3$,
(5) —$CHF_2$,
(6) —$CF_3$,
(7) —$CH_2OH$,
(8) —$CH_2CH_3$,
(9) —$C(CH_3)OH$,
(10) —$OCH_3$,
(11) —$OCHF_2$,
(12) —$OCH_2CH_2F$,
(13) —$N(CH_3)_2$,
(14) cyclopropyl, and
(15) phenyl.

An embodiment of the present invention includes compounds wherein $R^2$ is selected from:
(1) hydrogen,
(2) —$C_{1-6}$alkyl, where the alkyl is unsubstituted or substituted with one to three fluoro, and
(3) phenyl, which is unsubstituted or substituted with —$C_{1-6}$alkyl, where the alkyl is unsubstituted or substituted with one to three fluoro.

An embodiment of the present invention includes compounds wherein $R^2$ is selected from:
(1) hydrogen,
(2) —$CH_2(CH_3)_2$,
(3) —$CF_3$,
(4) —$CH_2CHF_2$,
(5) —$CH_2CF_3$, and
(6) phenyl, which is unsubstituted or substituted with —$CF_3$ or —$CH_2CF_3$.

An embodiment of the present invention includes compounds wherein $R^2$ is phenyl.

An embodiment of the present invention includes compounds wherein $R^{2a}$ is hydrogen and $R^{2b}$ is hydrogen. An embodiment of the present invention includes compounds wherein $R^{2a}$ is methyl and $R^{2b}$ is hydrogen. An embodiment of the present invention includes compounds wherein $R^{2a}$ is methyl and $R^{2b}$ is methyl. An embodiment of the present invention includes compounds wherein $R^{2a}$ is methyl and $R^{2b}$ is methyl, wherein $R^{2a}$ and $R^{2b}$ are attached to the same carbon atom. An embodiment of the present invention includes compounds wherein $R^{2a}$ is fluoro and $R^{2b}$ is hydrogen. An embodiment of the present invention includes compounds wherein $R^{2a}$ is fluoro and $R^{2b}$ is fluoro, wherein $R^{2a}$ and $R^{2b}$ are attached to the same carbon atom.

An embodiment of the present invention includes compounds wherein $R^5$ and $R^6$ are independently selected from:
(1) hydrogen,
(2) methyl,
(3) ethyl,
(4) —$CHF_2$, (5) —CF₃,
(6) —CH₂OH,
(7) —CH₂OCH₃, and
(8) cyclopropyl.

An embodiment of the present invention includes compounds wherein $R^5$ is hydrogen or methyl and $R^6$ is hydrogen. An embodiment of the present invention includes compounds wherein $R^5$ is hydrogen and $R^6$ is hydrogen. An embodiment of the present invention includes compounds wherein $R^5$ is methyl and $R^6$ is hydrogen. An embodiment of the present invention includes compounds wherein $R^5$ is ethyl and $R^6$ is hydrogen. An embodiment of the present invention includes compounds wherein $R^5$ is ethyl and $R^6$ is ethyl. An embodiment of the present invention includes compounds wherein $R^5$ and $R^6$ are joined together with the carbon atoms to which they are attached to form a cyclopropyl ring.

Certain embodiments of the present invention include a compound which is selected from the group consisting of the subject compounds of the Examples herein or a pharmaceutically acceptable salt thereof.

Certain embodiments of the present invention include a compound which is selected from:
(CIS)-N-ethyl-2-(((((CIS)-4-phenylcyclohexyl)oxy)methyl)-3-(1H-pyrazol-5-yl)piperidine-1-carboxamide;
methyl (CIS)-3-(2-hydroxy-5-methylthiazol-4-yl)-2-((((CIS)-4-phenyl-cyclohexyl)oxy)-methyl)piperidine-1-carboxylate;
(CIS)-N-ethyl-2-(((4-isopropylcyclohexyl)oxy)methyl)-3-(1H-pyrazol-5-yl)piperidine-1-carboxamide;
(2R,3S)—N-ethyl-2-((((CIS)-4-isopropylcyclohexyl)oxy)methyl)-3-(1H-pyrazol-5-yl)piperidine-1-carboxamide;
(2S,3R)—N-ethyl-2-((((CIS)-4-isopropylcyclohexyl)oxy)methyl)-3-(1H-pyrazol-5-yl)piperidine-1-carboxamide;
methyl (CIS)-3-(4-methyl-1H-pyrazol-3-yl)-2-(((1-(pyrimidin-2-yl)piperidin-4-yl)oxy)methyl)piperidine-1-carboxylate;
methyl (CIS)-2-(((1-(5-fluoropyrimidin-2-yl)piperidin-4-yl)oxy)methyl)-3-(4-methyl-1H-pyrazol-3-yl)piperidine-1-carboxylate;
methyl (CIS)-3-(4-methyl-1H-pyrazol-3-yl)-2-(((1-phenylpiperidin-4-yl)oxy)-methyl)piperidine-1-carboxylate;
isopropyl (CIS)-3-(4-methyl-1H-pyrazol-3-yl)-2-(((1-(pyrimidin-2-yl)piperidin-4-yl)oxy)methyl)piperidine-1-carboxylate;
(CIS)-N-ethyl-2-((((CIS)-4-(3-fluorophenyl)cyclohexyl)oxy)methyl)-3-(4-methyl-1H-pyrazol-3-yl)piperidine-1-carboxamide;
(2R,3S)—N-ethyl-2-((((CIS)-4-(3-fluorophenyl)cyclohexyl)oxy)methyl)-3-(4-methyl-1H-pyrazol-3-yl)piperidine-1-carboxamide;
(2S,3R)—N-ethyl-2-((((CIS)-4-(3-fluorophenyl)cyclohexyl)oxy)methyl)-3-(4-methyl-1H-pyrazol-3-yl)piperidine-1-carboxamide;
methyl (CIS)-2-(((((S)-3'-fluoro-2,3,4,5-tetrahydro-[1,1'-biphenyl]-4-yl)oxy)methyl)-3-(4-methyl-1H-pyrazol-3-yl)piperidine-1-carboxylate;
cyclopropyl((CIS)-2-((((CIS)-4-(3-fluorophenyl)cyclohexyl)oxy)methyl)-3-(4-methyl-1H-pyrazol-3-yl)piperidin-1-yl)methanone;
methyl (CIS)-2-(((((CIS)-4-(3-fluorophenyl)cyclohexyl)oxy)methyl)-3-(4-methyl-1H-pyrazol-3-yl)piperidine-1-carboxylate;
2,2-difluoroethyl (CIS)-2-((((CIS)-4-(3-fluorophenyl)cyclohexyl)oxy)methyl)-3-(4-methyl-1H-pyrazol-3-yl)piperidine-1-carboxylate;
(2R,3S)—N-ethyl-2-(((((CIS)-4-phenylcyclohexyl)oxy)methyl)-3-(1H-pyrazol-3-yl)piperidine-1-carboxamide;
(CIS)-N-ethyl-2-(((((CIS)-4-phenylcyclohexyl)oxy)methyl)-3-(1H-pyrazol-3-yl)piperidine-1-carboxamide;
(2S,3R)—N-ethyl-2-(((((CIS)-4-phenylcyclohexyl)oxy)methyl)-3-(1H-pyrazol-3-yl)piperidine-1-carboxamide;
cyclopropyl((CIS)-2-(((((CIS)-4-phenylcyclohexyl)oxy)methyl)-3-(1H-pyrazol-3-yl)piperidin-1-yl)methanone;
methyl (CIS)-2-(((((CIS)-4-phenylcyclohexyl)oxy)methyl)-3-(1H-pyrazol-3-yl)piperidine-1-carboxylate;
(CIS)-N-ethyl-3-(1-methyl-1H-pyrazol-5-yl)-2-((((CIS)-4-phenylcyclohexyl)-oxy)methyl)-piperidine-1-carboxamide;
methyl (CIS)-3-(4-methyl-1H-pyrazol-5-yl)-2-((((CIS)-4-phenylcyclohexyl)-oxy)methyl)-piperidine-1-carboxylate;
2,2-difluoroethyl (CIS)-3-(4-methyl-1H-pyrazol-5-yl)-2-((((CIS)-4-phenyl-cyclohexyl)oxy)methyl)-piperidine-1-carboxylate;
methyl (CIS)-2-((((CIS)-4-phenylcyclohexyl)oxy)methyl)-3-(4-(trifluoromethyl)-1H-pyrazol-5-yl)piperidine-1-carboxylate;
methyl (CIS)-2-((((CIS)-4-phenylcyclohexyl)oxy)methyl)-3-(1H-1,2,4-triazol-5-yl)piperidine-1-carboxylate;
(CIS)-N-ethyl-3-(1-methyl-1H-pyrazol-3-yl)-2-((((CIS)-4-phenylcyclohexyl)-oxy)-methyl)piperidine-1-carboxamide;
(CIS)-N-ethyl-2-((((CIS)-4-phenylcyclohexyl)oxy)methyl)-3-(1H-pyrazol-3-yl)pyrrolidine-1-carboxamide;
methyl 3-(1H-pyrazol-5-yl)-2-((((CIS)-4-(2,3,6-trifluorophenyl)cyclohexyl)-oxy)methyl)piperidine-1-carboxylate;
2-fluoroethyl 3-(1H-pyrazol-5-yl)-2-((((CIS)-4-(2,3,6-trifluorophenyl)-cyclohexyl)oxy)methyl)piperidine-1-carboxylate;
2,2,2-trifluoroethyl 3-(1H-pyrazol-5-yl)-2-((((CIS)-4-(2,3,6-trifluorophenyl)-cyclohexyl)oxy)methyl)piperidine-1-carboxylate;
1-(3-(1H-pyrazol-5-yl)-2-((((CIS)-4-(2,3,6-trifluorophenyl)cyclohexyl)-oxy)methyl)piperidin-1-yl)-2-hydroxyethan-1-one;
N-ethyl-2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine-1-carboxamide;
3-(1H-pyrazol-5-yl)-N-(2,2,2-trifluoroethyl)-2-(((((CIS)-4-(2,3,6-trifluorophenyl)cyclohexyl)-oxy)methyl)piperidine-1-carboxamide;
2,2-difluoroethyl 3-(1H-pyrazol-5-yl)-2-(((((CIS)-4-(2,3,6-trifluorophenyl)-cyclohexyl)oxy)methyl)piperidine-1-carboxylate;
methyl (2R,5R)-5-methyl-3-(4-methyl-1H-pyrazol-5-yl)-2-((((CIS)-4-phenylcyclohexyl)oxy)methyl)pyrrolidine-1-carboxylate;
methyl (2R,5R)-5-methyl-2-((((CIS)-4-phenylcyclohexyl)oxy)methyl)-3-(1H-pyrazol-5-yl)pyrrolidine-1-carboxylate;
N-ethyl-2-(((4-isopropylcyclohexyl)oxy)methyl)-6-methyl-3-(1H-pyrazol-5-yl)piperidine-1-carboxamide;
(+/−) methyl (2R,3S,5S)-5-methyl-2-((((CIS)-4-phenylcyclohexyl)oxy)methyl)-3-(1H-pyrazol-5-yl)piperidine-1-carboxylate;
(+/−) methyl (2R,3R,5S)-5-methyl-2-((((CIS)-4-phenylcyclohexyl)oxy)methyl)-3-(1H-pyrazol-5-yl)piperidine-1-carboxylate;
(+/−) methyl (2R,3S,5R)-5-methyl-2-((((CIS)-4-phenylcyclohexyl)oxy)methyl)-3-(1H-pyrazol-5-yl)piperidine-1-carboxylate;

methyl cis-3-(4-iodo-1H-pyrazol-3-yl)-2-(((((CIS)-4-phenyl-cyclohexyl)-oxy)methyl)piperidine-1-carboxylate;
methyl (2R,3S)-3-(4-ethyl-1H-pyrazol-3-yl)-2-(((((CIS)-4-phenylcyclohexyl)-oxy)methyl)-piperidine-1-carboxylate;
(2S,3R)-3-(4-ethyl-1H-pyrazol-3-yl)-2-(((((CIS)-4-phenyl-cyclohexyl)-oxy)methyl)piperidine-1-carboxylate;
methyl (2R,3S)-3-(4-chloro-1H-pyrazol-3-yl)-2-(((((CIS)-4-phenylcyclohexyl)-oxy)methyl)-piperidine-1-carboxylate;
methyl (2S,3R)-3-(4-chloro-1H-pyrazol-3-yl)-2-(((((CIS)-4-phenylcyclohexyl)-oxy)methyl)-piperidine-1-carboxylate;
methyl cis-3-(4-chloro-1H-pyrazol-3-yl)-2-(((((CIS)-4-(2-chlorophenyl)-cyclohexyl)oxy)methyl)-piperidine-1-carboxylate;
methyl cis-3-(4-chloro-1H-pyrazol-3-yl)-2-(((((CIS)-4-(4-chlorophenyl)-cyclohexyl)oxy)methyl)-piperidine-1-carboxylate;
methyl (2R,3S)-3-(4-isopropyl-1H-pyrazol-3-yl)-2-(((((CIS)-4-phenylcyclohexyl)-oxy)-methyl)piperidine-1-carboxylate;
methyl (2S,3R)-3-(4-isopropyl-1H-pyrazol-3-yl)-2-(((((CIS)-4-phenylcyclohexyl)-oxy)methyl)-piperidine-1-carboxylate;
methyl (2R,3S)-3-(4-cyano-1H-pyrazol-3-yl)-2-(((((CIS)-4-phenylcyclohexyl)-oxy)methyl)-piperidine-1-carboxylate;
methyl (2S,3R)-3-(4-cyano-1H-pyrazol-3-yl)-2-(((((CIS)-4-phenylcyclohexyl)-oxy)methyl)-piperidine-1-carboxylate;
methyl (2R,3S)-3-(4-(hydroxymethyl)-1H-pyrazol-3-yl)-2-(((((CIS)-4-phenylcyclohexyl)oxy)-methyl)piperidine-1-carboxylate;
methyl (2S,3R)-3-(4-(hydroxymethyl)-1H-pyrazol-3-yl)-2-(((((CIS)-4-phenylcyclohexyl)oxy)methyl)-piperidine-1-carboxylate;
methyl (2R,3S)-3-(4-(difluoromethyl)-1H-pyrazol-3-yl)-2-(((((CIS)-4-phenylcyclohexyl)oxy)methyl)-piperidine-1-carboxylate;
methyl (2S,3R)-3-(4-(difluoromethyl)-1H-pyrazol-3-yl)-2-(((((CIS)-4-phenylcyclohexyl)oxy)methyl) piperidine-1-carboxylate;
methyl cis-3-(4-(methoxymethyl)-1H-pyrazol-3-yl)-2-(((((CIS)-4-phenylcyclohexyl)oxy)methyl)-piperidine-1-carboxylate;
N-ethyl-2-(((4-isopropylcyclohexyl)oxy)methyl)-3-(4-methyl-1H-pyrazol-5-yl)piperidine-1-carboxamide;
N-ethyl-2-((((CIS)-4-isopropylcyclohexyl)oxy)methyl)-3-(1H-1,2,4-triazol-3-yl)piperidine-1-carboxamide;
methyl (CIS)-3-(6-hydroxypyridin-2-yl)-2-(((((CIS)-4-phenylcyclohexyl)oxy)-methyl)piperidine-1-carboxylate;
methyl (CIS)-3-(2-hydroxythiazol-4-yl)-2-(((((CIS)-4-phenylcyclohexyl)oxy)-methyl)piperidine-1-carboxylate;
methyl (CIS)-3-(6-hydroxy-3-methylpyridin-2-yl)-2-(((((CIS)-4-phenylcyclohexyl)oxy)methyl)piperidine-1-carboxylate;
methyl 3-(5-chloro-2-hydroxythiazol-4-yl)-2-(((4-phenyl-cyclohexyl)oxy)methyl)-piperidine-1-carboxylate;
((CIS)-2-methylcyclopropyl)((2R,3S)-2-(((((1s,4S)-4-phenylcyclohexyl)oxy-)methyl)-3-(1H-pyrazol-3-yl)piperidin-1-yl)methanone;
((TRANS)-2-methylcyclopropyl)((CIS)-2-(((((CIS)-4-phenylcyclohexyl)oxy)-methyl)-3-(1H-pyrazol-3-yl)piperidin-1-yl)methanone;
cyclopropyl((CIS)-2-(((((CIS)-4-phenylcyclohexyl)oxy)methyl)-3-(1H-pyrazol-3-yl)piperidin-1-yl)methanone;

(S)-2-amino-1-((CIS)-2-(((((CIS)-4-isopropylcyclohexyl)oxy)methyl)-3-(1H-pyrazol-3-yl)piperidin-1-yl)-4-methoxybutan-1-one;
1-((CIS)-2-(((((CIS)-4-isopropylcyclohexyl)oxy)methyl)-3-(1H-pyrazol-3-yl)piperidin-1-yl)-2-methylpropan-1-one;
2-(oxetan-3-yl)-1-((CIS)-2-(((((CIS)-4-phenylcyclohexyl)oxy)methyl)-3-(1H-pyrazol-3-yl)piperidin-1-yl)ethan-1-one;
cyclopropyl((CIS)-2-(((((CIS)-4-isopropylcyclohexyl)oxy)methyl)-3-(1H-pyrazol-3-yl)piperidin-1-yl)methanone;
((CIS)-2-(((((CIS)-4-isopropylcyclohexyl)oxy)methyl)-3-(1H-pyrazol-3-yl)piperidin-1-yl)(2-methylcyclopropyl)methanone;
2-hydroxy-2-methyl-1-((CIS)-2-(((((CIS)-4-phenylcyclohexyl)oxy)methyl)-3-(1H-pyrazol-3-yl)piperidin-1-yl)propan-1-one;
(1-hydroxycyclopropyl)((CIS)-2-(((((CIS)-4-phenylcyclohexyl)oxy)methyl)-3-(1H-pyrazol-3-yl)piperidin-1-yl)methanone;
cyclobutyl((CIS)-2-(((((CIS)-4-isopropylcyclohexyl)oxy)methyl)-3-(1H-pyrazol-3-yl)piperidin-1-yl)methanone;
(1-methylcyclopropyl)((CIS)-2-(((((CIS)-4-phenylcyclohexyl)oxy)methyl)-3-(1H-pyrazol-3-yl)piperidin-1-yl)methanone;
(2,2-dimethylcyclopropyl)((CIS)-2-(((((CIS)-4-isopropylcyclohexyl)oxy)methyl)-3-(1H-pyrazol-3-yl)piperidin-1-yl)methanone;
1-((CIS)-2-(((((CIS)-4-isopropylcyclohexyl)oxy)methyl)-3-(1H-pyrazol-3-yl)piperidin-1-yl)propan-1-one;
cyclopentyl((CIS)-2-(((((CIS)-4-isopropylcyclohexyl)oxy)methyl)-3-(1H-pyrazol-3-yl)piperidin-1-yl)methanone;
1-((CIS)-2-(((((CIS)-4-isopropylcyclohexyl)oxy)methyl)-3-(1H-pyrazol-3-yl)piperidin-1-yl)but-3-en-1-one;
1-((CIS)-2-(((((CIS)-4-isopropylcyclohexyl)oxy)methyl)-3-(1H-pyrazol-3-yl)piperidin-1-yl)pent-4-yn-1-one;
1-((CIS)-2-(((((CIS)-4-isopropylcyclohexyl)oxy)methyl)-3-(1H-pyrazol-3-yl)piperidin-1-yl)hex-5-yn-1-one;
2-methoxy-2-methyl-1-((CIS)-2-(((((CIS)-4-phenylcyclohexyl)oxy)methyl)-3-(1H-pyrazol-3-yl)piperidin-1-yl)propan-1-one;
3-cyclopropyl-1-((CIS)-2-(((((CIS)-4-isopropylcyclohexyl)oxy)methyl)-3-(1H-pyrazol-3-yl)piperidin-1-yl)propan-1-one;
(S)-2-fluoro-1-((CIS)-2-(((((CIS)-4-isopropylcyclohexyl)oxy)methyl)-3-(1H-pyrazol-3-yl)piperidin-1-yl)-2-methylpentan-1-one;
5-((CIS)-1-((TRANS)-2-ethylcyclopropane-1-carbonyl)-2-(((((CIS)-4-phenylcyclohexyl)oxy)methyl)piperidin-3-yl)-1H-pyrazol-2-ium;
((R)-2,2-dimethylcyclopropyl)((CIS)-2-(((((CIS)-4-phenylcyclohexyl)-oxy)methyl)-3-(1H-pyrazol-3-yl)piperidin-1-yl)methanone;
(2,2-difluorocyclopropyl)((CIS)-2-(((((CIS)-4-phenylcyclohexyl)oxy)methyl)-3-(1H-pyrazol-3-yl)piperidin-1-yl)methanone;
2-chlorobenzyl (CIS)-2-(((((CIS) 4-isopropylcyclohexyl)oxy)methyl)-3-(1H-pyrazol-3-yl)piperidine-1-carboxylate;
((R)-4-methyl-5-oxomorpholin-2-yl)methyl (CIS)-2-(((((CIS)-4-phenylcyclohexyl)oxy)methyl)-3-(1H-pyrazol-3-yl)piperidine-1-carboxylate;
prop-2-yn-1-yl (CIS)-2-(((((CIS)-4-isopropylcyclohexyl)oxy)methyl)-3-(1H-pyrazol-3-yl)piperidine-1-carboxylate;
2,2-difluoroethyl (CIS)-2-(((((CIS)-4-phenylcyclohexyl)oxy)methyl)-3-(1H-pyrazol-3-yl)piperidine-1-carboxylate;

2-oxopropyl (CIS)-2-(((((CIS)-4-phenylcyclohexyl)oxy)methyl)-3-(1H-pyrazol-3-yl)piperidine-1-carboxylate;
2-methoxy-2-oxoethyl (CIS)-2-(((((CIS)-4-phenylcyclohexyl)oxy)methyl)-3-(1H-pyrazol-3-yl)piperidine-1-carboxylate;
1,1-difluoropropan-2-yl (CIS)-2-(((((CIS)-4-phenylcyclohexyl)oxy)methyl)-3-(1H-pyrazol-3-yl)piperidine-1-carboxylate;
prop-2-yn-1-yl (CIS)-2-(((((CIS)-4-phenylcyclohexyl)oxy)methyl)-3-(1H-pyrazol-3-yl)piperidine-1-carboxylate;
pyridin-3-yl (CIS)-2-(((((CIS)-4-phenylcyclohexyl)oxy)methyl)-3-(1H-pyrazol-3-yl)piperidine-1-carboxylate;
2,2,2-trifluoroethyl (CIS)-2-(((((CIS)-4-phenylcyclohexyl)oxy)methyl)-3-(1H-pyrazol-3-yl)piperidine-1-carboxylate;
but-2-yn-1-yl (CIS)-2-(((((CIS)-4-phenylcyclohexyl)oxy)methyl)-3-(1H-pyrazol-3-yl)piperidine-1-carboxylate;
cyclobutylmethyl (CIS)-2-(((((CIS)-4-phenylcyclohexyl)oxy)methyl)-3-(1H-pyrazol-3-yl)piperidine-1-carboxylate;
isobutyl (CIS)-2-(((((CIS)-4-phenylcyclohexyl)oxy)methyl)-3-(1H-pyrazol-3-yl)piperidine-1-carboxylate;
pent-3-yn-1-yl (CIS)-2-(((((CIS)-4-phenylcyclohexyl)oxy)methyl)-3-(1H-pyrazol-3-yl)piperidine-1-carboxylate;
(S)-2-methylbutyl (CIS)-2-(((((CIS)-4-phenylcyclohexyl)oxy)methyl)-3-(1H-pyrazol-3-yl)piperidine-1-carboxylate;
(R)-sec-butyl (CIS)-2-(((((CIS)-4-phenylcyclohexyl)oxy)methyl)-3-(1H-pyrazol-3-yl)piperidine-1-carboxylate;
(5-methyloxazol-2-yl)methyl (CIS)-2-(((((CIS)-4-phenylcyclohexyl)oxy)methyl)-3-(1H-pyrazol-3-yl)piperidine-1-carboxylate;
2,2-difluoropropyl (CIS)-2-(((((CIS)-4-phenylcyclohexyl)oxy)methyl)-3-(1H-pyrazol-3-yl)piperidine-1-carboxylate;
2-fluoroethyl (CIS)-2-(((((CIS)-4-phenylcyclohexyl)oxy)methyl)-3-(1H-pyrazol-3-yl)piperidine-1-carboxylate;
cyclobutyl (CIS)-2-(((((CIS)-4-phenylcyclohexyl)oxy)methyl)-3-(1H-pyrazol-3-yl)piperidine-1-carboxylate;
1,3-difluoropropan-2-yl (CIS)-2-(((((CIS)-4-phenylcyclohexyl)oxy)methyl)-3-(1H-pyrazol-3-yl)piperidine-1-carboxylate;
3-methoxy-3-oxopropyl (CIS)-2-(((((CIS)-4-phenylcyclohexyl)oxy)methyl)-3-(1H-pyrazol-3-yl)piperidine-1-carboxylate;
(S)-but-3-yn-2-yl (CIS)-2-(((((CIS)-4-phenylcyclohexyl)oxy)methyl)-3-(1H-pyrazol-3-yl)piperidine-1-carboxylate;
(S)-sec-butyl (CIS)-2-(((((CIS)-4-phenylcyclohexyl)oxy)methyl)-3-(1H-pyrazol-3-yl)piperidine-1-carboxylate;
cyclopentyl (CIS)-2-(((((CIS)-4-phenylcyclohexyl)oxy)methyl)-3-(1H-pyrazol-3-yl)piperidine-1-carboxylate;
3-methoxypropyl (CIS)-2-(((((CIS)-4-phenylcyclohexyl)oxy)methyl)-3-(1H-pyrazol-3-yl)piperidine-1-carboxylate;
(S)-2-methoxypropyl (CIS)-2-(((((CIS)-4-phenylcyclohexyl)oxy)methyl)-3-(1H-pyrazol-3-yl)piperidine-1-carboxylate;
(CIS)-N-allyl-2-(((((CIS)-4-isopropylcyclohexyl)oxy)methyl)-3-(1H-pyrazol-3-yl)piperidine-1-carboxamide;
(CIS)-N-isopropyl-2-(((((CIS)-4-isopropylcyclohexyl)oxy)methyl)-3-(1H-pyrazol-3-yl)piperidine-1-carboxamide;
(CIS)-N-benzyl-2-(((((CIS)-4-isopropylcyclohexyl)oxy)methyl)-3-(1H-pyrazol-3-yl)piperidine-1-carboxamide;
(CIS)-N-(cyclohexylmethyl)-2-(((((CIS)-4-isopropylcyclohexyl)oxy)methyl)-3-(1H-pyrazol-3-yl)piperidine-1-carboxamide;
(CIS)-N-cyclohexyl-2-(((((CIS)-4-isopropylcyclohexyl)oxy)methyl)-3-(1H-pyrazol-3-yl)piperidine-1-carboxamide;
(CIS)-N-(cyclobutylmethyl)-2-(((((CIS)-4-phenylcyclohexyl)oxy)methyl)-3-(1H-pyrazol-3-yl)piperidine-1-carboxamide;
(CIS)-N-(1-methoxypropan-2-yl)-2-(((((CIS)-4-phenylcyclohexyl)oxy)methyl)-3-(1H-pyrazol-3-yl)piperidine-1-carboxamide;
(CIS)-N-(oxetan-3-yl)-2-(((((CIS)-4-phenylcyclohexyl)oxy)methyl)-3-(1H-pyrazol-3-yl)piperidine-1-carboxamide; and
(CIS)-N—((R)-sec-butyl)-2-(((((CIS)-4-phenylcyclohexyl)oxy)methyl)-3-(1H-pyrazol-3-yl)piperidine-1-carboxamide;

or a pharmaceutically acceptable salt thereof.

Alternate embodiments of the present invention may also exclude any of the compounds which are recited in the list above.

The compounds of the present invention may contain one or more asymmetric centers and can thus occur as racemates and racemic mixtures, single enantiomers, diastereomeric mixtures and individual diastereomers. Additional asymmetric centers may be present depending upon the nature of the various substituents on the molecule. Each such asymmetric center will independently produce two optical isomers and it is intended that all of the possible optical isomers and diastereomers in mixtures and as pure or partially purified compounds are included within the ambit of this invention. The present invention is meant to comprehend all such isomeric forms of these compounds. Likewise, the present invention includes tautomeric forms of the compounds disclosed herein. Formula I shows the structure of the class of compounds without specific stereochemistry. At least some of the chemical names of compounds of the invention as set forth in this application may have been generated on an automated basis by use of commercially available chemical naming software programs, and have not been independently verified.

The independent syntheses of these diastereomers or their chromatographic separations may be achieved as known in the art by appropriate modification of the methodology disclosed herein. Their absolute stereochemistry may be determined by the x-ray crystallography of crystalline products or crystalline intermediates which are derivatized, if necessary, with a reagent containing an asymmetric center of known absolute configuration. If desired, racemic mixtures of the compounds may be separated so that the individual enantiomers are isolated. The separation can be carried out by methods well known in the art, such as the coupling of a racemic mixture of compounds to an enantiomerically pure compound to form a diastereomeric mixture, followed by separation of the individual diastereomers by standard methods, such as fractional crystallization or chromatography. The coupling reaction is often the formation of salts using an enantiomerically pure acid or base. The diasteromeric derivatives may then be converted to the pure enantiomers by cleavage of the added chiral residue. The racemic mixture of the compounds can also be separated directly by chromatographic methods utilizing chiral stationary phases, which methods are well known in the art. Alternatively, any enantiomer of a compound may be obtained by stereoselective synthesis using optically pure starting materials or reagents of known configuration by methods well known in the art.

As appreciated by those of skill in the art, halogen or halo as used herein are intended to include fluoro, chloro, bromo and iodo. Similarly, $C_{1-6}$, as in $C_{1-6}$alkyl is defined to identify the group as having 1, 2, 3, 4, 5 or 6 carbons in a linear or branched arrangement, such that $C_{1-6}$alkyl specifically includes methyl, ethyl, n-propyl, iso-propyl, n-butyl, iso-butyl, tert-butyl, pentyl, and hexyl. A group which is designated as being independently substituted with substituents may be independently substituted with multiple numbers of such substituents.

The present invention also includes all pharmaceutically acceptable isotopic variations of a compound of the Formula I in which one or more atoms is replaced by atoms having the same atomic number, but an atomic mass or mass number different from the atomic mass or mass number usually found in nature. Such compounds are identical to those disclosed herein, but for the fact that one or more atoms are replaced by an atom having an atomic mass or mass number different from the atomic mass or mass number usually found in nature. Examples of isotopes suitable for inclusion in the compounds of the invention include isotopes of hydrogen such as $^{2}H$ and $^{3}H$, carbon such as $^{11}C$, $^{13}C$ and $^{14}C$, nitrogen such as $^{13}N$ and $^{15}N$, oxygen such as $^{15}O$, $^{17}O$ and $^{18}O$, phosphorus such as $^{32}P$, sulfur such as $^{35}S$, fluorine such as $^{18}F$, iodine such as $^{123}I$ and $^{125}I$, and chlorine such as $^{36}Cl$. Certain isotopically-labelled compounds of Formula I, for example those incorporating a radioactive isotope, are useful in drug and/or substrate tissue distribution studies. The radioactive isotopes tritium, i.e. $^{3}H$, and carbon-14, i.e. $^{14}C$, are particularly useful for this purpose in view of their ease of incorporation and ready means of detection. Substitution with heavier isotopes such as deuterium, i.e. $^{2}H$, may afford certain therapeutic advantages resulting from greater metabolic stability, for example, increased in vivo half-life or reduced dosage requirements, and hence may be preferred in some circumstances. Substitution with positron emitting isotopes, such as $^{11}C$, $^{18}F$, $^{15}O$ and $^{13}N$, can be useful in Positron Emission Topography (PET) studies for examining substrate receptor occupancy. An embodiment of the present invention includes compounds that are substituted with a positron emitting isotope. An embodiment of the present invention includes compounds that are substituted with a $^{11}C$ isotope. An embodiment of the present invention includes compounds that are substituted with an $^{18}F$ isotope. In the compounds of the invention, the atoms may exhibit their natural isotopic abundances, or one or more of the atoms may be artificially enriched in a particular isotope having the same atomic number, but an atomic mass or mass number different from the atomic mass or mass number predominantly found in nature.

The present invention is meant to include all suitable isotopic variations of the compounds of the invention. For example, different isotopic forms of hydrogen (H) include protium ($^{1}H$) and deuterium ($^{2}H$). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds of the invention can be prepared without undue experimentation by conventional techniques well known to those skilled in the art or by processes analogous to those described in the schemes and examples herein using appropriate isotopically-enriched reagents and/or intermediates.

Those skilled in the art will recognize those instances in which the compounds of the invention may form salts. In such instances, another embodiment provides pharmaceutically acceptable salts of the compounds of the invention. Thus, reference to a compound of the invention herein is understood to include reference to salts thereof, unless otherwise indicated. The term "pharmaceutically acceptable salts" refers to salts prepared from pharmaceutically acceptable non-toxic bases or acids including inorganic or organic bases and inorganic or organic acids. In addition, when a compound of the invention contains both a basic moiety, such as, but not limited to a pyridine or imidazole, and an acidic moiety, such as, but not limited to a carboxylic acid, zwitterions ("inner salts") may be formed and are included within the present invention. Salts derived from inorganic bases include aluminum, ammonium, calcium, copper, ferric, ferrous, lithium, magnesium, manganic salts, manganous, potassium, sodium, zinc, and the like. Particular embodiments include the ammonium, calcium, magnesium, potassium, and sodium salts. Salts in the solid form may exist in more than one crystal structure, and may also be in the form of hydrates or solvates. Salts derived from pharmaceutically acceptable organic non-toxic bases include salts of primary, secondary, and tertiary amines, substituted amines including naturally occurring substituted amines, cyclic amines, and basic ion exchange resins, such as arginine, betaine, caffeine, choline, N,N'-dibenzylethylenediamine, diethylamine, 2-diethylaminoethanol, 2-dimethylaminoethanol, ethanolamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine, and the like.

When the compound of the present invention is basic, salts may be prepared from pharmaceutically acceptable non-toxic acids, including inorganic and organic acids. Such acids include acetic, benzenesulfonic, benzoic, camphorsulfonic, citric, ethanesulfonic, fumaric, gluconic, glutamic, hydrobromic, hydrochloric, isethionic, lactic, maleic, malic, mandelic, methanesulfonic, mucic, nitric, pamoic, pantothenic, phosphoric, succinic, sulfuric, tartaric, p-toluenesulfonic acid, and the like. Particular embodiments include the citric, hydrobromic, hydrochloric, maleic, phosphoric, sulfuric, fumaric, and tartaric acids. It will be understood that, as used herein, references to the compounds of Formula I are meant to also include the pharmaceutically acceptable salts. Salts of the compounds of the invention may be formed by methods known to those of ordinary skill in the art, for example, by reacting a compound of the invention with an amount of acid or base, such as an equivalent amount, in a medium such as one in which the salt precipitates or in an aqueous medium followed by lyophilization.

Exemplifying the invention is the use of the compounds disclosed in the Examples and herein. Specific compounds within the present invention include a compound which is selected from the compounds disclosed in the following Examples and pharmaceutically acceptable salts thereof and individual enantiomers or diastereomers thereof.

The present invention is also directed to the use of the compounds disclosed herein as agonists of orexin receptor activity. The subject compounds and pharmaceutically acceptable salts thereof are useful in a method of agonizing orexin receptor activity in a subject such as a mammal comprising the administration of an amount of the compound. In addition to primates, especially humans, a variety of other mammals may be administered with a compound of the present invention. The present invention is directed to a compound of the present invention or a pharmaceutically acceptable salt thereof that could be useful in therapy. The present invention may further be directed to a use of a compound of the present invention or a pharmaceutically acceptable salt thereof for the manufacture of a medicament for agonizing orexin receptor activity or treating the disorders and diseases noted herein in humans and animals.

A subject administered with a compound of the present invention, or a pharmaceutically acceptable salt thereof, is generally a mammal, such as a human being, male or female. The amount of compound administered to the subject is an amount sufficient to agonize the orexin receptor in the subject. In an embodiment, the amount of compound can be an "effective amount", wherein the subject compound is administered in an amount that will elicit the biological or medical response of a tissue, system, animal or human that is being sought by the researcher, veterinarian, medical doctor or other clinician. An effective amount does not necessarily include considerations of toxicity and safety related to the administration of the compound. It is recognized that one skilled in the art may affect neurological and psychiatric disorders associated with orexin receptor activation by treating a subject presently afflicted with the disorders, or by prophylactically treating a subject likely to be afflicted with the disorders, with an effective amount of a compound of the present invention. As used herein, the terms "treatment" and "treating" refer to all processes wherein there may be a slowing, interrupting, arresting, controlling, or stopping of the progression of the neurological and psychiatric disorders described herein, but does not necessarily indicate a total elimination of all disorder symptoms, as well as the prophylactic therapy of the mentioned conditions, particularly in a subject that is predisposed to such disease or disorder. The terms "administration of" and or "administering a" compound should be understood to mean providing a compound of the invention or a prodrug of a compound of the invention to the subject.

The term "composition" as used herein is intended to encompass a product comprising the specified ingredients in the specified amounts, as well as any product which results, directly or indirectly, from combination of the specified ingredients in the specified amounts. Such term is intended to encompass a product comprising the active ingredient(s), and the inert ingredient(s) that make up the carrier, as well as any product which results, directly or indirectly, from combination, complexation or aggregation of any two or more of the ingredients, or from dissociation of one or more of the ingredients, or from other types of reactions or interactions of one or more of the ingredients. Accordingly, the compositions of the present invention encompass any composition made by admixing a compound of the present invention and a pharmaceutically acceptable carrier. By "pharmaceutically acceptable" it is meant the carrier, diluent or excipient must be compatible with the other ingredients of the formulation and not deleterious to the recipient thereof.

The utility of the compounds in accordance with the present invention as orexin receptor OX1R and/or OX2R agonists may be readily determined without undue experimentation by methodology well known in the art. Both the OX1R and/or OX2R G-coupled protein receptors (GPCRs) couple through the Gαq signaling pathway, which ultimately promotes calcium mobilization via inositol triphosphate (IP3) production. The half-life of IP-3 is relatively short, being rapidly metabolized to inositol monophosphate (IP-1), which can be readily detected using a commercially available assay kit (IP-One; Cisbio; cat #621PAPEC) coupled with a cell line expressing the target receptor(s) of interest. The utility of the compounds in accordance with the present invention as orexin receptor OX1R and/or OX2R agonists may be determined utilizing this assay.

In a typical experiment, the OX1 and OX2 receptor agonist activity is determined in accordance with the following general experimental method. Chinese hamster ovary (CHO) cells expressing human OX1R and/or the human OX2R were grown in Iscove's modified DMEM containing glutaMAX™, 1% G418, 100 U/mL penicillin, 100 μg/mL streptomycin and 10% heat-inactivated qualified fetal bovine serum (FBS). The OX2R cells were seeded at 10,000 cells/well/50 μL and the OX1R cells were seeded at 20,000 cells/well/50 μL into 384-well white tissue culture plates (Greiner; cat #781080). All cell/media reagents were from GIBCO-Invitrogen Corp. The seeded cell plate(s) were incubated at 37° C. with 5% $CO_2$ and 85% humidity for 20-24 hours. On the day of the assay, assay-ready compound plates were prepared using an acoustic liquid handler (ECHO; Labcyte), which dispensed sufficient volume of test compound stock (10 mM in DMSO) or 100% DMSO to prepare 10 point, ½-log dilutions in a final volume of 202.5 nL/well in all test wells of a 384-well diamond plate (Labcyte). Following completion of assay-ready plates, importantly, the next three steps were performed with minimal delay: 1) 20 μl of 1× stimulation buffer was added to the compound plate using a Multidrop Combi (small cassette, Thermo Fisher Scientific cat #24073290); 2) culture medium was removed from the cell plate using the Bluewasher plate washer (gentle spin; BlueCatBio); 3) 14 μl of compound/stimulation buffer mixture was added to the cell plate using a Bravo liquid handler (Agilent) prior to incubating cell plates at 37° C. with 5% $CO_2$ and 85% humidity for 1 or 2 hours (OX1R and OX2R, respectively). During this incubation, IP-one detection reagents were prepared (38:1:1 lysis buffer:D2:AB-cryptate reagents). Six μL of mixed detection reagents were added to the cell plate using a Multidrop Combi (small cassette, Thermo Fisher Scientific cat #24073290) and incubated 60 minutes at room temperature in the dark. Fluorescence signal was detected using an Envision plate reader (Perkin Elmer) [LANCE/DELFIA Dual Enh (Em: APC 665; Ex: Cy5 620)].

For each compound, data were fit to a four parameter logistic fit (ActivityBase software) and the $EC_{50}$ was reported as the inflection point of the resulting curve. Percent effect for each test compound was determined as the percentage of sample raw value/mean max effect, where the mean max effect was derived from the mean raw value of 32 control wells per assay plate (using Orexin A (cat #003-30) at 1 μM for human OX1R and a reference compound at 1 uM with 100% activity previously established by comparison to Orexin A for human OX2R). The intrinsic orexin receptor agonist activity of a compound which may be used in the present invention may be determined by these assays.

All of the final compounds of the following examples had activity in agonizing the human orexin-2 receptor in the aforementioned IPOne assay with an $EC_{50}$ of about 0.01 nM to 5000 nM. Additional data is provided in the following Examples. Such a result is indicative of the intrinsic activity of the compounds in use as agonists of orexin-1 receptor and/or the orexin-2 receptor. In general, one of ordinary skill in the art would appreciate that a substance is considered to effectively agonize the orexin receptor if it has an $EC_{50}$ in the IPOne assay of less than about 50 μM, or more specifically less than about 1000 nM.

The orexin receptors have been implicated in a wide range of biological functions. This has suggested a potential role for these receptors in a variety of disease processes in humans or other species. The compounds of the present invention could therefore potentially have utility in treating, preventing, ameliorating, controlling or reducing the risk of a variety of disorders associated with orexin receptors, including one or more of the following conditions or diseases: narcolepsy, narcolepsy syndrome accompanied by narcolepsy-like symptoms, cataplexy in narcolepsy, excessive daytime sleepiness (EDS) in narcolepsy, hypersomnia, idiopathic hypersomnia, repeatability hypersomnia, intrinsic hypersomnia, hypersomnia accompanied by daytime hypersomnia, interrupted sleep, sleep apnea, wakefulness, nocturnal myoclonus, disturbances of consciousness, such as coma, REM sleep interruptions, jet-lag, excessive daytime sleepiness, shift workers' sleep disturbances, dyssomnias, sleep disorders, sleep disturbances, hypersomnia associated with depression, emotional/mood disorders, Alzheimer's disease or cognitive impairment, Parkinson's disease, Guillain-Barre syndrome, Kleine Levin syndrome, and sleep disorders which accompany aging; Alzheimer's sundowning; conditions associated with circadian rhythmicity as well as mental and physical disorders associated with travel across time zones and with rotating shift-work schedules; fibromyalgia; cardiac failure; diseases related to bone loss; sepsis; syndromes which are manifested by non-restorative sleep and muscle pain or sleep apnea which is associated with respiratory disturbances during sleep; conditions which result from a diminished quality of sleep; and other diseases related to general orexin system dysfunction.

Thus, in certain embodiments the present invention may provide methods for: treating or controlling narcolepsy, narcolepsy syndrome accompanied by narcolepsy-like symptoms, cataplexy in narcolepsy, excessive daytime sleepiness (EDS) in narcolepsy, hypersomnia, idiopathic hypersomnia, repeatability hypersomnia, intrinsic hypersomnia, hypersomnia accompanied by daytime hypersomnia, interrupted sleep, sleep apnea, disturbances of consciousness, REM sleep interruptions, jet-lag, shift workers' sleep disturbances, dyssomnias, night terror, insomnias associated with depression, emotional/mood disorders, Alzheimer's disease or cognitive impairment; treating or controlling sleep disturbances associated with diseases such as neurological disorders including neuropathic pain and restless leg syndrome; treating or controlling addiction disorders; treating or controlling psychoactive substance use and abuse; enhancing cognition; increasing memory retention; treating or controlling obesity; treating or controlling diabetes and appetite, taste, eating, or drinking disorders; treating or controlling insulin resistance syndrome; treating or controlling hypothalamic diseases; treating or controlling depression; treating, controlling, ameliorating or reducing the risk of epilepsy, including absence epilepsy; treating or controlling pain, including neuropathic pain; treating or controlling Parkinson's disease; treating or controlling Guillain-Barre syndrome; treating or controlling Klein Levin syndrome; treating or controlling psychosis; treating or controlling dysthymic, mood, psychotic and anxiety disorders; treating side effects or complications due to anesthesia; reversal of anesthesia; reversal of anesthesia following surgery; treating or controlling depression, including major depression and major depression disorder; treating or controlling bipolar disorder; or treating, controlling, ameliorating or reducing the risk of schizophrenia, in a mammalian subject which comprises administering to the subject a compound of the present invention.

The compounds of the present invention may also potentially have utility in treating, preventing, ameliorating, controlling or reducing the risk of a variety of other disorders associated with orexin receptors, including one or more of the following conditions or diseases including enhancing sleep quality, improving sleep quality, increasing sleep efficiency, augmenting sleep maintenance; increasing the value which is calculated from the time that a subject sleeps divided by the time that a subject is attempting to sleep; improving sleep initiation; decreasing sleep latency or onset (the time it takes to fall asleep); decreasing difficulties in falling asleep; increasing sleep continuity; decreasing the number of awakenings during sleep; decreasing intermittent wakings during sleep; decreasing nocturnal arousals; decreasing the time spent awake following the initial onset of sleep; increasing the total amount of sleep; reducing the fragmentation of sleep; altering the timing, frequency or duration of REM sleep bouts; altering the timing, frequency or duration of slow wave (i.e. stages 3 or 4) sleep bouts; increasing the amount and percentage of stage 2 sleep; promoting slow wave sleep; enhancing EEG-delta activity during sleep; decreasing nocturnal arousals, especially early morning awakenings; increasing daytime alertness; reducing daytime drowsiness; treating or reducing excessive daytime sleepiness; increasing satisfaction with the intensity of sleep; increasing sleep maintenance; idiopathic insomnia; sleep problems; insomnia; night terror, insomnias associated with depression, emotional/mood disorders, Alzheimer's disease or cognitive impairment, as well as sleep walking and enuresis, and sleep disorders which accompany aging; Alzheimer's sundowning; conditions associated with circadian rhythmicity as well as mental and physical disorders associated with travel across time zones and with rotating shift-work schedules, conditions due to drugs which cause reductions in REM sleep as a side effect; fibromyalgia; syndromes which are manifested by non-restorative sleep and muscle pain or sleep apnea which is associated with respiratory disturbances during sleep; conditions which result from a diminished quality of sleep; increasing learning; augmenting memory; increasing retention of memory; eating disorders associated with excessive food intake and complications associated therewith, compulsive eating disorders, obesity (due to any cause, whether genetic or environmental), obesity-related disorders overeating, anorexia, bulimia, cachexia, dysregulated appetite control, hypertension, diabetes, elevated plasma insulin concentrations and insulin resistance, dyslipidemias, hyperlipidemia, endometrial, breast, prostate and colon cancer, osteoarthritis, obstructive sleep apnea, cholelithiasis, gallstones, heart disease, lung disease, abnormal heart rhythms and arrythmias, myocardial infarction, congestive heart failure, coronary heart disease, acute and congestive heart failure; hypotension; hypertension; urinary retention; osteoporosis; angina pectoris; myocardinal infarction; ischemic or haemorrhagic stroke; subarachnoid haemorrhage; ulcers; allergies; benign prostatic hypertrophy; chronic renal failure; renal disease; impaired glucose tolerance; sudden death, polycystic ovary disease, craniopharyngioma, the Prader-Willi Syndrome, Frohlich's syndrome, GH-deficient subjects, normal variant short stature, Turner's syndrome, and other pathological conditions showing reduced metabolic activity or a decrease in resting energy expenditure as a percentage of total fat-free mass, e.g, children with acute lymphoblastic leukemia, metabolic syndrome, also known as syndrome X, insulin resistance syndrome, reproductive hormone abnormalities, sexual and reproductive dysfunction, such as impaired fertility, infertility, hypogonadism in males and hirsutism in females, fetal defects associated with maternal obesity, gastrointestinal motility disorders, intestinal motility dyskinesias, obesity-related gastro-esophageal reflux, hypothalmic diseases, hypophysis diseases, respiratory disorders, such as obesity-hypoventilation syndrome (Pickwickian syndrome), breathlessness, cardiovascular disorders, inflammation, such as systemic inflammation of the vasculature, arteriosclerosis, hypercholesterolemia, hyperuricaemia, lower back pain, gallbladder disease, gout, kidney cancer, increased anesthetic risk, reducing the risk of secondary outcomes of obesity, such as reducing the risk of left ventricular hypertrophy; diseases or disorders where abnormal oscillatory activity occurs in the brain, including depression, migraine, neuropathic pain, Parkinson's disease, psychosis and schizophrenia, as well as diseases or disorders where there is abnormal coupling of activity, particularly through the thalamus; enhancing cognitive function, including cognitive dysfunctions that comprise deficits in all types of attention, learning and memory functions occurring transiently or chronically in the normal, healthy, young, adult or aging population, and also occurring transiently or chronically in psychiatric, neurologic, cardiovascular and immune disorders; treating or controlling Guillain-Barre syndrome; treating or controlling Klein Levin syndrome; treating or controlling psychosis; treating or controlling dysthymic, mood, psychotic and anxiety disorders; treating complications due to anesthesia; enhancing memory; increasing memory retention; increasing immune response; increasing immune function; hot flashes; night sweats; extending life span; schizophrenia; muscle-related disorders that are controlled by the excitation/relaxation rhythms imposed by the neural system such as cardiac rhythm and other disorders of the cardiovascular system; conditions related to proliferation of cells such as vasodilation or vasorestriction and blood pressure; cancer; cardiac arrhythmia; hypertension; congestive heart failure; conditions of the genital/urinary system; disorders of sexual function and fertility; adequacy of renal function; responsivity to anesthetics; mood disorders, such as depression or more particularly depressive disorders, for example, single episodic or recurrent major depressive disorders and dysthymic disorders, or bipolar disorders, for example, bipolar I disorder, bipolar II disorder and cyclothymic disorder, mood disorders due to a general medical condition, and substance-induced mood disorders; affective neurosis; depressive neurosis; anxiety neurosis; anxiety disorders including acute stress disorder, agoraphobia, generalized anxiety disorder, obsessive-compulsive disorder, panic attack, panic disorder, post-traumatic stress disorder, separation anxiety disorder, social phobia, specific phobia, substance-induced anxiety disorder and anxiety due to a general medical condition; acute neurological and psychiatric disorders such as cerebral deficits subsequent to cardiac bypass surgery and grafting, stroke, ischemic stroke, cerebral ischemia, spinal cord trauma, head trauma, perinatal hypoxia, cardiac arrest, hypoglycemic neuronal damage; Huntington's Chorea; Huntington's disease and Tourette syndrome; Cushing's syndrome/disease; basophile adenoma; prolactinoma; hyperprolactinemia; hypophysis tumor/adenoma; hypothalamic diseases; inflammatory bowel disease; gastric diskinesia; gastric ulcers; Froehlich's syndrome; adrenohypophysis disease; hypophysis disease; adrenohypophysis hypofunction; adrenohypophysis hyperfunction; hypothalamic hypogonadism; Kallman's syndrome (anosmia, hyposmia); functional or psychogenic amenorrhea; hypopituitarism; hypothalamic hypothyroidism; hypothalamic-adrenal dysfunction; idiopathic hyperprolactinemia; hypothalamic disorders of growth hormone deficiency; idiopathic growth deficiency; dwarfism; gigantism; acromegaly; amyotrophic lateral sclerosis; multiple sclerosis; ocular damage; retinopathy; cognitive disorders; idiopathic and drug-induced Parkinson's disease; muscular spasms and disorders associated with muscular spasticity including tremors, epilepsy, convulsions, seizure disorders; absence seizures, complex partial and generalized seizures; Lennox-Gastaut syndrome; cognitive disorders including dementia (associated with Alzheimer's disease, ischemia, trauma, vascular problems or stroke, HIV disease, Parkinson's disease, Huntington's disease, Pick's disease, Creutzfeldt-Jacob disease, perinatal hypoxia, other general medical conditions or substance abuse); delirium, amnestic disorders or age related cognitive decline; schizophrenia or psychosis including schizophrenia (paranoid, disorganized, catatonic or undifferentiated), schizophreniform disorder, schizoaffective disorder, delusional disorder, brief psychotic disorder, shared psychotic disorder, psychotic disorder due to a general medical condition and substance-induced psychotic disorder; dissociative disorders including multiple personality syndromes and psychogenic amnesias; substance-related disorders, substance use, substance abuse, substance seeking, substance reinstatement, all types of psychological and physical addictions and addictive behaviors, reward-related behaviors (including substance-induced delirium, persisting dementia, persisting amnestic disorder, psychotic disorder or anxiety disorder; tolerance, addictive feeding, addictive feeding behaviors, binge/purge feeding behaviors, dependence, withdrawal or relapse from substances including alcohol, amphetamines, cannabis, cocaine, hallucinogens, inhalants, morphine, nicotine, opioids, phencyclidine, sedatives, hypnotics or anxiolytics); appetite, taste, eating or drinking disorders; movement disorders, including akinesias and akinetic-rigid syndromes (including Parkinson's disease, drug-induced parkinsonism, postencephalitic parkinsonism, progressive supranuclear palsy, multiple system atrophy, corticobasal degeneration, parkinsonism-ALS dementia complex and basal ganglia calcification), chronic fatigue syndrome, fatigue, including Parkinson's fatigue, multiple sclerosis fatigue, fatigue caused by a sleep disorder or a circadian rhythm disorder, medication-induced parkinsonism (such as neuroleptic-induced parkinsonism, neuroleptic malignant syndrome, neuroleptic-induced acute dystonia, neuroleptic-induced acute akathisia, neuroleptic-induced tardive dyskinesia and medication-induced postural tremor), Gilles de la Tourette's syndrome, epilepsy, and dyskinesias [including tremor (such as rest tremor, essential tremor, postural tremor and intention tremor), chorea (such as Sydenham's chorea, Huntington's disease, benign hereditary chorea, neuroacanthocytosis, symptomatic chorea, drug-induced chorea and hemiballism), myoclonus (including generalised myoclonus and focal myoclonus), tics (including simple tics, complex tics and symptomatic tics), restless leg syndrome and dystonia (including generalised dystonia such as iodiopathic dystonia, drug-induced dystonia, symptomatic dystonia and paroxymal dystonia, and focal dystonia such as blepharospasm, oromandibular dystonia, spasmodic dysphonia, spasmodic torticollis, axial dystonia, dystonic writer's cramp and hemiplegic dystonia); neurodegenerative disorders including nosological entities such as disinhibition-dementia-parkinsonism-amyotrophy complex; pallido-ponto-nigral degeneration; epilepsy; seizure disorders; attention deficit/hyperactivity disorder (ADHD); conduct disorder; migraine (including migraine headache); headache; hyperalgesia; pain; enhanced or exaggerated sensitivity to pain such as hyperalgesia, causalgia, and allodynia; acute pain; burn pain; atypical facial pain; neuropathic pain; back pain; complex regional pain syndrome I and II; arthritic pain; sports injury pain; pain related to infection e.g. HIV, post-chemotherapy pain; post-stroke pain; post-operative pain; neuralgia; emesis, nausea, vomiting; gastric dyskinesia; gastric ulcers; Kallman's syndrome (anosmia); asthma; cancer; conditions associated with visceral pain such as irritable bowel syndrome, and angina; eating disorders; urinary incontinence; substance tolerance, substance withdrawal (including, substances such as opiates, nicotine, tobacco products, alcohol, benzodiazepines, cocaine, sedatives, hypnotics, etc.); psychosis; schizophrenia; anxiety (including generalized anxiety disorder, panic disorder, and obsessive compulsive disorder); mood disorders (including depression, mania, bipolar disorders); trigeminal neuralgia; hearing loss; tinnitus; neuronal damage including ocular damage; retinopathy; macular degeneration of the eye; emesis; brain edema; pain, including acute and chronic pain states, severe pain, intractable pain, inflammatory pain, neuropathic pain, post-traumatic pain, bone and joint pain (osteoarthritis), repetitive motion pain, dental pain, cancer pain, myofascial pain (muscular injury, fibromyalgia), perioperative pain (general surgery, gynecological), chronic pain, neuropathic pain, post-traumatic pain, trigeminal neuralgia, migraine and migraine headache and other diseases related to general orexin system dysfunction.

The subject compounds could further be of potential use in a method for the prevention, treatment, control, amelioration, or reduction of risk of the diseases, disorders and conditions noted herein. The dosage of active ingredient in the compositions of this invention may be varied, however, it is necessary that the amount of the active ingredient be such that a suitable dosage form is obtained. The active ingredient may be administered to subjects (animals and human) in need of such treatment in dosages that will provide optimal pharmaceutical efficacy. The selected dosage depends upon the desired therapeutic effect, on the route of administration, and on the duration of the treatment. The dose will vary from subject to subject depending upon the nature and severity of disease, the subject's weight, special diets then being followed by a subject, concurrent medication, and other factors which those skilled in the art will recognize.

Generally, dosage levels of between 0.0001 to 100 mg/kg. of body weight daily are administered to the subject, e.g., humans, adolescent humans and elderly humans, to obtain effective agonism of orexin receptors. The dosage range will generally be about 0.5 mg to 10.0 g. per subject per day which may be administered in single or multiple doses. In one embodiment, the dosage range will be about 0.5 mg to 500 mg per subject per day; in another embodiment about 0.5 mg to 200 mg per subject per day; and in yet another embodiment about 5 mg to 50 mg per subject per day. Pharmaceutical compositions of the present invention may be provided in a solid dosage formulation such as comprising about 0.5 mg to 500 mg active ingredient, or comprising about 1 mg to 250 mg active ingredient. The pharmaceutical composition may be provided in a solid dosage formulation comprising about 1 mg, 5 mg, 10 mg, 25 mg, 30 mg, 50 mg, 80 mg, 100 mg, 200 mg or 250 mg active ingredient. For oral administration, the compositions may be provided in the form of tablets containing 1.0 to 1000 milligrams of the active ingredient, such as 1, 5, 10, 15, 20, 25, 50, 75, 100, 150, 200, 250, 300, 400, 500, 600, 750, 800, 900, and 1000 milligrams of the active ingredient for the symptomatic adjustment of the dosage to the subject to be treated. The compounds may be administered on a regimen of 1 to 4 times per day, such as once or twice per day. The compounds may be administered once or multiple times during the day. The compounds may be administered upon awakening or otherwise in the morning, or during waking hours. For example, the compounds may be administered about 1 hour after awakening, about 30 minutes after awakening or immediately after awakening.

The compounds of the present invention may be used in combination with one or more other drugs in the treatment, prevention, control, amelioration, or reduction of risk of diseases or conditions for which compounds of the present invention or the other drugs may have utility, where the combination of the drugs together are safer or more effective than either drug alone. Such other drug(s) may be administered, by a route and in an amount commonly used therefor, contemporaneously or sequentially with a compound of the present invention. When a compound of the present invention is used contemporaneously with one or more other drugs, a pharmaceutical composition in unit dosage form containing such other drugs and the compound of the present invention is contemplated. However, the combination therapy may also include therapies in which the compound of the present invention and one or more other drugs are administered on different overlapping schedules. It is also contemplated that when used in combination with one or more other active ingredients, the compounds of the present invention and the other active ingredients may be used in lower doses than when each is used singly.

Accordingly, the pharmaceutical compositions of the present invention include those that contain one or more other active ingredients, in addition to a compound of the present invention. The above combinations include combinations of a compound of the present invention not only with one other active compound, but also with two or more other active compounds.

The weight ratio of the compound of the present invention to the second active ingredient may be varied and will depend upon the effective dose of each ingredient. Generally, an effective dose of each will be used. Thus, for example, when a compound of the present invention is combined with another agent, the weight ratio of the compound of the present invention to the other agent will generally range from about 1000:1 to about 1:1000, such as about 200:1 to about 1:200. Combinations of a compound of the present invention and other active ingredients will generally also be within the aforementioned range, but in each case, an effective dose of each active ingredient should be used. In such combinations the compound of the present invention and other active agents may be administered separately or in conjunction.

In addition, the administration of one element may be prior to, concurrent to, or subsequent to the administration of other agent(s).

The compounds of the present invention may be administered in combination with compounds which are known in the art to be useful for treating or controlling narcolepsy, including e.g., methylphenidate, amphetamine, pemoline, phenelzine, protriptyline, gamma-hydroxybutyric acid, sodium oxybate, or other oxybate salts, modafinil, armodafinil, caffeine, and salts thereof, and combinations thereof, and the like, The compounds of the present invention may be administered in combination with compounds which are known in the art to be useful for preventing and treating sleep disorders and sleep disturbances, including e.g., sedatives, hypnotics, anxiolytics, antipsychotics, antianxiety agents, antihistamines, benzodiazepines, barbiturates, cyclopyrrolones, GABA agonists, 5HT-2 antagonists including 5HT-2A antagonists and 5HT-2A/2C antagonists, histamine antagonists including histamine H3 antagonists, histamine H3 inverse agonists, imidazopyridines, minor tranquilizers, melatonin agonists and antagonists, melatonergic agents, orexin antagonists, other orexin agonists, prokineticin agonists and antagonists, pyrazolopyrimidines, T-type calcium channel antagonists, triazolopyridines, and the like, such as: adinazolam, allobarbital, alonimid, alprazolam, amitriptyline, amobarbital, amoxapine, armodafinil, APD-125, bentazepam, benzoctamine, brotizolam, bupropion, busprione, butabarbital, butalbital, capromorelin, capuride, carbocloral, chloral betaine, chloral hydrate, chlordiazepoxide, clomipramine, clonazepam, cloperidone, clorazepate, clorethate, clozapine, conazepam, cyprazepam, desipramine, dexclamol, diazepam, dichloralphenazone, divalproex, diphenhydramine, doxepin, EMD-281014, eplivanserin, estazolam, eszopiclone, ethchlorynol, etomidate, fenobam, flunitrazepam, flurazepam, fluvoxamine, fluoxetine, fosazepam, gaboxadol, glutethimide, halazepam, hydroxyzine, ibutamoren, imipramine, indiplon, lithium, lorazepam, lormetazepam, LY-156735, maprotiline, MDL-100907, mecloqualone, melatonin, mephobarbital, meprobamate, methaqualone, methyprylon, midaflur, midazolam, modafinil, nefazodone, NGD-2-73, nisobamate, nitrazepam, nortriptyline, omortriptyline, oxazepam, paraldehyde, paroxetine, pentobarbital, perlapine, perphenazine, phenelzine, phenobarbital, prazepam, promethazine, propofol, protriptyline, quazepam, ramelteon, reclazepam, roletamide, secobarbital, sertraline, suproclone, TAK-375, temazepam, thioridazine, tiagabine, tracazolate, tranylcypromaine, trazodone, triazolam, trepipam, tricetamide, triclofos, trifluoperazine, trimetozine, trimipramine, uldazepam, venlafaxine, zaleplon, zolazepam, zopiclone, zolpidem, and salts thereof, and combinations thereof, and the like, or the compound of the present invention may be administered in conjunction with the use of physical methods such as with light therapy or electrical stimulation.

In another embodiment, the subject compound may be employed in combination with other compounds which are known in the art, either administered separately or in the same pharmaceutical compositions, including, but are not limited to: insulin sensitizers including (i) PPARγ antagonists such as glitazones (e.g. ciglitazone; darglitazone; englitazone; isaglitazone (MCC-555); pioglitazone; rosiglitazone; troglitazone; tularik; BRL49653; CLX-0921; 5-BTZD), GW-0207, LG-100641, and LY-300512, and the like); (iii) biguanides such as metformin and phenformin; (b) insulin or insulin mimetics, such as biota, LP-100, novarapid, insulin detemir, insulin lispro, insulin glargine, insulin zinc suspension (lente and ultralente); Lys-Pro insulin, GLP-1 (73-7) (insulintropin); and GLP-1 (7-36)-NH$_2$); (c) sulfonylureas, such as acetohexamide; chlorpropamide; diabinese; glibenclamide; glipizide; glyburide; glimepiride; gliclazide; glipentide; gliquidone; glisolamide; tolazamide; and tolbutamide; (d) α-glucosidase inhibitors, such as acarbose, adiposine; camiglibose; emiglitate; miglitol; voglibose; pradimicin-Q; salbostatin; CKD-711; MDL-25,637; MDL-73,945; and MOR 14, and the like; (e) cholesterol lowering agents such as (i) HMG-CoA reductase inhibitors (atorvastatin, itavastatin, fluvastatin, lovastatin, pravastatin, rivastatin, rosuvastatin, simvastatin, and other statins), (ii) bile acid absorbers/sequestrants, such as cholestyramine, colestipol, dialkylaminoalkyl derivatives of a cross-linked dextran; Colestid®; LoCholest®, and the like, (ii) nicotinyl alcohol, nicotinic acid or a salt thereof, (iii) proliferator-activater receptor a agonists such as fenofibric acid derivatives (gemfibrozil, clofibrate, fenofibrate and benzafibrate), (iv) inhibitors of cholesterol absorption such as stanol esters, beta-sitosterol, sterol glycosides such as tiqueside; and azetidinones such as ezetimibe, and the like, and (acyl CoA:cholesterol acyltransferase (ACAT)) inhibitors such as avasimibe, and melinamide, (v) anti-oxidants, such as probucol, (vi) vitamin E, and (vii) thyromimetics; (f) PPARα agonists such as beclofibrate, benzafibrate, ciprofibrate, clofibrate, etofibrate, fenofibrate, and gemfibrozil; and other fibric acid derivatives, such as Atromid®, Lopid® and Tricor®, and the like, and PPARα agonists as described in WO 97/36579; (g) PPARS agonists, such as those disclosed in WO97/28149; (h) PPAR a/S agonists, such as muraglitazar, and the compounds disclosed in U.S. Pat. No. 6,414,002; (i) anti-obesity agents, such as (1) growth hormone secretagogues, growth hormone secretagogue receptor agonists/antagonists, such as NN703, hexarelin, MK-0677, SM-130686, CP-424,391, L-692,429, and L-163,255, and such as those disclosed in U.S. Pat. Nos. 5,536,716, and 6,358,951, U.S. Patent Application Nos. 2002/049196 and 2002/022637, and PCT Application Nos. WO 01/56592 and WO 02/32888; (2) protein tyrosine phosphatase-1B (PTP-1B) inhibitors; (3) cannabinoid receptor ligands, such as cannabinoid CB$_1$ receptor antagonists or inverse agonists, such as rimonabant, taranabant, AMT-251, and SR-14778 and SR 141716A (Sanofi Synthelabo), SLV-319 (Solvay), BAY 65-2520 (Bayer) and those disclosed in U.S. Pat. Nos. 5,532,237, 4,973,587, 5,013,837, 5,081,122, 5,112,820, 5,292,736, 5,624,941, 6,028,084, PCT Application Nos. WO 96/33159, WO 98/33765, WO98/43636, WO98/43635, WO 01/09120, WO98/31227, WO98/41519, WO98/37061, WO00/10967, WO00/10968, WO97/29079, WO99/02499, WO 01/58869, WO 01/64632, WO 01/64633, WO 01/64634, WO02/076949, WO 03/007887, WO 04/048317, and WO 05/000809; (4) anti-obesity serotonergic agents, such as fenfluramine, dexfenfluramine, phentermine, and sibutramine; (5) β3-adrenoreceptor agonists, such as AD9677/TAK677 (Dainippon/Takeda), CL-316,243, SB 418790, BRL-37344, L-796568, BMS-196085, BRL-35135A, CGP12177A, BTA-243, Trecadrine, Zeneca D7114, SR 59119A; (6) pancreatic lipase inhibitors, such as orlistat (Xenical®), Triton WR1339, RHC80267, lipstatin, tetrahydrolipstatin, teasaponin, diethylumbelliferyl phosphate, and those disclosed in PCT Application No. WO 01/77094; (7) neuropeptide Y1 antagonists, such as BIBP3226, J-115814, BIBO 3304, LY-357897, CP-671906, GI-264879A, and those disclosed in U.S. Pat. No. 6,001,836, and PCT Patent Publication Nos. WO 96/14307, WO 01/23387, WO 99/51600, WO 01/85690, WO 01/85098, WO 01/85173, and WO 01/89528; (8) neuropeptide Y5 antagonists, such as GW-569180A, GW-594884A, GW-587081X, GW-548118X, FR226928, FR 240662, FR252384, 1229U91, GI-264879A, CGP71683A, LY-377897, PD-160170, SR-120562A, SR-120819A and JCF-104, and those disclosed in U.S. Pat. Nos. 6,057,335; 6,043,246; 6,140,354; 6,166,038; 6,180,653; 6,191,160; 6,313,298; 6,335,345; 6,337,332; 6,326,375; 6,329,395; 6,340,683; 6,388,077; 6,462,053; 6,649,624; and 6,723,847, European Patent Nos. EP-01010691, and EP-01044970; and PCT International Patent Publication Nos. WO 97/19682, WO 97/20820, WO 97/20821, WO 97/20822, WO 97/20823, WO 98/24768; WO 98/25907; WO 98/25908; WO 98/27063, WO 98/47505; WO 98/40356; WO 99/15516; WO 99/27965; WO 00/64880, WO 00/68197, WO 00/69849, WO 01/09120, WO 01/14376; WO 01/85714, WO 01/85730, WO 01/07409, WO 01/02379, WO 01/02379, WO 01/23388, WO 01/23389, WO 01/44201, WO 01/62737, WO 01/62738, WO 01/09120, WO 02/22592, WO 0248152, and WO 02/49648; WO 02/094825; WO 03/014083; WO 03/10191; WO 03/092889; WO 04/002986; and WO 04/031175; (9) melanin-concentrating hormone (MCH) receptor antagonists, such as those disclosed in WO 01/21577 and WO 01/21169; (10) melanin-concentrating hormone 1 receptor (MCH1R) antagonists, such as T-226296 (Takeda), and those disclosed in PCT Patent Application Nos. WO 01/82925, WO 01/87834, WO 02/051809, WO 02/06245, WO 02/076929, WO 02/076947, WO 02/04433, WO 02/51809, WO 02/083134, WO 02/094799, WO 03/004027; (11) melanin-concentrating hormone 2 receptor (MCH2R) agonist/antagonists; (12) orexin receptor antagonists, such as SB-334867-A, and those disclosed in patent publications herein; (13) serotonin reuptake inhibitors such as fluoxetine, paroxetine, and sertraline; (14) melanocortin agonists, such as Melanotan II; (15) Mc4r (melanocortin 4 receptor) agonists, such as CHIR86036 (Chiron), ME-10142, and ME-10145 (Melacure), CHIR86036 (Chiron); PT-141, and PT-14 (Palatin); (16) 5HT-2 agonists; (17) 5HT2C (serotonin receptor 2C) agonists, such as BVT933, DPCA37215, WAY161503, R-1065, and those disclosed in U.S. Pat. No. 3,914,250, and PCT Application Nos. WO 02/36596, WO 02/48124, WO 02/10169, WO 01/66548, WO 02/44152, WO 02/51844, WO 02/40456, and WO 02/40457; (18) galanin antagonists; (19) CCK agonists; (20) CCK-A (cholecystokinin-A) agonists, such as AR-R 15849, GI 181771, JMV-180, A-71378, A-71623 and SR14613, and those described in U.S. Pat. No. 5,739,106; (21) GLP-1 agonists; (22) corticotropin-releasing hormone agonists; (23) histamine receptor-3 (H3) modulators; (24) histamine receptor-3 (H3) antagonists/inverse agonists, such as hioperamide, 3-(1H-imidazol-4-yl)propyl N-(4-pentenyl)carbamate, clobenpropit, iodophenpropit, imoproxifan, GT2394 (Gliatech), and O-[3-(1H-imidazol-4-yl)propanol]-carbamates; (25) β-hydroxy steroid dehydrogenase-1 inhibitors (β-HSD-1); (26) PDE (phosphodiesterase) inhibitors, such as theophylline, pentoxifylline, zaprinast, sildenafil, amrinone, milrinone, cilostamide, rolipram, and cilomilast; (27) phosphodiesterase-3B (PDE3B) inhibitors; (28) NE (norepinephrine) transport inhibitors, such as GW 320659, despiramine, talsupram, and nomifensine; (29) ghrelin receptor antagonists, such as those disclosed in PCT Application Nos. WO 01/87335, and WO 02/08250; (30) leptin, including recombinant human leptin (PEG-OB, Hoffman La Roche) and recombinant methionyl human leptin (Amgen); (31) leptin derivatives; (32) BRS3 (bombesin receptor subtype 3) agonists such as [D-Phe6, beta-Ala11, Phe13, Nle14]Bn(6-14) and [D-Phe6, Phe13] Bn(6-13)propylamide, and those compounds disclosed in Pept. Sci. 2002 August; 8(8): 461-75); (33) CNTF (Ciliary neurotrophic factors), such as GI-181771 (Glaxo-SmithKline), SR146131 (Sanofi Synthelabo), butabindide, PD170,292, and PD 149164 (Pfizer); (34) CNTF derivatives, such as axokine (Regeneron); (35) monoamine reuptake inhibitors, such as sibutramine; (36) UCP-1 (uncoupling protein-1), 2, or 3 activators, such as phytanic acid, 4-[(E)-2-(5,6,7,8-tetrahydro-5,5,8,8-tetramethyl-2-napthalenyl)-1-propenyl]benzoic acid (TTNPB), retinoic acid; (37) thyroid hormone 0 agonists, such as KB-2611 (KaroBioBMS); (38) FAS (fatty acid synthase) inhibitors, such as Cerulenin and C75; (39) DGAT1 (diacylglycerol acyltransferase 1) inhibitors; (40) DGAT2 (diacylglycerol acyltransferase 2) inhibitors; (41) ACC2 (acetyl-CoA carboxylase-2) inhibitors; (42) glucocorticoid antagonists; (43) acyl-estrogens, such as oleoyl-estrone, disclosed in del Mar-Grasa, M. et al., Obesity Research, 9:202-9 (2001); (44) dipeptidyl peptidase IV (DP-IV) inhibitors, such as isoleucine thiazolidide, valine pyrrolidide, NVP-DPP728, LAF237, P93/01, TSL 225, TMC-2A/2B/2C, FE 999011, P9310/K364, VIP 0177, SDZ 274-444, sitagliptin; and the compounds disclosed in U.S. Pat. No. 6,699,871, WO 03/004498; WO 03/004496; EP 1 258 476; WO 02/083128; WO 02/062764; WO 03/000250; WO 03/002530; WO 03/002531; WO 03/002553; WO 03/002593; WO 03/000180; and WO 03/000181; (46) dicarboxylate transporter inhibitors; (47) glucose transporter inhibitors; (48) phosphate transporter inhibitors; (49) Metformin (Glucophage); (50) Topiramate (Topimax®); (50) peptide YY, PYY 3-36, peptide YY analogs, derivatives, and fragments such as BIM-43073D, BIM-43004C (Olitvak, D. A. et al., Dig. Dis. Sci. 44(3):643-48 (1999)); (51) Neuropeptide Y2 (NPY2) receptor agonists such NPY3-36, N acetyl [Leu(28,31)] NPY 24-36, TASP-V, and cyclo-(28/32)—Ac-[Lys28-Glu32]-(25-36)-pNPY; (52) Neuropeptide Y4 (NPY4) agonists such as pancreatic peptide (PP), and other Y4 agonists such as 1229U91; (54) cyclooxygenase-2 inhibitors such as etoricoxib, celecoxib, valdecoxib, parecoxib, lumiracoxib, BMS347070, tiracoxib or JTE522, ABT963, CS502 and GW406381; (55) Neuropeptide Y1 (NPY1) antagonists such as BIBP3226, J-115814, BIBO 3304, LY-357897, CP-671906, GI-264879A; (56) Opioid antagonists such as nalmefene (Revex®), 3-methoxynaltrexone, naloxone, naltrexone; (57) 110 HSD-1 (11-beta hydroxy steroid dehydrogenase type 1) inhibitors such as BVT 3498, BVT 2733, and those disclosed in WO 01/90091, WO 01/90090, WO 01/90092, U.S. Pat. No. 6,730,690 and US 2004-0133011; (58) aminorex; (59) amphechloral; (60) amphetamine; (61) benzphetamine; (62) chlorphentermine; (63) clobenzorex; (64) cloforex; (65) clominorex; (66) clortermine; (67) cyclexedrine; (68) dextroamphetamine; (69) diphemethoxidine, (70) N-ethylamphetamine; (71) fenbutrazate; (72) fenisorex; (73) fenproporex; (74) fludorex; (75) fluminorex; (76) furfurylmethylamphetamine; (77) levamfetamine; (78) levophacetoperane; (79) mefenorex; (80) metamfepramone; (81) methamphetamine; (82) norpseudoephedrine; (83) pentorex; (84) phendimetrazine; (85) phenmetrazine; (86) picilorex; (87) phytopharm 57; and (88) zonisamide., (89) neuromedin U and analogs or derivatives thereof, (90) oxyntomodulin and analogs or derivatives thereof, and (91) Neurokinin-1 receptor antagonists (NK-1 antagonists) such as the compounds disclosed in: U.S. Pat. Nos. 5,162,339, 5,232,929, 5,242,930, 5,373,003, 5,387,595, 5,459,270, 5,494,926, 5,496,833, and 5,637,699.

In another embodiment, the subject compound may be employed in combination with an anti-depressant or anti-anxiety agent, including norepinephrine reuptake inhibitors (including tertiary amine tricyclics and secondary amine tricyclics), selective serotonin reuptake inhibitors (SSRIs), monoamine oxidase inhibitors (MAOIs), reversible inhibitors of monoamine oxidase (RIMAs), serotonin and noradrenaline reuptake inhibitors (SNRIs), corticotropin releasing factor (CRF) antagonists, α-adrenoreceptor antagonists, neurokinin-1 receptor antagonists, atypical anti-depressants, benzodiazepines, 5-HT1A agonists or antagonists, especially 5-HT1A partial agonists, and corticotropin releasing factor (CRF) antagonists. Specific agents include: amitriptyline, clomipramine, doxepin, imipramine and trimipramine; amoxapine, desipramine, maprotiline, nortriptyline and protriptyline; citalopram, duloxetine, fluoxetine, fluvoxamine, paroxetine and sertraline; isocarboxazid, phenelzine, tranylcypromine and selegiline; moclobemide: venlafaxine; aprepitant; bupropion, lithium, nefazodone, trazodone and viloxazine; alprazolam, chlordiazepoxide, clonazepam, chlorazepate, diazepam, halazepam, lorazepam, oxazepam and prazepam; buspirone, flesinoxan, gepirone and ipsapirone, and pharmaceutically acceptable salts thereof.

In another embodiment, the subject compound may be employed in combination with anti-Alzheimer's agents; beta-secretase inhibitors, such as verubecestat; gamma-secretase inhibitors; growth hormone secretagogues; recombinant growth hormone; HMG-CoA reductase inhibitors; NSAID's including ibuprofen; vitamin E; anti-amyloid antibodies; CB-1 receptor antagonists or CB-1 receptor inverse agonists; antibiotics such as doxycycline and rifampin; N-methyl-D-aspartate (NMDA) receptor antagonists, such as memantine; cholinesterase inhibitors such as galantamine, rivastigmine, donepezil, and tacrine; growth hormone secretagogues such as ibutamoren, ibutamoren mesylate, and capromorelin; histamine H3 antagonists; AMPA agonists; PDE IV inhibitors; $GABA_A$ inverse agonists; or neuronal nicotinic agonists.

In another embodiment, the subject compound may be employed in combination with sedatives, hypnotics, anxiolytics, antipsychotics, antianxiety agents, cyclopyrrolones, imidazopyridines, pyrazolopyrimidines, minor tranquilizers, melatonin agonists and antagonists, melatonergic agents, benzodiazepines, barbiturates, 5HT-2 antagonists, and the like, such as: adinazolam, allobarbital, alonimid, alprazolam, amitriptyline, amobarbital, amoxapine, bentazepam, benzoctamine, brotizolam, bupropion, busprione, butabarbital, butalbital, capuride, carbocloral, chloral betaine, chloral hydrate, chlordiazepoxide, clomipramine, clonazepam, cloperidone, clorazepate, clorethate, clozapine, cyprazepam, desipramine, dexclamol, diazepam, dichloralphenazone, divalproex, diphenhydramine, doxepin, estazolam, ethchlorvynol, etomidate, fenobam, flunitrazepam, flurazepam, fluvoxamine, fluoxetine, fosazepam, glutethimide, halazepam, hydroxyzine, imipramine, lithium, lorazepam, lormetazepam, maprotiline, mecloqualone, melatonin, mephobarbital, meprobamate, methaqualone, midaflur, midazolam, nefazodone, nisobamate, nitrazepam, nortriptyline, oxazepam, paraldehyde, paroxetine, pentobarbital, perlapine, perphenazine, phenelzine, phenobarbital, prazepam, promethazine, propofol, protriptyline, quazepam, reclazepam, roletamide, secobarbital, sertraline, suproclone, temazepam, thioridazine, tracazolate, tranylcypromaine, trazodone, triazolam, trepipam, tricetamide, triclofos, trifluoperazine, trimetozine, trimipramine, uldazepam, venlafaxine, zaleplon, zolazepam, zolpidem, and salts thereof, and combinations thereof, and the like, or the subject compound may be administered in conjunction with the use of physical methods such as with light therapy or electrical stimulation.

In another embodiment, the subject compound may be employed in combination with acetophenazine, alentemol, benzhexol, bromocriptine, biperiden, chlorpromazine, chlorprothixene, clozapine, diazepam, fenoldopam, fluphenazine, haloperidol, levodopa, levodopa with benserazide, levodopa with carbidopa, lisuride, loxapine, mesoridazine, molindolone, naxagolide, olanzapine, pergolide, perphenazine, pimozide, pramipexole, risperidone, sulpiride, tetrabenazine, trihexyphenidyl, thioridazine, thiothixene or trifluoperazine.

In another embodiment, the subject compound may be employed in combination with a compound from the phenothiazine, thioxanthene, heterocyclic dibenzazepine, butyrophenone, diphenylbutylpiperidine and indolone classes of neuroleptic agent. Suitable examples of phenothiazines include chlorpromazine, mesoridazine, thioridazine, acetophenazine, fluphenazine, perphenazine and trifluoperazine. Suitable examples of thioxanthenes include chlorprothixene and thiothixene. An example of a dibenzazepine is clozapine. An example of a butyrophenone is haloperidol. An example of a diphenylbutylpiperidine is pimozide. An example of an indolone is molindolone. Other neuroleptic agents include loxapine, sulpiride and risperidone.

In another embodiment, the subject compound may be employed in combination with a nicotine agonist or a nicotine receptor partial agonist such as varenicline, opioid antagonists (e.g., naltrexone (including naltrexone depot), antabuse, and nalmefene), dopaminergic agents (e.g., apomorphine), ADD/ADHD agents (e.g., methylphenidate hydrochloride (e.g., Ritalin® and Concerta®), atomoxetine (e.g., Strattera®), a monoamine oxidase inhibitor (MAOI), amphetamines (e.g., Adderall®)) and anti-obesity agents, such as apo-B/MTP inhibitors, 11Beta-hydroxy steroid dehydrogenase-1 (1 Beta-HSD type 1) inhibitors, peptide YY3-36 or analogs thereof, MCR-4 agonists, CCK-A agonists, monoamine reuptake inhibitors, sympathomimetic agents, β3 adrenergic receptor agonists, dopamine receptor agonists, melanocyte-stimulating hormone receptor analogs, 5-HT2c receptor agonists, melanin concentrating hormone receptor antagonists, leptin, leptin analogs, leptin receptor agonists, galanin receptor antagonists, lipase inhibitors, bombesin receptor agonists, neuropeptide-Y receptor antagonists (e.g., NPY Y5 receptor antagonists), thyromimetic agents, dehydroepiandrosterone or analogs thereof, glucocorticoid receptor antagonists, orexin receptor antagonists, such as suvorexant, other orexin agonists, glucagon-like peptide-1 receptor agonists, ciliary neurotrophic factors, human agouti-related protein antagonists, ghrelin receptor antagonists, histamine 3 receptor antagonists or inverse agonists, and neuromedin U receptor agonists, and pharmaceutically acceptable salts thereof.

In another embodiment, the subject compound may be employed in combination with an agent such as aminorex, amphechloral, amphetamine, benzphetamine, chlorphentermine, clobenzorex, cloforex, clominorex, clortermine, cyclexedrine, dexfenfluramine, dextroamphetamine, diethylpropion, diphemethoxidine, N-ethylamphetamine, fenbutrazate, fenfluramine, fenisorex, fenproporex, fludorex, fluminorex, furfurylmethylamphetamine, levamfetamine, levophacetoperane, mazindol, mefenorex, metamfepramone, methamphetamine, norpseudoephedrine, pentorex, phendimetrazine, phenmetrazine, phentermine, phenylpropanolamine, picilorex and sibutramine; selective serotonin reuptake inhibitor (SSRI); halogenated amphetamine derivatives, including chlorphentermine, cloforex, clortermine, dexfenfluramine, fenfluramine, picilorex and sibutramine; and pharmaceutically acceptable salts thereof.

In another embodiment, the subject compound may be employed in combination with an opiate agonist, a lipoxygenase inhibitor, such as an inhibitor of 5-lipoxygenase, a cyclooxygenase inhibitor, such as a cyclooxygenase-2 inhibitor, an interleukin inhibitor, such as an interleukin-1 inhibitor, an NMDA antagonist, an inhibitor of nitric oxide or an inhibitor of the synthesis of nitric oxide, a non-steroidal antiinflammatory agent, or a cytokine-suppressing antiinflammatory agent, for example with a compound such as acetaminophen, asprin, codiene, fentanyl, ibuprofen, indomethacin, ketorolac, morphine, naproxen, phenacetin, piroxicam, a steroidal analgesic, sufentanyl, sunlindac, tenidap, and the like. Similarly, the subject compound may be administered with a pain reliever; a potentiator such as caffeine, an H2-antagonist, simethicone, aluminum or magnesium hydroxide; a decongestant such as phenylephrine, phenylpropanolamine, pseudophedrine, oxymetazoline, ephinephrine, naphazoline, xylometazoline, propylhexedrine, or levo-desoxy-ephedrine; an antiitussive such as codeine, hydrocodone, caramiphen, carbetapentane, or dextramethorphan; a diuretic; and a sedating or non-sedating antihistamine.

The compounds of the present invention may be administered by oral, parenteral (e.g., intramuscular, intraperitoneal, intravenous, ICV, intracistemal injection or infusion, subcutaneous injection, or implant), by inhalation spray, nasal, vaginal, rectal, sublingual, or topical routes of administration and may be formulated, alone or together, in suitable dosage unit formulations containing conventional non-toxic pharmaceutically acceptable carriers, adjuvants and vehicles appropriate for each route of administration. In addition to the treatment of warm-blooded animals such as mice, rats, horses, cattle, sheep, dogs, cats, monkeys, etc., the compounds of the invention may be effective for use in humans.

The pharmaceutical compositions for the administration of the compounds of this invention may conveniently be presented in dosage unit form and may be prepared by any of the methods well known in the art of pharmacy. All methods include the step of bringing the active ingredient into association with the carrier which constitutes one or more accessory ingredients.

In general, the pharmaceutical compositions are prepared by uniformly and intimately bringing the active ingredient into association with a liquid carrier or a finely divided solid carrier or both, and then, if necessary, shaping the product into the desired formulation. In the pharmaceutical composition the active object compound is included in an amount sufficient to produce the desired effect upon the process or condition of diseases. As used herein, the term "composition" is intended to encompass a product comprising the specified ingredients in the specified amounts, as well as any product which results, directly or indirectly, from combination of the specified ingredients in the specified amounts.

Pharmaceutical compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide pharmaceutically elegant and palatable preparations. Tablets contain the active ingredient in admixture with non-toxic pharmaceutically acceptable excipients which are suitable for the manufacture of tablets. These excipients may be for example, inert diluents, such as calcium carbonate, sodium carbonate, lactose, calcium phosphate or sodium phosphate; granulating and disintegrating agents, for example, corn starch, or alginic acid; binding agents, for example starch, gelatin or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. Compositions for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example peanut oil, liquid paraffin, or olive oil.

Aqueous suspensions contain the active materials in admixture with excipients suitable for the manufacture of aqueous suspensions. Oily suspensions may be formulated by suspending the active ingredient in a suitable oil. Oil-in-water emulsions may also be employed. Dispersible powders and granules suitable for preparation of an aqueous suspension by the addition of water provide the active ingredient in admixture with a dispersing or wetting agent, suspending agent and one or more preservatives. Pharmaceutical compositions of the present compounds may be in the form of a sterile injectable aqueous or oleagenous suspension. The compounds of the present invention may also be administered in the form of suppositories for rectal administration.

For topical use, creams, ointments, jellies, solutions or suspensions, etc., containing the compounds of the present invention may be employed. The compounds of the present invention may also be formulated for administered by inhalation. The compounds of the present invention may also be administered by a transdermal patch by methods known in the art.

Several methods for preparing the compounds of this invention are illustrated in the following Schemes and Examples. Starting materials are made according to procedures known in the art or as illustrated herein. The following abbreviations are used herein: Me: methyl; Et: ethyl; t-Bu: tert-butyl; Ar: aryl; Ph: phenyl; BINAP: 2,2'-bis(diphenylphosphino)-1,1'-binaphthyl; Bn: benzyl; Ac: acetyl; Boc: tert-butyloxy carbonyl; BSA: bovine serum albumin; CbzCl: benzylchloroformate; CDI: carbonyl diimidazole; DCM ($CH_2Cl_2$): dichloromethane; DCE: dichloroethane; DEAD: diethylazodicarboxylate; DIPEA: N,N-diisopropylethylamine; DMF: N,N-dimethylformamide; DMSO: dimethylsulfoxide; EDC: N-(3-Dimethylaminopropyl)-N'-ethylcarbodiimide; $Et_3N$: triethylamine; EtOAc: ethyl acetate; EtOH: ethanol; HATU: 1-[Bis(dimethylamino)methylene]-1H-1,2,3-triazolo[4,5-b]pyridinium 3-oxid hexafluorophosphate aka. N-[(Dimethylamino)-1H-1,2,3-triazolo-[4,5-b]pyridin-1-ylmethylene]-N-methyl-methanaminium hexafluorophosphate N-oxide; HCl: hydrogen chloride; HOAt: 1-hydroxy-7-aza-benzotriazole; HOBT: hydroxybenzotriazole hydrate; HPLC: high performance liquid chromatography; Hunig's base: N,N-diisopropylethylamine; MeOH: methanol; $MgSO_4$: magnesium sulfate; Ms: methanesulfonyl; MTBE: methyl tert-butyl ether; $NaHCO_3$: sodium bicarbonate; NaOH: sodium hydroxide; NMM: N-methylmorpholine; $PtO_2$: platinum oxide; PyClu: 1-(chloro-1-pyrrolidinylmethylene)-pyrrolidinium hexafluorophosphate; rt: room temperature; $SOCl_2$: thionyl chloride; T3P: 2,4,6-tripropyl-1,3,5,2,4,6-trioxatriphosphorinane-2,4,6-trioxide; THF: tetrahydrofuran; TFA: trifluoracetic acid; X-Phos: 2-(dicyclohexyl-phosphino)-2',4',6'-triisopropylbiphenyl.

The compounds of the present invention can be prepared in a variety of fashions. In some cases the final product may be further modified, for example, by manipulation of substituents. These manipulations may include, but are not limited to, reduction, oxidation, alkylation, acylation, and hydrolysis reactions which are commonly known to those skilled in the art. In some cases the order of carrying out the foregoing reaction schemes may be varied to facilitate the reaction or to avoid unwanted reaction products. The following examples are provided so that the invention might be more fully understood. These examples are illustrative only and should not be construed as limiting the invention in any way.

Intermediate A (CIS)-4-Phenylcyclohexanol

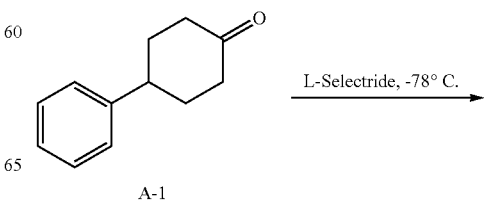

A-1

-continued

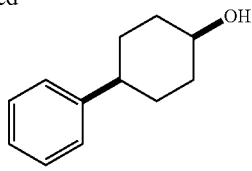

INTERMEDIATE A

To a mixture of 4-phenylcyclohexanone (A-1) (10.50 g, 60.3 mmol) in THF (201 ml) at −78° C. was added L-Selectride (102 ml, 102 mmol) in THF over 20 min. The mixture stirred at −78° C. for 3 hours before warming to 0° C. and stirring for an additional 2 hours. The reaction was quenched with a saturated solution of NH4Cl (200 mL), extracted with EtOAc (250 mL×3), dried over Na2SO4, and concentrated. The residue was purified by column chromatography on silica (2% to 60% EtOAc/hexanes) to afford the title compound. MS: 199.9 (M+23).

Intermediate B ((CIS)-4-(Chloromethoxy)cyclohexyl)benzene

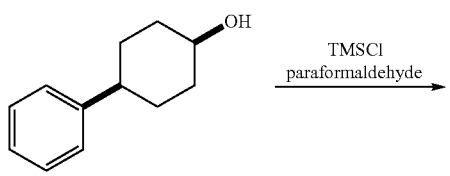

INTERMEDIATE A

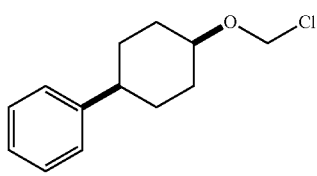

INTERMEDIATE B

To a mixture of (CIS)-4-phenylcyclohexanol (INTERMEDIATE A) (5.00 g, 28.4 mmol) in DCM (28.4 ml) at ambient temperature was added paraformaldehyde (0.937 g, 31.2 mmol) followed by the dropwise addition of TMS-Cl (10.88 ml, 85 mmol). The mixture stirred for 2 hours before concentrating, taking up in DCM (50 mL), drying over Na2SO4, and reconcentrating, and then placed under vacuum. The resulting residue was used directly without any further purification.

Intermediate C

Benzyl 3-oxo-2-(CIS)-4-phenylcyclohexyl)oxy)methyl)piperidine-1-carboxylate

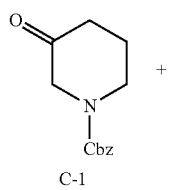

C-1

-continued

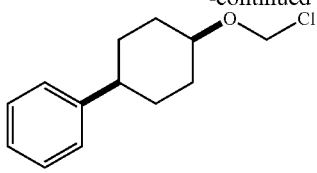

INTERMEDIATE B

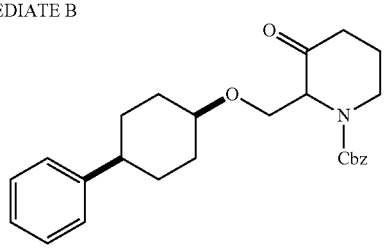

INTERMEDIATE C

To a solution of benzyl 3-oxopiperidine-1-carboxylate (C-1) (497 mg, 2.129 mmol) in at −78° C. was added 1.0 M KHMDS (2129 µl, 2.129 mmol) in THF dropwise. The mixture stirred for 15 min before adding ((CIS)-4-(chloromethoxy)cyclohexyl)benzene (INTERMEDIATE B) (319 mg, 1.419 mmol) in THF (1.0 mL). The mixture stirred for 1 hour before quenching with a saturated solution of NH4Cl. The mixture was warmed to ambient temp, add H2O (5 mL), extracted with EtOAc (3×@ 5 mL), dried over Na2SO4, and concentrated. The residue was purified by column chromatography on silica (2% to 50% EtOAc/hexanes) to afford the title compound. MS: 423.3 (M+1).

Intermediate D

Benzyl 6-(((((CIS)-4-phenylcyclohexyl)oxy)methyl)-5-(((trifluoromethyl)sulfonyloxy)-3,6-dihydropyridine-1(2H)-carboxylate (Mixture of Olefin Regioisomers)

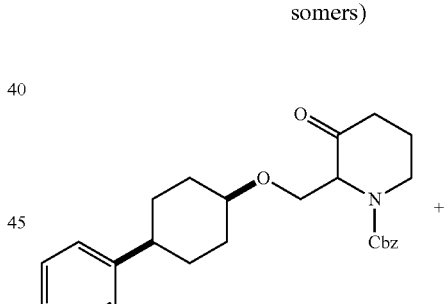

INTERMEDIATE C

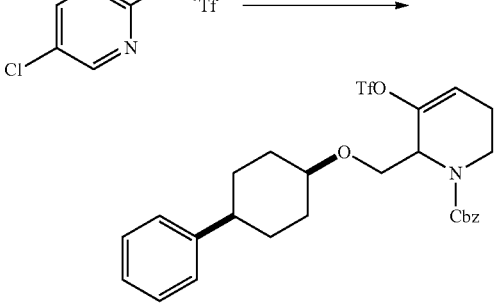

INTERMEDIATE D

To a mixture of benzyl 3-oxo-2-(((((CIS)-4-phenylcyclohexyl)oxy)methyl)piperidine-1-carboxylate (INTERMEDIATE C) (215 mg, 0.510 mmol) in THF (2550 µl) at −78° C. was added N-(5-chloropyridin-2-yl)-1,1,1-trifluoro-N-(trifluoromethyl)sulfonyl)methane-sulfonamide (D-1) (220 mg, 0.561 mmol). 1.0 M KHMDS (663 µl, 0.663 mmol) in THF was added dropwise and the reaction stirred for 1 hour. The mixture was quenched with a saturated solution of NH4Cl (5 mL) and warmed to ambient temperature. The mixture was extracted with EtOAc (3×@ 5 mL), dried over Na2SO4, and concentrated. The residue was purified by column chromatography on silica (2% to 20% 3:1 EtOAc:EtOH/hexanes) to afford the title compound as a mixture of olefin regioisomer. MS: 554.4 (M+1).

Intermediate E (CIS)-2-(((((CIS)-4-phenylcyclohexyl)oxy)methyl)-3-(1-((2-(trimethylsilyl)ethoxy)methyl)-1H-pyrazol-5-yl)piperidine

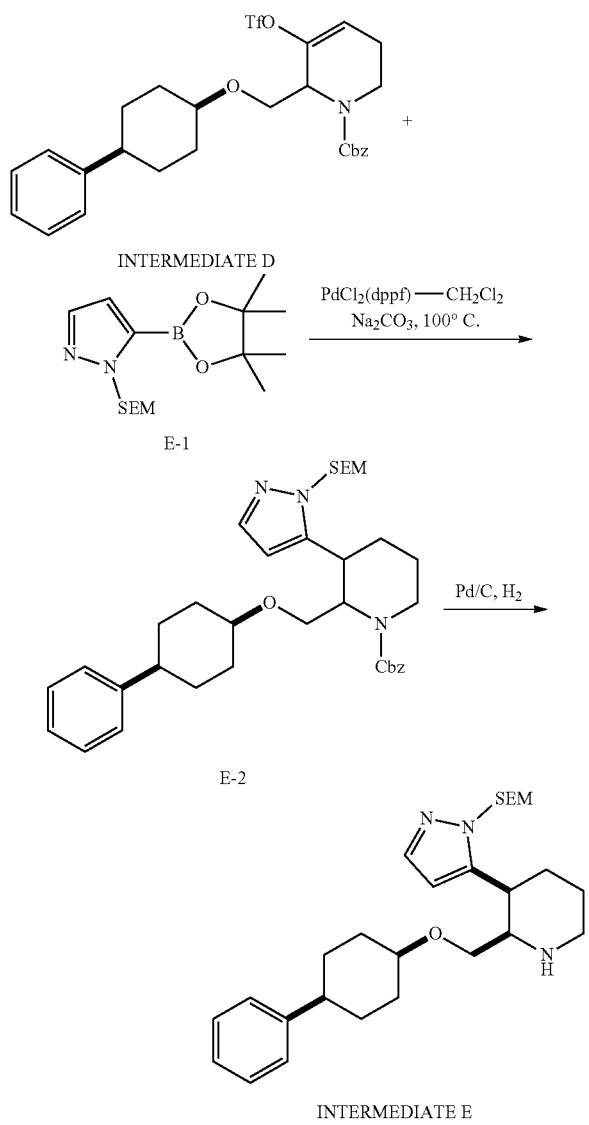

Step 1: benzyl 6-(((((CIS)-4-phenylcyclohexyl)oxy)methyl)-5-(1-((2-(trimethylsilyl)ethoxy)-methyl)-1H-pyrazol-5-yl)-3,6-dihydropyridine-1(2H)-carboxylate (Mixture of Olefin Regioisomers) (E-2)

To a mixture of benzyl 6-(((((CIS)-4-phenylcyclohexyl)oxy)methyl)-5-(((trifluoromethyl)sulfonyl)oxy)-3,6-dihydropyridine-1(2H)-carboxylate (mixture of olefin regioisomers) (INTERMEDIATE D) (50 mg, 0.090 mmol) in Dioxane (723 µl) at ambient temperature was added 5-(4,4,5,5-tetramethyl-1,3,2-dioxaborolan-2-yl)-1-((2-(trimethylsilyl)ethoxy)methyl)-1H-pyrazole (E-1) (58.6 mg, 0.181 mmol) and Na2CO3 (28.7 mg, 0.271 mmol) dissolved in Water (181 µl). PdCl$_2$(dppf)-CH$_2$Cl$_2$ Adduct (14.75 mg, 0.018 mmol) was added and the mixture was heated to 100° C. and stirred for 1 hour. The mixture was cooled, add H$_2$O (5 mL), extracted with EtOAc (3×@ 5 mL), dried over Na2SO4, and concentrated. The residue was purified by column chromatography on silica (2% to 50% 3:1 EtOAc:EtOH/hexanes) to afford the title compound as a mixture of olefin regioisomer. MS: 602.7 (M+1).

Step 2: (CIS)-2-(((((CIS)-4-phenylcyclohexyl)oxy)methyl)-3-(1-((2-(trimethylsilyl)ethoxy)-methyl)-1H-pyrazol-5-ylpiperidine (Intermediate E)

To a mixture of benzyl 6-(((((CIS)-4-phenylcyclohexyl)oxy)methyl)-5-(1-((2-(trimethylsilyl)ethoxy)methyl)-1H-pyrazol-5-yl)-3,6-dihydropyridine-1(2H)-carboxylate (E-2) (30.9 mg, 0.051 mmol) in THF (513 µl)/MeOH (513 µl) was added Pd/C (10.93 mg, 10.27 µmol). A hydrogen balloon was added (vacuum purge 3×) and the mixture was allowed to stir overnight. The mixture was filtered through a pad of celite and the resulting filtrate was concentrated to afford the title compound. MS: 470.4 (M+1).

Intermediate F 4-bromo-2-methoxy-5-methylthiazole

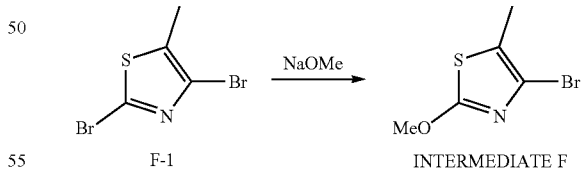

To a mixture of 2,4-dibromo-5-methylthiazole (F-1) (1.00 g, 3.89 mmol) in MeOH (15.57 ml) at ambient temperature was added sodium methoxide (1.051 g, 19.46 mmol). The mixture was heated to 50° C. and stirred for 3 days. The mixture was cooled before quenching with a H2O (50 mL), extract with DCM (3×@ 100 mL), dry over Na2SO4, and concentrate. The residue was purified by column chromatography on silica (2% to 50% EtOAc/hexanes) to afford the title compound. MS: 208.1, 210.1 (M+1).

Intermediate G

Methyl 6-((((CIS)-4-phenylcyclohexyl)oxy)methyl)-5-(((trifluoromethyl)sulfonyl)oxy)-3,6-dihydropyridine-1(2H)-carboxylate (Mixture of Olefin Regioisomers)

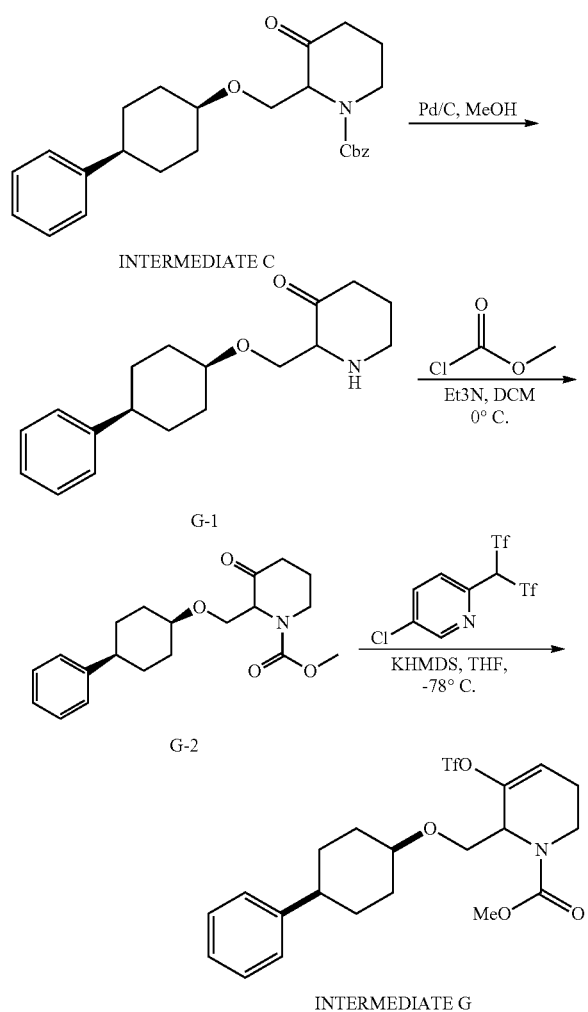

Step 1: 2-((((1s,4s)-4-phenylcyclohexyl)oxy)methyl) piperidin-3-one (G-1)

Pd/C (3.03 g, 2.85 mmol) was added to a stirred mixture of benzyl 3-oxo-2-((((1s,4s)-4-phenylcyclohexyl)oxy) methyl)piperidine-1-carboxylate (INTERMEDIATE C) (12 g, 28.5 mmol) in MeOH (120 ml) and the mixture was stirred under H2 (1 atm) at room temperature for 5h. The mixture was filtered, washing with methanol, the solution was concentrated, dried to afford the title compound. MS: 288.3 (M+1).

Step 2: methyl 3-oxo-2-((1s,4s)-4-phenylcyclohexyl)oxy)methyl)piperidine-1-carboxylate (G-2)

METHYL CHLOROFORMATE (2.202 ml, 28.5 mmol) was added to a stirred mixture of 2-((((1s,4s)-4-phenylcyclohexyl)oxy)methyl)piperidin-3-one (G-1) (8.19 g, 28.5 mmol), Et3N (7.94 ml, 57.0 mmol) in DCM (20 ml) and the mixture was stirred under at 0° C. for 15 min. Concentrated, The residue was purified by column chromatography on silica gel, eluting with EtOAc:EtOH3:1/hexane (0-30%) to afford the title compound. MS: 346.7 (M+1).

Step 3: Methyl 6-((((CIS)-4-phenylcyclohexyl)oxy) methyl)-5-(((trifluoromethyl)sulfonyl)oxy)-3,6-dihydropyridine-1(2H)-carboxylate (Mixture of Olefin Regioisomers) (Intermediate G)

KHMDS in THF (25.6 ml, 25.6 mmol) was added to a stirred, cooled −78° C. mixture of methyl 3-oxo-2-((((1s, 4s)-4-phenylcyclohexyl)oxy)methyl)piperidine-1-carboxylate (G-2) (6.8 g, 19.69 mmol) in THF (150 ml) and the mixture was stirred at −78° C. for 15 min. Then added 2-[N,N-bis(trifluoromethanesulfonyl)amino]-5-chloropyridine (8.50 g, 21.65 mmol), and the reaction mixture was continued stirred at −78° C. for 1 h. Aqueous ammonium chloride (saturated, 50 mL) was added and the mixture was extracted with ethyl acetate (3×80 mL). The combined organic fractions were washed with brine (saturated, 50 mL), dried ($Na_2SO_4$), filtered and the solvent was evaporated under reduced pressure. The residue was purified by column chromatography on silica gel, eluting with EtOAc: EtOH3:1/hexane (0-30%) to afford the title compound. MS: 478.7 (M+1).

Intermediate H (CIS)-2-(((4-isopropylcyclohexyl)oxy)methyl)-3-(1-((2-(trimethylsilyl)ethoxy)methyl)-1H-pyrazol-5-yl)piperidine -continued

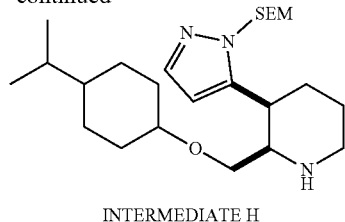

INTERMEDIATE H

Step 1: (3-bromopyridin-2-yl)methyl methanesulfonate (H-1)

Methanesulfonic anhydride (2.346 g, 13.47 mmol) was added to a stirred cooled 0° C. mixture of (3-bromopyridin-2-yl)methanol (1.2662 g, 6.73 mmol), DIEA (3.53 ml, 20.20 mmol) in CH2Cl2 (5 ml) and the mixture was stirred at room temperature for 30 min. Water (50 mL) was added and the mixture was extracted with ethyl acetate (3×50 mL). The combined organic fractions were washed with brine (saturated, 50 mL), dried (Na$_2$SO$_4$), filtered and the solvent was evaporated under reduced pressure. The residue was purified by column chromatography on silica gel, eluting with EtOAc:EtOH3:1/hexane (0-50%) to afford the title compound. MS: 267.9 (M+1).

Step 2: 3-bromo-2-((4-isopropylphenoxy)methyl)pyridine (H-2)

Cs2CO3 (774 mg, 2.375 mmol) was added to a stirred mixture of (3-bromopyridin-2-yl)methyl methanesulfonate (H-1) (316 mg, 1.187 mmol), 4-isopropylphenol (323 mg, 2.375 mmol) in DMF (3 ml) and the mixture was stirred at 50° C. for Overnight. Water (50 mL) was added and the mixture was extracted with ethyl acetate (3×30 mL). The combined organic fractions were washed with brine (saturated, 30 mL), dried (Na$_2$SO$_4$), filtered and the solvent was evaporated under reduced pressure. The residue was purified by column chromatography on silica gel, eluting with EtOAc:EtOH3:1/heneane (0-30%) to afford the title compound. MS: 308.0 (M+1).

Step 3: 2-((4-isopropylphenoxy)methyl)-3-(1-((2-(trimethylsilyl)ethoxy)methyl)-1H-pyrazol-5-yl)pyridine (H-3)

The mixture of 3-bromo-2-((4-isopropylphenoxy)methyl)pyridine (H-2) (64 mg, 0.209 mmol), 5-(4,4,5,5-tetramethyl-1,3,2-dioxaborolan-2-yl)-1-((2-(trimethylsilyl)ethoxy)methyl)-1h-pyrazole (87.3 mg, 0.269 mmol), chloro(2-dicyclohexylphosphino-2',4',6'-triisopropyl-1,1'-biphenyl)[2-(2'-amino-1,1'-biphenyl)]palladium(II) (32.9 mg, 0.042 mmol) and K3PO4 (144 mg, 0.627 mmol) in 1,4-Dioxane (3 ml) and the mixture was stirred at 80° C. for Overnight. Cooled to room temperature, filtered, the solution was concentrated, redissolved in MeOH, the solution was purified by preparative HPLC Reverse phase (C-18), eluting with Acetonitrile/Water+0.1% TFA to afford the title compound. MS: 425.5 (M+1).

Step 4: (CIS)-2-(((4-isopropylcyclohexyl)oxy)methyl)-3-(1-((2-(trimethylsilyl)ethoxy)methyl)-1H-pyrazol-5-yl)piperidine (Intermediate H)

The mixture of 2-((4-isopropylphenoxy)methyl)-3-(1-((2-(trimethylsilyl)ethoxy)methyl)-1H-pyrazol-5-yl)pyridine (H-3) (100 mg, 0.201 mmol), rhodium (1.664 µl, 0.201 mmol) in EtOH (2 ml)/acetic acid (0.011 ml, 0.201 mmol) and the mixture was stirred at room temperature under H$_2$ (1 atm) for Overnight. The mixture was filtered, washing with methanol, DCM, the solution was concentrated, and dried to afford the title compound. MS: 436.4 (M+1).

Intermediate IA and Intermediate IB 4-methyl-3-(4,4,5,5-tetramethyl-1,3,2-dioxaborolan-2-yl)-1-((2-(trimethylsilyl)ethoxy)methyl)-1H-pyrazole (Intermediate IA) & (4-methyl-1-((2-(trimethylsilyl)ethoxy)methyl)-1H-pyrazol-3-yl)boronic acid (Intermediate IB)

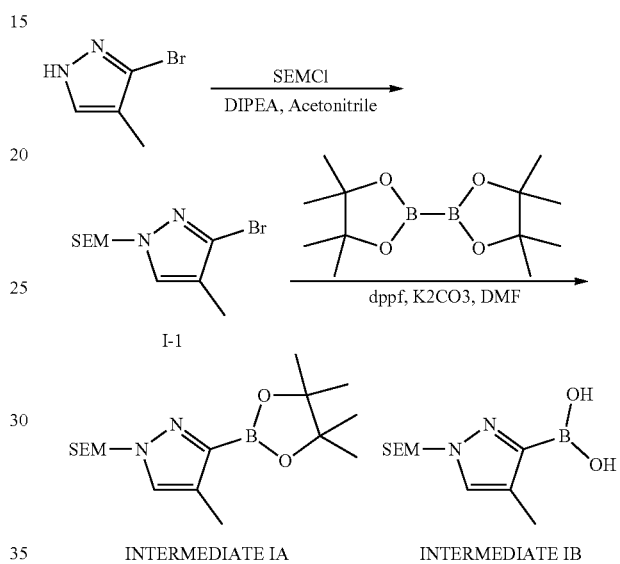

Step 1: 3-bromo-4-methyl-1-((2-(trimethylsilyl)ethoxy)methyl)-pH-pyrazole (I-1)

2-(Trimethylsilyl)ethoxymethyl chloride (16.54 ml, 93 mmol) was added to a stirred mixture of 3-bromo-4-methyl-1h-pyrazole (10.03 g, 62.3 mmol), DIPEA (32.6 ml, 187 mmol) in Acetonitrile (100 ml) and the mixture was stirred at 0° C. to room temperature for overnight. Hydrochloric acid (0M, 50 mL) was added and the mixture was extracted with ethyl acetate (3×80 mL). The combined organic fractions were washed with brine (saturated, 80 mL), dried (Na$_2$SO$_4$), filtered and the solvent was evaporated under reduced pressure. The residue was purified by column chromatography on silica gel, eluting with EtOAc:EtOH3:1/hexane (0-30%) to afford the title compound. MS: 292.4 (M+1).

Step 2: 4-methyl-3-(4,4,5,5-tetramethyl-1,3,2-dioxaborolan-2-yl)-1-((2-(trimethylsilyl)ethoxy)methyl)-1H-pyrazole (Intermediate IA) & (4-methyl-1-((2-(trimethylsilyl)ethoxy)methyl)-1H-pyrazol-3-yl)boronic acid (Intermediate IB)

The mixture of 3-bromo-4-methyl-1-((2-(trimethylsilyl)ethoxy)methyl)-1H-pyrazole (I-1) (3.1 g, 10.64 mmol), bis(pinacolato)diboron (13.51 g, 53.2 mmol), 1,1'-bis(diphenyl-phosphino)ferrocene-palladium(ii)dichloride dichloromethane complex (4.35 g, 5.32 mmol) and potassium acetate (5.22 g, 53.2 mmol) in DMF (30 ml) and was stirred under N2 at 80° C. for Overnight. The mixture was cooled, water (100 mL) was added and the mixture was extracted with ethyl acetate (3×80 mL). The combined organic fractions were filtered through silica gel pad and the solvent was evaporated under reduced pressure. The residue was purified by column chromatography on silica gel, eluting with EtOAc:EtOH3:1/hexane (0-20%) to afford the title compound. MS: 338.8 (M+1) (IA), MS: 256.7 (M+1) (IB).

Intermediate J

Methyl (CIS)-3-(4-methyl-1-((2-(trimethylsilyl)ethoxy)methyl)-2H-pyrazol-3-yl)-2-((piperidin-4-yloxy)methyl)piperidine-1-carboxylate

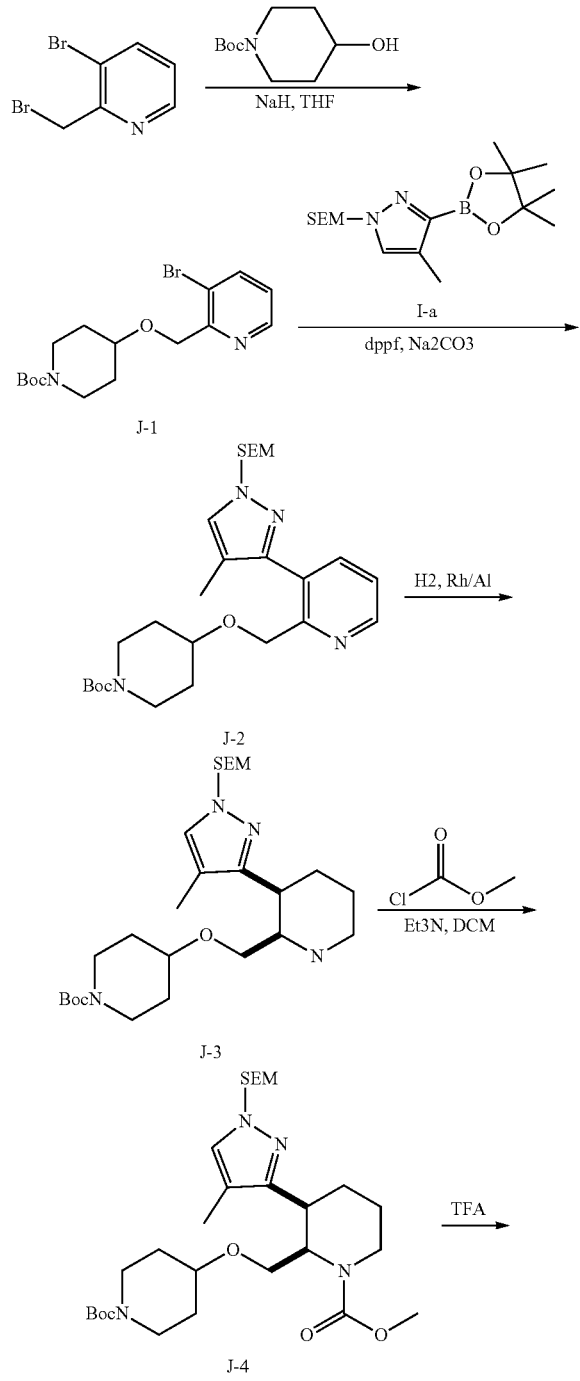

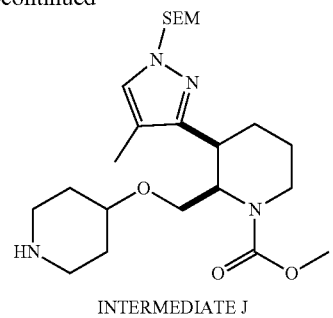

INTERMEDIATE J

Step 1: tert-butyl 4-((3-bromopyridin-2-yl)methoxy)piperidine-1-carboxylate (J-1)

3-bromo-2-(bromomethyl)pyridine (2 g, 7.97 mmol) was added to a stirred mixture of 1-boc-4-hydroxypiperidine (2.085 g, 10.36 mmol), NaH (0.383 g, 9.56 mmol) in THF (10 ml) and the mixture was stirred at room temperature for Overnight. Water (100 mL) was added and the mixture was extracted with ethyl acetate (3×80 mL). The combined organic fractions were washed with brine (saturated, 50 mL), dried ($Na_2SO_4$), filtered and the solvent was evaporated under reduced pressure. The residue was purified by column chromatography on silica gel, eluting with EtOAc:EtOH3:1/hexane (0-30%) to afford the title compound. MS: 371.6 (M+1).

Step 2: tert-butyl 4-U3-(4-methyl-1-((2-(trimethylsilyl)ethoxy)methyl)-1H-pyrazol-3-yl)pyridin-2-yl)methoxy)piperidine-1-carboxylate (J-2)

The mixture of tert-butyl 4-((3-bromopyridin-2-yl)methoxy)piperidine-1-carboxylate (J-1) (588.8 mg, 1.586 mmol), 4-methyl-3-(4,4,5,5-tetramethyl-1,3,2-dioxaborolan-2-yl)-1-((2-(trimethylsilyl)ethoxy)methyl)-1H-pyrazole (I-a) (1.09 g, 1.611 mmol), sodium carbonate (0.504 g, 4.76 mmol) and 1,1'-bis(diphenylphosphino)ferrocene-palladium(ii)dichloride dichloromethane complex (0.259 g, 0.317 mmol) in Dioxane (9 ml)/Water (2 ml) was stirred under N2 at 80° C. for Overnight. The mixture was cooled, water (50 mL) was added and the mixture was extracted with ethyl acetate (3×50 mL). The combined organic fractions were washed with brine (saturated, 50 mL), dried ($Na_2SO_4$), filtered and the solvent was evaporated under reduced pressure. The residue was purified by column chromatography on silica gel, eluting with EtOAc:EtOH (3:1)/hexane (0-50%) to afford the title compound. MS: 504.5 (M+1).

Step 3: tert-butyl 4-(((CIS)-3-(4-methyl-1-((2-(trimethylsilyl)ethoxy)methyl)-1H-pyrazol-3-yl)piperidin-2-yl)methoxy)piperidine-1-carboxylate (J-3)

Rhodium (169 mg, 0.082 mmol) was added to a stirred mixture of tert-butyl 4-((3-(4-methyl-1-((2-(trimethylsilyl)ethoxy)methyl)-1H-pyrazol-3-yl)pyridin-2-yl)methoxy)piperidine-1-carboxylate (J-2) (207 mg, 0.412 mmol), ACETIC ACID (23.57 µl, 0.412 mmol) in MeOH (5 mL) and the mixture was stirred under H2 (1 atm) at room temperature for Overnight. The mixture was filtered, washing with Methanol, the solution was concentrated, dried to afford the title compound. MS: 509.4 (M+1).

Step 4: methyl (CIS)-2-(((1-(tert-butoxycarbonyl) piperidin-4-yl)oxy)methyl)-3-(4-methyl-1-((2-(trimethylsilyl)ethoxy)methyl)-1H-pyrazol-3-yl)piperidine-1-carboxylate carboxylate (J-4)

Methyl chloroformate (0.063 ml, 0.820 mmol) was added to a stirred mixture of tert-butyl 4-((((CIS)-3-(4-methyl-1-((2-(trimethylsilyl)ethoxy)methyl)-1H-pyrazol-3-yl)piperidin-2-yl)methoxy)piperidine-1-carboxylate (J-3) (209 mg, 0.41 mmol), Et3N (0.571 ml, 4.10 mmol) in DCM (5 ml) and the mixture was stirred at room temperature for 15 min. Quenched with ethyl amine (0.5 ml, 2 M in THF), concentrated. The residue was purified by column chromatography on silica gel, eluting with EtOAc:EtOH 3:1/hexane (0-30%) to afford the title compound. MS: 567.4 (M+1).

Step 5: Methyl (CIS)-3-(4-methyl-1-((2-(trimethylsilyl)ethoxy)methyl)-2H-pyrazol-3-yl)-2-((piperidin-4-yloxy)methyl)piperidine-1-carboxylate (Intermediate J)

TFA (0.5 mL, 6.49 mmol) was added to a stirred mixture of methyl (CIS)-2-(((1-(tert-butoxycarbonyl)piperidin-4-yl)oxy)methyl)-3-(4-methyl-1-((2-(trimethylsilyl)ethoxy)methyl)-1H-pyrazol-3-yl)piperidine-1-carboxylate (J-4) (145 mg, 0.256 mmol) in CH2Cl2 (5 ml) and the mixture was stirred at room temperature for 30 min. Concentrated, redissolved in MeOH (3 ml), filtered, the solution was purified by preparative HPLC Reverse phase (C-18), eluting with Acetonitrile/Water+0.1% TFA to afford the title compound. MS: 467.4 (M+1).

Intermediate K

4-((3-(4-methyl-1-((2-(trimethylsilyl)ethoxy)methyl)-1H-pyrazol-3-ylpyridin-2-yl)methoxycyclohex-1-en-1-yl trifluoromethanesulfonate

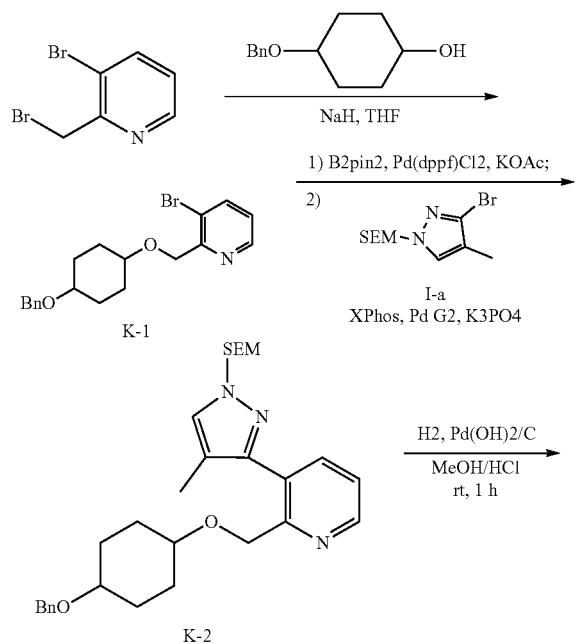

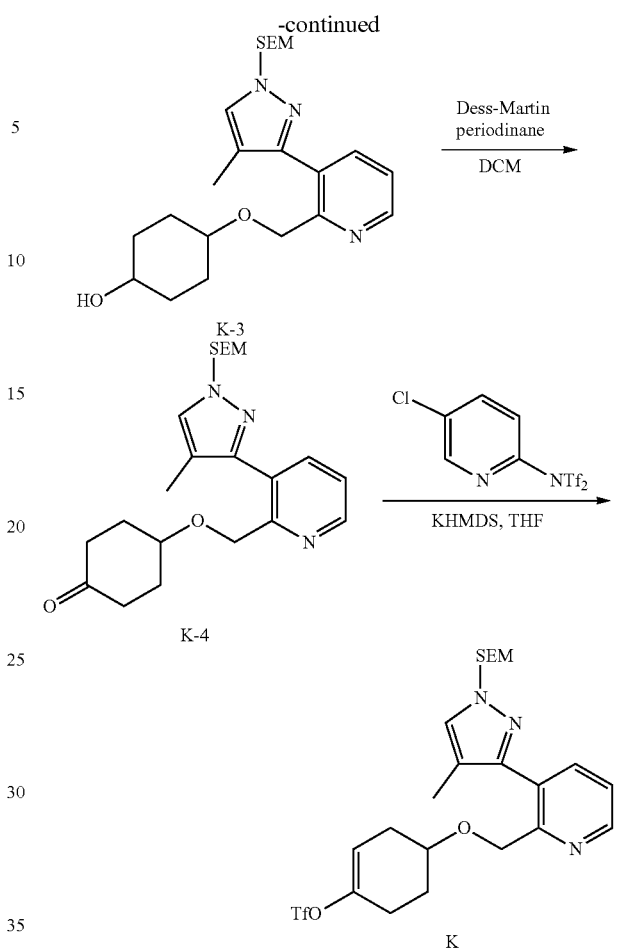

Step 1: 2-(((4-(benzyloxy)cyclohexyl)oxy)methyl)-3-bromopyridine (K-1)

3-bromo-2-(bromomethyl)pyridine (1.4 g, 5.36 mmol) was added to a stirred mixture of sodium hydride (0.300 g, 7.50 mmol), 3-bromo-2-(bromomethyl)pyridine (1.4 g, 5.36 mmol) in THF (20 ml) and the mixture was stirred at room temperature for 24 h. Water (100 mL) was added and the mixture was extracted with ethyl acetate (3×100 mL). The combined organic fractions were washed with brine (saturated, 80 mL), dried (Na2SO4), filtered and the solvent was evaporated under reduced pressure. The residue was purified by column chromatography on silica gel, eluting with EtOAc:EtOH 3:1/hexane (0-30%) to afford the title compound. MS: 377.6 (M+1).

Step 2: 2-(((4-(benzyloxy)cyclohexyl)oxy)methyl)-3-(4-methyl-1-((2-(trimethylsilyl)ethoxy)-methyl)-1H-pyrazol-3-ylpyridine (K-2)

The mixture of 2-(((4-(benzyloxy)cyclohexyl)oxy)methyl)-3-bromopyridine (K-1) (1.09 g, 2.90 mmol), bis(pinacolato)diboron (0.809 g, 3.19 mmol), [1,1'-bis(diphenylphosphino)-ferrocene]dichloropalladium(II) (0.424 g, 0.579 mmol) and POTASSIUM ACETATE (1.421 g, 14.48 mmol) in DMF (10 ml) and was stirred under N2 at 80° C. for 3 h. Then added 3-bromo-4-methyl-1-((2-(trimethylsilyl)ethoxy)methyl)-1H-pyrazole (I-a) (1.687 g, 5.79 mmol), chloro(2-dicyclohexylphosphino-2',4',6'-triisopropyl-1,1'- biphenyl)[2-(2'-amino-1,1'-biphenyl)]-palladium(ii) (xphos g2) (0.456 g, 0.579 mmol) and potassium phosphate tribasic monohydrate (2.001 g, 8.69 mmol), the reaction mixture was stirred under N2 at 80° C. for Overnight. The mixture was cooled, water (80 mL) was added and the mixture was extracted with ethyl acetate (3×80 mL). The combined organic fractions were washed with brine (saturated, 50 mL), dried (Na$_2$SO$_4$), filtered and the solvent was evaporated under reduced pressure. The residue was purified by column chromatography on silica gel eluting with EtOAc: EtOH3:1/hexane (0-30%) to afford the title compound. MS: 508.9 (M+1).

Step 3: 4-((3-(4-methyl-1-((2-(trimethylsilyl)ethoxy) methyl)-1H-pyrazol-3-yl)pyridin-2-yl)methoxy)cyclohexan-1-ol (K-3)

HCl (0.130 ml, 1.578 mmol) was added to a stirred mixture of 2-(((4-(benzyloxy)-cyclohexyl)oxy)methyl)-3-(4-methyl-1-((2-(trimethylsilyl)ethoxy)methyl)-1H-pyrazol-3-yl)pyridine (K-2) (801 mg, 1.578 mmol), PdOH2 (222 mg, 0.316 mmol) in MeOH (10 ml) and the mixture was stirred under H2 (1 atm) at room temperature for 1 h. The mixture was filtered, washing with methanol, the solution was concentrated. The residue was purified by column chromatography on silica gel, eluting with EtOAc:EtOH3; 1/hexane (0-50%) to afford the title compound. MS: 418.8 (M+1).

Step 4: 4-((3-(4-methyl-1-((2-(trimethylsilyl)ethoxy) methyl)-1H-pyrazol-3-yl)pyridin-2-yl)methoxy)cyclohexan-1-one (K-4)

Dess-Martin periodinane (498 mg, 1.174 mmol) was added to a stirred, cooled 0° C. mixture of 4-((3-(4-methyl-1-((2-(trimethylsilyl)ethoxy)methyl)-1H-pyrazol-3-yl)pyridin-2-yl)methoxy)cyclohexan-1-ol (K-3) (327 mg, 0.783 mmol) in DCM (10 ml) and the mixture was stirred at room temperature for 2 h. Aqueous sodium hydrogen carbonate (saturated, 50 mL) was added and the mixture was extracted with dichloromethane (3×30 mL). The combined organic fractions were washed with brine (saturated, 20 mL), dried (Na$_2$SO$_4$), filtered and the solvent was evaporated under reduced pressure. The residue was purified by column chromatography on silica gel, eluting with EtOAc:EtOH3: 1/hexane (0-50%) to afford the title compound. MS: 416.3 (M+1).

Step 5: 4-((3-(4-methyl-1-((2-(trimethylsilyl)ethoxy) methyl)-1H-pyrazol-3-yl)pyridin-2-yl)methoxy)cyclohex-1-en-1-yl trifluoromethanesulfonate (K)

Potassium bis(trimethylsilyl)amide (0.5 M in toluene) (0.910 ml, 0.455 mmol) was added to a stirred, cooled −78° C. mixture of 4-((3-(4-methyl-1-((2-(trimethylsilyl)ethoxy) methyl)-1H-pyrazol-3-yl)pyridin-2-yl)methoxy)cyclohexan-1-one (K-4) (145.5 mg, 0.350 mmol) in THF (5 ml) and the mixture was stirred at −78° C. for 10 min. then added 2-[N,N-bis(trifluoromethane-sulfonyl)amino]-5-chloropyridine (151 mg, 0.385 mmol), and the reaction mixture was continued stirred at −78° C. for 1 h. Aqueous ammonium chloride (saturated, 50 mL) was added and the mixture was extracted with ethyl acetate (3×50 mL). The combined organic fractions were washed with brine (saturated, 50 mL), dried (Na$_2$SO$_4$), filtered and the solvent was evaporated under reduced pressure. The residue was purified by column chromatography on silica gel, eluting with EtOAc: EtOH3:1/hexane (0-30%) to afford the title compound. MS: 548.3 (M+1).

Intermediate L & Intermediate M (CIS)-2-(((3'-fluoro-2,3,4,5-tetrahydro-[1,1'-biphenyl]-4-yl)oxy)methyl)-3-(4-methyl-1-((2-(trimethylsilyl)ethoxy)methyl)-1H-pyrazol-3-yl)piperidine (Intermediate L) and (CIS)-2-(((((CIS)-4-(3-fluorophenyl)cyclohexyl)oxy)methyl)-3-(4-methyl-1-((2-(trimethylsilyl)ethoxy)methyl)-1H-pyrazol-3-yl) piperidine (Intermediate M)

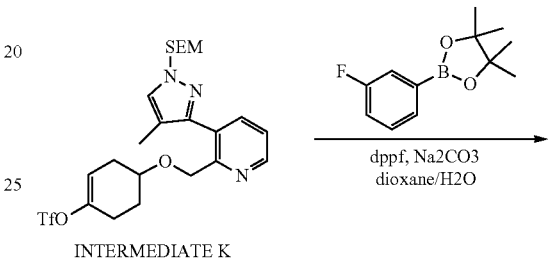

INTERMEDIATE K

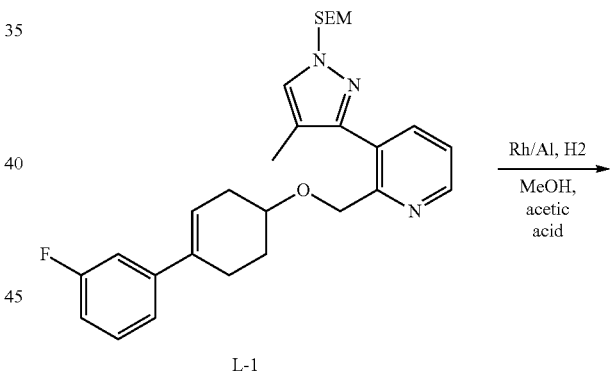

L-1

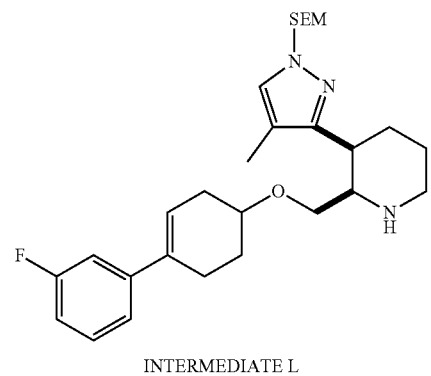

INTERMEDIATE L

47

-continued

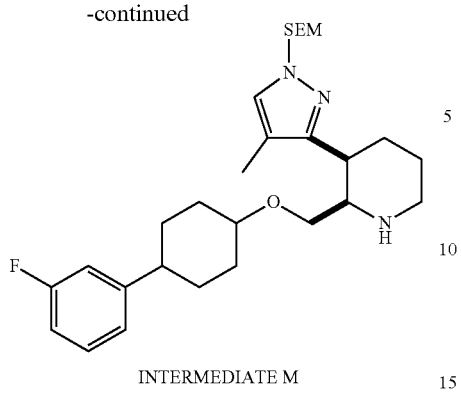

INTERMEDIATE M

Step 1: (S)-2-(((3'-fluoro-2,3,4,5-tetrahydro-[1,1'-biphenyl]-4-yl)oxy)methyl)-3-(4-methyl-1-((2-(trimethylsilyl)ethoxy)methyl)-1H-pyrazol-3-yl)pyridine (L-1)

The mixture of 4-((3-(4-methyl-1-((2-(trimethylsilyl)ethoxy)methyl)-1H-pyrazol-3-yl)pyridin-2-yl)methoxy)cyclohex-1-en-1-yl trifluoromethanesulfonate (INTERMEDIATE K) (380 mg, 0.347 mmol), 3-fluorophenylboronic acid (97 mg, 0.694 mmol), 1,1'-bis(diphenyl-phosphino)ferrocene-palladium(ii)dichloride dichloromethane complex (56.7 mg, 0.069 mmol) and sodium carbonate (110 mg, 1.041 mmol) in Dioxane (3 ml)/Water (0.8 ml) and the mixture was stirred at 80° C. for Overnight. Water (30 mL) was added and the mixture was extracted with ethyl acetate (3×30 mL). The combined organic fractions were washed with brine (saturated, 80 mL), dried (Na$_2$SO$_4$), filtered and the solvent was evaporated under reduced pressure. The residue was purified by column chromatography on silica gel, eluting with EtOAc:EtOH 3:1/hexane (0-30%) to afford the title compound. MS: 494.3 (M+1).

Step 2: (CIS)-2-(((3'-fluoro-2,3,4,5-tetrahydro-[1,1'-biphenyl]-4-yl)oxy)methyl)-3-(4-methyl-1-((2-(trimethylsilyl)ethoxy)methyl)-1H-pyrazol-3-yl)piperidine (Intermediate L) and (CIS)-2-((((CIS)-4-(3-fluorophenyl)cyclohexyl)oxy)methyl)-3-(4-methyl-1-((2-(trimethylsilyl)ethoxy)methyl)-1H-pyrazol-3-yl)piperidine (Intermediate M)

Rhodium (32 mg, 0.016 mmol) was added to a stirred mixture of (S)-2-(((3'-fluoro-2,3,4,5-tetrahydro-[1,1'-biphenyl]-4-yl)oxy)methyl)-3-(4-methyl-1-((2-(trimethylsilyl)ethoxy)-methyl)-1H-pyrazol-3-yl)pyridine (L-1) (20 mg, 0.041 mmol), ACETIC ACID (2.319 µl, 0.041 mmol) in MeOH (5 ml) and the mixture was stirred under H2 (1 atm)) at room temperature for 2 h. The mixture was filtered, washing with methanol, the solution was concentrated, dried to afford the title compound. MS: 500.4 (M+1) (INTERMEDIATE L), MS: 502.4 (M+1)(INTERMEDIATE M).

48

Intermediate Q 3-bromo-2-(((CIS)-4-(3-fluorophenyl)cyclohexyl)oxy)methyl)pyridine

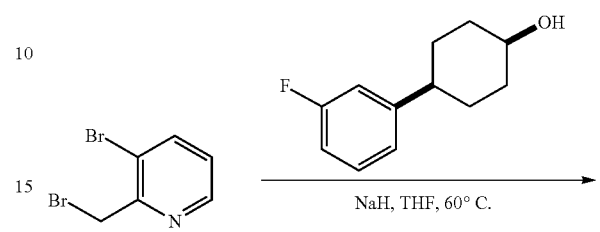

INTERMEDIATE O 3-bromo-2-(bromomethyl)pyridine (350 mg, 1.396 mmol) was added to a stirred mixture of (CIS)-4-(3-fluorophenyl)cyclohexan-1-ol (226 mg, 1.163 mmol), sodium hydride (93 mg, 2.327 mmol) in THF (8 ml) and the mixture was stirred at 60° C. for 3 h. The mixture was cooled, water (50 mL) was added and the mixture was extracted with ethyl acetate (3×50 mL). The combined organic fractions were washed with brine (saturated, 30 mL), dried (Na$_2$SO$_4$), filtered and the solvent was evaporated under reduced pressure. The residue was purified by column chromatography on silica gel, eluting with EtOAc:EtOH3:1/hexane (0-30%) to afford the title compound. MS: 366.1 (M+1).

Intermediate P (CIS)-2-((((CIS)-4-(3-fluorophenyl)cyclohexyl)oxy)methyl)-3-(4-methyl-1-((2-(trimethylsilyl)ethoxy)methyl)-1H-pyrazol-3-yl)piperidine

INTERMEDIATE O    INTERMEDIATE IA

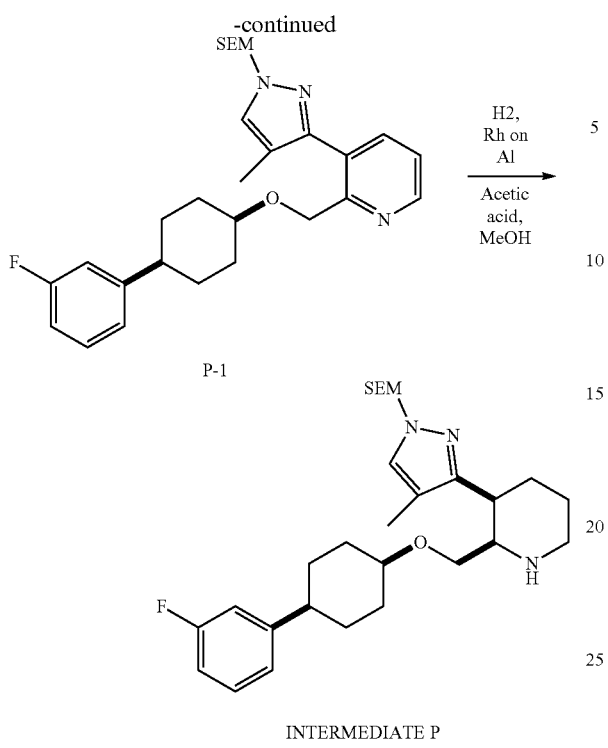

INTERMEDIATE P

Step 1: 2-(((((CIS)-4-(3-fluorophenyl)cyclohexyl)oxy)methyl)-3-(4-methyl-1-((2-(trimethylsilyl)ethoxy)methyl)-1H-pyrazol-3-yl)pyridine (P-1)

The mixture of 3-bromo-2-(((((CIS)-4-(3-fluorophenyl)cyclohexyl)oxy)methyl)pyridine (INTERMEDIATE O) (323 mg, 0.887 mmol), 4-methyl-5-(4,4,5,5-tetramethyl-1,3,2-dioxaborolan-2-yl)-1-((2-(trimethylsilyl)ethoxy)methyl)-1H-pyrazole (I-a) (439 mg, 1.298 mmol), sodium carbonate (282 mg, 2.66 mmol) and 1,1'-bis(diphenylphosphino)ferrocene-palladium(ii)dichloride dichloromethane complex (145 mg, 0.177 mmol) in Dioxane (6 ml)/Water (1.5 ml) was stirred under N2 at 80° C. for Overnight. The mixture was cooled, water (50 mL) was added and the mixture was extracted with ethyl acetate (3×50 mL). The combined organic fractions were washed with brine (saturated, 50 mL), dried (Na₂SO₄), filtered and the solvent was evaporated under reduced pressure. The residue was purified by column chromatography on silica gel, eluting with EtOAc:EtOH 3:1/hexane (0-30%) to give product with little impurity. The product was re-purified by preparative HPLC Reverse phase (C-18), eluting with Acetonitrile/Water+0.1% TFA, to afford the title compound. MS: 496.4 (M+1).

Step 2: (CIS)-2-(((((CIS)-4-(3-fluorophenyl)cyclohexyl)oxy)methyl)-3-(4-methyl-1-((2-(trimethylsilyl)ethoxy)methyl)-1H-pyrazol-3-yl)piperidine (Intermediate P)

Acetic acid (0.1 ml, 1.747 mmol) was added to a stirred mixture of 2-(((((CIS)-4-(3-fluorophenyl)cyclohexyl)oxy)methyl)-3-(4-methyl-1-((2-(trimethylsilyl)ethoxy)methyl)-1H-pyrazol-3-yl)pyridine (P-1) (122 mg, 0.246 mmol) and RHODIUM on Al (101 mg, 0.049 mmol) in MeOH (8 ml) and the mixture was stirred under H2 (1 atm) at room temperature for 72 h. The mixture was filtered, washing with methanol, the solution was concentrated, dried to afford the title compound. MS: 502.5 (M+1).

Intermediate Q 3-bromo-2-(((((CIS)-4-phenylcyclohexyl)oxy)methyl)pyridine

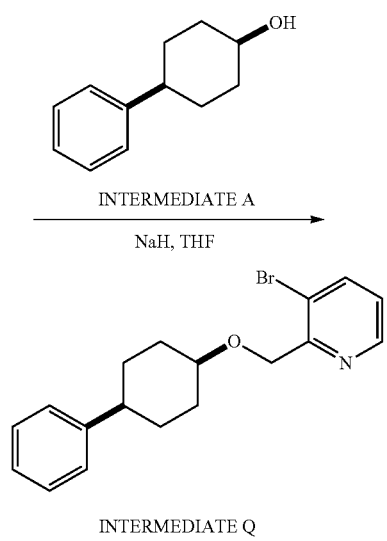

INTERMEDIATE Q 3-bromo-2-(bromomethyl)pyridine (2.02 g, 8.05 mmol) was added to a stirred mixture of (CIS)-4-phenylcyclohexan-1-ol (INTERMEDIATE A) (2.197 g, 12.46 mmol), sodium hydride (0.419 g, 10.47 mmol) in THF (15 ml) and the mixture was stirred at room temperature for Overnight. Water (100 mL) was added and the mixture was extracted with ethyl acetate (3×80 mL). The combined organic fractions were washed with brine (saturated, 50 mL), dried (Na₂SO₄), filtered and the solvent was evaporated under reduced pressure. The residue was purified by column chromatography on silica gel, eluting with EtOAc:EtOH3:1/hexane (0-30%) to afford the title compound. MS: 346.1 (M+H).

Intermediate R 3-bromo-4-(trifluoromethyl)-1-((2-(trimethylsilyl)ethoxy)methyl)-1H-pyrazole

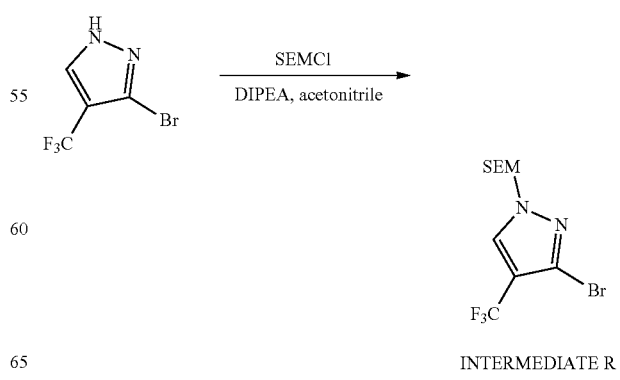

INTERMEDIATE R 2-(Trimethylsilyl)ethoxymethyl chloride (1.235 ml, 6.98 mmol) was added to a stirred mixture of 3-bromo-4-(trifluoromethyl)-1H-pyrazole (1 g, 4.65 mmol), DIPEA (2.437 ml, 13.96 mmol) in Acetonitrile (10 ml) and the mixture was stirred at 0° C. to room temperature for 2 h. Hydrochloric acid (0M, 50 mL) was added and the mixture was extracted with ethyl acetate (3×80 mL). The combined organic fractions were washed with brine (saturated, 80 mL), dried (Na$_2$SO$_4$), filtered and the solvent was evaporated under reduced pressure. The residue was purified by column chromatography on silica gel, eluting with EtOAc:EtOH3:1/hexane (0-30%) to afford the title compound. MS: 347.1 (M+1).

Intermediate S 3-bromo-1-((2-(trimethylsilyl)ethoxy)methyl)-1H-1,2,4-triazole

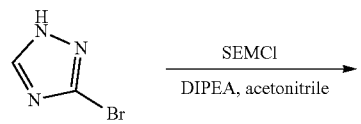

INTERMEDIATE S

Following the general procedure described for INTERMEDIATE R, but with the correct starting heterocycle, INTERMEDIATE S was afforded. LC-MS (m/z)=280.0 (M+1).

Intermediate T (CIS)-2-((((CIS)-4-phenylcyclohexyl)oxy)methyl)-3-(4-(trifluoromethyl)-1-((2-(trimethylsilyl)-ethoxy)methyl)-1H-pyrazol-3-yl)piperidine

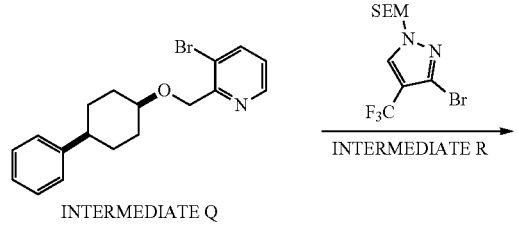

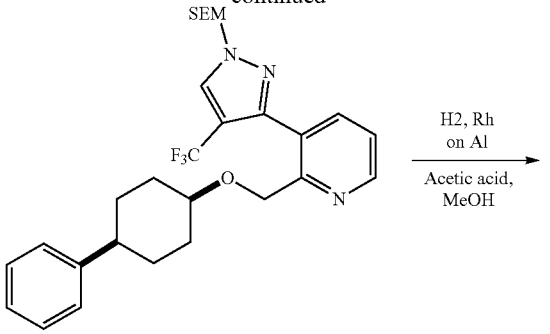

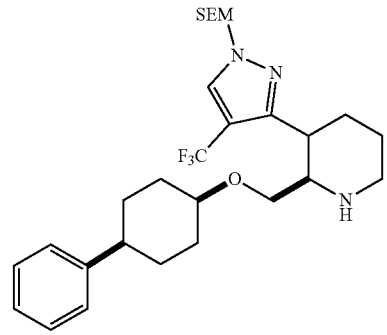

INTERMEDIATE T

Step 1: 2-(((1s,4s)-4-phenylcyclohexyl)oxy)methyl)-3-(4-(trifluoromethyl)-1-((2-(trimethylsilyl)ethoxy)methyl)-1H-pyrazol-3-yl)pyridine (T-1)

The mixture of 3-bromo-2-((((1s,4s)-4-phenylcyclohexyl)oxy)methyl)pyridine (INTERMEDIATE Q) (209 mg, 0.604 mmol), bis(pinacolato)diboron (184 mg, 0.724 mmol), [1,1'-bis(diphenylphosphino)ferrocene]dichloropalladium (II) (88 mg, 0.121 mmol) and POTASSIUM ACETATE (178 mg, 1.811 mmol) in DMF (10 ml) was stirred under N2 at 80° C. for 3 h. Then added 3-bromo-4-(trifluoromethyl)-1-((2-(trimethylsilyl)ethoxy)methyl)-1H-pyrazole (INTERMEDIATE R) (417 mg, 1.207 mmol), CHLORO(2-dicyclohexylphosphino-2',4',6'-triisopropyl-1,1'-biphenyl)[2-(2'-amino-1,1'-biphenyl)]palladium(ii) (xphos g2) (95 mg, 0.121 mmol) and potassium phosphate tribasic monohydrate (417 mg, 1.811 mmol), the reaction mixture was stirred under N2 at 80° C. for Overnight. The mixture was cooled, water (80 mL) was added and the mixture was extracted with ethyl acetate (3×80 mL). The combined organic fractions were washed with brine (saturated, 50 mL), dried (Na$_2$SO$_4$), filtered and the solvent was evaporated under reduced pressure. The residue was purified by prep. TLC, eluting with EtOAc:EtOH3:1/hexane (1:3) to give product with in purity as brown solid. redissolved in MeOH, filtered, The solution was purified by preparative HPLC Reverse phase (C-18), eluting with Acetonitrile/Water+0.1% TFA, to afford the title compound. MS: 532.3 (M+1).

Step 2: (CIS)-2-((((CIS)-4-phenylcyclohexyl)oxy)methyl)-3-(4-(trifluoromethyl)-1-((2-(trimethylsilyl)ethoxy)methyl)-1H-pyrazol-3-yl)piperidine (Intermediate T)

RHODIUM (61.9 mg, 0.030 mmol) was added to a stirred mixture of 2-((((1s,4s)-4-phenylcyclohexyl)oxy)methyl)-3-

(4-(trifluoromethyl)-1-((2-(trimethylsilyl)ethoxy)methyl)-1H-pyrazol-3-yl)pyridine (T-1) (16 mg, 0.030 mmol), ACETIC ACID (1.723 µl, 0.030 mmol) in MeOH (5 ml) and the mixture was stirred under H2 (1 atm) at room temperature for 2 h. The mixture was filtered, washing with methanol, the solution was concentrated, dried to afford the title compound. MS: 538.3 (M+1).

Intermediate U (CIS)-2-(((((CIS)-4-phenylcyclohexyl)oxy)methyl)-3-(1-((2-(trimethylsilyl)ethoxy)methyl)-1H-1,2,4-triazol-3-yl)piperidine

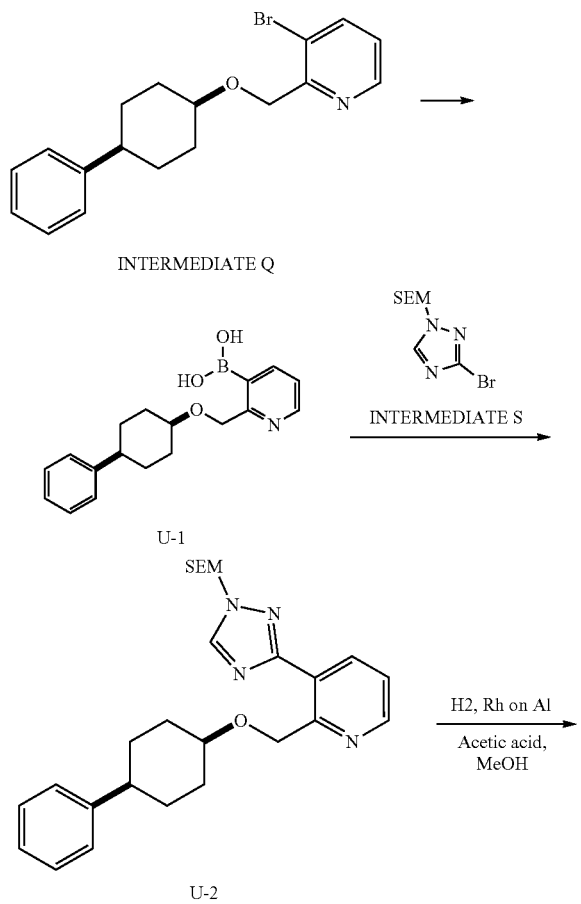

Step 1: (2-((((1s,4s)-4-phenylcyclohexyl)oxy)methyl)pyridin-3-yl)boronic acid (U-1)

The mixture of 3-bromo-2-((((1s,4s)-4-phenylcyclohexyl)oxy)methyl)pyridine (INTERMEDIATE Q) (198.4 mg, 0.573 mmol), bis(pinacolato)diboron (436 mg, 1.719 mmol), 1,1'-bis(diphenylphosphino)ferrocene-palladium(ii) dichloride dichloromethane complex (94 mg, 0.115 mmol) and POTASSIUM ACETATE (281 mg, 2.86 mmol) in DMF (10 ml) was stirred under N2 at 80° C. for 3 h. The mixture was cooled, water (100 mL) was added and the mixture was extracted with ethyl acetate (3×80 mL). The combined organic fractions were washed with brine (saturated, 80 mL), dried (Na2SO4), filtered and the solvent was evaporated under reduced pressure. The residue was purified by prep. TLC, eluting with DCM:MeOH (9:1) to afford the title compound. MS: 312.2 (M+1).

Step 2: 2-(((1s,4s)-4-phenylcyclohexyl)oxy)methyl)-3-(1-((2-(trimethylsilyl)ethoxy)methyl)-1H-1,2,4-triazol-3-yl)pyridine (U-2)

The mixture of (2-((((1s,4s)-4-phenylcyclohexyl)oxy)methyl)pyridin-3-yl)boronic acid (U-1) (37 mg, 0.119 mmol), 3-bromo-1-((2-(trimethylsilyl)ethoxy)methyl)-1H-1,2,4-triazole (INTERMEDIATE S) (66.2 mg, 0.238 mmol), chloro(2-dicyclohexylphosphino-2',4',6'-tri-i-propyl-1,1'-biphenyl)(2'-amino-1,1'-biphenyl-2-yl) palladium(II) (XPhos G2) (18.71 mg, 0.024 mmol) and potassium phosphate hydrate (82 mg, 0.357 mmol) in 1,4-Dioxane (2 ml)/Water (0.6 ml) was stirred under N2 at 80° C. for Overnight. Concentrated, redissolved in MeOH (2 mL), filtered, the solution was purified by preparative HPLC Reverse phase (C-18), eluting with Acetonitrile/Water+0.1% TFA, to afford the title compound. MS: 465.3 (M+1).

Step 3: (CIS)-2-(((((CIS)-4-phenylcyclohexyl)oxy)methyl)-3-(1-((2-(trimethylsilyl)ethoxy)methyl)-1H-1,2,4-triazol-3-yl)piperidine (Intermediate U)

RHODIUM (31.9 mg, 0.015 mmol) was added to a stirred mixture of 2-((((1s,4s)-4-phenylcyclohexyl)oxy)methyl)-3-(1-((2-(trimethylsilyl)ethoxy)methyl)-1H-1,2,4-triazol-3-yl)pyridine (U-2) (36 mg, 0.077 mmol), ACETIC ACID (4.44 µl, 0.077 mmol) in MeOH (5 ml) and the mixture was stirred under H2 (1 atm) at room temperature for 4 h. The mixture was filtered, washing with methanol, the solution was concentrated, dried to afford the title compound. MS: 471.4 (M+1).

Intermediate V benzyl (CIS)-3-amino-2-(((((CIS)-4-phenylcyclohexyl)oxy)methyl)pyrrolidine-1-carboxylate

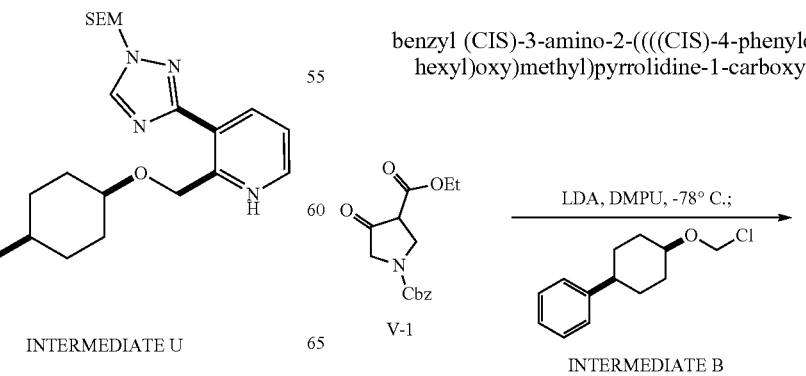

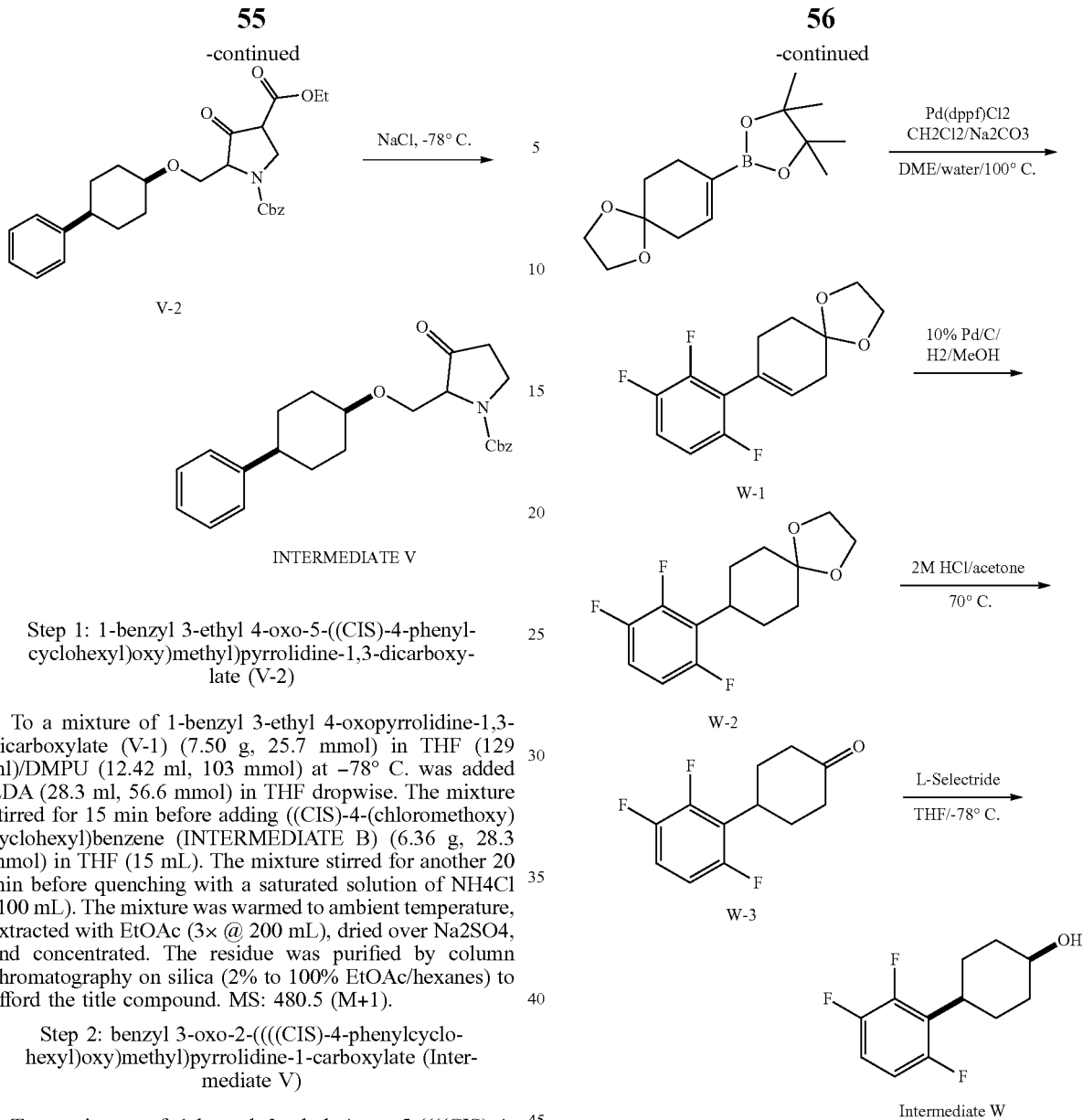

Step 1: 1-benzyl 3-ethyl 4-oxo-5-((CIS)-4-phenyl-cyclohexyl)oxy)methyl)pyrrolidine-1,3-dicarboxylate (V-2)

To a mixture of 1-benzyl 3-ethyl 4-oxopyrrolidine-1,3-dicarboxylate (V-1) (7.50 g, 25.7 mmol) in THF (129 ml)/DMPU (12.42 ml, 103 mmol) at −78° C. was added LDA (28.3 ml, 56.6 mmol) in THF dropwise. The mixture stirred for 15 min before adding ((CIS)-4-(chloromethoxy)cyclohexyl)benzene (INTERMEDIATE B) (6.36 g, 28.3 mmol) in THF (15 mL). The mixture stirred for another 20 min before quenching with a saturated solution of NH4Cl (100 mL). The mixture was warmed to ambient temperature, extracted with EtOAc (3× @ 200 mL), dried over Na2SO4, and concentrated. The residue was purified by column chromatography on silica (2% to 100% EtOAc/hexanes) to afford the title compound. MS: 480.5 (M+1).

Step 2: benzyl 3-oxo-2-(((((CIS)-4-phenylcyclo-hexyl)oxy)methyl)pyrrolidine-1-carboxylate (Intermediate V)

To a mixture of 1-benzyl 3-ethyl 4-oxo-5-(((((CIS)-4-phenylcyclohexyl)oxy)methyl)-pyrrolidine-1,3-dicarboxylate (V-2) (4.00 g, 8.34 mmol) in DMSO (25.3 ml) was added SODIUM CHLORIDE (0.975 g, 16.68 mmol) and H2O (3.01 ml, 167 mmol). The mixture was heated to 130° C. and stirred for 2 hours before cooling to ambient temperature. The mixture was purified directly by column chromatography on C18 (5-95% MeCN/water with 0.05% TFA modifier) to afford the title compound. MS: 408.5 (M+1).

Intermediate W (CIS)-4-(2,3,6-trifluorophenyl)cyclohexan-1-ol

Step 1: 8-(2,3,6-Trifluorophenyl)-1,4-dioxaspiro[4.5]dec-7-ene (W-1)

A suspension of 2-bromo-1,3,4-trifluorobenzene (3.2 g, 15.17 mmol), 1,1′-Bis(diphenylphosphino)ferrocene-palladium(ii)dichloride dichloromethane complex (2.477 g, 3.03 mmol), sodium carbonate (4.82 g, 45.5 mmol) and 4,4,5,5-tetramethyl-2-(1,4-dioxaspiro[4.5]dec-7-en-8-yl)-1,3,2-dioxaborolane (4.84 g, 18.2 mmol) in DME (72 ml) and Water (28 ml) was bubbled with nitrogen for 10 mins. The reaction mixture was sealed in the reaction vial and heated at 100° C. overnight. The reaction mixture was diluted with 100 mL of EtOAc. Separated the organic layer. The aqueous layer was extracted with EtOAc twice. The combined organic layer was dried over MgSO4, concentrated to leave black oil. The residue was purified by column chromatography on silica (0% to 15% EtOAc/hexanes) to afford the title compound. MS: 271.1 (M+1).

Step 2: 8-(2,3,6-Trifluorophenyl)-1,4-dioxaspiro[4.5]decane (W-2)

To a solution of 8-(2,3,6-trifluorophenyl)-1,4-dioxaspiro[4.5]dec-7-ene (A-1, 2.4 g, 8.88 mmol) in MeOH (45 ml) was added 10% palladium on carbon (0.756 g, 0.710 mmol). The reaction mixture was stirred under H₂ balloon overnight. The reaction mixture was filtered through celite and the filtrated was concentrated to afford the title compound. MS: 273.2 (M+1).

Step 3: 4-(2,3,6-Trifluorophenyl)cyclohexan-1-one (W-3)

To a solution of 8-(2,3,6-trifluorophenyl)-1,4-dioxaspiro[4.5]decane (A-2, 2.3 g, 8.45 mmol) in acetone (30 ml) was added 2M HCl in water (10.56 ml, 21.12 mmol). The reaction mixture was heated at 70° C. for 70 mins. The reaction mixture was concentrated to get rid off acetone and leave colorless water solution. The aqueous layer was extracted with EtOAc three times, dried over MgSO4, concentrated to leave colorless oil. The residue was purified by column chromatography on silica (0% to 15% EtOAc/hexanes) to afford the title compound. MS: 229.1 (M+1).

Step 4: (CIS)-4-(2,3,6-trifluorophenyl)cyclohexan-1-ol (Intermediate W)

To a solution of 4-(2,3,6-trifluorophenyl)cyclohexan-1-one (A-3, 1.56 g, 6.84 mmol) in THF (24 ml) at −78° C. under nitrogen was added L-Selectride (1.0 M in THF, 11.62 ml, 11.62 mmol) dropwise. The mixture was continued to stir at −78° C. for 20 mins. Then warmed up to 0° C. and stir at 0° C. under nitrogen for 20 mins. The reaction mixture was quenched with saturated NH4Cl solution, extracted with EtOAc (30 mL×3), dried over MgSO4, and concentrated to leave colorless oil. The residue was purified by column chromatography on silica (0% to 20% EtOAc/hexanes) to afford the title compound. MS: 272.2 (M+23).

Intermediate X

Methyl (2S,5R)-5-methyl-2-(((CIS)-4-phenylcyclohexyl)oxy)methyl)-3-(((trifluoromethyl)-sulfonyl)oxy)-2,5-dihydro-1H-pyrrole-1-carboxylate

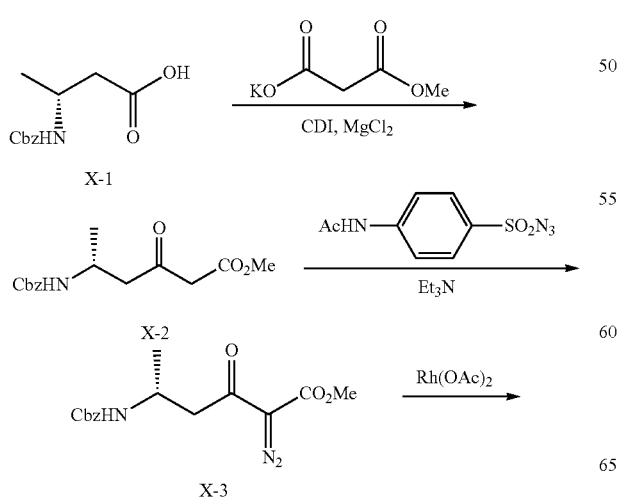

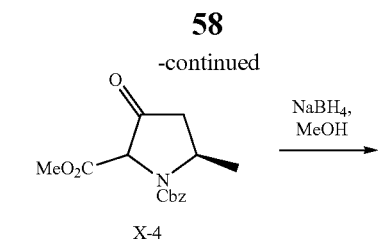

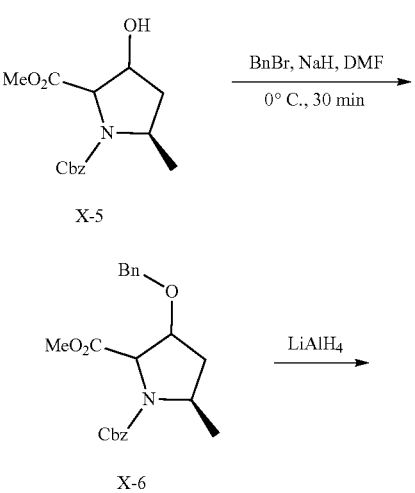

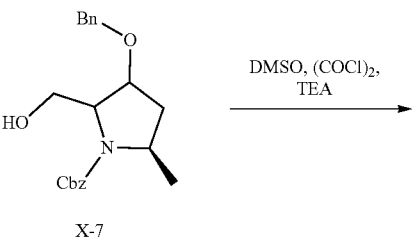

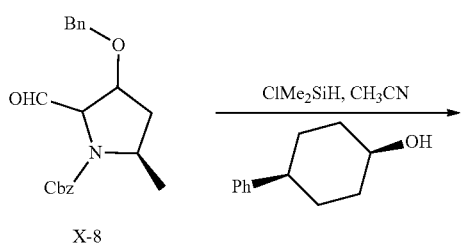

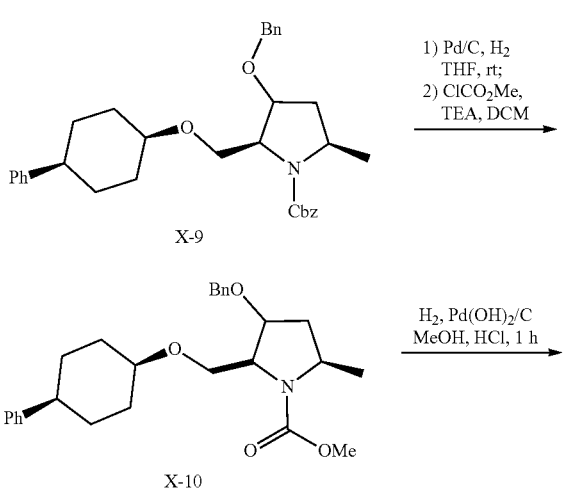

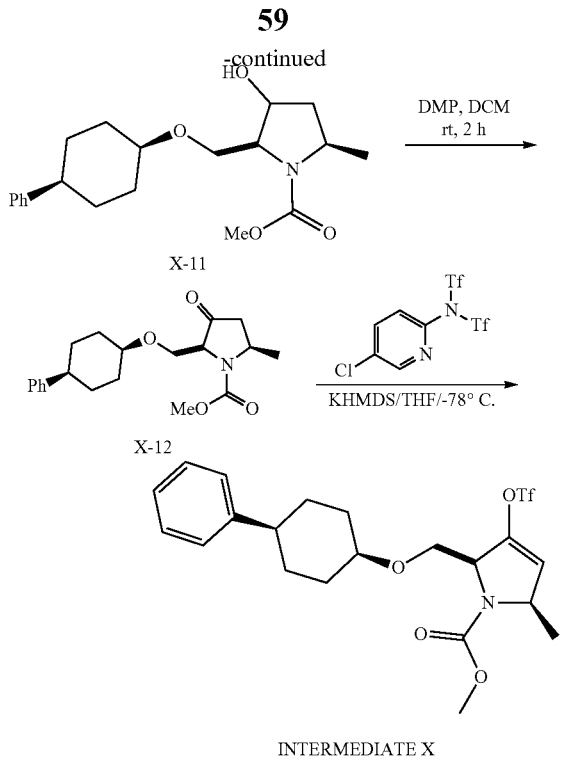

INTERMEDIATE X

Step 1: methyl (R)-5-(((benzyloxy)carbonyl)amino)-3-oxohexanoate (X-2)

To a solution of (R)-3-(((benzyloxy)carbonyl)amino)butanoic acid (X-1) (6.25 g, 26.3 mmol) in anhydrous THF (100 ml) under $N_2$ was added di(1H-imidazol-1-yl)methanone (6.41 g, 39.5 mmol). After stirring at rt for 1 h, previously mixed $MgCl_2$ (4.64 ml, 52.7 mmol) and potassium 3-methoxy-3-oxopropanoate (8.23 g, 52.7 mmol) was added. The resulting mixture was stirred at rt for an additional 18 h under $N_2$. The solvent was evaporated and the residue was dissolved in ethyl acetate (100 mL) and washed with water (100 mL) and brine (20 mL). The organic layer was dried over $MgSO_4$, filtered and concentrated in vacuo. The residue was purified by column chromatography (silica gel, 0-100% EtOAc in hexane) to afford methyl (R)-5-(((benzyloxy)carbonyl)amino)-3-oxohexanoate. LC-MS 294 (M+1).

Step 2: methyl (R)-5-(((benzyloxy)carbonyl)amino)-2-diazo-3-oxohexanoate (X-3)

To a solution of methyl (R)-5-(((benzyloxy)carbonyl)amino)-3-oxohexanoate (X-2) (6.2 g, 21.14 mmol) in $CH_2Cl_2$ (200 ml) was added $Et_3N$ (6.42 g, 63.4 mmol) and 4-acetamidobenzene-sulfonyl azide (5.08 g, 21.14 mmol) at rt under $N_2$. The reaction mixture was stirred for 12h. LC-MS shown reaction completed. The crude was diluted with 200 ml of DCM, washed with 50 ml of $H_2O$. The organic phase was collected and dried ($MgSO_4$), concentrated and chromatographed over silica gel (0-100% Ethyl acetate in hexanes) to give the title compound methyl (R)-5-(((benzyloxy)carbonyl)amino)-2-diazo-3-oxohexanoate. LC-MS 320 (M+1).

Step 3: 1-benzyl 2-methyl (5R)-5-methyl-3-oxopyrrolidine-1,2-dicarboxylate (X-4)

To a solution of methyl (R)-5-(((benzyloxy)carbonyl)amino)-2-diazo-3-oxohexanoate (X-3) (2.0 g, 6.26 mmol) in toluene (50 ml) was added diacetoxyrhodium (0.138 g, 0.313 mmol) under $N_2$ at rt. The reaction mixture was degassed for 10 min, then was stirred at 80° C. for 2h. LC-MS shown reaction completed. The reaction mixture was concentrated and chromatographed over silica gel (0-100% EtOAc in hexanes) to give the title compound 1-benzyl 2-methyl (5R)-5-methyl-3-oxopyrrolidine-1,2-dicarboxylate. LC-MS 292.28 (M+1).

Step 4: 1-benzyl 2-methyl (5R)-3-hydroxy-5-methylpyrrolidine-1,2-dicarboxylate (X-5)

To a solution of 1-benzyl 2-methyl (5R)-5-methyl-3-oxopyrrolidine-1,2-dicarboxylate (A) (9.7 g, 33.3 mmol) in MeOH (20 ml) and THF (50 ml) was added $NaBH_4$ (1.0 g, 26.4 mmol) little by little under $N_2$ at 0° C. over 15 min. The reaction mixture was stirred for 0.5 h. LC-MS shown reaction completed. The reaction was quenched by dropwise addition of 2N $KHSO_4$ at 0° C. until pH <2. The mixture was extracted by 2 portions of 50 ml of EtOAc. The organic phase was collected, dried ($MgSO_4$), concentrated and chromatographed over silic gel with 0-50% EtOAc in hexanes as eluent to give product 1-benzyl 2-methyl (5R)-3-hydroxy-5-methylpyrrolidine-1,2-dicarboxylate. LC-MS 294 (M+1).

Step 5: 1-benzyl 2-methyl (5R)-3-(benzyloxy)-5-methylpyrrolidine-1,2-dicarboxylate (X-6)

To a solution of 1-benzyl 2-methyl (5R)-3-hydroxy-5-methylpyrrolidine-1,2-dicarboxylate (X-5) (2000 mg, 6.82 mmol) and benzyl bromide (0.892 ml, 7.50 mmol) in DMF (30 ml) was added NaH (355 mg, 8.86 mmol) at 0° C. under $N_2$. The reaction mixture bubbled for a few minutes, then turned clear. After stirring for 10 min, LC-MS shown reaction completed. The reaction mixture was quenched by addition of sat. aq. $NH_4Cl$, then to the suspension was added 10 ml of EtOAc. After stirring for 30 min, the organic phase was collected, dried ($MgSO_4$), concentrated and chromatographed over silic gel with 0-100% EtOAc in hexanes as eluent to give product 1-benzyl 2-methyl (5R)-3-(benzyloxy)-5-methylpyrrolidine-1,2-dicarboxylate. LC-MS 384 (M+1).

Step 6: benzyl (5R)-3-(benzyloxy)-2-(hydroxymethyl)-5-methylpyrrolidine-1-carboxylate (X-7)

To a solution of 1-benzyl 2-methyl (5R)-3-(benzyloxy)-5-methylpyrrolidine-1,2-dicarboxylate (X-6) (2000 mg, 5.22 mmol) in THF (30 ml) was added $LiAlH_4$ (5.22 ml, 5.22 mmol) dropwise at −15° C. under $N_2$. The reaction mixture was stirred for 5 min. LC-MS shown formation of the desired product. The reaction was quenchec by adding 2 ml of $H_2O$, 2 ml of 1N NaOH and 6 ml of $H_2O$. The organic phase was collected, dried (MgSO4), concentrated and purified by chromatography on silica gel with 0-50% ethyl acetate in hexanes as eluent to give the desired product benzyl (5R)-3-(benzyloxy)-2-(hydroxymethyl)-5-methylpyrrolidine-1-carboxylate. LC-MS 356 (M+1).

Step 7: benzyl (5R)-3-(benzyloxy)-2-formyl-5-methylpyrrolidine-1-carboxylate (X-8)

To a solution of oxalyl chloride (0.394 mL, 4.50 mmol) in $CH_2Cl_2$ (30 mL) was added DMSO (0.639 mL, 9.00 mmol) in $CH_2Cl_2$ (5 mL) at −78° C. under $N_2$. After addition finished, the reaction mixture was stirred for 5 min before addition of benzyl (5R)-3-(benzyloxy)-2-(hydroxymethyl)-

5-methylpyrrolidine-1-carboxylate (X-7) (800 mg, 2.251 mmol) in 2 ml of CH₂Cl₂. The reaction was stirred for 30 min until no starting material left. A solution of Et₃N (1.255 mL, 9.00 mmol) in 2 ml of DCM was added, then the reaction mixture was allowed to raise to rt, then the reaction was quenched by 2 ml of sat. aq. NaHCO₃. The organic phase was collected and dried (MgSO4), filtered and the filtrate was concentrated to give the title compound benzyl (5R)-3-(benzyloxy)-2-formyl-5-methylpyrrolidine-1-carboxylate (F). LC-MS 354 (M+1).

Step 8: benzyl (2S,5R)-3-(benzyloxy)-5-methyl-2-((((CIS)-4-phenylcyclohexyl)oxy)methyl)-pyrrolidine-1-carboxylate (X-9)

To a solution of benzyl (5R)-3-(benzyloxy)-2-formyl-5-methylpyrrolidine-1-carboxylate (X-8) (400 mg, 1.132 mmol) and (1s,4s)-4-phenylcyclohexan-1-ol (299 mg, 1.698 mmol) in 2 mL of acetonitrile was added chlorodimethylsilane (161 mg, 1.698 mmol) at 0° C. under N₂. The reaction mixture was raised to rt and stirred for 8 h. LC-MS showed formation of the desired product. The reaction was quenched by sat. aq. NaHCO₃, and the mixture was diluted with 5 mL of DCM, derived by MgSO₄, filtered, and the filtrate was concentrated in vacuo. The crude product was purified by column chromatography on C18 with 10-100% acetonitrile in H₂O as eluent to give the title compound benzyl (2S,5R)-3-(benzyloxy)-5-methyl-2-((((CIS)-4-phenylcyclohexyl)oxy)methyl)-pyrrolidine-1-carboxylate. LC-MS 514 (M+1).

Step 9: methyl (2S,5R)-3-(benzyloxy)-5-methyl-2-((((CIS)-4-phenylcyclohexyl)oxy)methyl-pyrrolidine-1-carboxylate (X-10)

To a solution of benzyl (2S,5R)-3-(benzyloxy)-5-methyl-2-((((CIS)-4-phenylcyclohexyl)oxy)methyl)pyrrolidine-1-carboxylate (X-9) (210 mg, 0.409 mmol) in THF (10 mL) was added palladium on carbon (5%, 87 mg, 0.041 mmol). The reaction mixture was degassed and refilled with H₂ three times from a balloon. The reaction mixture was stirred at rt for 30 min. LC-MS showed reaction completed. The reaction mixture was filtered through a pad of diatomaceous earth and the filtrate was concentrated to give the crude product (2S,5R)-3-(benzyloxy)-5-methyl-2-((((CIS)-4-phenylcyclohexyl)oxy)methyl)pyrrolidine. LC-MS 380 (M+1). The crude product was dissolved in DCM (5 mL), followed by addition of Et₃N (0.044 mL, 0.316 mmol) and chloromethylformate (17.93 mg, 0.190 mmol) at 0° C. under N₂. The reaction mixture was stirred for 20 min. LC-MS showed reaction completed. The reaction mixture was quenched by methanol, then was concentrated in vacuo. The crude was chromatographed over silica gel with 0-50% EtOAc in hexanes as eluent to give the title compound methyl (2S, 5R)-3-(benzyloxy)-5-methyl-2-((((CIS)-4-phenylcyclohexyl)oxy)methyl)pyrrolidine-1-carboxylate. LC-MS 438 (M+1).

Step 10: methyl (2S,5R)-3-hydroxy-5-methyl-2-((((CIS)-4-phenylcyclohexyl)oxy)methyl-pyrrolidine-1-carboxylate (X-11)

A solution of methyl (2S,5R)-3-(benzyloxy)-5-methyl-2-((((CIS)-4-phenylcyclohexyl)-oxy)methyl)pyrrolidine-1-carboxylate (X-10) (45 mg, 0.103 mmol) was dissolved in methanol (5 mL), followed by addition of dihydroxypalladium on carbon (5%, 28.9 mg, 10.28 μmol). The reaction mixture was degassed and refilled with H₂ for 3 times, then stirred at rt for 2h. LC-MS showed reaction was complete. The reaction mixture was filtered through a pad of diatomaceous earth and the filtrate was concentrated in vacuo. The crude was chromatographed over silica gel on C18 with 10-100% acetonitrile in H₂O to give the title compound methyl (2S,5R)-3-hydroxy-5-methyl-2-((((CIS)-4-phenylcyclohexyl)oxy)methyl)pyrrolidine-1-carboxylate. LC-MS 348 (M+1).

Step 11: methyl (2S,5R)-5-methyl-3-oxo-2-((((CIS)-4-phenylcyclohexyl)oxy)methyl)-pyrrolidine-1-carboxylate (X-12)

A solution of methyl (2S,5R)-3-hydroxy-5-methyl-2-((((CIS)-4-phenylcyclohexyl)oxy)-methyl)pyrrolidine-1-carboxylate (X-11) (30 mg, 0.086 mmol) was dissolved in DCM (5 mL), followed by addition of Dess-Martin Periodinane (36.6 mg, 0.086 mmol) at 0° C. under N₂. The reaction mixture was stirred for 2h. LC-MS showed reaction was complete. The reaction mixture was washed with sat. aq. NaHCO₃, then was dried (MgSO₄) and concentrated in vacuo. The crude material was chromatographed over silica gel and eluted with 10-100% acetonitrile in H₂O to give the title compound methyl (2S,5R)-5-methyl-3-oxo-2-((((CIS)-4-phenylcyclohexyl)oxy)-methyl)pyrrolidine-1-carboxylate. LC-MS 346 (M+1).

Step 12: Methyl (2S,5R)-5-methyl-2-((((CIS)-4-phenylcyclohexyl)oxy)methyl)-3-(((trifluoromethyl)sulfonyl)oxy)-2,5-dihydro-1H-pyrrole-1-carboxylate (Intermediate X)

To a mixture of methyl (2S,5R)-5-methyl-3-oxo-2-((((1r,4S)-4-phenylcyclohexyl)oxy)methyl)pyrrolidine-1-carboxylate (X-12, 50 mg, 0.145 mmol) and N-(5-chloropyridin-2-yl)-1,1,1-trifluoro-N-((trifluoromethyl)sulfonyl)methanesulfonamide (62.5 mg, 0.159 mmol) in 2.0 ml of THF at −78° C. was added potassium bis(trimethylsilyl)amide (1.0 M in THF, 0.188 ml, 0.188 mmol). The reaction mixture was stirred at −78° C. under nitrogen for 2 hrs. The reaction was quenched with sat. NaHCO3 at −30° C. Let it stirring at rt for 10 mins. Extracted with EtOAc (×3). The organic layer was dried with MgSO4, concentrated to leave white solid. The residue was purified by prep silica gel TLC eluent with 20% EtOAc/hexane to afford the title compound. MS: 478.2 (M+23).

Intermediate Y 5-methyl-2-((((CIS)-4-phenylcyclohexyl)oxy)methyl)-3-(1-((2-(trimethylsilyl)ethoxy)methyl)-1H-pyrazol-5-yl)pyridine

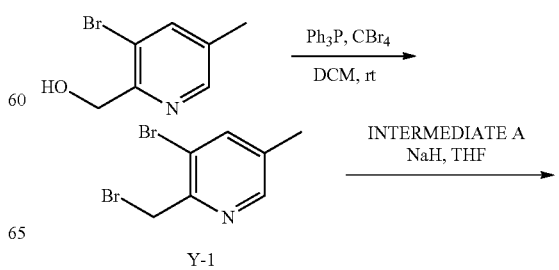

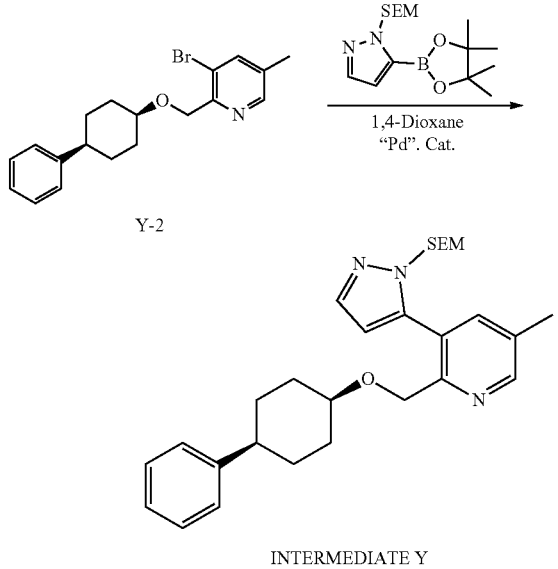

INTERMEDIATE Y

Step 1: 3-bromo-2-(bromomethyl)-5-methylpyridine (Y-1)

A solution of (3-bromo-5-methylpyridin-2-yl)methanol (500 mg, 2.475 mmol) and carbon tetrabromide (1231 mg, 3.71 mmol) in DCM (4949 µl) at 25° C. under N2 was treated with triphenylphosphine (974 mg, 3.71 mmol). The mixture was stirred for 30 min and TLC with Hexane:EtOAc (9:1) showed all SM consumed. The solvent was evaporated under reduced pressure to afford the crude. The crude was purified by silica gel chromatography, on the Combiflash Rf on an 80 g column, eluting with a gradient of ethyl acetate: ethanol (3:1)/hexanes—0:100 to 30:70 to afford the title compound. MS: m/z=263.83, 265.85, 267.83 (M, M+2, M+4). 1H NMR (500 MHz, Chloroform-d) δ 8.37-8.33 (m, 1H), 7.73-7.69 (m, 1H), 4.70 (s, 2H), 2.34 (s, 3H).

Step 2: 3-bromo-5-methyl-2-(((((CIS)-4-phenylcyclohexyl)oxy)methyl)pyridine (Y-2)

A suspension of (CIS)-4-phenylcyclohexan-1-ol (INTERMEDIATE A) (319 mg, 1.812 mmol) and SODIUM HYDRIDE (87 mg, 2.174 mmol) in anhydrous THF (3623 µl) under N2 at 0° C. (water bath) was stirred for 30 min, then 3-bromo-2-(bromomethyl)-5-methylpyridine, (Y-1) (480 mg, 1.812 mmol) was added to the flask. The flask was then removed from the water bath and stirred at 25° C. o/n. An aliquot was taken, quenched with water and analyzed by LC-MS which showed greater than 90% conversion and desired mass present as the major product. The reaction was quenched with water at 0° C. and extracted with EtOAc (×2). The combined extracts was dried (MgSO4), filtered and concentrated under reduced pressure to afford the crude. The crude was purified by silica gel chromatography, on the Combiflash Rf on a 40 g column, eluting with a gradient of ethyl acetate/hexanes—0:100 to 40:60 to afford the title compound. MS: m/z=359.98, 361.93 (M, M+2).

Step 3: 5-methyl-2-(((((CIS)-4-phenylcyclohexyl)oxy)methyl)-3-(1-((2-(trimethylsilyl)ethoxy)methyl)-1H-pyrazol-5-yl)pyridine A sealed flask at 25° C. containing 3-bromo-5-methyl-2-(((((CIS)-4-phenylcyclohexyl)oxy)methyl)pyridine (Y-2), (100 mg, 0.278 mmol), potassium phosphate (177 mg, 0.833 mmol), chloro(2-dicyclohexylphosphino-2',4',6'-tri-i-propyl-1,1'-biphenyl)(2'-amino-1,1'-biphenyl-2-yl) palladium (ii) (43.7 mg, 0.056 mmol) and 5-(4,4,5,5-tetramethyl-1,3,2-dioxaborolan-2-yl)-1-((2-(trimethylsilyl)ethoxy)methyl)-1h-pyrazole (108 mg, 0.333 mmol) under N2 was purged (×3) and Dioxane (2379 µl)/Water (397 µl) was added via a needle. The mixture was again purged (×3) and the mixture stirred at 80° C. for 1 h. LC-MS showed all SM consumed and desired product mass present. The reaction mixture was allowed to cool to rt, diluted with EtOAc and filtered through celite. The filtrate was then washed with water and brine, dried (MgSO4), filtered and concentrated under reduced pressure to afford the crude product. The crude product was purified by silica gel chromatography, on the Combiflash Rf on a 24 g column, eluting with a gradient of ethyl acetate/hexanes—0:100 to 30:70 to afford INTERMEDIATE Y. MS: m/z=378.25 (M+1).

Intermediate ZA, ZB, ZC (2R,3S,5S)-5-methyl-2-(((((CIS)-4-phenylcyclohexyl)oxy)methyl)-3-(1-((2-(trimethylsilyl)ethoxy)methyl)-1H-pyrazol-5-yl)piperidine Intermediate ZA (2R,3R,5S)-5-methyl-2-(((((CIS)-4-phenylcyclohexyl)oxy)methyl)-3-(1-((2-(trimethylsilyl)ethoxy)methyl)-1H-pyrazol-5-ylpiperidine Intermediate ZB (2R,3S,5R)-5-methyl-2-(((((CIS)-4-phenylcyclohexyl)oxy)methyl)-3-(1-((2-(trimethylsilyl)ethoxy)methyl)-1H-pyrazol-5-yl)piperidine Intermediate ZC

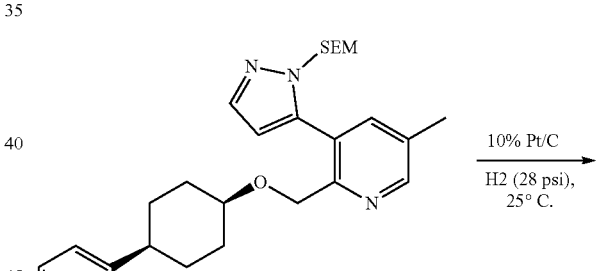

INTERMEDIATE Y

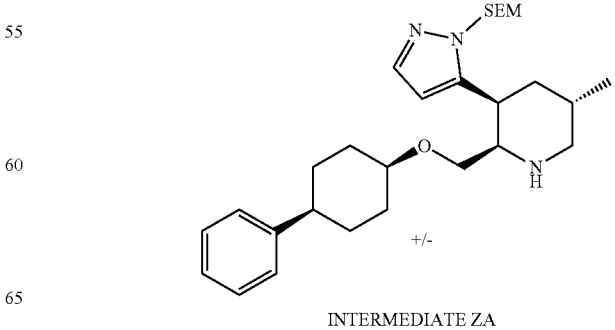

INTERMEDIATE ZA

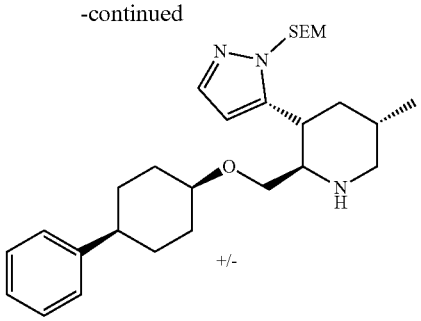

INTERMEDIATE ZB

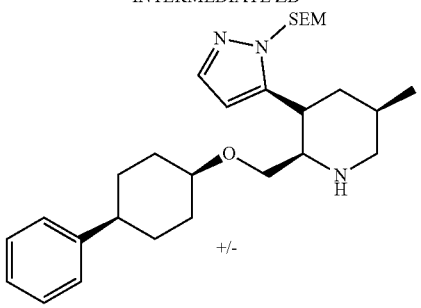

INTERMEDIATE ZC

A solution of INTERMEDIATE Y (400 mg, 0.837 mmol in 8373 μl of EtOAc) was dispensed equally into 20 one-dram vial each containing 10 mg of 10% Pt/C. An equal volume of acetic acid (418 μl) was then added to each vial followed by a glass bead in each vial. The vials were then loaded into a low pressure reactor and sealed. The reactor was purged with N2 (×2) and then with H2 (×2). The reactor was then pressurized to 28 psi of H2 and heated at 35° C. for 12 h with continuous shaking. The contents from all the vials were then combined, filtered, washed with EtOAc and concentrated under reduced pressure to afford an oil. The oil was taken up in EtOAc (100 ml) and washed with Sat. NaHCO$_3$ (×3). The organic layer was then washed with brine, dried (MgSO4), filtered and concentrated under reduced pressure to afford the crude as an oil. LC-MS analysis showed >80% conversion of SM. The crude was purified by silica gel chromatography, on the Combiflash Rf, on an 80 g column, eluting with a gradient of ethyl acetate/hexanes—0:100 to 60:40 to elute off the unreacted starting material (UV active). The column was then flushed with 100% EtOAc and all the fractions (except the starting material) was combined and concentrated under reduced pressure. The resulting residue was re-purified on the Combiflash Next Gen-300 with ELSD on a 12 g column, eluting with a gradient of ethyl acetate/hexanes—0:100 to 80:20 to afford the title compounds INTERMEDIATE ZA, INTERMEDIATE ZB, and INTERMEDIATE ZC, as mixtures of enantiomers. MS: m/z=484.38 (M+1).

INTERMEDIATE ZA: $^1$H NMR (600 MHz, Chloroform-d) δ 7.42 (d, J=1.6 Hz, 1H), 7.29 (t, J=7.6 Hz, 2H), 7.24-7.14 (m, 3H), 6.67 (s, 1H), 5.49 (d, J=11.3 Hz, 1H), 5.41 (d, J=11.2 Hz, 1H), 3.52-3.47 (m, 2H), 3.44 (d, J=2.8 Hz, 1H), 3.30 (s, 1H), 3.24-3.05 (m, 4H), 2.49 (ddd, J=11.9, 8.5, 3.5 Hz, 1H), 2.37 (q, J=13.4, 12.0 Hz, 1H), 1.98-1.83 (m, 3H), 1.72 (dtd, J=21.3, 12.5, 3.4 Hz, 4H), 1.64-1.56 (m, 2H), 1.51-1.39 (m, 3H), 0.90-0.80 (m, 5H), −0.03 (s, 9H).

INTERMEDIATE ZB: $^1$H NMR (600 MHz, Chloroform-d) δ 7.45 (d, J=1.6 Hz, 1H), 7.29 (t, J=7.6 Hz, 2H), 7.24-7.15 (m, 3H), 6.12 (dd, J=9.9, 1.8 Hz, 1H), 5.55 (d, J=11.1 Hz, 1H), 5.37 (d, J=11.1 Hz, 1H), 3.51 (ddd, J=9.6, 6.6, 2.8 Hz, 2H), 3.47 (s, 1H), 3.28 (d, J=9.1 Hz, 1H), 3.17 (q, J=8.9, 7.8 Hz, 2H), 2.92 (d, J=11.5 Hz, 1H), 2.84 (d, J=5.3 Hz, 1H), 2.51 (ddd, J=11.9, 8.6, 3.3 Hz, 1H), 2.41 (t, J=11.6 Hz, 1H), 2.01 (d, J=11.7 Hz, 1H), 1.94 (d, J=11.2 Hz, 2H), 1.82-1.67 (m, 4H), 1.63 (d, J=12.8 Hz, 2H), 1.47 (t, J=12.9 Hz, 2H), 1.20 (dd, J=15.7, 9.8 Hz, 1H), 0.92-0.82 (m, 5H), −0.03 (s, 9H).

INTERMEDIATE ZC: $^1$H NMR (500 MHz, Chloroform-d) δ 7.43 (d, J=1.7 Hz, 1H), 7.32-7.27 (m, 2H), 7.18 (dd, J=14.3, 7.2 Hz, 3H), 6.06 (d, J=1.6 Hz, 1H), 5.51-5.42 (m, 2H), 3.64 (t, J=9.6 Hz, 1H), 3.61-3.52 (m, 3H), 3.51-3.41 (m, 2H), 2.91 (dd, J=9.2, 3.3 Hz, 1H), 2.87-2.80 (m, 1H), 2.57 (t, J=11.5 Hz, 1H), 2.50 (tt, J=11.8, 3.5 Hz, 1H), 1.99 (dt, J=13.9, 2.8 Hz, 1H), 1.93-1.79 (m, 3H), 1.74 (dddd, J=16.2, 12.8, 8.2, 4.7 Hz, 2H), 1.68-1.52 (m, 3H), 1.47 (tq, J=13.4, 4.3 Hz, 2H), 0.96 (d, J=6.5 Hz, 3H), 0.90 (ddd, J=13.8, 7.1, 2.9 Hz, 2H), 0.86-0.76 (m, 1H). −0.05 (s, 9H).

Example 1

(CIS)-N-ethyl-2-((((CIS)-4-phenylcyclohexyl)oxy)methyl)-3-(1H-pyrazol-5-yl)piperidine-1-carboxamide

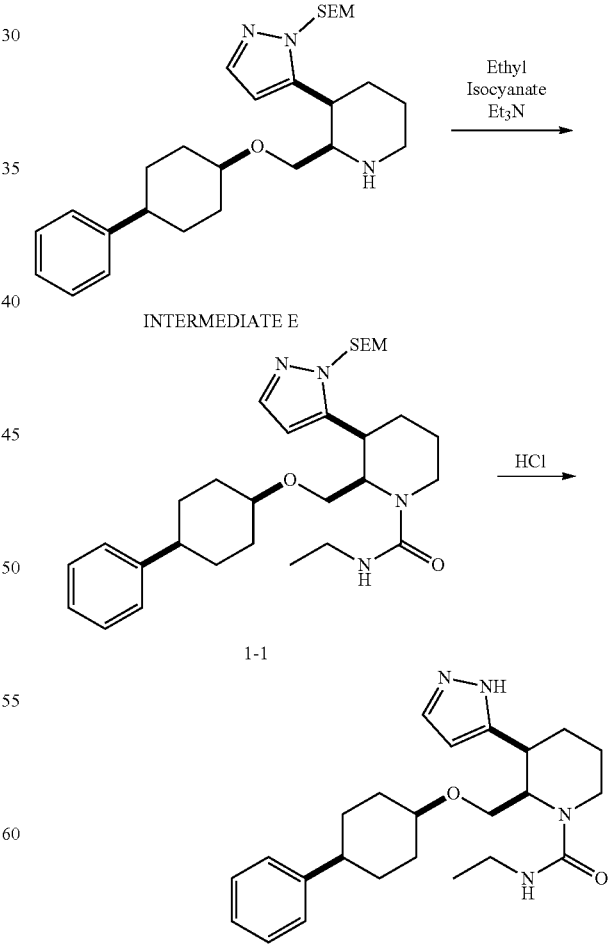

Step 1: (CIS)-N-ethyl-2-(((((CIS)-4-phenylcyclohexyl)oxy)methyl)-3-(1-((2-(trimethylsilyl)ethoxy)methyl)-H-pyrazol-5-yl)piperidine-1-carboxamide (1-1)

To a mixture of (CIS)-2-((((CIS)-4-phenylcyclohexyl)oxy)methyl)-3-(1-((2-(trimethylsilyl)ethoxy)methyl)-1H-pyrazol-5-yl)piperidine (INTERMEDIATE E) (24 mg, 0.051 mmol) in DMF (511 µl) at ambient temperature was added ethyl isocyanate (8.09 µl, 0.102 mmol) and triethylamine (14.24 µl, 0.102 mmol). The mixture was purified directly by column chromatography on C18 (5-95% MeCN/water with 0.05% TFA modifier) to afford the title compound. MS: 541.5 (M+1).

Step 2: (CIS)-N-ethyl-2-(((((CIS)-4-phenylcyclohexyl)oxy)methyl)-3-(1H-pyrazol-5-yl)piperidine-1-carboxamide (1)

To a mixture of (CIS)-N-ethyl-2-(((((CIS)-4-phenylcyclohexyl)oxy)methyl)-3-(1-((2-(trimethylsilyl)ethoxy)methyl)-1H-pyrazol-5-yl)piperidine-1-carboxamide (1-1) (25 mg, 0.046 mmol) in Dioxane (92 µl) at ambient temperature was added HCl (200 µl, 0.800 mmol) in dioxanes. The mixture stirred for 3 hours. The mixture was purified directly by column chromatography on C18 (5-95% MeCN/water with 0.05% TFA modifier) to afford the title compound. MS: 411.5 (M+1). 1H NMR (500 MHz, DMSO-d6) δ 7.56 (s, 1H), 7.24 (t, J=7.5 Hz, 2H), 7.21-7.09 (m, 3H), 6.14 (s, 1H), 4.53 (bs, 1H), 3.95 (bs, 1H), 3.57 (t, J=9.2 Hz, 1H), 3.37 (s, 1H), 3.05 (q, J=6.8 Hz, 2H), 3.01-2.85 (m, 2H), 2.43 (t, J=12.0 Hz, 1H), 2.01-1.89 (m, 2H), 1.85-1.79 (m, 2H), 1.75-1.67 (m, 2H), 1.67-1.54 (m, 2H), 1.47-1.29 (m, 5H), 0.99 (t, J=7.2 Hz, 3H).

Example 2

Methyl (CIS)-3-(2-hydroxy-5-methylthiazol-4-yl)-2-(((((CIS)-4-phenylcyclohexyl)oxy)-methyl)piperidine-1-carboxylate

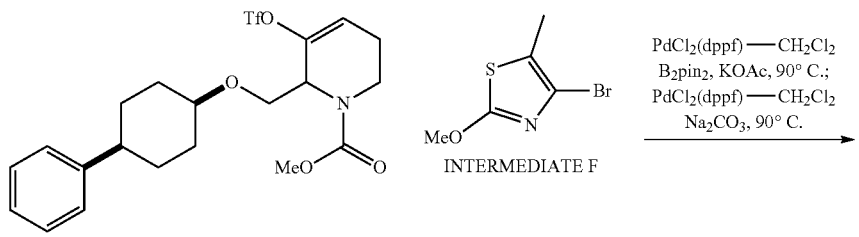

INTERMEDIATE G

INTERMEDIATE F

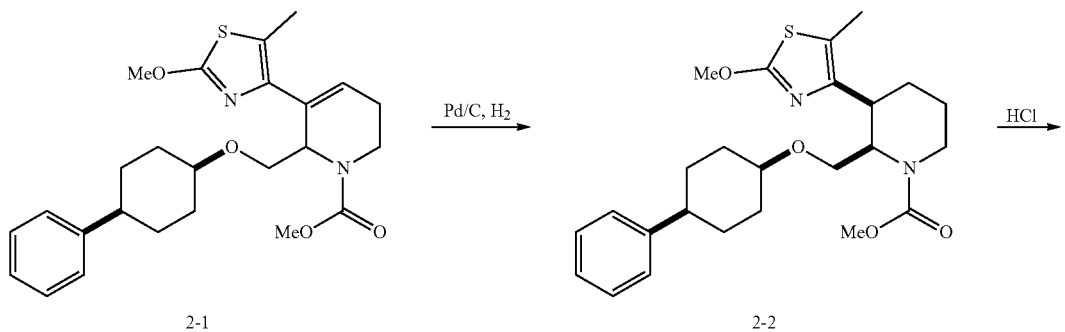

2-1

2-2

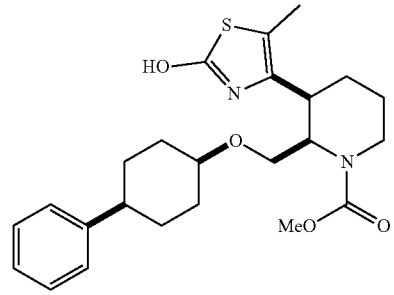

2

Step 1: Methyl 5-(2-methoxy-5-methylthiazol-4-yl)-6-((((CIS)-4-phenylcyclohexyl)oxy)methyl)-3,6-dihydropyridine-1(2H)-carboxylate (Mixture of Olefin Regioisomers) (2-1)

To a mixture of methyl 6-((((CIS)-4-phenylcyclohexyl)oxy)methyl)-5-(((trifluoromethyl)sulfonyl)oxy)-3,6-dihydropyridine-1(2H)-carboxylate (mixture of olefin regioisomers) (INTERMEDIATE G) (100 mg, 0.209 mmol) in Dioxane (1047 µl) at ambient temperature was added bis(pinacolato)diboron (55.8 mg, 0.220 mmol), PdCl2(dppf)-CH$_2$Cl$_2$ Adduct (17.10 mg, 0.021 mmol), and potassium acetate (61.7 mg, 0.628 mmol). The mixture was heated to 90° C. and stirred for 2 hours. The reaction was cooled and 4-bromo-2-methoxy-5-methylthiazole (INTERMEDIATE F) (87 mg, 0.419 mmol), PdCl2(dppf)-CH2Cl2 Adduct (17.10 mg, 0.021 mmol), and Na2CO3 (66.6 mg, 0.628 mmol) dissolved in 0.2 mL H2O was added. The mixture was warmed to 90° C. and stirred overnight. The mixture was cooled before quenching with a H2O (10 mL), extract with DCM (3×@ 10 mL), dry over Na2SO4, and concentrate. The residue was purified by column chromatography on silica (0% to 30% EtOAc/hexanes) to afford the title compound. MS: 457.5 (M+1).

Step 2: Methyl (CIS)-3-(2-methoxy-5-methylthiazol-4-yl)-2-((((CIS)-4-phenylcyclohexyl)oxy)methyl)piperidine-1-carboxylate (2-2)

To a mixture of methyl 5-(2-methoxy-5-methylthiazol-4-yl)-6-((((CIS)-4-phenylcyclohexyl)oxy)methyl)-3,6-dihydropyridine-1(2H)-carboxylate (mixture of olefin regioisomers) (2-1) (50 mg, 0.110 mmol) in MeOH (730 µl)/THF (365 µl) was added Pd/C (23.31 mg, 10.95 µmol). A hydrogen balloon was added (vacuum purge 3×) and the mixture stirred for 2 days. The mixture was filtered through a pad of celite and concentrated. The residue was purified by column chromatography on silica (0% to 25% EtOAc/hexanes) to afford the title compound. MS: 459.5 (M+1).

Step 3: Methyl (CIS)-3-(2-hydroxy-5-methylthiazol-4-yl)-2-((((CIS)-4-phenylcyclohexyl)oxy)methyl)piperidine-1-carboxylate (2)

To a mixture of methyl (CIS)-3-(2-methoxy-5-methylthiazol-4-yl)-2-((((CIS)-4-phenylcyclohexyl)oxy)methyl)piperidine-1-carboxylate (2-2) (15 mg, 0.033 mmol) in Dioxane (164 µl) at ambient temperature was added 6.0 M HCl (27.3 µl, 0.164 mmol). The mixture was heated to 50° C. and stirred for 2 hours before cooling to ambient temperature. The mixture was purified directly by column chromatography on C18 (5-95% MeCN/water with 0.05% TFA modifier) to afford the title compound. MS: 445.4 (M+1). 1H NMR (500 MHz, Chloroform-d) δ 9.27 (s, 1H), 7.32 (t, J=7.5 Hz, 2H), 7.26-7.19 (m, 3H), 4.37 (s, 1H), 4.18 (d, J=10.8 Hz, 1H), 3.76 (s, 3H), 3.63 (s, 3H), 3.26 (t, J=12.3 Hz, 1H), 3.07 (dt, J=12.9, 4.8 Hz, 1H), 2.66-2.50 (m, 1H), 2.17 (s, 3H), 2.15-1.97 (m, 3H), 1.92 (d, J=13.2 Hz, 1H), 1.83-1.67 (m, 4H), 1.66-1.48 (m, 3H).

Example 3

(CIS)-N-ethyl-2-(((4-isopropylcyclohexyl)oxy)methyl)-3-(1H-pyrazol-5-yl)piperidine-1-carboxamide

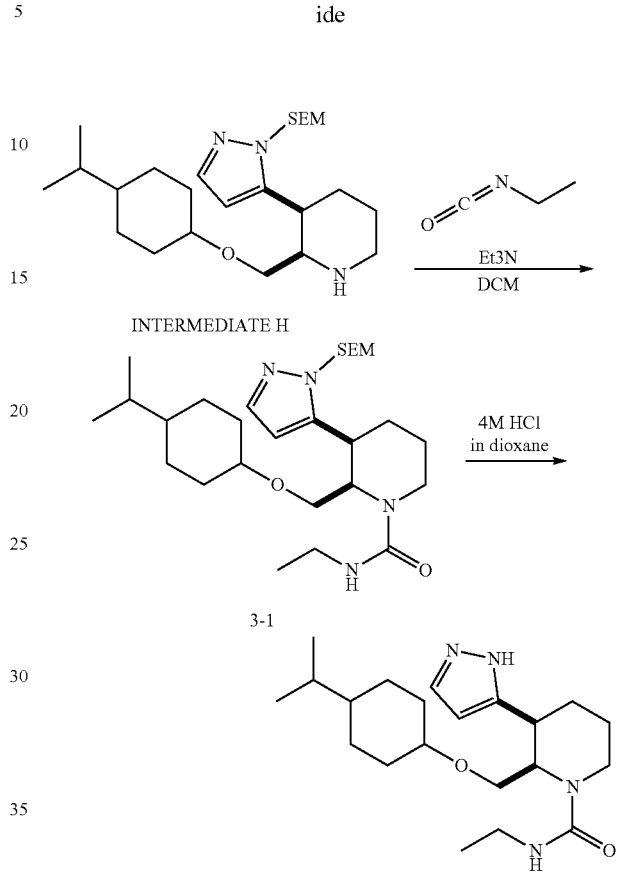

Step 1: N-ethyl-2-(((4-isopropylcyclohexyl)oxy)methyl)-3-(1-((2-(trimethylsilyl)ethoxy)methyl)-1H-pyrazol-5-yl)piperidine-1-carboxamide (3-1)

ETHYL ISOCYANATE (0.013 ml, 0.170 mmol) was added to a stirred, cooled 0° C. mixture of 2-(((4-isopropylcyclohexyl)oxy)methyl)-3-(1-((2-(trimethylsilyl)ethoxy)methyl)-1H-pyrazol-5-yl)piperidine (INTERMEDIATE H) (61.8 mg, 0.142 mmol), Et3N (0.198 ml, 1.418 mmol) in CH2Cl2 (2 ml) and the mixture was stirred at room temperature for 15 min. Quenched with ethyl amine (0.5 ml 1M). Concentrated, dried to afford the title compound. MS: 507.4 (M+1).

Step 2: (CIS)-N-ethyl-2-(((-4-isopropylcyclohexyl)oxy)methyl)-3-(1H-pyrazol-5-yl)piperidine-1-carboxamide (3)

HCl in dioxane (1 mL, 4.00 mmol) was added to a N-ethyl-2-(((4-isopropylcyclohexyl)oxy)methyl)-3-(1-((2-(trimethylsilyl)ethoxy)methyl)-1H-pyrazol-5-yl)piperidine-1-carboxamide (3-1) (72.0 mg, 0.142 mmol) and the mixture was stirred at room temperature for Overnight. Concentrated, dried, redissolved in MeOH (2 mL), filtered, the solution was purified by preparative HPLC Reverse phase (C-18), eluting with Acetonitrile/Water+0.1% TFA, to give mixture of isomers. Chiral separation to afford the title compound. MS: 377.3 (M+1).

Example 4 and 5

(2R,3S)—N-ethyl-2-((((CIS)-4-isopropylcyclohexyl)oxy)methyl)-3-(1H-pyrazol-5-yl)piperidine-1-carboxamide (4) and (2S,3R)—N-ethyl-2-((((CIS)-4-isopropylcyclohexyl)oxy)methyl)-3-(1H-pyrazol-5-yl)piperidine-1-carboxamide (5)

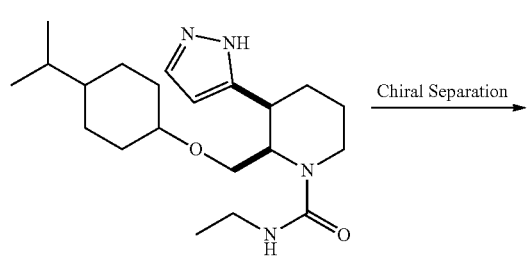

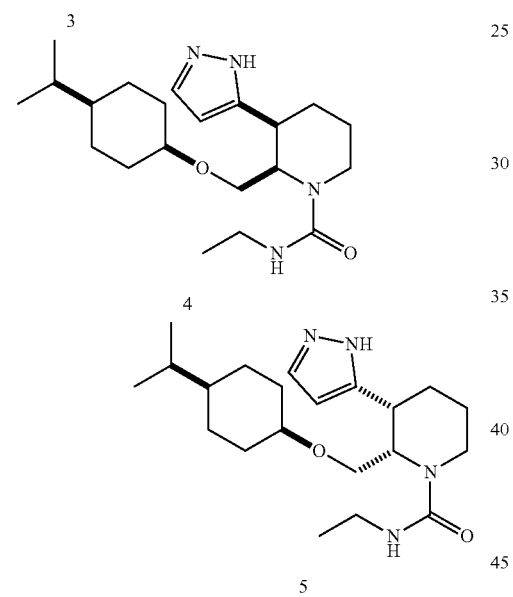

The enantiomer mixture of (CIS)-N-ethyl-2-(((4-isopropylcyclohexyl)oxy)methyl)-3-(1H-pyrazol-5-yl)piperidine-1-carboxamide (3) was submitted for SFC purification, using AD-H, 50×250 mm column, 20% (EtOH), to obtain two chiral isomers. (2R,3S)—N-ethyl-2-((((CIS)-4-isopropylcyclohexyl)oxy)methyl)-3-(1H-pyrazol-5-yl)piperidine-1-carboxamide (4, peak 1): MS: 377.3 (M+1). 1H NMR (500 MHz, Methanol-d4) δ 7.58 (s, 1H), 6.22 (s, 1H), 4.47 (s, 1H), 4.09 (s, 1H), 3.64 (s, 1H), 3.40-2.89 (m, 6H), 2.10-1.53 (m, 6H), 1.47-1.18 (m, 6H), 1.13 (t, J=7.2 Hz, 3H), 1.02 (m, 1H), 0.85 (m, 7H). (2S,3R)—N-ethyl-2-((((CIS)-4-isopropylcyclohexyl)oxy)methyl)-3-(1H-pyrazol-5-yl)piperidine-1-carboxamide (5, peak 2): MS: 377.3 (M+1).

Example 6

Methyl (CIS)-3-(4-methyl-1H-pyrazol-3-yl)-2-(((1-(pyrimidin-2-yl)piperidin-4-yl)oxy)methyl)piperidine-1-carboxylate

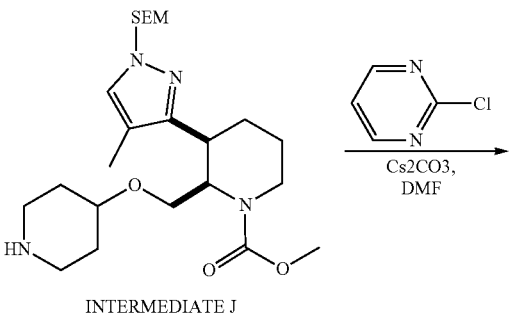

INTERMEDIATE J

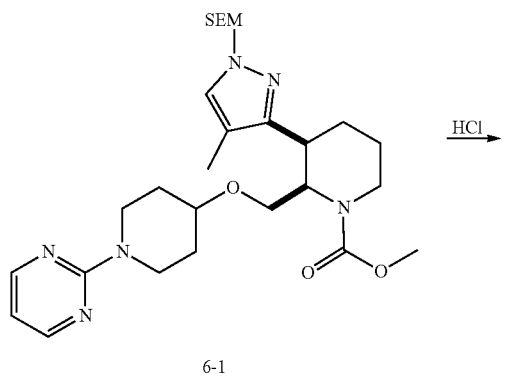

6-1

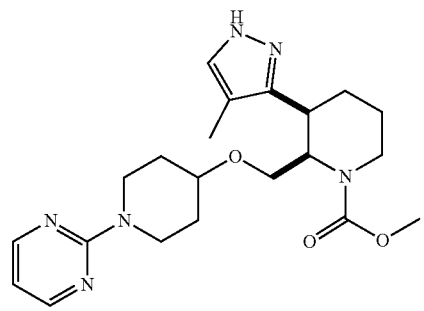

6

Step 1: methyl (CIS)-3-(4-methyl-1-((2-(trimethylsilyl)ethoxy)methyl)-1H-pyrazol-3-yl)-2-(((1-(pyrimidin-2-yl)piperidin-4-yl)oxy)methyl)piperidine-1-carboxylate (6-1)

2-CHLOROPYRIMIDINE (9.94 mg, 0.087 mmol) was added to a stirred mixture of methyl (CIS)-3-(4-methyl-1-((2-(trimethylsilyl)ethoxy)methyl)-1H-pyrazol-3-yl)-2-((piperidin-4-yloxy)methyl)piperidine-1-carboxylate (INTERMEDIATE J) (13.5 mg, 0.029 mmol) and Cs2CO3 (28.3 mg, 0.087 mmol) in DMF (1 ml) and the mixture was stirred at 90° C. for 1 h. The mixture was cooled, filtered, washing with methanol. The solution was purified by preparative HPLC Reverse phase (C-18), eluting with Acetonitrile/Water+0.1% TFA, to afford the title compound. MS: 545.4 (M+1).

Step 2: Methyl (CIS)-3-(4-methyl-1H-pyrazol-3-yl)-2-(((1-(pyrimidin-2-yl)piperidin-4-yl)oxy)methyl)piperidine-1-carboxylate (6)

HCl in dioxane (0.5 ml, 2.000 mmol) was added to methyl (CIS)-3-(4-methyl-1-((2-(trimethylsilyl)ethoxy)methyl)-1H-pyrazol-3-yl)-2-(((1-(pyrimidin-2-yl)piperidin-4-yl)oxy)methyl)piperidine-1-carboxylate (6-1) (8.9 mg, 0.016 mmol) and the mixture was stirred at 60° C. for 1 h. Concentrated, redissolved in MeOH (1 mL), filtered, the solution was purified by preparative HPLC Reverse phase (C-18), eluting with Acetonitrile/Water+0.1% TFA, to afford the title compound. MS: 415.3 (M+1). 1H NMR (500 MHz, Methanol-d4) δ 8.42 (d, J=5.0 Hz, 2H), 7.60 (s, 1H), 6.74 (t, J=5.0 Hz, 1H), 4.70 (s, 1H), 4.10 (d, J=10.8 Hz, 1H), 3.93 (dtd, J=13.9, 7.3, 3.7 Hz, 2H), 3.73 (s, 4H), 3.71-3.59 (m, 2H), 3.51 (tt, J=6.8, 3.3 Hz, 1H), 3.25 (dt, J=13.4, 3.8 Hz, 1H), 3.06 (s, 1H), 2.31-2.08 (m, 4H), 2.04-1.35 (m, 7H).

The following examples were prepared according to the general procedures herein and in an analogous manner to that used to synthesize the Example compounds using the appropriate intermediates. The starting materials were either prepared as described in the intermediates section, commercial available, or prepared from commercially available reagents using conventional reactions well known in the art.

Example 8

Methyl (CIS)-3-(4-methyl-1H-pyrazol-3-yl)-2-(((1-phenylpiperidin-4-yl)oxy)methyl)piperidine-1-carboxylate

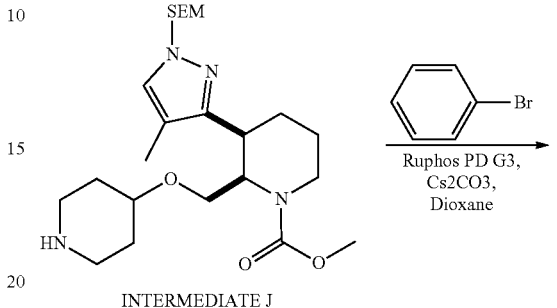

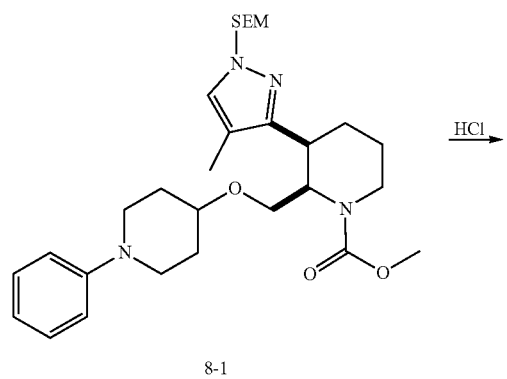

8-1

| Example Number | Structure | Name | Observed Mass [M + H]+ |
|---|---|---|---|
| 7 | | methyl (CIS)-2-(((1-(5-fluoropyrimidin-2-yl)piperidin-4-yl)oxy)methyl)-3-(4-methyl-1H-pyrazol-3-yl)piperidine-1-carboxylate | 433.1 |

-continued

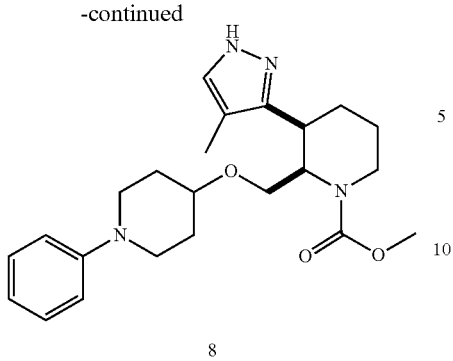

8

Step 1: methyl (CIS)-3-(4-methyl-1-((2-(trimethylsilyl)ethoxy)methyl)-1H-pyrazol-3-yl)-2-(((1-phenylpiperidin-4-yloxy)methyl)piperidine-1-carboxylate (8-1)

The mixture of methyl (CIS)-3-(4-methyl-1-((2-(trimethylsilyl)ethoxy)methyl)-1H-pyrazol-3-yl)-2-((piperidin-4-yloxy)methyl)piperidine-1-carboxylate (INTERMEDIATE J) (30 mg, 0.064 mmol), bromobenzene (30.3 mg, 0.193 mmol), methanesulfonato (2-dicyclohexylphosphino-2',6'-di-i-propoxy-1,1'-biphenyl)(2'-amino-1,1'-biphenyl-2-yl)palladium(II)(RuPhos Pd G3) (5.38 mg, 6.43 μmol) and Cs2CO3 (0.042 ml, 0.193 mmol) in Dioxane (1 ml) was stirred under N2 at 100° C. for Overnight. Concentrated, redissolved in MeOH, filtered, the solution was purified by preparative HPLC Reverse phase (C-18), eluting with Acetonitrile/Water+0.1% TFA, to afford the title compound. MS: 543.4 (M+1).

Step 2: methyl (CIS)-3-(4-methyl-1H-pyrazol-3-yl)-2-(((1-phenylpiperidin-4-yl)oxy)methyl)piperidine-1-carboxylate (8)

HCl in dioxane (0.5 ml, 2.000 mmol) was added to methyl (CIS)-3-(4-methyl-1-((2-(trimethylsilyl)ethoxy)methyl)-1H-pyrazol-3-yl)-2-(((1-phenylpiperidin-4-yl)oxy)methyl)piperidine-1-carboxylate (5-1) (19 mg, 0.035 mmol) and the mixture was stirred at 60° C. for 1 h. Concentrated, redissolved in MeOH (1 mL), filtered, the solution was purified by preparative HPLC Reverse phase (C-18), eluting with Acetonitrile/Water+0.1% TFA to afford the title compound. MS: 413.2 (M+1). 1H NMR (500 MHz, Methanol-d4) δ 7.66-7.52 (m, 5H), 7.44 (s, 1H), 4.76 (s, 1H), 4.13 (d, J=10.0 Hz, 1H), 3.86 (t, J=9.4 Hz, 1H), 3.75 (s, 6H), 3.48 (d, J=16.1 Hz, 2H), 3.23 (s, 2H), 3.08 (s, 1H), 2.27-1.85 (m, 10H), 1.66 (d, J=13.8 Hz, 1H).

Example 9

Isopropyl (CIS)-3-(4-methyl-1H-pyrazol-3-yl)-2-(((1-(pyrimidin-2-yl)piperidin-4-yl)oxy)methyl)piperidine-1-carboxylate

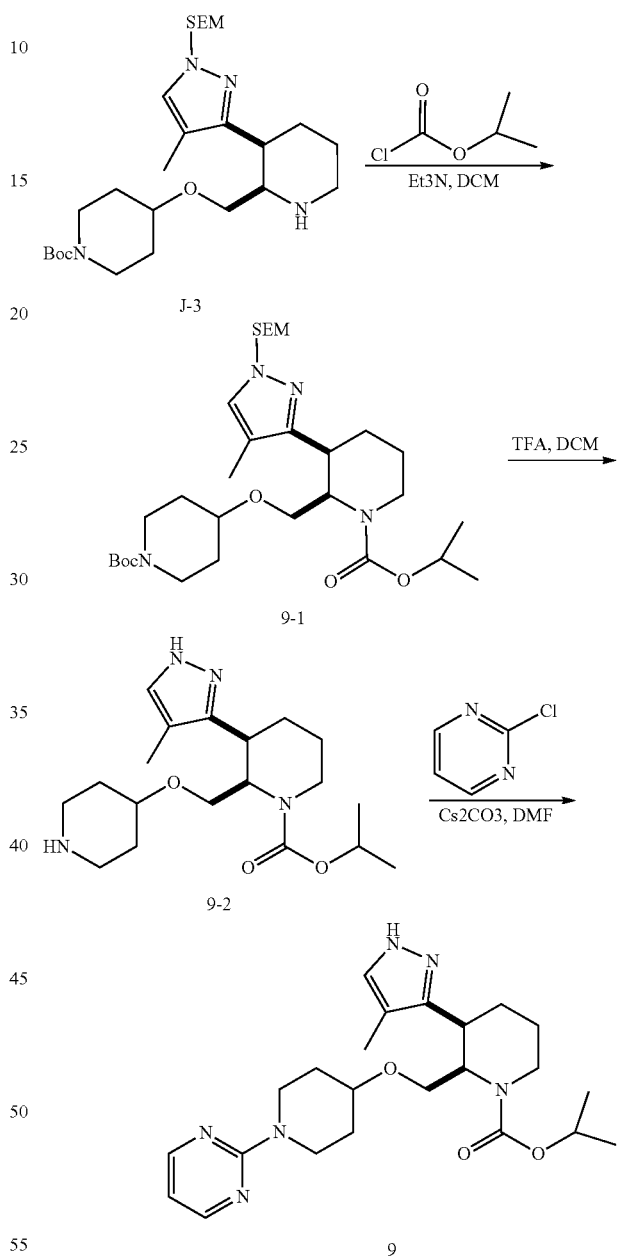

Step 1: Isopropyl (CIS)-2-(((1-(tert-butoxycarbonyl)piperidin-4-yl)oxy)methyl)-3-(4-methyl-1-((2-(trimethylsilyl)ethoxy)methyl)-1H-pyrazol-3-yl)piperidine-1-carboxylate (9-1)

Isopropyl chloroformate (0.070 ml, 0.070 mmol) was added to a stirred mixture of tert-butyl 4-(((CIS)-3-(4-methyl-1-((2-(trimethylsilyl)ethoxy)methyl)-1H-pyrazol-3-yl)piperidin-2-yl)methoxy)piperidine-1-carboxylate (J-3)

(35.6 mg, 0.07 mmol), Et3N (0.098 ml, 0.700 mmol) in CH2Cl2 (5 ml) and the mixture was stirred at room temperature for 15 min. Concentrated, redissolved in MeOH (2 mL), filtered, solution was purified by preparative HPLC Reverse phase (C-18), eluting with Acetonitrile/Water+0.1% TFA, to afford the title compound. MS: 595.5 (M+1).

Step 2: isopropyl (CIS)-3-(4-methyl-1H-pyrazol-3-yl) 2-((piperidin-4-yloxy)methyl)piperidine-1-carboxylate (9-2)

TFA (0.016 ml, 0.202 mmol) was added to a stirred mixture of isopropyl (CIS)-2-(((1-(tert-butoxycarbonyl)piperidin-4-yl)oxy)methyl)-3-(4-methyl-1-((2-(trimethylsilyl)ethoxy)-methyl)-1H-pyrazol-3-yl)piperidine-1-carboxylate (9-1) (12 mg, 0.020 mmol) in CH2Cl2 (2 ml) and the mixture was stirred at room temperature for 1 h. Concentrated, dried to afford the title compound. MS: 365.3 (M+1).

Step 3: isopropyl (CIS)-3-(4-methyl-1H-pyrazol-3-yl)-2-(((1-(pyrimidin-2-yl)piperidin-4-yl)oxy)methyl)piperidine-1-carboxylate (9)

2-CHLOROPYRIMIDINE (6.60 mg, 0.058 mmol) was added to a stirred mixture of isopropyl (CIS)-3-(4-methyl-1H-pyrazol-3-yl)-2-((piperidin-4-yloxy)methyl)piperidine-1-carboxylate (6-2) (7 mg, 0.019 mmol), Cs2CO3 (31.3 mg, 0.096 mmol) in DMF (2 ml) and the mixture was stirred at 90° C. for 1 h. Cooled, filtered, the solution was purified by preparative HPLC Reverse phase (C-18), eluting with Acetonitrile/Water+0.1% TFA to afford the title compound. MS: 443.3 (M+1). 1H NMR (500 MHz, Methanol-d4) δ 8.35 (d, J=4.8 Hz, 2H), 7.49 (s, 1H), 6.64 (t, J=4.9 Hz, 1H), 4.87 (s, 1H), 4.71 (s, 1H), 4.11 (d, J=10.3 Hz, 1H), 3.97 (s, 2H), 3.77 (s, 1H), 3.65-3.42 (m, 3H), 3.19 (s, 2H), 3.04 (s, 1H), 2.15 (s, 4H), 1.89 (d, J=10.8 Hz, 1H), 1.76 (s, 2H), 1.64 (s, 1H), 1.47 (s, 2H), 1.27 (s, 7H).

Example 10

(CIS)-N-ethyl-2-((((CIS)-4-(3-fluorophenyl)cyclohexyl)oxy)methyl)-3-(4-methyl-1H-pyrazol-3-yl)piperidine-1-carboxamide

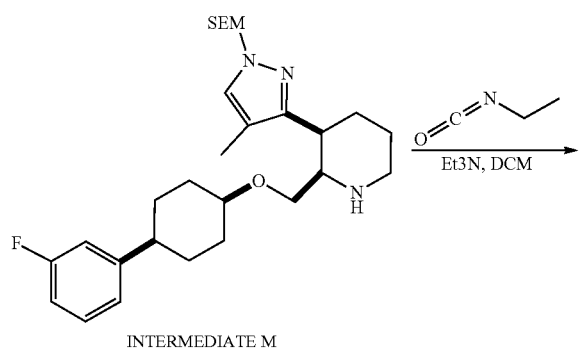

INTERMEDIATE M

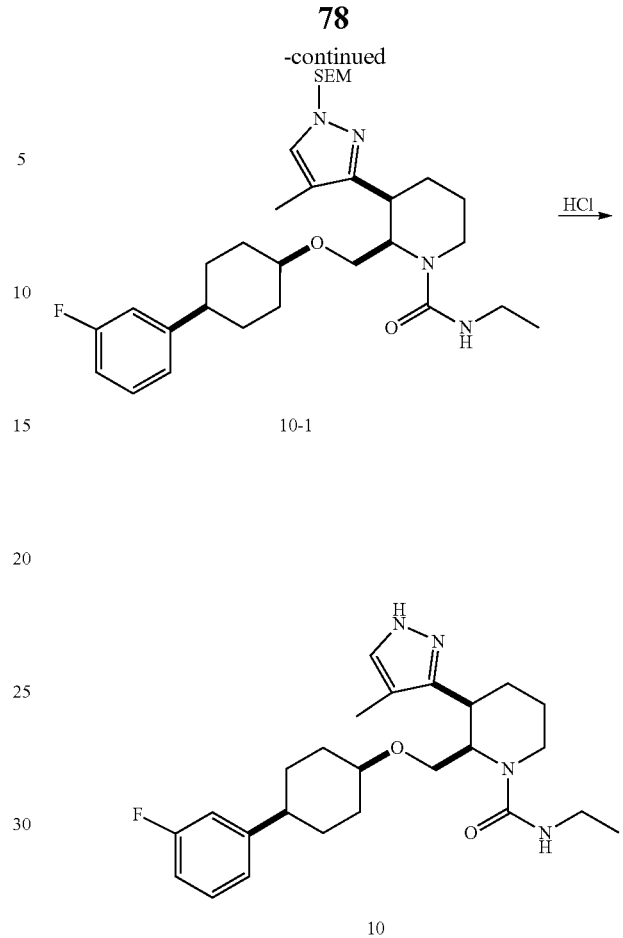

Step 1: N-ethyl-(CIS)-2-((((CIS)-4-(3-fluorophenyl)cyclohexyl)oxy)methyl)-3-(4-methyl-1-((2-(trimethylsilyl)ethoxy)methyl)-1H-pyrazol-3-yl)piperidine-1-carboxamide (10-1)

Ethyl isocyanate (0.02 ml, 0.272 mmol) was added to a stirred, cooled 0° C. mixture of (CIS)-2-((((CIS)-4-(3-fluorophenyl)cyclohexyl)oxy)methyl)-3-(4-methyl-1-((2-(trimethylsilyl)ethoxy)methyl)-1H-pyrazol-3-yl) piperidine (INTERMEDIATE M) (80 mg, 0.128 mmol), Et3N (0.2 ml, 1.435 mmol) in DCM (5 ml) and the mixture was stirred at 0° C. for 15 min. Concentrated, The residue was purified by prep. TLC, eluting with EtOAc:EtOH3:1/hexane (25%) to afford the title compound. MS: 574.6 (M+1).

Step 2: (CIS)-N-ethyl-2-((((CIS)-4-(3-fluorophenyl)cyclohexyl)oxy)methyl)-3-(4-methyl-1H-pyrazol-3-yl)piperidine-1-carboxamide (10)

The mixture of N-ethyl-(CIS)-2-((((CIS)-4-(3-fluorophenyl)cyclohexyl)oxy)methyl)-3-(4-methyl-1-((2-(trimethylsilyl)ethoxy)methyl)-1H-pyrazol-3-yl)piperidine-1-carboxamide (10-1) (68 mg, 0.119 mmol) and HCl in dioxane (1 mL, 4.00 mmol) was stirred at 60° C. for 2 h. Concentrated, redissolved in MeOH, filtered. The solution was purified by preparative HPLC Reverse phase (C-18), eluting with Acetonitrile/Water+0.1% TFA, to give mixture of enantiomers. MS: 443.4 (M+1).

Example 11 and 12

(2R,3S)—N-ethyl-2-(((((CIS)-4-(3-fluorophenyl)cyclohexyl)oxy)methyl)-3-(4-methyl-1H-pyrazol-3-yl)piperidine-1-carboxamide (11) and (2S,3R)—N-ethyl-2-(((((CIS)-4-(3-fluorophenyl)cyclohexyl)oxy)methyl)-3-(4-methyl-1H-pyrazol-3-yl)piperidine-1-carboxamide (12)

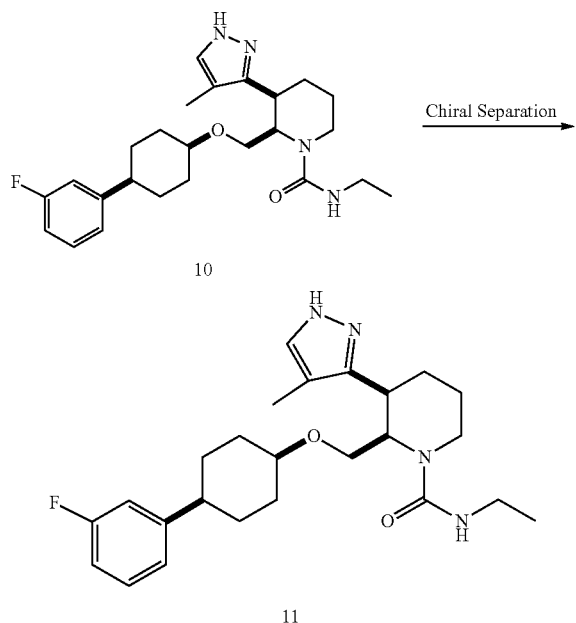

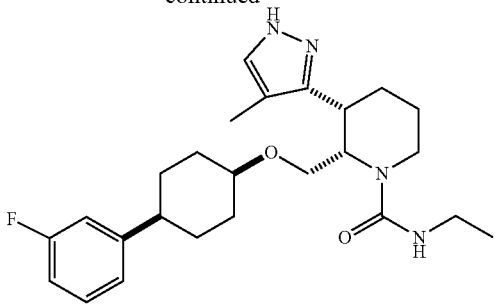

The enantiomer mixture of (CIS)-N-ethyl-2-(((((CIS)-4-(3-fluorophenyl)cyclohexyl)-oxy)methyl)-3-(4-methyl-1H-pyrazol-3-yl)piperidine-1-carboxamide (10) was submitted for SFC purification, OJ-H, 21×250 mm, 15% (MeOH), to obtain two chiral isomers. (2R,3S)—N-ethyl-2-(((((CIS)-4-(3-fluorophenyl)cyclohexyl)oxy)methyl)-3-(4-methyl-1H-pyrazol-3-yl)piperidine-1-carboxamide (11, peak 1): MS: 443.4 (M+1). 1H NMR (500 MHz, Methanol-d4) δ 7.40 (s, 1H), 7.27 (q, J=7.9 Hz, 1H), 7.01 (d, J=7.7 Hz, 1H), 6.97-6.80 (m, 2H), 4.56 (s, 1H), 4.06 (s, 1H), 3.79 (s, 1H), 3.48 (s, 1H), 3.30-2.96 (m, 6H), 2.53 (t, J=12.2 Hz, 1H), 2.29-2.08 (m, 4H), 1.99 (d, J=14.0 Hz, 1H), 1.87 (s, 2H), 1.79-1.40 (m, 7H), 1.32 (d, J=6.5 Hz, 1H), 1.13 (t, J=7.2 Hz, 3H). (2S,3R)—N-ethyl-2-(((((CIS) 4-(3-fluorophenyl)cyclohexyl)oxy)methyl)-3-(4-methyl-1H-pyrazol-3-yl)piperidine-1-carboxamide (12, peak 2): MS: 443.4 (M+1).

The following examples were prepared according to the general procedures herein and in an analogous manner to that used to synthesize the Example compounds using the appropriate intermediates. The starting materials were either prepared as described in the intermediates section, commercial available, or prepared from commercially available reagents using conventional reactions well known in the art.

| Example Number | Structure | Name | Observed Mass [M + H]+ |
|---|---|---|---|
| 13 | | methyl (CIS)-2-((((S)-3'-fluoro-2,3,4,5-tetrahydro-[1,1'-biphenyl]-4-yl)oxy)methyl)-3-(4-methyl-1H-pyrazol-3-yl)piperidine-1-carboxylate | 428.3 |
| 14 | | cyclopropyl((((CIS)-2-(((((CIS)-4-(3-fluorophenyl)cyclohexyl)oxy)methyl)-3-(4-methyl-1H-pyrazol-3-yl)piperidin-1-yl)methanone | 440.4 |

-continued

| Example Number | Structure | Name | Observed Mass [M + H]+ |
|---|---|---|---|
| 15 | 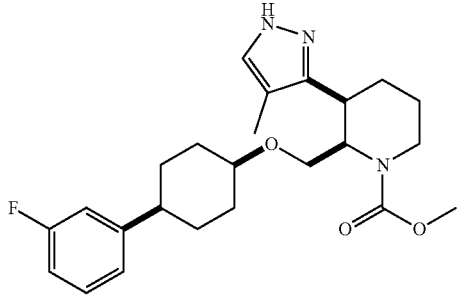 | methyl (CIS)-2-((((CIS)-4-(3-fluorophenyl)cyclohexyl)oxy)methyl)-3-(4-methyl-1H-pyrazol-3-yl)piperidine-1-carboxylate | 430.3 |
| 16 | 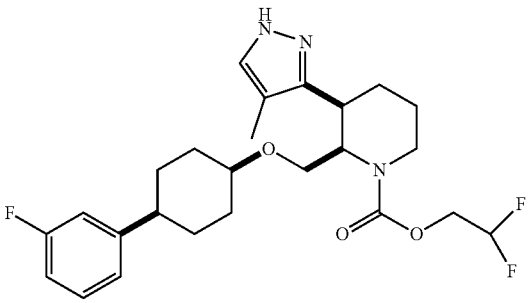 | 2,2-difluoroethyl (CIS)-2-((((CIS)-4-(3-fluorophenyl)cyclohexyl)oxy)methyl)-3-(4-methyl-1H-pyrazol-3-yl)piperidine-1-carboxylate | 480.4 |
| 17 | 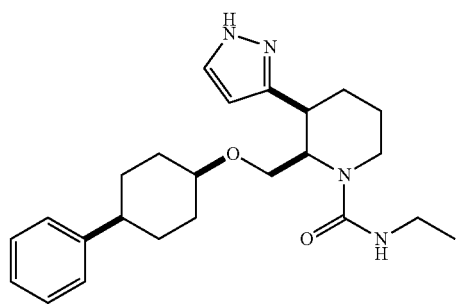 | (2R,3S)-N-ethyl-2-((((CIS)-4-phenylcyclohexyl)oxy)methyl)-3-(1H-pyrazol-3-yl)piperidine-1-carboxamide | 411.3 |
| 18 | 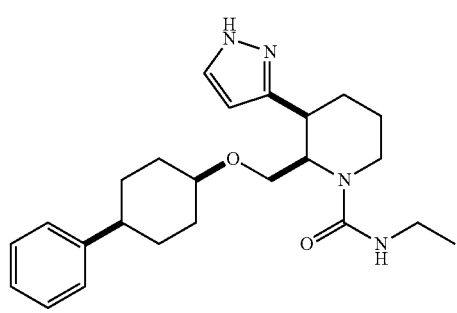 | (CIS)-N-ethyl-2-((((CIS)-4-phenylcyclohexyl)oxy)methyl)-3-(1H-pyrazol-3-yl)piperidine-1-carboxamide | 411.3 |
| 19 | 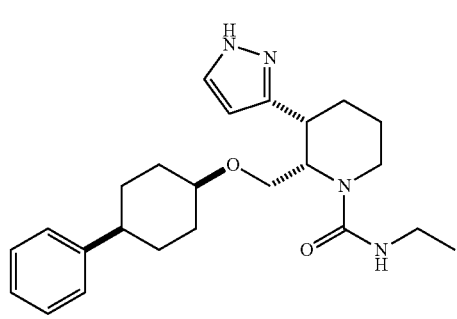 | (2S,3R)-N-ethyl-2-((((CIS)-4-phenylcyclohexyl)oxy)methyl)-3-(1H-pyrazol-3-yl)piperidine-1-carboxamide | 411.3 |

-continued

| Example Number | Structure | Name | Observed Mass [M + H]+ |
|---|---|---|---|
| 20 | 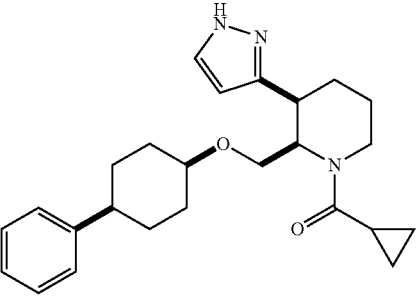 | cyclopropyl((CIS)-2-((((CIS)-4-phenylcyclohexyl)oxy)methyl)-3-(1H-pyrazol-3-yl)piperidin-1-yl)methanone | 408.3 |
| 21 | 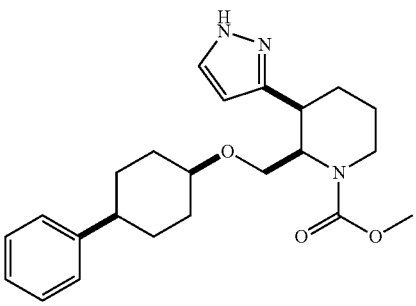 | methyl (CIS)-2-((((CIS)-4-phenylcyclohexyl)oxy)methyl)-3-(1H-pyrazol-3-yl)piperidine-1-carboxylate | 398.3 |
| 22 | 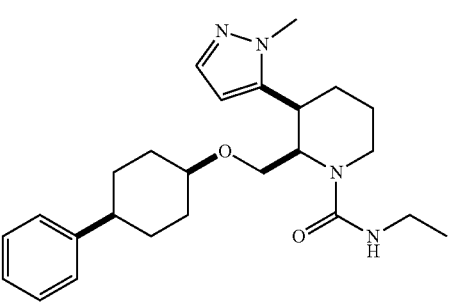 | (CIS)-N-ethyl-3-(1-methyl-1H-pyrazol-5-yl)-2-((((CIS)-4-phenylcyclohexyl)oxy)methyl)piperidine-1-carboxamide | 425.4 |
| 23 | 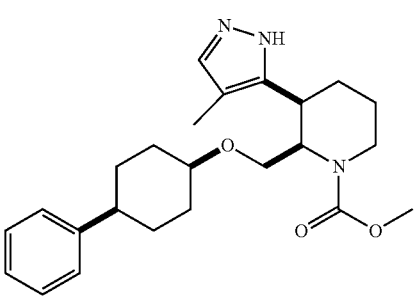 | methyl (CIS)-3-(4-methyl-1H-pyrazol-5-yl)-2-((((CIS)-4-phenylcyclohexyl)oxy)methyl)piperidine-1-carboxylate | 412.3 |
| 24 | 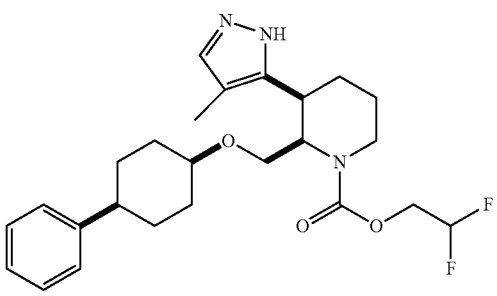 | 2,2-difluoroethyl (CIS)-3-(4-methyl-1H-pyrazol-5-yl)-2-((((CIS)-4-phenylcyclohexyl)oxy)methyl)piperidine-1-carboxylate | 462.3 |

-continued

| Example Number | Structure | Name | Observed Mass [M + H]+ |
|---|---|---|---|
| 25 | | methyl (CIS)-2-((((CIS)-4-phenylcyclohexyl)oxy)methyl)-3-(4-(trifluoromethyl)-1H-pyrazol-5-yl)piperidine-1-carboxylate | 466.2 |
| 26 | | methyl (CIS)-2-((((CIS)-4-phenylcyclohexyl)oxy)methyl)-3-(1H-1,2,4-triazol-5-yl)piperidine-1-carboxylate | 399.3 |

Example 27

(CIS)-N-ethyl-3-(1-methyl-1H-pyrazol-3-yl)-2-((((CIS)-4-phenylcyclohexyl)oxy)-methyl)piperidine-1-carboxamide

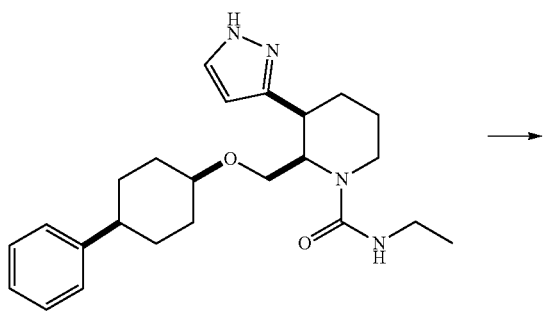

MeI (4.76 μl, 0.076 mmol) was added to a stirred mixture of N-ethyl (CIS)-2-((((1r,4r)-4-phenylcyclohexyl)oxy)methyl)-3-(1H-pyrazol-5-yl)piperidine-1-carboxamide (1) (17 mg, 0.038 mmol), Cs2CO3 (62.0 mg, 0.190 mmol) in DMF (2 ml) and the mixture was stirred at room temperature for 2 h. Filtered, the solution was purified by preparative HPLC Reverse phase (C-18), eluting with Acetonitrile/Water+0.1% TFA, to afford the title compound. MS: 425.4 (M+1); 1H NMR (500 MHz, Methanol-d4) δ 7.53 (s, 1H), 7.29-7.07 (m, 5H), 6.22 (s, 1H), 4.53 (s, 1H), 4.10 (s, 1H), 3.85 (s, 3H), 3.71 (t, J=9.3 Hz, 1H), 3.46 (s, 1H), 3.24-3.15 (m, 3H), 3.13-2.97 (m, 2H), 2.48 (t, J=11.9 Hz, 1H), 2.07-1.80 (m, 5H), 1.77-1.40 (m, 7H), 1.12 (t, J=7.2 Hz, 3H).

Example 28

(CIS)-N-ethyl-2-((((CIS)-4-phenylcyclohexyl)ox)methyl)-3-(1H-pyrazol-3-yl)pyrrolidine-1-carboxamide

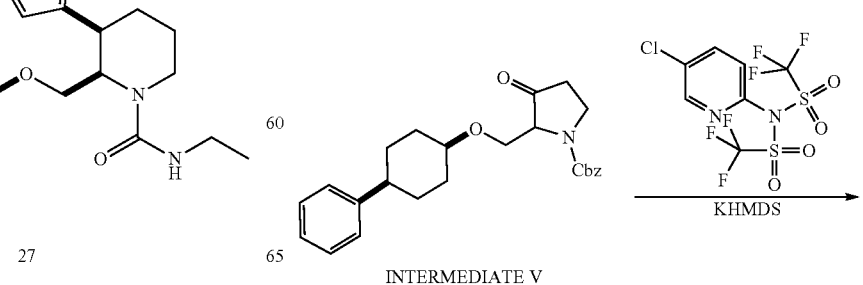

INTERMEDIATE V

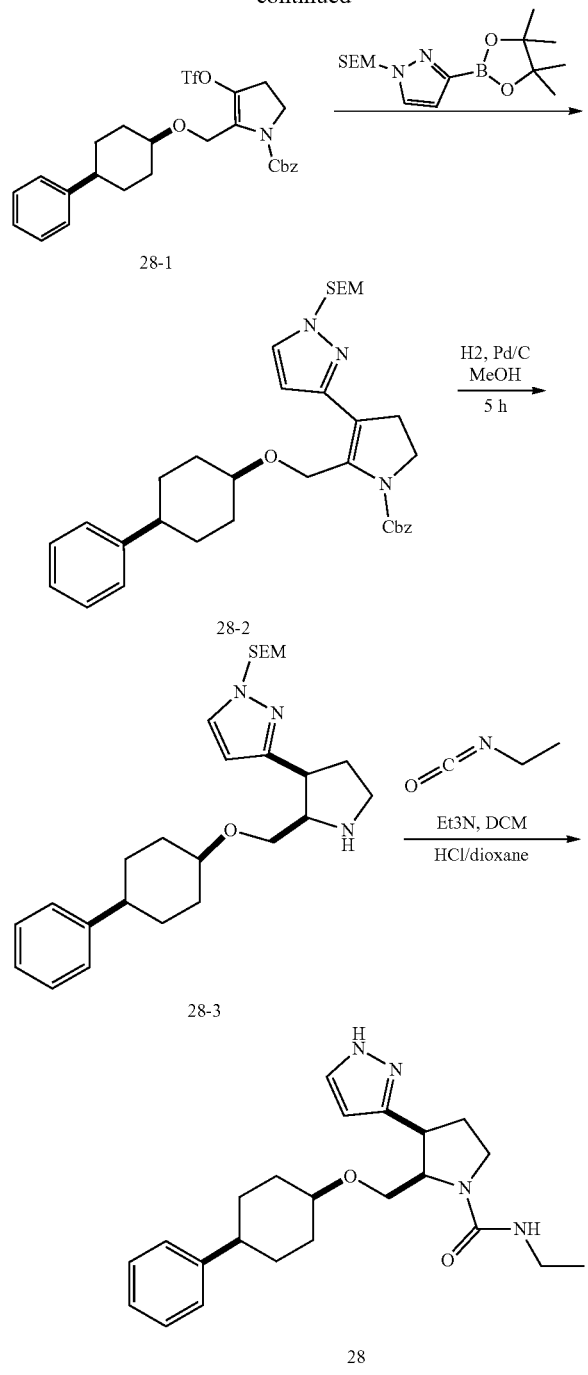

28-1

28-2

28-3

28

Step 1: benzyl 5-(((((CIS)-4-phenylcyclohexyl)oxy)
methyl)-4-(((trifluoromethyl)sulfonyl)oxy)-2,3-di-
hydro-1H-pyrrole-1-carboxylate (28-1)

Potassium bis(trimethylsilyl)amide (6.86 ml, 6.86 mmol) was added slowly to a stirred, cooled −78° C. mixture of benzyl 3-oxo-2-(((((CIS)-4-phenylcyclohexyl)oxy)methyl) pyrrolidine-1-carboxylate (INTERMEDIATE V) (2.15 g, 5.28 mmol), 2-[N,N-bis(trifluoro-methanesulfonyl)amino]-5-chloropyridine (2.279 g, 5.80 mmol) in THF (20 ml) and the mixture was stirred at −78° C. for 3 h. Aqueous ammonium chloride (saturated, 50 mL) was added and the mixture was extracted with ethyl acetate (2×80 mL). The combined organic fractions were washed with brine (saturated, 50 mL), dried ($Na_2SO_4$), filtered and the solvent was evaporated under reduced pressure. The residue was purified by column chromatography on silica gel, eluting with EtOAc: EtOH3:1/hexane (0-20%) to afford the title compound. MS: 540.2 (M+1).

Step 2: benzyl 5-(((((CIS)-4-phenylcyclohexyl)oxy) methyl)-4-(1-((2-(trimethylsilyl)ethoxy)methyl)-1H-pyrazol-3-yl)-2,3-dihydro-1H-pyrrole-1-carboxylate (28-2)

The mixture of benzyl 5-((((CIS)-4-phenylcyclohexyl) oxy)methyl)-4-(((trifluoromethyl)sulfonyl)oxy)-2,3-di-hydro-1H-pyrrole-1-carboxylate (28-1) (357.5 mg, 0.663 mmol), 5-(4,4,5,5-tetramethyl-1,3,2-dioxaborolan-2-yl)-1-((2-(trimethylsilyl)ethoxy)methyl)-1h-pyrazole (322 mg, 0.994 mmol), 1,1′-bis(diphenylphosphino)ferrocene-palladium(ii)dichloride dichloromethane complex (108 mg, 0.133 mmol) and sodium carbonate (211 mg, 1.988 mmol) in 1,4-Dioxane (5 ml)/Water (1 ml) and the mixture was stirred under N2 at 80° C. for 4 h. The mixture was cooled, water (80 mL) was added and the mixture was extracted with ethyl acetate (3×50 mL). The combined organic fractions were washed with brine (saturated, 50 mL), dried ($Na_2SO_4$), filtered and the solvent was evaporated under reduced pressure. The residue was purified by column chromatography on silica gel, eluting with EtOAc:EtOH 3:1/hexane (0-20%) to afford the title compound. MS: 588.3 (M+1).

Step 3: (CIS)-3-(2-(((CIS)-4-phenylcyclohexyl)oxy) methyl)pyrrolidin-3-yl)-1-((2-(trimethylsilyl)ethoxy) methyl)-1H-pyrazole (28-3)

Pd/C (11.59 mg, 0.109 mmol) was added to a stirred mixture of benzyl 5-((((1r,4r)-4-phenylcyclohexyl)oxy) methyl)-4-(1-((2-(trimethylsilyl)ethoxy)methyl)-1H-pyra-zol-3-yl)-2,3-dihydro-1H-pyrrole-1-carboxylate (28-2) (320 mg, 0.544 mmol) in MeOH (10 ml) and the mixture was stirred under H2 (balloon) at room temperature for 3 h. Filtered, the solution was concentrated, redissolved in MeOH (3 mL), filtered, the solution was purified by preparative HPLC Reverse phase (C-18), eluting with Acetonitrile/Water+0.1% TFA, to afford the title compound. MS: 456.4 (M+1).

Step 4: (CIS)-N-ethyl-2-(((((CIS)-4-phenylcyclohexyl)oxy)methyl)-3-(1H-pyrazol-3-yl)pyrrolidine-1-carboxamide (28)

Ethyl isocyanate (8.11 mg, 0.114 mmol) was added to a stirred mixture of (CIS)-3-(2-((((CIS)-4-phenylcyclohexyl) oxy)methyl)pyrrolidin-3-yl)-1-((2-(trimethylsilyl)ethoxy) methyl)-1H-pyrazole (28-3) (26 mg, 0.057 mmol), Et3N (0.040 ml, 0.285 mmol) in DCM (1 ml) and the mixture was stirred at room temperature for 15 min. Quenched with ethyl amine, concentrated, dried, added HCl in dioxane (0.5 ml, 2.000 mmol) the mixture was stirred at 60° C. for 2 h. Concentrated, redissolved in MeOH (1 ml), filtered, the solution was purified by preparative HPLC Reverse phase (C-18), eluting with Acetonitrile/Water+0.1% TFA to afford the title compound. MS: 397.3 (M+1), 1H NMR (500 MHz, Methanol-d4) δ 7.68 (d, J=2.0 Hz, 1H), 7.36-7.13 (m, 5H), 6.43 (d, J=2.0 Hz, 1H), 4.25 (dt, J=7.8, 3.9 Hz, 1H), 3.70-3.59 (m, 2H), 3.51 (td, J=16.1, 14.6, 5.8 Hz, 2H), 3.41 (s, 1H), 3.29-3.10 (m, 3H), 2.74-2.60 (m, 1H), 2.52 (tt, J=12.1, 3.4 Hz, 1H), 2.30 (dt, J=12.5, 6.8 Hz, 1H), 1.99-1.87 (m, 2H), 1.69 (dtt, J=16.1, 7.6, 4.7 Hz, 2H), 1.63-1.44 (m, 4H), 1.13 (t, J=7.2 Hz, 3H).

Example 29

Methyl 3-(1H-pyrazol-5-yl)-2-((((CIS)-4-(2,3,6-trifluorophenyl)cyclohexyl)oxy)methyl)piperidine-1-carboxylate

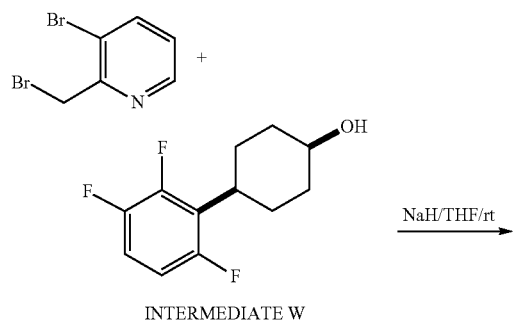

INTERMEDIATE W

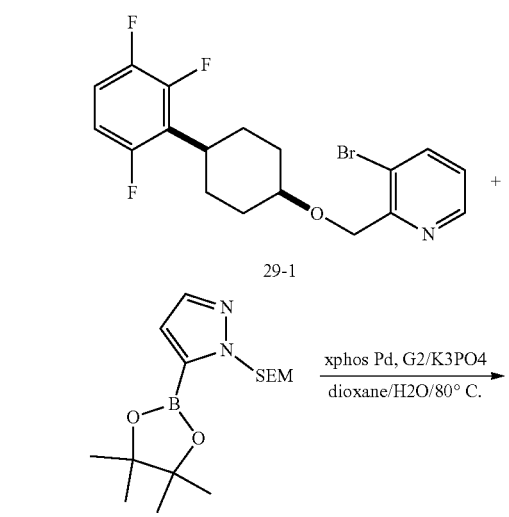

29-1

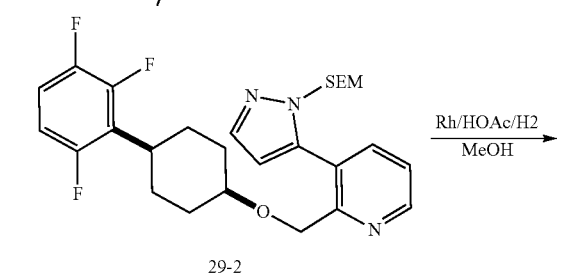

29-2

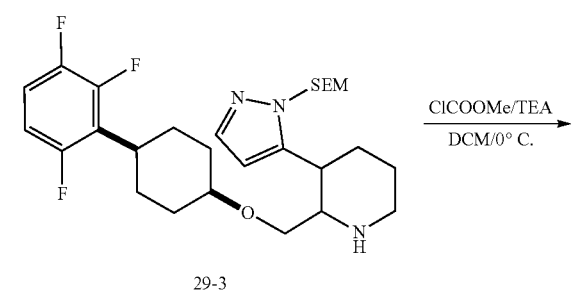

29-3

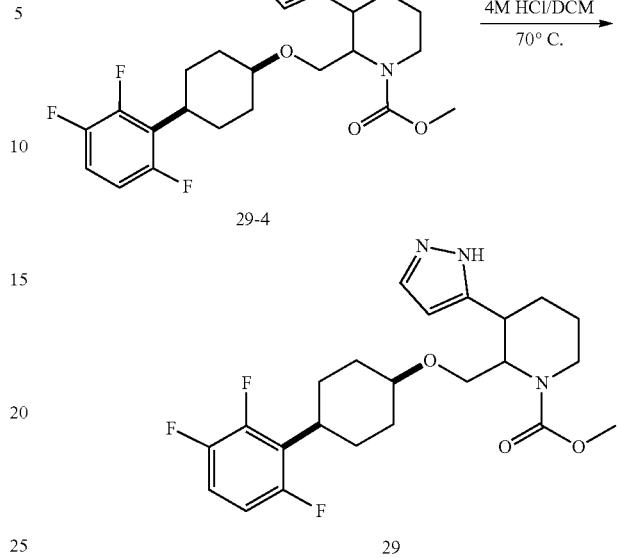

Step 1: 3-Bromo-2-((((CIS)-4-(2,3,6-trifluorophenyl)cyclohexyl)oxy)methyl)pyridine (29-1)

To a solution of (CIS)-4-(2,3,6-trifluorophenyl)cyclohexan-1-ol (INTERMEDIATE W, 330 mg, 1.435 mmol) in THF (5 ml) was added sodium hydride (60% in mineral oil, 62.2 mg, 1.554 mmol), and the mixture was stirred at room temperature for 1 h. Then 3-bromo-2-(bromomethyl)pyridine (300 mg, 1.196 mmol) was added, and the mixture was stirred at room temperature overnight. The reaction mixture was concentrated to leave brown oil. The residue was purified by column chromatography on silica (0% to 20% EtOAc/hexanes) to afford the title compound. MS: 402.6 (M+1).

Step 2: 2-((((CIS)-4-(2,3,6-Trifluorophenyl)cyclohexyl)oxy)methyl)-3-(1-((2-(trimethylsilyl)-ethoxy)methyl)-1H-pyrazol-5-yl)pyridine (29-2)

A suspension of 3-bromo-2-((((CIS)-4-(2,3,6-trifluorophenyl)cyclohexyl)-oxy)methyl)pyridine (29-1, 335 mg, 0.837 mmol), 5-(4,4,5,5-tetramethyl-1,3,2-dioxaborolan-2-yl)-1-((2-(trimethylsilyl)ethoxy)methyl)-1H-pyrazole (339 mg, 1.004 mmol), chloro(2-dicyclohexylphosphino-2',4',6'-triisopropyl-1,1'-biphenyl)[2-(2'-amino-1,1'-biphenyl)]palladium(ii) (Xphos Pd, G2, 132 mg, 0.167 mmol) and potassium phosphate (533 mg, 2.51 mmol) in 1,4-Dioxane (4 ml)/Water (1.0 ml) was bubbled with nitrogen for 10 min. The reaction mixture was sealed in the reaction vial and heated at 80° C. overnight. The reaction mixture was diluted with 10 ml of EtOAc, filtered through a celite pad. The filtrate was dried with MgSO4, concentrated to leave dark brown oil. The reaction mixture was concentrated to leave brown oil. The residue was purified by column chromatography on silica (0% to 30% EtOAc/hexanes) to afford the title compound. MS: 519.5 (M+1).

Step 3: 2-((((CIS)-4-(2,3,6-Trifluorophenyl)cyclohexyl)oxy)methyl)-3-(1-((2-(trimethylsilyl)ethoxy)methyl)-1H-pyrazol-5-yl)piperidine (29-3)

To a stirred solution of 2-((((CIS)-4-(2,3,6-trifluorophenyl)cyclohexyl)oxy)methyl)-3-(1-((2-(trimethylsilyl)

ethoxy)methyl)-1H-pyrazol-5-yl)pyridine (29-2, 102 mg, 0.197 mmol) in MeOH (3 ml) was added RHODIUM (5% on Alumina, 60.8 mg, 0.030 mmol) followed by acetic acid (11.83 µl, 0.197 mmol). The mixture was stirred under H2 balloon at room temperature for 7 hrs. The reaction mixture was filtered through celite and concentrated to leave an oil. The residue was purified by prep silica gel TLC eluent with 3% 7N NH$_3$ in MeOH/DCM to afford the title compound. MS: 524.4 (M+1).

Step 4: Methyl 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine-1-carboxylate (29-4)

To a stirred solution of 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine (29-3, 25 mg, 0.048 mmol) in DCM (0.5 ml) at 0° C. was added methyl chloroformate (5.92 µl, 0.076 mmol) followed by TEA (20 µl, 0.143 mmol). The mixture was stirred at 0° C. for 15 mins. Then the reaction was concentrated to afford the title compound. MS: 582.5 (M+1).

Step 5: Methyl 3-(1H-pyrazol-5-yl)-2-(((((CIS)-4-(2,3,6-trifluorophenyl)cyclohexyl)-oxy)methyl)piperidine-1-carboxylate. (29)

To a solution of methyl 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine-1-carboxylate (29-4, 27 mg, 0.046 mmol) in DCM (0.5 ml) was added 4M HCl in 1,4-dioxane (0.580 ml, 2.321 mmol). The reaction was heated at 70° C. for 2 hrs. The mixture was purified directly by column chromatography on C18 (5-95% MeCN/water with 0.05% TFA modifier) to afford the title compound. MS: 452.3 (M+1). 1H NMR (400 MHz, Chloroform-d) δ 7.72 (d, J=2.3 Hz, 1H), 7.01-6.89 (m, 1H), 6.82-6.70 (m, 1H), 6.50 (d, J=2.4 Hz, 1H), 4.67 (d, J=5.6 Hz, 1H), 4.17 (d, J=10.2 Hz, 1H), 3.75 (s, 3H), 3.71-3.36 (m, 5H), 3.34-3.15 (m, 2H), 3.04-2.86 (m, 1H), 2.47-2.25 (m, 1H), 2.10-1.78 (m, 5H), 1.72-1.55 (m, 1H), 1.54-1.33 (m, 3H)

Example 30

2-Fluoroethyl 3-(1H-pyrazol-5-yl)-2-(((((CIS)-4-(2,3,6-trifluorophenyl)cyclohexyl)oxy)methyl)-piperidine-1-carboxylate

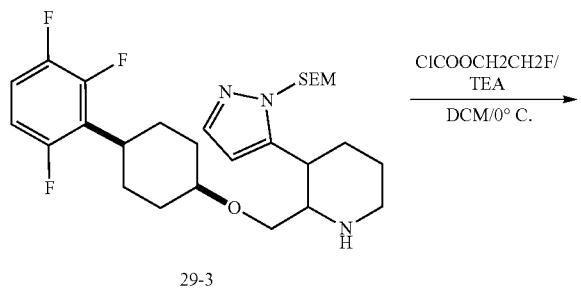

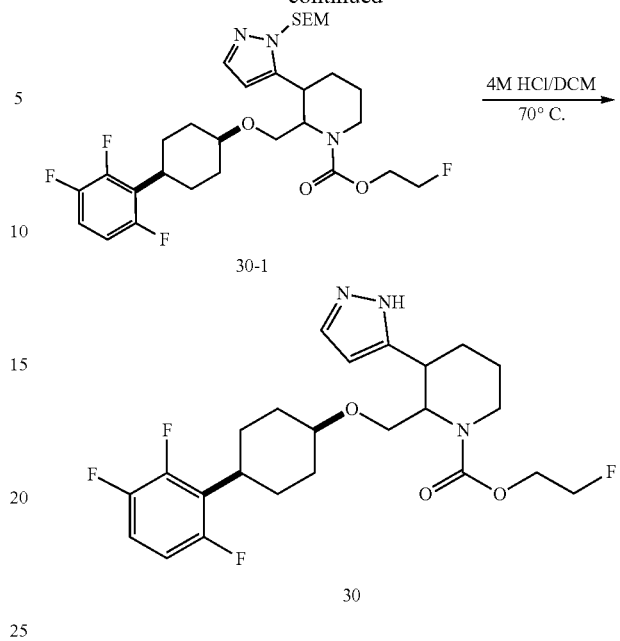

Step 1: 2-Fluoroethyl 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine-1-carboxylate (30-1)

To a stirred solution of 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine (29-3, 30 mg, 0.057 mmol) in DCM (0.5 ml) at 0° C. was added 2-fluoroethyl carbonochloridate (10.89 mg, 0.086 mmol) followed by TEA (24 µl, 0.172 mmol). The mixture was stirred at 0° C. for 1 hr. The reaction mixture was concentrated to leave a film. The residue was purified by prep silica gel TLC eluent with 3% MeOH/DCM to afford the title compound. MS: 614.4 (M+1).

Step 2: 2-Fluoroethyl 3-(1H-pyrazol-5-yl)-2-(((((CIS)-4-(2,3,6-trifluorophenyl)cyclohexyl)oxy)-methyl)piperidine-1-carboxylate (30)

To a solution of 2-fluoroethyl 2-(((((CIS)-4-(2,3,6-trifluorophenyl)cyclohexyl)-oxy)methyl)-3-(1-((2-(trimethylsilyl)ethoxy)methyl)-1H-pyrazol-5-yl)piperidine-1-carboxylate (30-1, 13 mg, 0.021 mmol) in DCM (0.3 ml) was added 4M HCl in 1,4-dioxane (0.265 ml, 1.059 mmol). The reaction was heated at 70° C. for 1 hr. The mixture was purified directly by column chromatography on C18 (5-95% MeCN/water with 0.05% TFA modifier) to afford the title compound. MS: 484.7 (M+1). 1H NMR (500 MHz, Chloroform-d) δ 7.83 (s, 1H), 6.97 (qd, J=9.1, 5.0 Hz, 1H), 6.78 (tdd, J=9.5, 3.8, 2.2 Hz, 1H), 6.60 (d, J=9.1 Hz, 1H), 4.80-4.67 (m, 2H), 4.61 (t, J=3.9 Hz, 1H), 4.52-4.33 (m, 2H), 4.24 (d, J=11.7 Hz, 1H), 3.56-3.35 (m, 4H), 3.28 (s, 1H), 2.98 (t, J=12.2 Hz, 1H), 2.40 (d, J=12.4 Hz, 1H), 2.16-1.81 (m, 6H), 1.77-1.62 (m, 1H), 1.47 (dt, J=27.4, 13.1 Hz, 4H).

Example 31

2,2,2-Trifluoroethyl 3-(1H-pyrazol-5-yl)-2-(((((CIS)-4-(2,3,6-trifluorophenyl)cyclohexyl)-oxy)methyl)piperidine-1-carboxylate

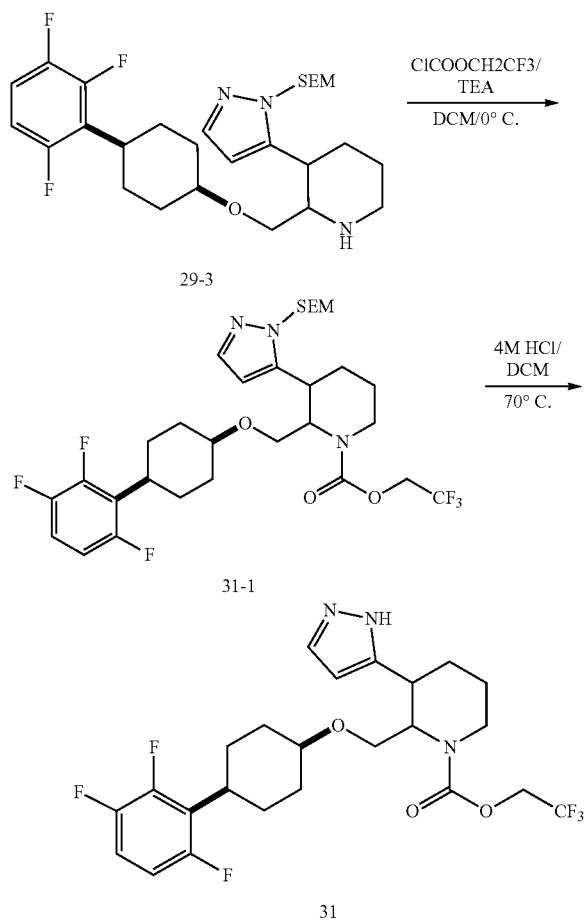

Step 1: 2,2,2-Trifluoroethyl 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine-1-carboxylate (31-1)

To a stirred solution of 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine (29-3, 30 mg, 0.057 mmol) in DCM (0.5 ml) at 0° C. was added 2,2,2-trifluoroethyl carbonochloridate (13.96 mg, 0.086 mmol) followed by TEA (24 μl, 0.172 mmol). The mixture was stirred at 0° C. for 1 hr. The reaction mixture was concentrated to leave a film. The residue was purified by prep silica gel TLC eluent with 3% MeOH/DCM to afford the title compound. MS: 650.4 (M+1).

Step 2: 2,2,2-Trifluoroethyl 3-(1H-pyrazol-5-yl)-2-(((((CIS)-4-(2,3,6-trifluorophenyl)cyclohexyl)oxy)methyl)piperidine-1-carboxylate (31)

To a solution of 2,2,2-trifluoroethyl 2-(((((CIS)-4-(2,3,6-trifluorophenyl)cyclohexyl)-oxy)methyl)-3-(1-((2-(trimethylsilyl)ethoxy)methyl)-1H-pyrazol-5-yl)piperidine-1-carboxylate (31-1, 25 mg, 0.038 mmol) in DCM (0.5 ml) was added 4M HCl in 1,4-dioxane (0.481 ml, 1.924 mmol). The reaction was heated at 70° C. for 2 hrs. The mixture was purified directly by column chromatography on C18 (5-95% MeCN/water with 0.05% TFA modifier) to afford the title compound. MS: 520.3 (M+1). 1H NMR (500 MHz, Chloroform-d) δ 7.87 (s, 1H), 6.98 (qd, J=9.2, 4.9 Hz, 1H), 6.78 (tdd, J=9.0, 3.3, 1.9 Hz, 1H), 6.61 (s, 1H), 4.93-4.42 (m, 3H), 4.23 (s, 1H), 3.45 (dd, J=25.6, 14.4 Hz, 4H), 3.10-2.91 (m, 1H), 2.40 (s, 1H), 2.19-1.79 (m, 7H), 1.70 (d, J=13.4 Hz, 1H), 1.49 (dq, J=25.5, 13.2, 12.4 Hz, 4H).

Example 32

1-(3-(1H-Pyrazol-5-yl)-2-(((((CIS)-4-(2,3,6-trifluorophenyl)cyclohexyl)oxy)methyl)piperidin-1-yl)-2-hydroxyethan-1-one

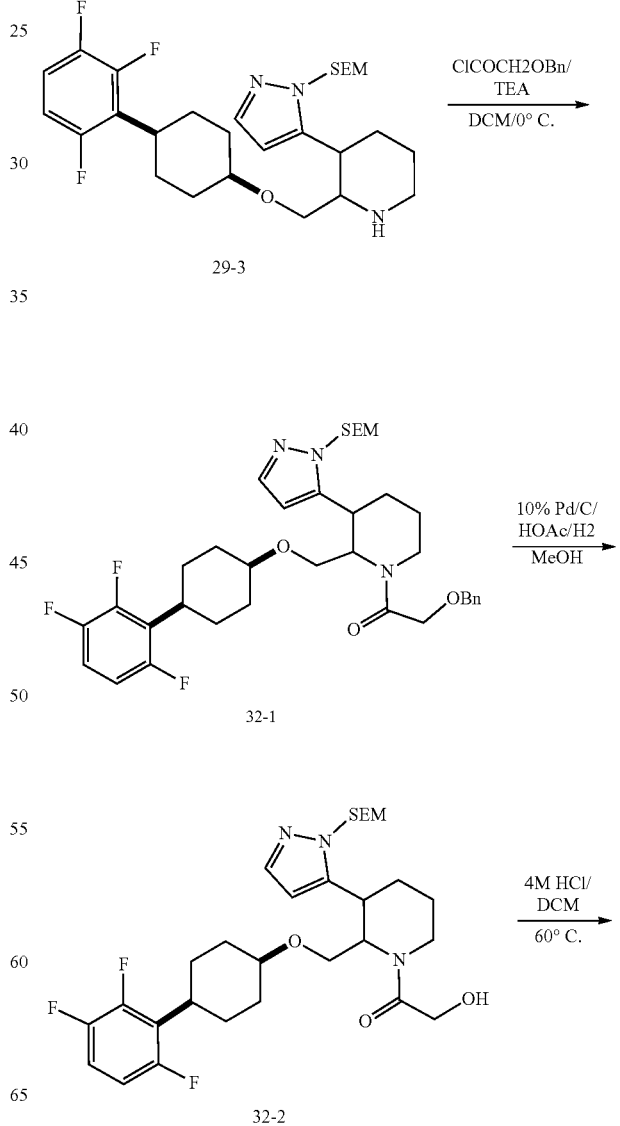

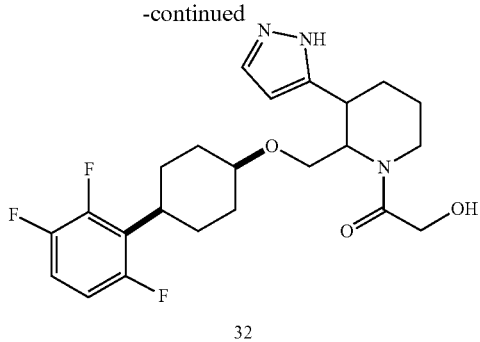

32

Step 1: 2-(Benzyloxy)-1-(2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidin-1-yl)ethan-1-one (32-1)

To a stirred solution of 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine (29-3, 30 mg, 0.057 mmol) in DCM (0.5 ml) at 0° C. was added 2-(benzyloxy)acetyl chloride (15.86 mg, 0.086 mmol) followed by TEA (24 µl, 0.172 mmol). The mixture was stirred at 0° C. for 10 mins. The reaction mixture was concentrated to leave a film. The residue was purified by prep silica gel TLC eluent with 3% MeOH/DCM to afford the title compound. MS: 672.4 (M+1).

Step 2: 2-Hydroxy-1-(2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidin-1-yl)ethan-1-one (32-2)

To a solution of 2-(benzyloxy)-1-(2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidin-1-yl)ethan-1-one (32-1.30 mg, 0.045 mmol) in MeOH (1.0 ml) was added 10% palladium on carbon (4.75 mg, 4.47 µmol) followed by 1 drop of HOAc. The reaction mixture was degassed and refilled with H2 from balloon for three times. The reaction mixture was stirred at rt under hydrogen balloon overnight. The reaction mixture was filtered through a celite pad. The filtrate was concentrated to afford the title compound. MS: 582.4 (M+1)

Step 3: 1-(3-(1H-pyrazol-5-yl)-2-(((((CIS)-4-(2,3,6-trifluorophenyl)cyclohexyl)oxy)methyl-piperidin-1-yl)-2-hydroxyethan-1-one (32)

To a solution of 2-hydroxy-1-(2-(((((CIS)-4-(2,3,6-trifluorophenyl)cyclohexyl)-oxy)methyl)-3-(1-((2-(trimethylsilyl)ethoxy)methyl)-1H-pyrazol-5-yl)piperidin-1-yl)ethan-1-one (32-2, 25 mg, 0.043 mmol) in DCM (0.5 ml) in the reaction vial was added 4M HCl in 1,4-dioxane (0.537 ml, 2.149 mmol). The reaction was sealed in the vial and heated at 60° C. for 1.5 hrs. The mixture was purified directly by column chromatography on C18 (5-95% MeCN/water with 0.05% TFA modifier) to afford the title compound. MS: 452.2 (M+1). 1H NMR (500 MHz, Methanol-d4) δ 7.76 (d, J=60.8 Hz, 1H), 7.11 (ddt, J=14.3, 9.5, 4.9 Hz, 1H), 6.89 (tdd, J=9.8, 6.6, 4.5 Hz, 1H), 6.42 (d, J=64.0 Hz, 1H), 4.61-4.36 (m, 2H), 4.35-4.22 (m, 1H), 3.82-3.64 (m, 1H), 3.63-3.38 (m, 2H), 3.30-3.13 (m, 2H), 2.99 (dtd, J=27.3, 13.4, 13.0, 4.8 Hz, 2H), 2.28-1.91 (m, 7H), 1.86 (d, J=14.0 Hz, 1H), 1.79-1.61 (m, 1H), 1.46 (q, J=13.0, 12.2 Hz, 3H).

Example 33

N-Ethyl-2-(((((CIS)-4-(2,3,6-trifluorophenyl)cyclohexyl)oxy)methyl-3-(1-((2-(trimethylsilyl)ethoxy)methyl-1H-pyrazol-5-yl)piperidine-1-carboxamide

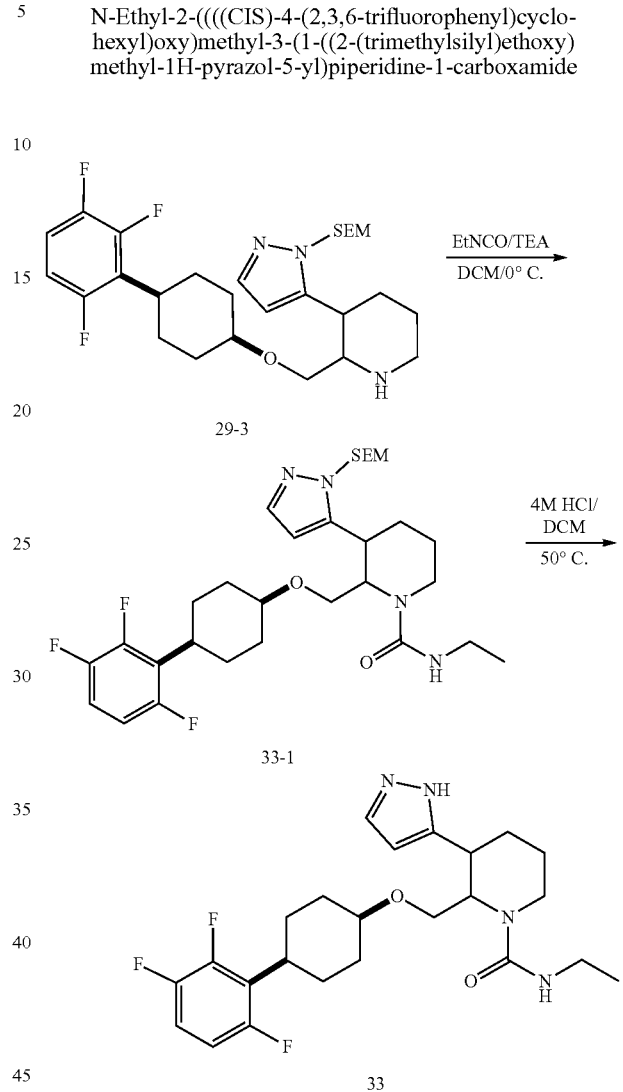

Step 1: N-ethyl-2-(((((CIS)-4-(2,3,6-trifluorophenyl)cyclohexyl)oxy)methyl-3-(1-((2-(trimethylsilyl)ethoxy)methyl)-1H-pyrazol-5-yl)piperidine-1-carboxamide (33-1)

To a stirred solution of 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine (29-3, 25 mg, 0.048 mmol) in DCM (0.5 ml) at 0° C. was added ETHYL ISOCYANATE (5.67 µl, 0.072 mmol) followed by TEA (20 µl, 0.143 mmol). The mixture was stirred at 0° C. for 15 mins. The reaction was concentrated to afford the title compound. MS: 595.5 (M+1).

Step 2: N-Ethyl-2-(((((CIS)-4-(2,3,6-trifluorophenyl)cyclohexyl)oxy)methyl)-3-(1-((2-(trimethylsilyl)ethoxy)methyl-1H-pyrazol-5-yl)piperidine-1-carboxamide (33)

To a solution of N-ethyl-2-(((((CIS)-4-(2,3,6-trifluorophenyl)cyclohexyl)oxy)methyl)-3-(1-((2-(trimethylsilyl)

ethoxy)methyl)-1H-pyrazol-5-yl)piperidine-1-carboxamide (33-1, 28 mg, 0.047 mmol) in DCM (0.5 ml) was added 4M HCl in 1,4-dioxane (0.588 ml, 2.354 mmol). The reaction was heated at 50° C. for 40 mins. The mixture was purified directly by column chromatography on C18 (5-95% MeCN/water with 0.05% TFA modifier) to afford the title compound. MS: 465.3 (M+1). 1H NMR (400 MHz, Chloroform-d) δ 7.75 (s, 1H), 7.07-6.88 (m, 1H), 6.86-6.67 (m, 1H), 6.47 (s, 1H), 4.85-3.99 (m, 5H), 3.63-3.42 (m, 2H), 3.28 (q, J=7.0, 6.5 Hz, 3H), 3.19-3.06 (m, 1H), 3.05-2.89 (m, 1H), 2.19-1.34 (m, 10H), 1.14 (t, J=7.2 Hz, 3H).

Example 34

3-(1H-Pyrazol-5-yl)-N-(2,2,2-trifluoroethyl)-2-(((((CIS)-4-(2,3,6-trifluorophenyl)cyclohexyl)-oxy)methyl)piperidine-1-carboxamide 0.072 mmol) followed by TEA (20 μl, 0.143 mmol). The mixture was stirred at 0° C. for 25 mins. The reaction was concentrated to afford the title compound. MS: 649.4 (M+1).

Step 2: 341H-Pyrazol-5-yl)-N-(2,2,2-trifluoroethyl)-2-((((CIS)-4-(2,3,6-trifluorophenyl-cyclohexyl)oxy)methyl)piperidine-1-carboxamide (34)

To a solution of N-(2,2,2-trifluoroethyl)-2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine-1-carboxamide (34-1, 30 mg, 0.046 mmol) in DCM (0.5 ml) in the reaction vial was added 4M HCl in 1,4-dioxane (0.578 ml, 2.312 mmol). The reaction was sealed in the vial and heated at 60° C. for 3 hrs. It was concentrated to leave a film. The mixture was purified directly by column chromatography on C18 (5-95% MeCN/water with 0.05% TFA modifier) to afford the title compound. MS: 519.7 (M+1). 1H NMR (400 MHz, Methanol-d4) δ 7.77 (s, 1H), 7.09 (ddt, J=14.2, 9.3, 4.9 Hz, 1H), 6.87 (tdd, J=9.7, 3.8, 2.2 Hz, 1H), 6.43 (s, 1H), 4.65 (q, J=8.4 Hz, 1H), 4.11-3.74 (m, 3H), 3.72-3.57 (m, 1H), 3.45 (s, 1H), 3.22 (dt, J=13.3, 4.3 Hz, 2H), 3.07-2.92 (m, 1H), 2.37-1.78 (m, 8H), 1.74-1.58 (m, 1H), 1.55-1.35 (m, 4H).

Example 35

2,2-Difluoroethyl 3-(1H-pyrazol-5-yl)-2-((((CIS)-4-(2,3,6-trifluorophenyl)cyclohexyl)oxy-)methyl)piperidine-1-carboxylate

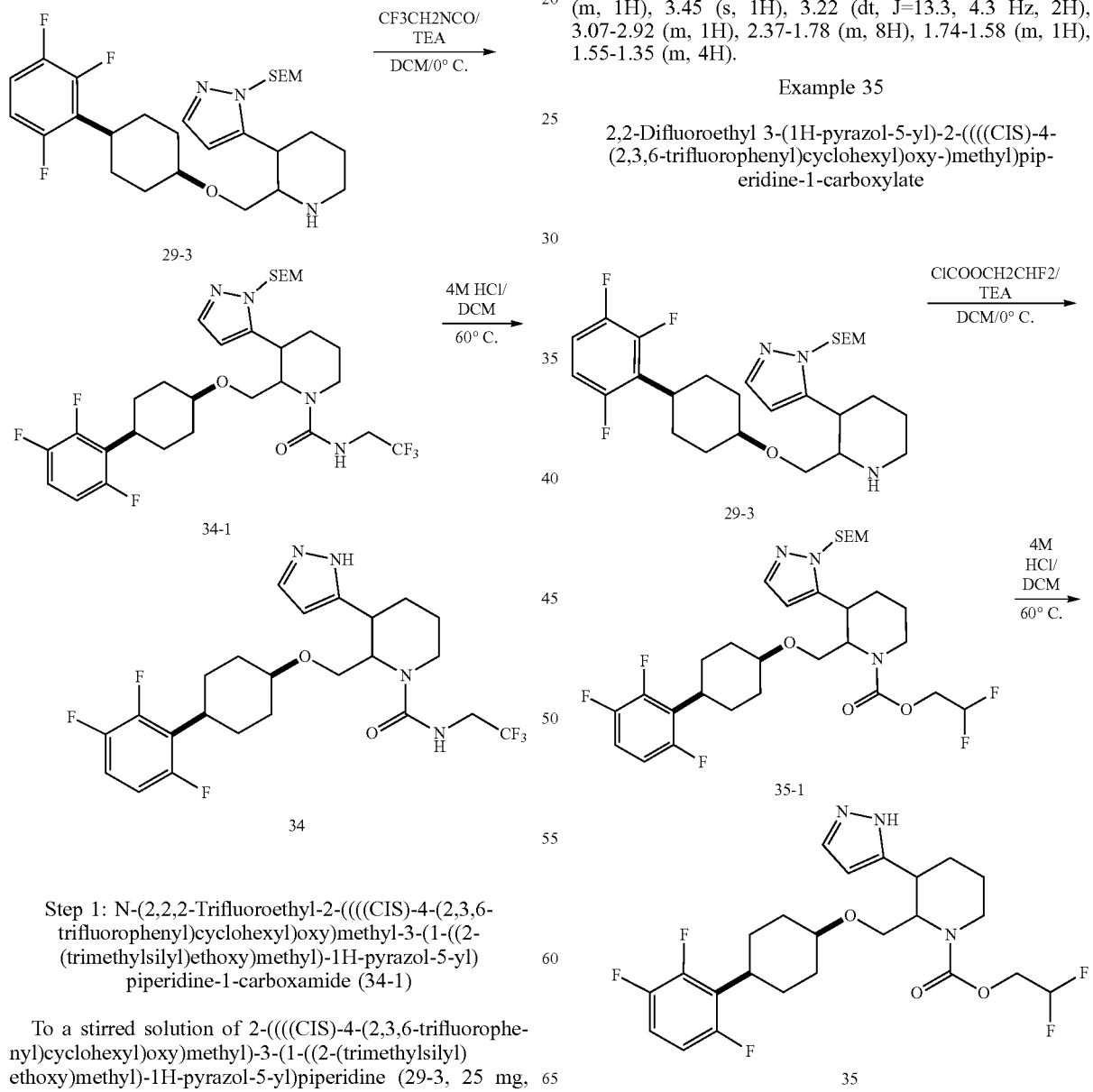

Step 1: N-(2,2,2-Trifluoroethyl-2-(((((CIS)-4-(2,3,6-trifluorophenyl)cyclohexyl)oxy)methyl-3-(1-((2-(trimethylsilyl)ethoxy)methyl)-1H-pyrazol-5-yl)piperidine-1-carboxamide (34-1)

To a stirred solution of 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine (29-3, 25 mg, 0.048 mmol) in DCM (0.5 ml) at 0° C. was added 1,1,1-trifluoro-2-isocyanatoethane (50% in EtOAc, 17.91 mg, Step 1: 2,2-Difluoroethyl 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine-1-carboxylate (35-1)

To a stirred solution of 2-(((((CIS)-4-(2,3,6-trifluorophenyl)cyclohexyl)oxy)methyl)-3-(1-((2-(trimethylsilyl)ethoxy)methyl)-1H-pyrazol-5-yl)piperidine (29-3, 30 mg, 0.057 mmol) in DCM (0.5 ml) at 0° C. was added 2,2-difluoroethyl carbonochloridate (12.42 mg, 0.086 mmol) followed by TEA (24 µl, 0.172 mmol). The mixture was stirred at 0° C. for 20 mins. The reaction mixture was concentrated to leave a film. The residue was purified by prep silica gel TLC eluent with 3% MeOH/DCM to afford the title compound. MS: 632.4 (M+1).

Step 2: 2,2-Difluoroethyl 3-(1H-pyrazol-5-yl)-2-((((CIS)-4-(2,3,6-trifluorophenyl)cyclohexyl)-oxy)methyl)piperidine-1-carboxylate (35)

To a solution of 2,2-difluoroethyl 2-((((CIS)-4-(2,3,6-trifluorophenyl)cyclohexyl)-oxy)methyl)-3-(1-((2-(trimethylsilyl)ethoxy)methyl)-1H-pyrazol-5-yl)piperidine-1-carboxylate (35-1, 35 mg, 0.055 mmol) in DCM (0.5 ml) was added 4M HCl in 1,4-dioxane (0.693 ml, 2.77 mmol) in the reaction vial. The reaction mixture was heated at 60° C. for 4 hrs. The mixture was purified directly by column chromatography on C18 (5-95% MeCN/water with 0.05% TFA modifier) to afford the title compound. MS: 502.3 (M+1). 1H NMR (500 MHz, Methanol-d4) δ 7.80 (d, J=16.9 Hz, 1H), 7.12 (qd, J=9.3, 4.9 Hz, 1H), 6.90 (tdd, J=9.6, 3.7, 2.1 Hz, 1H), 6.53-6.37 (m, 1H), 6.09 (tt, J=55.2, 3.8 Hz, 1H), 4.76 (d, J=4.2 Hz, 1H), 4.35 (q, J=14.3 Hz, 2H), 4.16 (d, J=13.3 Hz, 1H), 3.64 (dd, J=10.2, 7.4 Hz, 1H), 3.46 (s, 1H), 3.40-3.16 (m, 3H), 3.08-2.98 (m, 1H), 2.37-2.19 (m, 1H), 2.18-1.90 (m, 5H), 1.86 (d, J=13.9 Hz, 1H), 1.69 (ddd, J=17.6, 8.9, 4.4 Hz, 1H), 1.47 (t, J=14.9 Hz, 4H).

Example 36

Methyl (2R,5R)-5-methyl-3-(4-methyl-1H-pyrazol-5-yl)-2-((((CIS)-4-phenylcyclohexyl)oxy)methyl)pyrrolidine-1-carboxylate

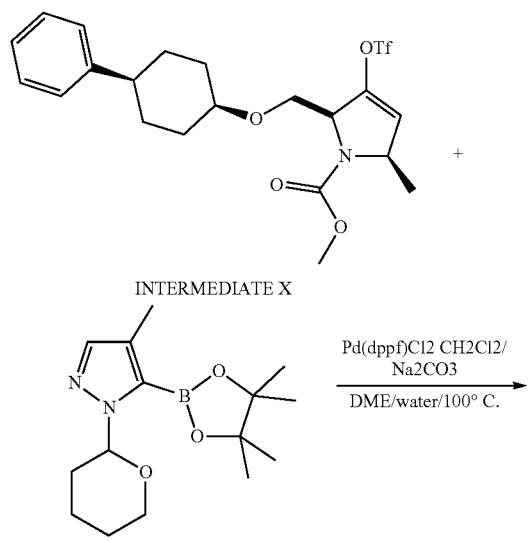

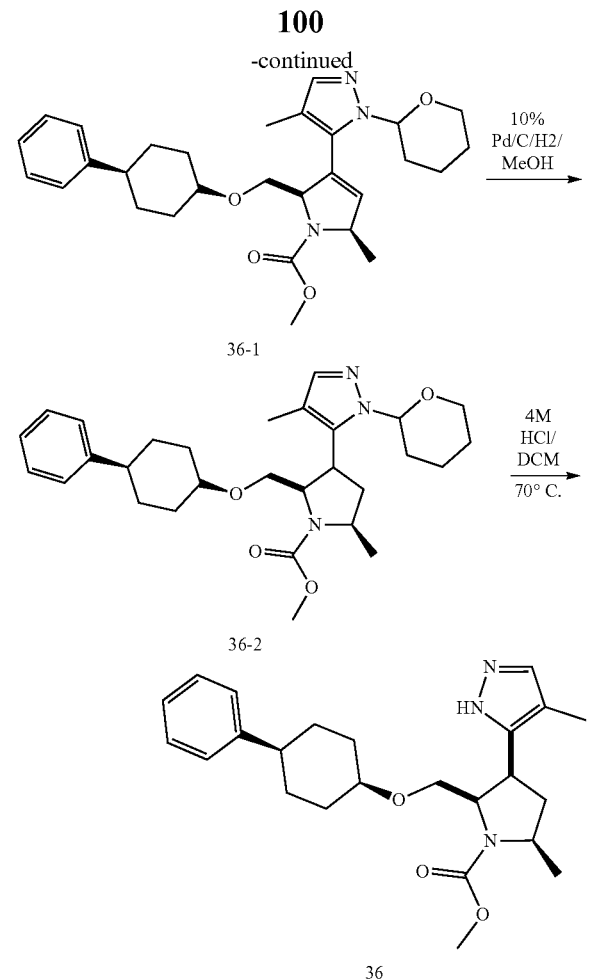

Step 1: Methyl (2R,5R)-5-methyl-3-(4-methyl-1-(tetrahydro-2H-pyran-2-yl)-1H-pyrazol-5-yl)-2-((((CIS)-4-phenylcyclohexyl)oxy)methyl)-2,5-dihydro-1H-pyrrole-1-carboxylate (36-1)

A suspension of methyl (2S,5R)-5-methyl-2-((((CIS)-4-phenylcyclohexyl)oxy)methyl)-3-(((trifluoromethyl)sulfonyl)oxy)-2,5-dihydro-1H-pyrrole-1-carboxylate (INTERMEDIATE X, 23 mg, 0.048 mmol), 1,1'-bis(diphenylphosphino)ferrocene-palladium(ii)dichloride dichloromethane complex (7.87 mg, 9.63 µmol), sodium carbonate (15.32 mg, 0.145 mmol) and 4-methyl-1-(tetrahydro-2h-pyran-2-yl)-1h-pyrazole-5-boronic acid pinacol ester (14.07 g, 0.048 mmol) in Dioxane (1 ml) and Water (0.5 ml) was bubbled with nitrogen for 10 min. The reaction mixture was sealed in the reaction vial and heated at 100° C. for 100 mins. The reaction mixture was purified by prep silica gel TLC eluent with 30% EtOAc/hexane to afford the title compound. MS: 494.8 (M+1).

Step 2: Methyl (2R,5R)-5-methyl-3-(4-methyl-1-(tetrahydro-2H-pyran-2-yl)-1H-pyrazol-5-yl)-2-((((CIS)-4-phenylcyclohexyl)oxy)methyl)pyrrolidine-1-carboxylate (36-2)

To a solution of methyl (2R,5R)-5-methyl-3-(4-methyl-1-(tetrahydro-2H-pyran-2-yl)-1H-pyrazol-5-yl)-2-((((CIS)-4-phenylcyclohexyl)oxy)methyl)-2,5-dihydro-1H-pyrrole-1-carboxylate (36-1, 13 mg, 0.026 mmol) in MeOH (0.8 ml)

was added 10% palladium on carbon (14.01 mg, 0.013 mmol). The reaction mixture was stirred under H$_2$ balloon for 2 days. The reaction mixture was filtered through celite and the filtrate was concentrated to afford the title compound. MS: 496.4 (M+1).

Step 3: Methyl (2R,5R)-5-methyl-3-(4-methyl-1H-pyrazol-5-yl)-2-(((((CIS)-4-phenylcyclohexyl)oxy)methyl)pyrrolidine-1-carboxylate (36)

To a solution of methyl (2R,5R)-5-methyl-3-(4-methyl-1-(tetrahydro-2H-pyran-2-yl)-1H-pyrazol-5-yl)-2-(((((CIS)-4-phenylcyclohexyl)oxy)methyl)pyrrolidine-1-carboxylate (36-2, 9 mg, 0.018 mmol) in DCM (0.3 ml) was added 4M HCl in 1,4-dioxane (0.227 ml, 0.908 mmol). The reaction mixture was sealed in the reaction vial and heated at 70° C. for 1 hr. The reaction mixture was concentrated to leave a film. The residue was purified directly by column chromatography on C18 (5-95% MeCN/water with 0.05% TFA modifier) to afford the title compound. MS: 413.3 (M+1). 1H NMR (500 MHz, Methanol-d4) δ 7.73 (s, 1H), 7.28 (t, J=7.6 Hz, 2H), 7.16 (dd, J=13.5, 7.2 Hz, 3H), 4.45 (s, 1H), 3.98 (dt, J=9.6, 6.4 Hz, 1H), 3.82-3.64 (m, 4H), 3.47 (s, 1H), 3.29-3.21 (m, 2H), 2.48 (p, J=10.1, 8.0 Hz, 3H), 2.18 (s, 3H), 1.86 (d, J=13.8 Hz, 1H), 1.75 (d, J=13.6 Hz, 1H), 1.68-1.40 (m, 7H), 1.32 (d, J=11.3 Hz, 2H).

Example 37

Methyl (2R,5R)-5-methyl-2-(((((CIS)-4-phenylcyclohexyl)oxy)methyl)-3-(1H-pyrazol-5-yl)pyrrolidine-1-carboxylate

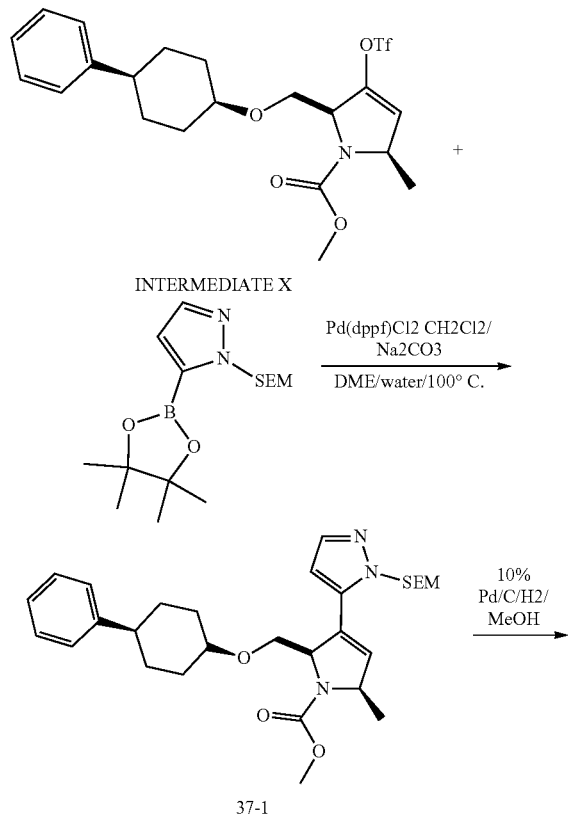

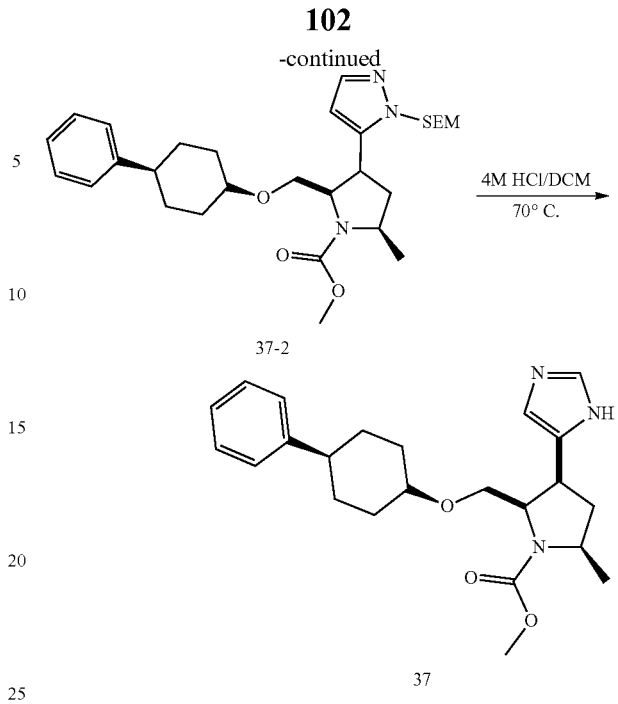

Step 1: Methyl (2R,5R)-5-methyl-2-(((((CIS)-4-phenylcyclohexyl)oxy)methyl)-3-(1-((2-(trimethylsilyl)ethoxy)methyl)-1H-pyrazol-5-yl)-2,5-dihydro-1H-pyrrole-1-carboxylate (37-1)'

A suspension of methyl (2S,5R)-5-methyl-2-(((((CIS)-4-phenylcyclohexyl)oxy)methyl)-3-(((trifluoromethyl)sulfonyl)oxy)-2,5-dihydro-1H-pyrrole-1-carboxylate (INTERMEDIATE X, 20 mg, 0.042 mmol), 1,1'-Bis (diphenylphosphino)ferrocene-palladium(ii)dichloride dichloromethane complex (6.84 mg, 8.38 µmol), sodium carbonate (13.32 mg, 0.126 mmol) and 5-(4,4,5,5-tetramethyl-1,3,2-dioxaborolan-2-yl)-1-((2-(trimethylsilyl)ethoxy)methyl)-1H-pyrazole (16.3 g, 0.050 mmol) in Dioxane (1 ml) and Water (0.5 ml) was bubbled with nitrogen for 10 min. The reaction mixture was sealed in the reaction vial and heated at 100° C. for 1.5 hrs. The reaction mixture was purified by prep silica gel TLC eluent with 30% EtOAc/hexane to afford the title compound. MS: 526.4 (M+1).

Step 2: Methyl (2R,5R)-5-methyl-2-(((((CIS)-4-phenylcyclohexyl)oxy)methyl)-3-(1-((2-(trimethylsilyl)ethoxy)methyl)-1H-pyrazol-5-yl)pyrrolidine-1-carboxylate (37-2)

To a solution of methyl (2R,5R)-5-methyl-2-(((((1r,4R)-4-phenylcyclohexyl)oxy)methyl)-3-(1-((2-(trimethylsilyl)ethoxy)methyl)-1H-pyrazol-5-yl)-2,5-dihydro-1H-pyrrole-1-carboxylate (37-1, 19 mg, 0.036 mmol) in MeOH (1 ml) was added 10% palladium on carbon (19.23 mg, 0.018 mmol). The reaction mixture was stirred under H$_2$ balloon for 2.5 hrs. The reaction mixture was filtered through celite and the filtrate was concentrated to afford the title compound. MS: 529.5 (M+1).

Step 3: Methyl (2R,5R)-5-methyl-2-(((((CIS)-4-phenylcyclohexyl)oxy)methyl)-3-(1H-pyrazol-5-yl)pyrrolidine-1-carboxylate (37)

To a solution of methyl (2R,5R)-5-methyl-2-(((((CIS)-4-phenylcyclohexyl)oxy)methyl)-3-(1-((2-(trimethylsilyl)

ethoxy)methyl)-1H-pyrazol-5-yl)pyrrolidine-1-carboxylate (37-2, 17 mg, 0.032 mmol) in DCM (0.3 ml) was added 4M HCl in 1,4-dioxane (0.403 ml, 1.611 mmol). The reaction mixture was sealed in the reaction vial and heated at 70° C. for 1.5 hrs. The reaction mixture was concentrated to leave a film. The residue was purified directly by column chromatography on C18 (5-95% MeCN/water with 0.05% TFA modifier) to afford the title compound. MS: 398.3 (M+1). 1H NMR (500 MHz, Methanol-d4) δ 7.84 (s, 1H), 7.28 (t, J=7.6 Hz, 2H), 7.17 (dd, J=14.3, 7.4 Hz, 3H), 6.56 (s, 1H), 4.38 (s, 1H), 4.09-3.94 (m, 1H), 3.75 (s, 3H), 3.63 (dt, J=14.3, 7.4 Hz, 1H), 3.50 (s, 1H), 3.32 (d, J=9.3 Hz, H), 2.57-2.29 (m, 3H), 2.05 (s, 1H), 1.85 (t, J=15.2 Hz, 2H), 1.75-1.39 (m, 9H).

Example 38

N-ethyl-2-(((4-isopropylcyclohexyl)oxy)methyl)-6-methyl-3-(H-pyrazol-5-yl)piperidine-1-carboxamide

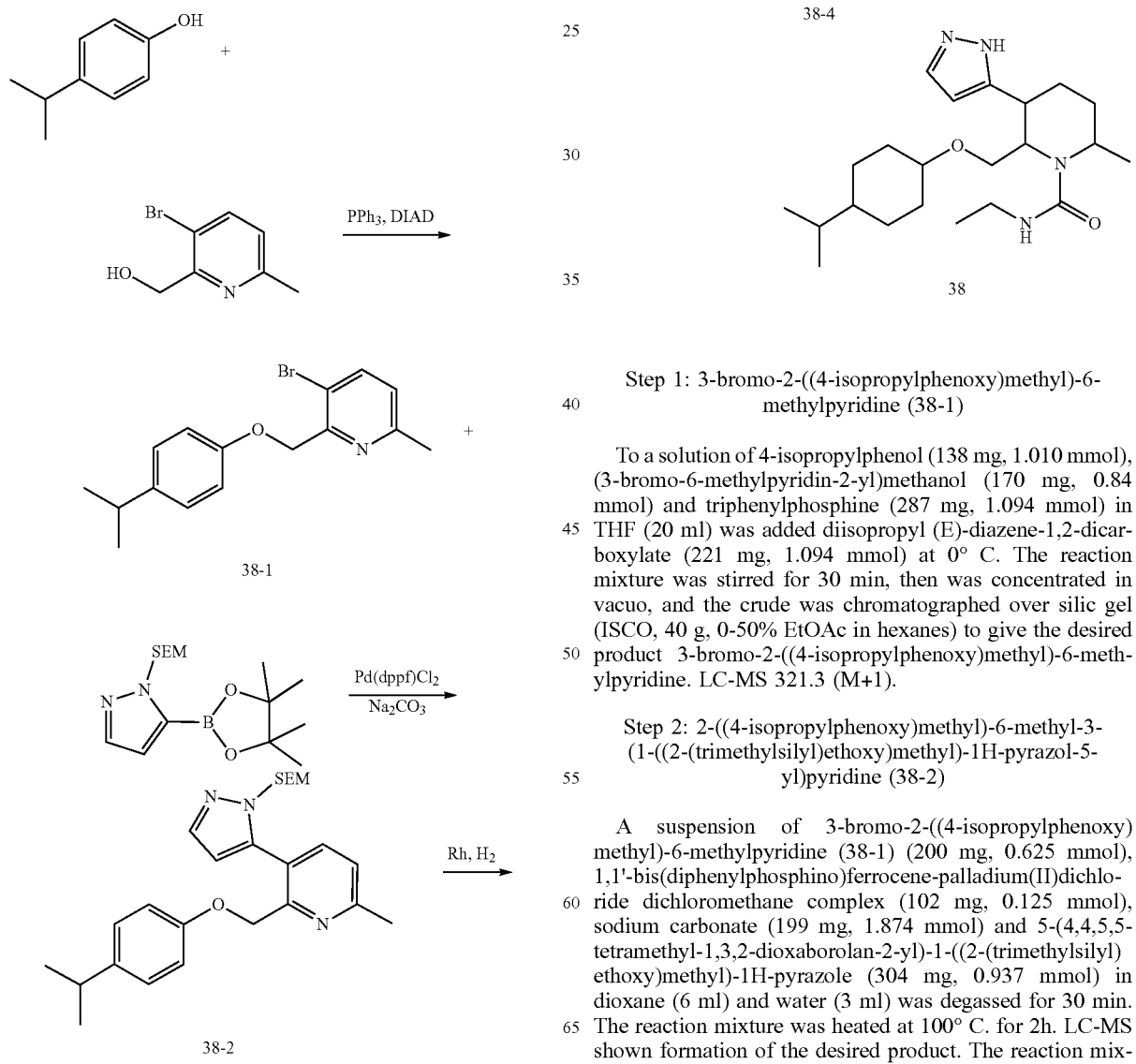

Step 1: 3-bromo-2-((4-isopropylphenoxy)methyl)-6-methylpyridine (38-1)

To a solution of 4-isopropylphenol (138 mg, 1.010 mmol), (3-bromo-6-methylpyridin-2-yl)methanol (170 mg, 0.84 mmol) and triphenylphosphine (287 mg, 1.094 mmol) in THF (20 ml) was added diisopropyl (E)-diazene-1,2-dicarboxylate (221 mg, 1.094 mmol) at 0° C. The reaction mixture was stirred for 30 min, then was concentrated in vacuo, and the crude was chromatographed over silic gel (ISCO, 40 g, 0-50% EtOAc in hexanes) to give the desired product 3-bromo-2-((4-isopropylphenoxy)methyl)-6-methylpyridine. LC-MS 321.3 (M+1).

Step 2: 2-((4-isopropylphenoxy)methyl)-6-methyl-3-(1-((2-(trimethylsilyl)ethoxy)methyl)-1H-pyrazol-5-yl)pyridine (38-2)

A suspension of 3-bromo-2-((4-isopropylphenoxy)methyl)-6-methylpyridine (38-1) (200 mg, 0.625 mmol), 1,1'-bis(diphenylphosphino)ferrocene-palladium(II)dichloride dichloromethane complex (102 mg, 0.125 mmol), sodium carbonate (199 mg, 1.874 mmol) and 5-(4,4,5,5-tetramethyl-1,3,2-dioxaborolan-2-yl)-1-((2-(trimethylsilyl)ethoxy)methyl)-1H-pyrazole (304 mg, 0.937 mmol) in dioxane (6 ml) and water (3 ml) was degassed for 30 min. The reaction mixture was heated at 100° C. for 2h. LC-MS shown formation of the desired product. The reaction mixture was cooled to M, diluted with 10 mL of EtOAc, filtered through a celite pad. The filtrate was dried (MgSO4), concentrated and chromatographed over silic gel (ISCO, 40 g, 0-10% MeOH in DCM) to give the desired product 2-((4-isopropylphenoxy)methyl)-6-methyl-3-(1-((2-(trimethylsilyl)ethoxy)methyl)-1H-pyrazol-5-yl)pyridine. LC-MS 438.5 (M+1).

Step 3: 2-(((4-isopropylcyclohexyl)oxy)methyl)-6-methyl-3-(1-((2-(trimethylsilyl)ethoxy)-methyl)-1H-pyrazol-5-yl)piperidine (38-3)

A mixture of 2-((4-isopropylphenoxy)methyl)-6-methyl-3-(1-((2-(trimethylsilyl)ethoxy)methyl)-1H-pyrazol-5-yl)pyridine (38-2) (110 mg, 0.251 mmol) in MeOH (5 ml) was added rhodium on alumina (0.208 µl, 0.025 mmol) under $N_2$ at rt. The reaction mixture was vacuumed and refilled with $H_2$ (40 psi) on par shaker for overnight. LC-MS shown SM disappeared. The reaction mixture was then hydrogenated with $H_2$ from a balloon for 2 day. LC-MS shown formation of the desired product. The reaction mixture was filtered through a celite pad and the filtrate was concentrated and chromatographed over Gilson (10-100% Acetonitrile in $H_2O$) to give the desired product 2-(((4-isopropylcyclohexyl)oxy)methyl)-6-methyl-3-(1-((2-(trimethylsilyl)ethoxy)methyl)-1H-pyrazol-5-yl)piperidine. LC-MS 450.48 (M+1).

Step 4: N-ethyl-2-(((4-isopropylcyclohexyl)oxy)methyl)-6-methyl-3-(1-((2-(trimethylsilyl)ethoxy)methyl)-1H-pyrazol-5-yl)piperidine-1-carboxamide (38-4)

To a solution of 2-(((4-isopropylcyclohexyl)oxy)methyl)-6-methyl-3-(1-((2-(trimethylsilyl)ethoxy)methyl)-1H-pyrazol-5-yl)piperidine (x-3) (30 mg, 0.067 mmol) in DCM (3 ml) was added TEA (0.019 ml, 0.133 mmol) and ethyl isocyanate (10.56 Al, 0.133 mmol) at 0° C. under $N_2$. The reaction mixture was raised to rt and stirred for 2h. LC-MS shown no SM left. The reaction mixture was concentrated and purified by Gilson (C18, 10-90% Acetonitrile in $H_2O$) to give the desired product N-ethyl-2-(((4-isopropylcyclohexyl)oxy)methyl)-6-methyl-3-(1-((2-(trimethylsilyl)ethoxy)methyl)-1H-pyrazol-5-yl)piperidine-1-carboxamide. LC-MS 521.26 (M+1).

Step 4: N-ethyl-2-(((4-isopropylcyclohexyl)oxy)methyl)-6-methyl-3-(1H-pyrazol-5-yl)piperidine-1-carboxamide (38)

A solution of N-ethyl-2-(((4-isopropylcyclohexyl)oxy)methyl)-6-methyl-3-(1-((2-(trimethylsilyl)ethoxy)methyl)-1H-pyrazol-5-yl)piperidine-1-carboxamide (38-4) (10 mg, 0.019 mmol) in dioxane (5 ml) with 1N HCl was stirred at 50° C. for 1 h under $N_2$. LC-MS shown formation of the desired product. The reaction mixture was concentrated and the residue was purified by Gilson (C18, 10-100% acetonitrile in $H_2O$) to give the desired product N-ethyl-2-(((4-isopropylcyclohexyl)oxy)methyl)-6-methyl-3-(1H-pyrazol-5-yl)piperidine-1-carboxamide, TFA. LC-MS 391.55 (M+1).

Example 39

(+/−) methyl (2R,3S,5S)-5-methyl-2-(((((CIS)-4-phenylcyclohexyl)oxy)methyl)-3-(1H-pyrazol-5-yl)piperidine-1-carboxylate

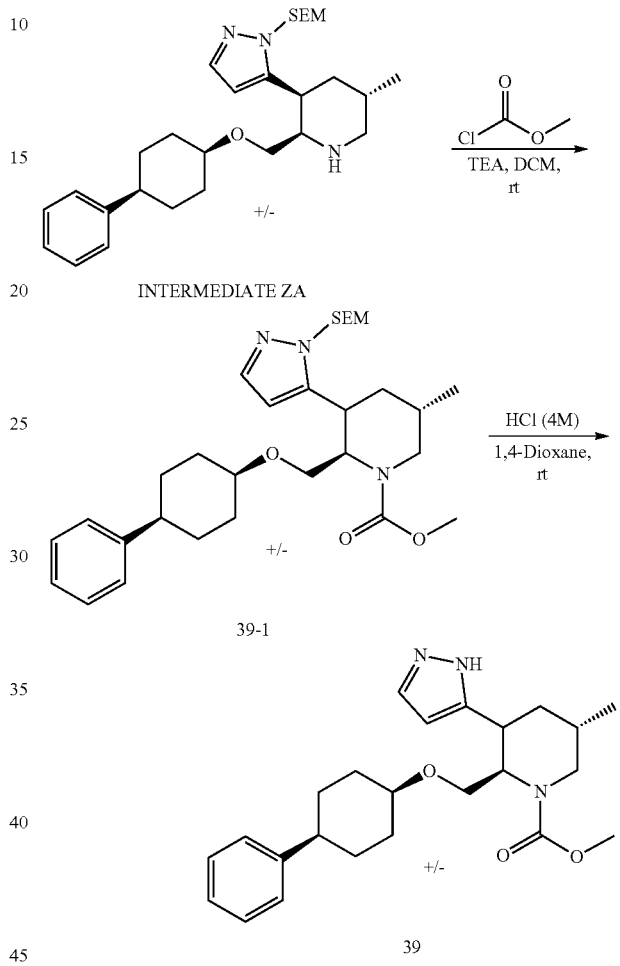

Step 1: (+/−) methyl (2R,3S,5S)-5-methyl-2-(((CIS)-4-phenylcyclohexyl)oxy)methyl)-3-(1-((2-(trimethylsilyl)ethoxy)methyl)-1H-pyrazol-5-yl)piperidine-1-carboxylate (39-1)

A solution of (2R,3S,5S)-5-methyl-2-(((((CIS)-4-phenylcyclohexyl)oxy)methyl)-3-(1-((2-(trimethylsilyl)ethoxy)methyl)-1H-pyrazol-5-yl)piperidine, INTERMEDIATE ZA (25 mg, 0.052 mmol) in DCM (258 µl) at 25° C. was treated with triethylamine (21.61 µl, 0.155 mmol) followed by methyl chloroformate (6.00 µl, 0.078 mmol) and the mixture stirred at 25° C. for 30 mins. Analysis showed some SM remaining. Another 1.5 equivalent of methyl chloroformate (6.00 µl, 0.078 mmol) was added and after stirring for 30 min the reaction was quenched with water, diluted with DCM and washed with brine. The organic layer was dried (MgSO4), filtered and concentrated under reduced pressure to afford the crude (39-1). LC-MS (m/z)=543.6 (M+1).

Step 2: (+/−) methyl (2R,3S,5S)-5-methyl-2-((((CIS)-4-phenylcyclohexyl)oxy)methyl)-3-(1H-pyrazol-5-yl)piperidine-1-carboxylate (39)

A solution of the crude from Step 1, methyl (2R,3S,5S)-5-methyl-2-((((CIS)-4-phenylcyclohexyl)oxy)methyl)-3-(1-((2-(trimethylsilyl)ethoxy)methyl)-1H-pyrazol-5-yl)piperidine-1-carboxylate, (39-1) (28 mg, 0.052 mmol) in HCl (129 µl, 0.517 mmol) 4 M in (1,4-Dioxane) was stirred at 60° C. for 1.5 h. The solvent was evaporated under reduced pressure and the residue diluted with EtOAc and washed with NaHCO$_3$ (×2). The organic layer was dried (MgSO$_4$), filtered and concentrated under reduced pressure to afford the crude. The crude was purified by silica gel chromatography, on the CombiFlash NextGen 300+ with ELSD, on a 12 g column, eluting with a gradient of ethyl acetate;ethanol (3:1)/hexanes—0:100 to 30:70 to afford the title compound (detected by ELSD). LC-MS (m/z)=412.7 (M+1). $^1$H NMR (500 MHz, Chloroform-d) δ 7.61 (s, 1H), 7.30-7.16 (m, 5H), 6.23 (s, 1H), 4.71 (s, 1H), 3.90 (d, J=13.2 Hz, 1H), 3.73 (s, 3H), 3.64-3.46 (m, 2H), 3.44 (s, 1H), 3.37 (d, J=11.2 Hz, 1H), 3.25 (dd, J=10.1, 3.3 Hz, 1H), 2.51-2.42 (m, 1H), 2.42-2.33 (m, 1H), 2.15 (s, 1H), 1.88 (m, 2H), 1.79-1.67 (m, 3H), 1.57 (m, 2H), 1.42 (t, J=13.3 Hz, 2H), 1.25 (s, 1H), 1.11 (d, J=7.0 Hz, 3H).

Example 40

(+/−) methyl (2R,3R,5S)-5-methyl-2-((((CIS)-4-phenylcyclohexyl)oxy)methyl)-3-(1H-pyrazol-5-yl)piperidine-1-carboxylate The title compound was prepared following the general procedure described for EXAMPLE 39, but with INTERMEDIATE ZB in step 1, to afford EXAMPLE 40. LC-MS (m/z)=412.7 (M+1).

Example 41

(+/−) methyl (2R,3S,5R)-5-methyl-2-((((CIS)-4-phenylcyclohexyl)oxy)methyl)-3-(1H-pyrazol-5-yl)piperidine-1-carboxylate Following the general procedure described for EXAMPLE 39, but with INTERMEDIATE ZC in step 1, EXAMPLE 41 was afforded. LC-MS (m/z)=412.3 (M+1).

Example 42

Methyl cis-3-(4-iodo-1H-pyrazol-3-yl)-2-((((CIS)-4-phenylcyclohexyl)oxy)methyl)piperidine-1-carboxylate

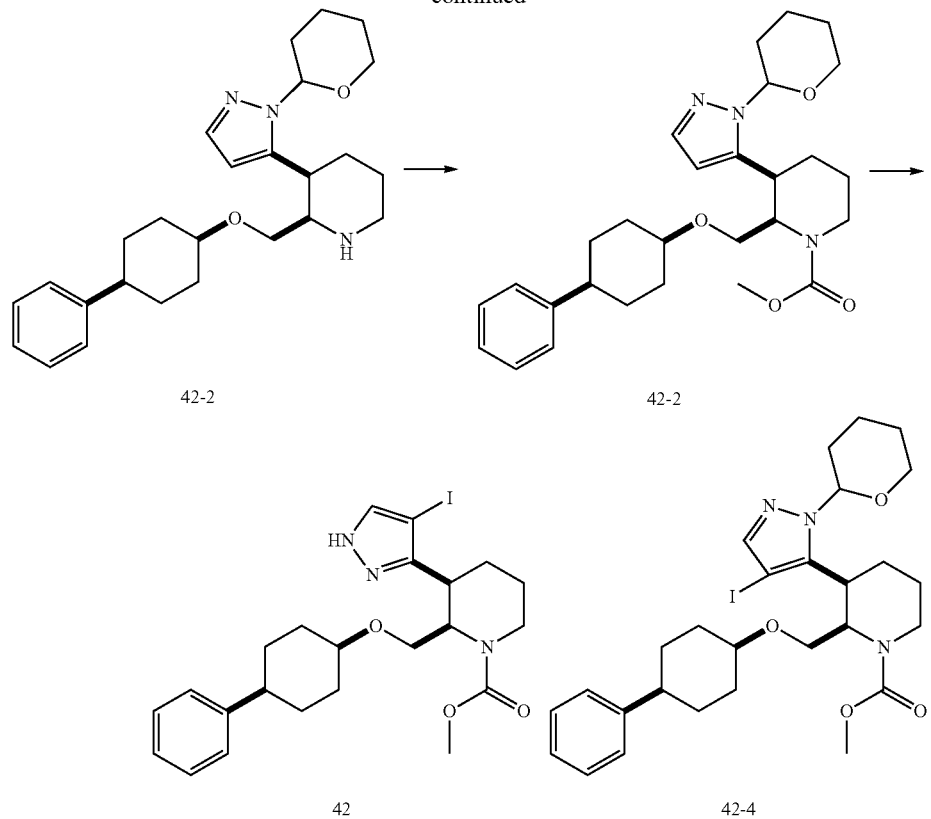

Step 1. Preparation of 2-((((CIS)-4-phenylcyclohexyl)oxy)methyl)-3-(1-(tetrahydro-2H-pyran-2-yl)-1H-pyrazol-5-yl)pyridine (42-1)

To a solution of 3-bromo-2-((((CIS)-4-phenylcyclohexyl)oxy)methyl)pyridine (1.8 g, 5.20 mmol) in THF (40 mL) and Water (8 mL) were added 1-(tetrahydro-2H-pyran-2-yl)-5-(4,4,5,5-tetramethyl-1,3,2-dioxaborolan-2-yl)-1H-pyrazole (2.89 g, 10.40 mmol), Na$_2$CO$_3$ (1.102 g, 10.40 mmol) and DTBPF Pd G3 (0.339 g, 0.520 mmol). The resulting mixture was stirred at 60° C. under N$_2$ protection for 16 h. TLC showed that new points were found. The reaction mixture was quenched with water (10 mL), then extracted with EtOAc (20 mL×3), washed with brine (20 mL). The organic layer dried over Na$_2$SO$_4$, filtered and the filtrate was concentrated.

The crude product was purified by column chromatography on silica gel (pet.ether:EtOAc=2:1) to the title compound.

Step 2. Preparation of cis-2-((((CIS)-4-phenylcyclohexyl)oxy)methyl)-3-(1-(tetrahydro-2H-pyran-2-yl)-1H-pyrazol-5-yl)piperidine (42-2)

To a solution of 2-((((CIS)-4-phenylcyclohexyl)oxy)methyl)-3-(1-(tetrahydro-2H-pyran-2-yl)-1H-pyrazol-5-yl)pyridine (1.79 g, 4.29 mmol) in MeOH (30 ML) and AcOH (3 mL) was added Pd(OH)$_2$ (0.602 g, 0.857 mmol) (20% wt.). The mixture was stirred at 50° C. under H$_2$ (excess) (50 psi) for 16 h. A new spot was found on TLC. The mixture was filtered and the filtrate was concentrated to give the title compound.

Step 3. Preparation of methyl cis-2-((((CIS)-4-phenylcyclohexyl)oxy)methyl)-3-(1-(tetrahydro-2H-pyran-2-yl)-1H-pyrazol-5-yl)piperidine-1-carboxylate (42-3)

To a solution of cis-2-((((CIS)-4-phenylcyclohexyl)oxy)methyl)-3-(1-(tetrahydro-2H-pyran-2-yl)-1H-pyrazol-5-yl)piperidine (1.8 g, 3.82 mmol) and TEA (1.599 mL, 11.47 mmol) in DCM (30 mL) was added methyl carbonochloridate (0.723 g, 7.65 mmol) at 0° C., the resulting mixture was stirred at 20° C. under N$_2$ protection for 16 h. LCMS showed desired mass. TLC showed that new points were found. The reaction mixture was quenched with water (5 mL), then extracted with DCM (10 mL×3), washed with brine (5 mL). The organic layer was dried over Na$_2$SO$_4$, filtered and the filtrate was concentrated. The crude product was purified by column chromatography on silica gel (pet.ether:EtOAc=5:1-2:1) to give the title compound. LCMS m/z (M+H)$^+$: C$_{28}$H$_{39}$N$_3$O$_4$ 482.3, found 482.2.

Step 4. Preparation of methyl cis-3-(4-iodo-1H-pyrazol-5-yl)-2-((((CIS)-4-phenylcyclohexyl)oxy)methyl)piperidine-1-carboxylate (42)

To a solution of cis-2-((((CIS)-4-phenylcyclohexyl)oxy)methyl)-3-(1-(tetrahydro-2H-pyran-2-yl)-1H-pyrazol-5-yl)piperidine-1-carboxylate (370 mg, 0.768 mmol) in acetonitrile (6 mL) was added NIS (346 mg, 1.536 mmol), the resulting mixture was stirred at 50° C. for 16 h. TLC showed that new points were found. LCMS showed desired mass and protected compound 42-4. The reaction mixture was purified by prep-TLC (SiO$_2$, pet.ether:EtOAc=2:1) to give the title compound. LCMS m/z (M+H)⁺: $C_{23}H_{30}IN_3O_3$ 608.2, found 608.3. ¹H NMR (400 MHz, CD₃OD) δ 7.67 (s, 1H), 7.28-7.21 (m, 2H), 7.20-7.16 (m, 2H), 7.15-7.08 (m, 1H), 4.96-4.90 (m, 1H), 4.12 (brd, J=11.00 Hz, 1H), 3.73 (s, 4H), 3.49-3.42 (m, 1H), 3.19-3.02 (m, 3H), 2.51-2.41 (m, 1H), 2.25 (brd, J=13.21 Hz, 1H), 1.99-1.78 (m, 4H), 1.76-1.58 (m, 3H), 1.55-1.40 (m, 4H).

Example 43 and 44

Methyl (2R,3S)-3-(4-ethyl-1H-pyrazol-3-yl)-2-((((CIS)-4-phenylcyclohexyl)oxy)methyl)piperidine-1-carboxylate (43) and (2S,3R)-3-(4-ethyl-1H-pyrazol-3-yl)-2-((((CIS)-4-phenylcyclohexyl)oxy)methyl)piperidine-1-carboxylate (44)

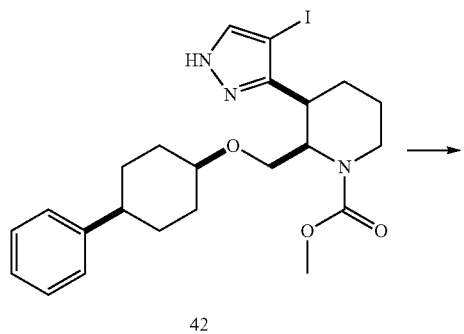

42

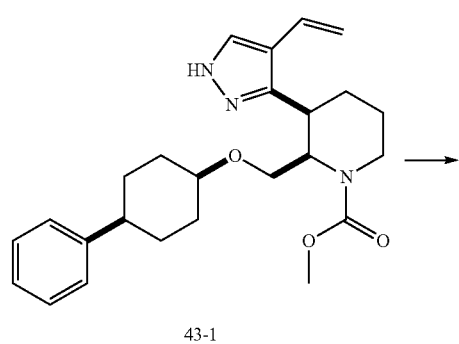

43-1

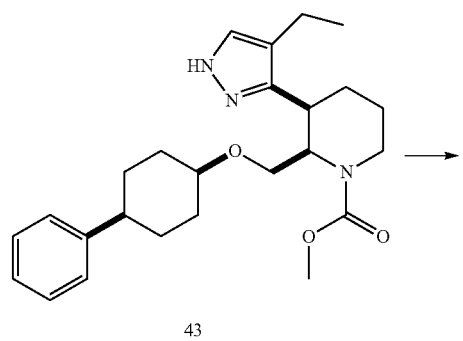

43

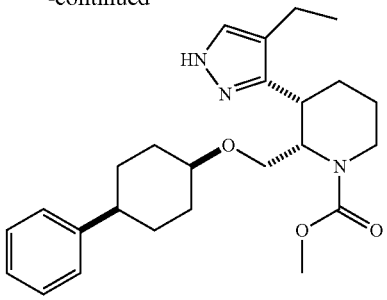

44

Step 1. Preparation of methyl cis-2-((((CIS)-4-phenylcyclohexyl)oxy)methyl)-3-(4-vinyl-1H-pyrazol-5-yl)piperidine-1-carboxylate (43-1)

To a solution of methyl cis-3-(4-iodo-1H-pyrazol-5-yl)-2-((((CIS)-4-phenylcyclohexyl)-oxy)methyl)piperidine-1-carboxylate (50 mg, 0.086 mmol) and potassium vinyltrifluoroborate (17.27 mg, 0.129 mmol) in Dioxane (1 mL) and Water (0.2 mL) were added K₂CO₃ (29.7 mg, 0.215 mmol) and PdCl₂(dppf) (6.29 mg, 8.60 μmol), the resulting mixture was stirred at 90° C. under N₂ protection for 16 h. New spots were found on TLC and LCMS showed the desired product was formed. The reaction mixture was poured into water (2 mL) and extracted with EtOAc (5 mL×3). The combined organic layers were washed with brine (2 mL), dried over Na₂SO₄, filtered and the filtrate was concentrated. The crude product was purified by pre-TLC (SiO₂, pet.ether:EtOAc=2:1) to give the title compound. LCMS m/z (M+H)⁺: $C_{25}H_{33}N_3O_3$ 424.2, found 424.2.

Step 2. Preparation of methyl (2R,3S)-3-(4-ethyl-1H-pyrazol-3-yl)-2-((((CIS)-4-phenylcyclohexyl)oxy)methyl)piperidine-1-carboxylate (43) and (2S,3R)-3-(4-ethyl-1H-pyrazol-3-yl)-2-((((CIS)-4-phenylcyclohexyl)oxy)methyl)piperidine-1-carboxylate (44)

To a solution of methyl cis-2-((((CIS)-4-phenylcyclohexyl)oxy)methyl)-3-(4-vinyl-1H-pyrazol-5-yl)piperidine-1-carboxylate (20 mg, 0.042 mmol) in MeOH (2 mL) was added Pd/C (45.2 mg, 0.042 mmol) (10%). The mixture was stirred at 20° C. under H₂ (excess) (15 psi) for 1 h. LCMS showed desired mass. The mixture was filtered and the filtrate was concentrated to give methyl cis-3-(4-ethyl-1H-pyrazol-3-yl)-2-((((CIS)-4-phenylcyclohexyl)oxy)methyl)-piperidine-1-carboxylate. LCMS m/z (M+H)⁺: $C_{25}H_{35}N_3O_3$ 426.3, found 426.3. The racemic compound was then resolved by SFC-Column: Chiralpak IG-3 50×4.6 mm I.D., 3 um, Mobile phase: A: CO₂ B: methanol (0.05% DEA) Gradient: from 5% to 40% of B in 2 min and hold 40% for 1.2 min, then 5% of B for 0.8 min. Flow rate: 4 mL/min, Column temp.: 35° C. ABPR: 1500 psi. Two compound single enantiomers were obtained:

(2R,3S)-3-(4-ethyl-1H-pyrazol-3-yl)-2-((((CIS)-4-phenylcyclohexyl)oxy)methyl)piperidine-1-carboxylate (43) (Rt=1.525 min). ¹H NMR (400 MHz, CD₃OD) δ 7.42 (brs, 1H), 7.27-7.21 (m, 2H), 7.20-7.16 (m, 2H), 7.15-7.09 (m, 1H), 4.82-4.60 (m, 1H), 4.11 (brd, J=12.52 Hz, 1H), 3.72 (s, 4H), 3.45 (brs, 1H), 3.21-2.96 (m, 3H), 2.63-2.42 (m, 3H), 2.20 (brd, J=12.13 Hz, 1H), 2.01-1.78 (m, 4H), 1.76-1.58 (m, 3H), 1.56-1.40 (m, 4H), 1.30-1.21 (m, 3H).

(2S,3R)-3-(4-ethyl-1H-pyrazol-3-yl)-2-((((CIS)-4-phenylcyclohexyl)oxy)methyl)piperidine-1-carboxylate (44) (Rt=2.124 min). $^1$H NMR (400 MHz, CD$_3$OD) δ 7.42 (brs, 1H), 7.27-7.21 (m, 2H), 7.20-7.15 (m, 2H), 7.14-7.09 (m, 1H), 4.79-4.60 (m, 1H), 4.11 (brd, J=13.30 Hz, 1H), 3.72 (s, 4H), 3.45 (brs, 1H), 3.20-3.00 (m, 3H), 2.64-2.41 (m, 3H), 2.20 (brd, J=11.74 Hz, 1H), 2.03-1.77 (m, 4H), 1.75-1.58 (m, 3H), 1.56-1.39 (m, 4H), 1.30-1.20 (m, 3H).

Example 45, 46, 47, and 48

Methyl (2R,3S)-3-(4-chloro-1H-pyrazol-3-yl)-2-(((((CIS)-4-phenylcyclohexyl)oxy)-methyl)piperidine-1-carboxylate (45). Methyl (2S,3R)-3-(4-chloro-1H-pyrazol-3-yl)-2-(((((CIS)-4-phenylcyclohexyl)oxy)methyl)piperidine-1-carboxylate (46). Methyl cis-3-(4-chloro-1H-pyrazol-3-yl)-2-(((((CIS)-4-(2-chlorophenyl)cyclohexyl)oxy)methyl)piperidine-1-carboxylate (47), and Methyl cis-3-(4-chloro-1H-pyrazol-3-yl)-2-(((((CIS)-4-(4-chlorophenyl)cyclohexyl)-oxy)methyl)piperidine-1-carboxylate (48)

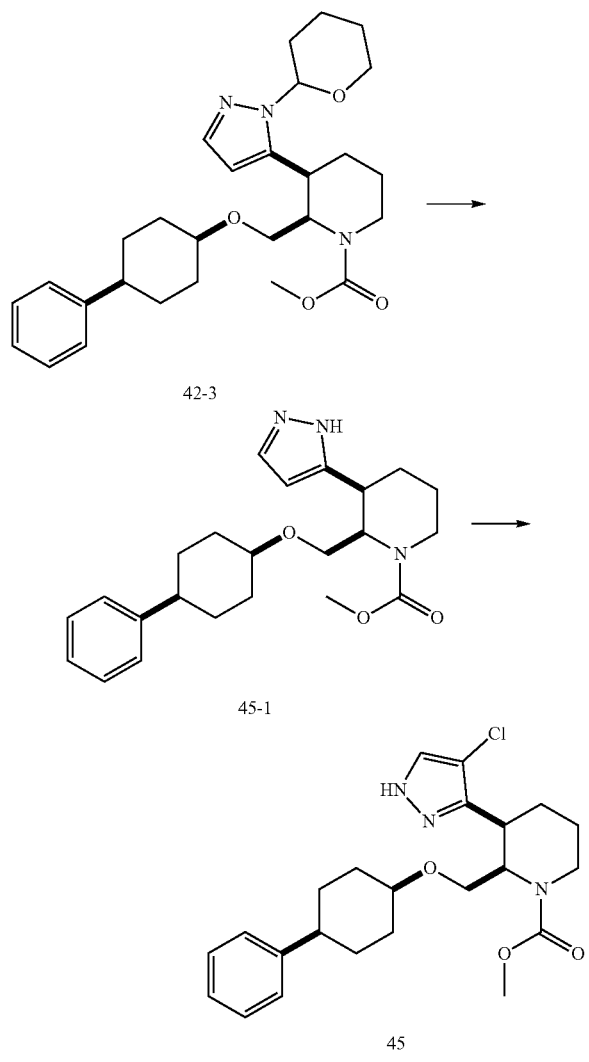

42-3

45-1

45

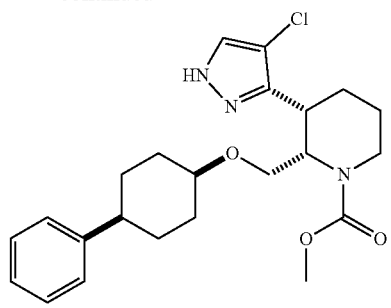

46

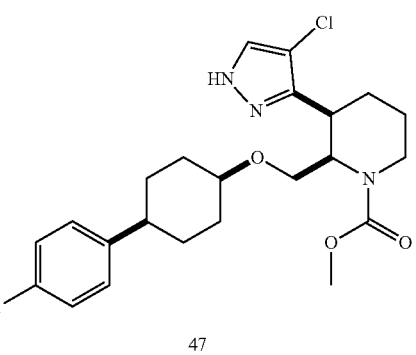

47

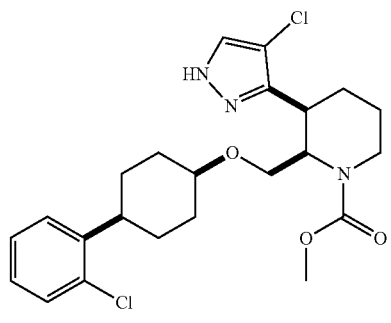

48

Step 1. Preparation of methyl cis-2-(((((CIS)-4-phenylcyclohexyl)oxy)methyl)-3-(1H-pyrazol-5-yl)piperidine-1-carboxylate (45-1)

To a solution of methyl cis-2-(((((CIS)-4-phenylcyclohexyl)oxy)methyl)-3-(1-(tetrahydro-2H-pyran-2-yl)-1H-pyrazol-5-yl)piperidine-1-carboxylate (50 mg, 0.104 mmol) in THF (0.4 mL) and Water (0.2 mL) was added HCl (0.2 mL, 2.435 mmol) (37%), the resulting mixture was stirred at 20° C. for 16 h. LCMS showed desired mass. The mixture was concentrated to give the title compound, which was used in the next step directly. LCMS m/z (M+H)$^+$: C$_{23}$H$_{31}$N$_3$O$_3$ 398.2, found 398.2.

Step 2. Preparation of Methyl (2R,3S)-3-(4-chloro-1H-pyrazol-3-yl)-2-((((CIS)-4-phenylcyclohexyl)oxy)methyl)piperidine-1-carboxylate (45). Methyl (2S,3R)-3-(4-chloro-1H-pyrazol-3-yl)-2-((((CIS)-4-phenylcyclohexyl)oxy)methyl)piperidine-1-carboxylate (46). Methyl cis-3-(4-chloro-1H-pyrazol-3-yl)-2-((((CIS)-4-(2-chlorophenyl)cyclohexyl)oxy)-methyl)piperidine-1-carboxylate (47), and Methyl cis-3-(4-chloro-1H-pyrazol-3-yl)-2-((((CIS)-4-(4-chlorophenyl)cyclohexyl)oxy)methyl)piperidine-1-carboxylate (48)

To a mixture of methyl cis-2-((((CIS)-4-phenylcyclohexyl)oxy)methyl)-3-(1H-pyrazol-5-yl)piperidine-1-carboxylate (40 mg, 0.086 mmol) in $CH_2Cl_2$ (1 mL) were added NCS (22.84 mg, 0.171 mmol) and TFA (6.59 μl, 0.086 mmol), the resulting mixture was stirred at 20° C. for 16 h. LCMS showed desired mass. The mixture was concentrated. The crude product was purified by prep-HPLC (TFA) to give methyl cis-3-(4-chloro-1H-pyrazol-3-yl)-2-((((CIS)-4-phenylcyclohexyl)oxy)methyl)piperidine-1-carboxylate (20 mg, 0.046 mmol, 54.1% yield), along with a mixture of methyl cis-3-(4-chloro-1H-pyrazol-3-yl)-2-((((CIS)-4-(2-chlorophenyl)cyclohexyl)oxy)methyl)piperidine-1-carboxylate and methyl cis-3-(4-chloro-1H-pyrazol-3-yl)-2-((((CIS)-4-(4-chlorophenyl)cyclohexyl)oxy)methyl)piperidine-1-carboxylate (20 mg).

The racemic methyl cis-3-(4-chloro-1H-pyrazol-3-yl)-2-((((CIS)-4-phenylcyclohexyl) oxy)methyl)piperidine-1-carboxylate was then resolved by SFC to give single enantiomers: SFC method: Column: Chiralpak IG-3 50×4.6 mm I.D., 3 um. Mobile phase: A: $CO_2$ B: ethanol (0.05% DEA). Gradient: from 5% to 40% of B in 2 min and hold 40% for 1.2 min, then 5% of B for 0.8 min. Flow rate: 4 mL/min; Column temp.: 35° C.; ABPR: 1500 psi Methyl (2R,3S)-3-(4-chloro-1H-pyrazol-3-yl)-2-((((CIS)-4-phenylcyclohexyl)oxy)methyl) piperidine-1-carboxylate (45) (Rt=1.466 min). LCMS m/z (M+H)$^+$: $C_{23}H_{30}ClN_3O_3$ 432.2, found 432.1. $^1$H NMR (400 MHz, $CD_3OD$) δ 7.65 (brs, 1H), 7.26-7.19 (m, 2H), 7.18-7.14 (m, 2H), 7.13-7.07 (m, 1H), 4.80 (brs, 1H), 4.09 (brd, J=13.69 Hz, 1H), 3.70 (s, 4H), 3.43 (brs, 1H), 3.24-2.99 (m, 3H), 2.50-2.38 (m, 1H), 2.22 (brd, J=13.94 Hz, 1H), 1.98-1.78 (m, 4H), 1.74-1.59 (m, 3H), 1.54-1.37 (m, 4H).

Methyl (2S,3R)-3-(4-chloro-1H-pyrazol-3-yl)-2-((((CIS)-4-phenylcyclohexyl)oxy)methyl) piperidine-1-carboxylate (46) (Rt=2.018 min). LCMS m/z (M+H)$^+$: $C_{23}H_{30}ClN_3O_3$ 432.2, found 432.1. $^1$H NMR (400 MHz, $CD_3OD$) δ 7.64 (brs, 1H), 7.27-7.22 (m, 2H), 7.21-7.16 (m, 2H), 7.15-7.10 (m, 1H), 4.82 (brs, 1H), 4.11 (brd, J=14.09 Hz, 1H), 3.72 (s, 4H), 3.45 (brs, 1H), 3.28-3.02 (m, 3H), 2.46 (brt, J=12.13 Hz, 1H), 2.23 (brs, 1H), 1.99-1.78 (m, 4H), 1.75-1.60 (m, 3H), 1.55-1.40 (m, 4H).

The mixture of methyl cis-3-(4-chloro-1H-pyrazol-3-yl)-2-((((CIS)-4-(2-chlorophenyl)cyclohexyl)oxy)methyl)piperidine-1-carboxylate and methyl cis-3-(4-chloro-1H-pyrazol-3-yl)-2-((((CIS)-4-(4-chlorophenyl)cyclohexyl)oxy)methyl)piperidine-1-carboxylate was separate by SFC to two racemic compounds: Methyl cis-3-(4-chloro-1H-pyrazol-3-yl)-2-((((CIS)-4-(2-chlorophenyl)cyclohexyl)oxy)methyl)piperidine-1-carboxylate (47): LCMS m/z (M+H)$^+$: $C_{23}H_{29}Cl_2N_3O_3$ 466.2, found 466.1. $^1$H NMR (400 MHz, $CD_3OD$) δ 7.71 (brs, 1H), 7.37-7.22 (m, 3H), 7.18-7.07 (m, 1H), 4.82 (brs, 1H), 4.11 (brd, J=13.69 Hz, 1H), 3.72 (s, 4H), 3.48 (brs, 1H), 3.26-2.97 (m, 4H), 2.20 (brd, J=9.39 Hz, 1H), 2.05-1.82 (m, 4H), 1.66 (brs, 3H), 1.54-1.49 (m, 4H) ppm. Methyl cis-3-(4-chloro-1H-pyrazol-3-yl)-2-((((CIS)-4-(4-chlorophenyl)cyclohexyl)oxy) methyl)piperidine-1-carboxylate (48): LCMS m/z (M+H)$^+$: $C_{23}H_{29}Cl_2N_3O_3$ 466.2, found 432.1. $^1$H NMR (400 MHz, $CD_3OD$) δ 7.68 (brs, 1H), 7.30-7.21 (m, 2H), 7.20-7.12 (m, 2H), 4.85-4.78 (brs, 1H), 4.10 (brd, J=14.87 Hz, 1H), 3.71 (s, 4H), 3.45 (brs, 1H), 3.25-2.95 (m, 3H), 2.47 (brt, J=12.33 Hz, 1H), 2.30-2.14 (m, 1H), 2.30-1.76 (m, 3H), 1.66 (brs, 4H), 1.53-1.39 (m, 4H) ppm.

Example 49 and 50

Methyl (2R,3S)-3-(4-isopropyl-1H-pyrazol-3-yl)-2-((((CIS)-4-phenylcyclohexyl)oxy)-methyl)piperidine-1-carboxylate (49) and Methyl (2S,3R)-3-(4-isopropyl-1H-pyrazol-3-yl)-2-((((CIS)-4-phenylcyclohexyl)oxy)methyl)piperidine-1-carboxylate (50)

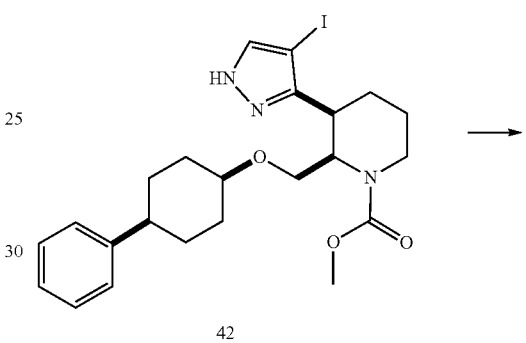

42

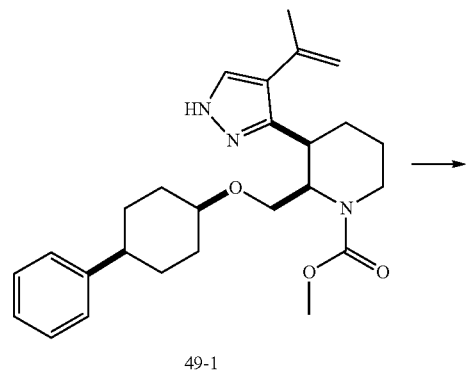

49-1

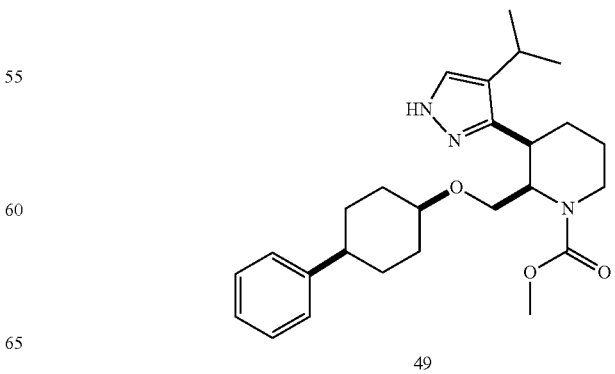

49

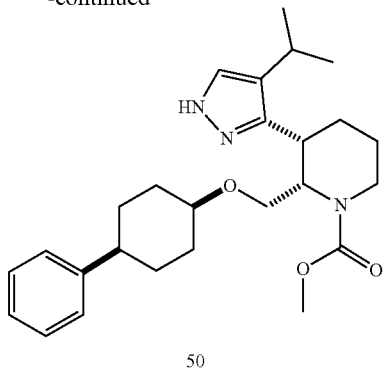

50

Step 1. Preparation of methyl cis-2-(((((CIS)-4-phenylcyclohexyl)oxy)methyl)-3-(4-(prop-1-en-2-yl)-1H-pyrazol-3-yl)piperidine-1-carboxylate (49-1)

To a solution of methyl cis-3-(4-iodo-1H-pyrazol-3-yl)-2-(((((CIS)-4-phenylcyclohexyl)oxy)methyl)piperidine-1-carboxylate (60 mg, 0.103 mmol) and potassium trifluoro(prop-1-en-2-yl)borate (22.90 mg, 0.155 mmol) in Dioxane (1 mL) and Water (0.2 mL) were added $K_2CO_3$ (35.6 mg, 0.258 mmol) and $PdCl_2(dppf)$ (7.55 mg, 10.32 μmol), the resulting mixture was stirred at 90° C. under $N_2$ protection for 16 hours. New spots were found on TLC and LCMS showed the desired product was formed. The reaction mixture was poured into water (2 mL) and extracted with EtOAc (5 mL×3). The combined organic layers were washed with brine (2 mL), dried over $Na_2SO_4$, filtered and the filtrate was concentrated. The crude product was purified by pre-TLC ($SiO_2$, pet.ether:EtOAc=2:1) to give the title compound. LCMS m/z $(M+H)^+$: $C_{26}H_{35}N_3O_3$ calc. 438.2, found 438.3.

Step 2. Preparation of Methyl (2R,3S)-3-(4-isopropyl-1H-pyrazol-3-yl)-2-(((((CIS)-4-phenylcyclohexyl)oxy)methyl)piperidine-1-carboxylate (49) and Methyl (2S,3R)-3-(4-isopropyl-1H-pyrazol-3-yl)-2-(((((CIS)-4-phenylcyclohexyl)oxy)methyl)piperidine-1-carboxylate (50)

To a solution of methyl cis-2-(((((CIS)-4-phenylcyclohexyl)oxy)methyl)-3-(4-(prop-1-en-2-yl)-1H-pyrazol-3-yl)piperidine-1-carboxylate (30 mg, 0.062 mmol) in MeOH (2 mL) was added Pd—C (6.57 mg, 0.062 mmol) (10%). The mixture was stirred at 20° C. under $H_2$ (excess) (15 psi) for 1 h. LCMS showed desired mass. The mixture was filtered and the filtrate was concentrated to give methyl cis-3-(4-isopropyl-1H-pyrazol-3-yl)-2-(((((CIS)-4-phenylcyclohexyl)oxy)methyl) piperidine-1-carboxylate, which was resolved by SFC to give two single enantiomers.

SFC method: Column: Chiralcel OJ-3 100×4.6 mm I.D., 3 um. Mobile phase: A: $CO_2$ B: ethanol (0.05% DEA). Gradient: from 5% to 40% of B in 4 min and hold 40% for 2.5 min, then 5% of B for 1.5 min. Flow rate: 2.8 mL/min; Column temp.: 35° C.; ABPR: 1500 psi Methyl (2S,3R)-3-(4-isopropyl-1H-pyrazol-3-yl)-2-(((((CIS)-4-phenylcyclohexyl)oxy)methyl) piperidine-1-carboxylate (50) (Rt=1.605 min): LCMS m/z $(M+H)^+$: $C_{26}H_{37}N_3O_3$ calc. 440.3, found 440.2. $^1$H NMR (400 MHz, $CD_3OD$) δ 7.44 (s, 1H), 7.27-7.21 (m, 2H), 7.20-7.09 (m, 3H), 4.80-4.58 (m, 1H), 4.11 (brd, J=15.89 Hz, 1H), 3.79 (brs, 1H), 3.90-3.66 (m, 3H), 3.46 (brs, 1H), 3.22-2.83 (m, 4H), 2.46 (brt, J=12.10 Hz, 1H), 2.20 (brd, J=13.21 Hz, 1H), 2.01-1.81 (m, 4H), 1.78-1.58 (m, 3H), 1.55-1.40 (m, 4H), 1.34-1.21 (m, 6H).

Methyl (2R,3S)-3-(4-isopropyl-1H-pyrazol-3-yl)-2-(((((CIS)-4-phenylcyclohexyl)oxy)methyl) piperidine-1-carboxylate (49) (Rt=1.864 min): LCMS m/z $(M+H)^+$: $C_{26}H_{37}N_3O_3$ calc. 440.3, found 440.2. $^1$H NMR (400 MHz, $CD_3OD$) δ 7.44 (s, 1H), 7.26-7.21 (m, 2H), 7.15-7.09 (m, 3H), 4.78-4.59 (m, 1H), 4.11 (brd, J=12.47 Hz, 1H), 3.79 (brs, 1H), 3.72 (s, 3H), 3.50-3.42 (m, 1H), 3.23-2.90 (m, 4H), 2.52-2.40 (m, 1H), 2.26-2.14 (m, 1H), 2.01-1.78 (m, 4H), 1.74-1.60 (m, 3H), 1.58-1.43 (m, 4H), 1.34-1.20 (m, 6H).

Example 51 and 52

Methyl (2R,3S)-3-(4-cyano-1H-pyrazol-3-yl)-2-(((((CIS)-4-phenylcyclohexyl)oxy)methyl)piperidine-1-carboxylate (51) and Methyl (2S,3R)-3-(4-cyano-1H-pyrazol-3-yl)-2-(((((CIS)-4-phenylcyclohexyl)oxy)methyl)piperidine-1-carboxylate (52)

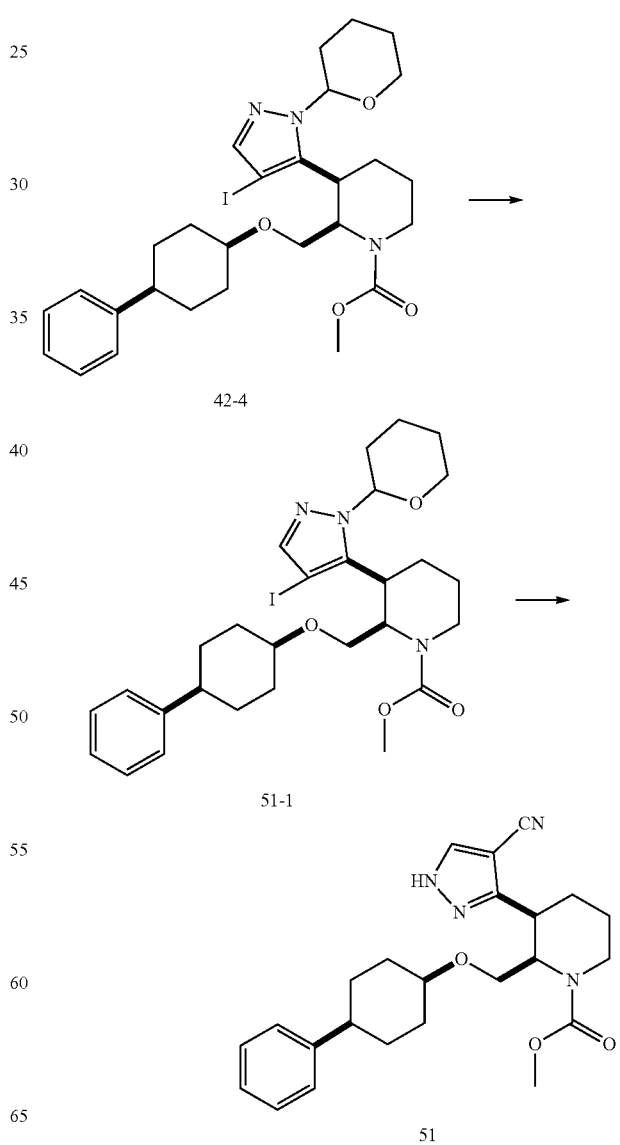

-continued

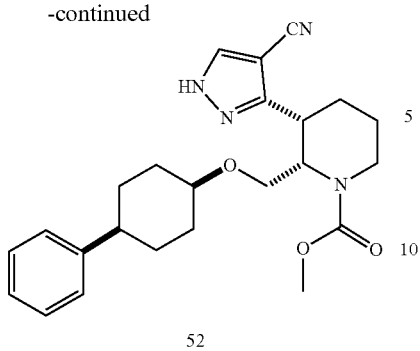

52

Step 1. Preparation of methyl (2R,3S-3-(4-cyano-1-(tetrahydro-2H-pyran-2-yl)-1H-pyrazol-3-yl)-2-((((CIS)-4-phenylcyclohexyl)oxy)methyl)piperidine-1-carboxylate (51-1)

To a solution of methyl cis-3-(4-iodo-1-(tetrahydro-2H-pyran-2-yl)-1H-pyrazol-3-yl)-2-((((CIS)-4-phenylcyclohexyl)oxy)methyl)piperidine-1-carboxylate (150 mg, 0.222 mmol) and zinc cyanide (78 mg, 0.667 mmol) in DMF (3 mL) were added xantphos (25.7 mg, 0.044 mmol) and $Pd_2dba_3$ (20.35 mg, 0.022 mmol), the resulting mixture was stirred at 120° C. under $N_2$ protection for 16 h. New spots were found on TLC and LCMS showed the desired mass. The reaction mixture was poured into water (5 mL) and extracted with EtOAc (10 mL×3). The combined organic layers were washed with brine (10 mL), dried over $Na_2SO_4$, filtered and the filtrate was concentrated. The crude product was purified by pre-TLC ($SiO_2$, pet.ether:EtOAc=2:1) to give the title compound. LCMS m/z $(M+H)^+$: $C_{29}H_{38}N_4O_4$ calc. 507.3, found 507.3.

Step 2. Preparation of Methyl (2R,3S)-3-(4-cyano-1H-pyrazol-3-yl)-2-((((CIS)-4-phenylcyclohexyl)oxy)methyl)piperidine-1-carboxylate (51) and Methyl (2S,3R-3-(4-cyano-1H-pyrazol-3-yl)-2-((((CIS)-4-phenylcyclohexyl)oxy)methyl)piperidine-1-carboxylate (52)

To a mixture of methyl cis-3-(4-cyano-1-(tetrahydro-2H-pyran-2-yl)-1H-pyrazol-3-yl)-2-((((CIS)-4-phenylcyclohexyl)oxy)methyl)piperidine-1-carboxylate (40 mg, 0.071 mmol) in THF (1 mL) and Water (0.5 mL) was added HCl (5.84 μl, 0.071 mmol) (37% wt.), the mixture was stirred at 20° C. for 16 h. LCMS showed desired mass. The mixture was concentrated and purified by prep-TLC ($SiO_2$, pet.ether:EtOAc=1:1) to give methyl cis-3-(4-cyano-1H-pyrazol-3-yl)-2-((((CIS)-4-phenylcyclohexyl)oxy)methyl)piperidine-1-carboxylate (32 mg, 0.068 mmol, 96% yield), which was resolved by SFC to two single enantiomers:

SFC method: Column: Chiralpak IG-3 100×4.6 mm I.D., 3 um. Mobile phase: A: $CO_2$ B: ethanol (0.05% DEA). Gradient: from 5% to 40% of B in 4 min and hold 40% for 2.5 min, then 5% of B for 1.5 min. Flow rate: 2.8 mL/min. Column temp.: 35° C. ABPR: 1500 psi Methyl (2R,3S)-3-(4-cyano-1H-pyrazol-3-yl)-2-((((CIS)-4-phenylcyclohexyl)oxy)methyl) piperidine-1-carboxylate (51) (Rt=2.954 min): LCMS m/z $(M+H)^+$: $C_{24}H_{30}N_4O_3$ calc. 423.3, found 423.2. $^1$H NMR (400 MHz, $CD_3OD$) δ 8.12 (s, 1H), 7.27-7.22 (m, 2H), 7.21-7.16 (m, 2H), 7.15-7.10 (m, 1H), 4.86 (brs, 1H), 4.12 (brd, J=11.74 Hz, 1H), 3.73 (s, 4H), 3.46 (brs, 1H), 3.35 (brdd, J=9.19, 4.11 Hz, 1H), 3.27-3.04 (m, 2H), 2.55-2.43 (m, 1H), 2.32 (brs, 1H), 2.06-1.86 (m, 3H), 1.84-1.61 (m, 4H), 1.56-1.39 (m, 4H) ppm.

Methyl (2S,3R)-3-(4-cyano-1H-pyrazol-3-yl)-2-((((CIS)-4-phenylcyclohexyl)oxy)methyl) piperidine-1-carboxylate (52) (Rt=3.243 min): LCMS m/z $(M+H)^+$: $C_{24}H_{30}N_4O_3$ calc. 423.3, found 423.2. $^1$H NMR (400 MHz, $CD_3OD$) δ 8.12 (s, 1H), 7.27-7.22 (m, 2H), 7.21-7.16 (m, 2H), 7.15-7.10 (m, 1H), 4.86 (brs, 1H), 4.12 (brd, J=12.52 Hz, 1H), 3.73 (s, 4H), 3.46 (brs, 1H), 3.37-3.33 (m, 1H), 3.26-3.02 (m, 2H), 2.53-2.43 (m, 1H), 2.31 (brs, 1H), 2.05-1.87 (m, 3H), 1.81-1.60 (m, 4H), 1.57-1.40 (m, 4H).

Example 53 and 54

Methyl (2R,3S)-3-(4-(hydroxymethyl)-1H-pyrazol-3-yl-2-((((CIS)-4-phenylcyclohexyl)oxy)-methyl) piperidine-1-carboxylate and (53) Methyl (2S,3R)-3-(4-hydroxymethyl-1H-pyrazol-3-yl)-2-((((CIS)-4-phenylcyclohexyl)oxy)methyl)piperidine-1-carboxylate (54)

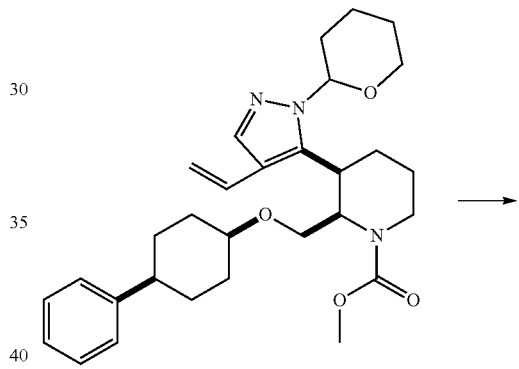

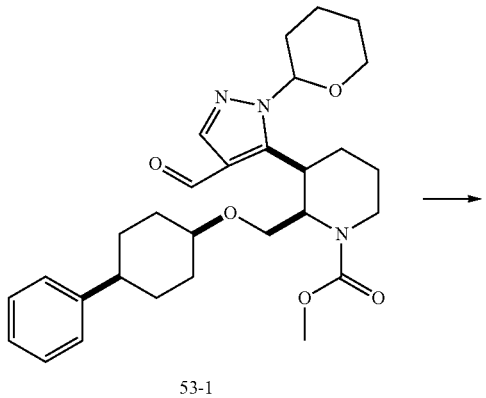

53-1

-continued

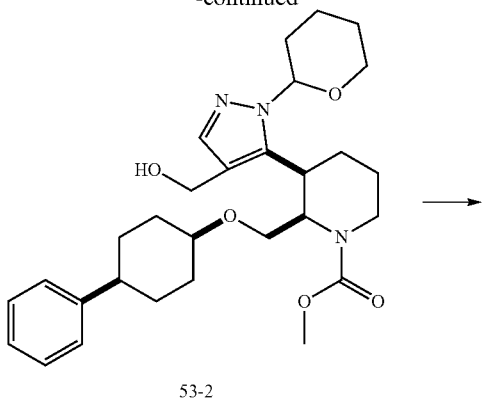

53-2

53

54

Step 1. Preparation of methyl cis-3-(4-formyl-1-(tetrahydro-2H-pyran-2-yl)-1H-pyrazol-3-yl)-2-((((CIS)-4-phenylcyclohexyl)oxy)methyl)piperidine-1-carboxylate (53-1)

To a mixture of methyl cis-2-((((CIS)-4-phenylcyclohexyl)oxy)methyl)-3-(1-(tetrahydro-2H-pyran-2-yl)-4-vinyl-1H-pyrazol-3-yl)piperidine-1-carboxylate (260 mg, 0.552 mmol) and $OsO_4$ (7.02 mg, 0.028 mmol) in THF (4 mL) and Water (4 mL) were added $NaIO_4$ (473 mg, 2.210 mmol), the resulting mixture was stirred at 20° C. for 16 h. New spots were found on TLC and LCMS showed the desired product was formed. The reaction mixture was extracted with EtOAc (5 mL×3). The combined organic layers were washed with aq. $Na_2SO_3$ (20 mL), brine (10 mL), dried over $Na_2SO_4$, filtered and the filtrate was concentrated. The crude product was purified by prep-TLC ($SiO_2$, pet.ether:EtOAc=2:1) to give the title compound. LCMS m/z (M+H)$^+$: $C_{29}H_{39}N_3O_5$ calc. 510.5, found 510.3.

Step 2. Preparation of methyl (2R,3S)-3-(4-(hydroxymethyl)-1-(tetrahydro-2H-pyran-2-yl)-1H-pyrazol-3-yl)-2-((((CIS)-4-phenylcyclohexyl)oxy)methyl)piperidine-1-carboxylate (53-2)

To a mixture of methyl cis-3-(4-formyl-1-(tetrahydro-2H-pyran-2-yl)-1H-pyrazol-3-yl)-2-((((CIS)-4-phenyl cyclohexyl)oxy)methyl)piperidine-1-carboxylate (100 mg, 0.196 mmol) in MeOH (2 mL) was added $NaBH_4$ (14.85 mg, 0.392 mmol) at 0° C., the resulting mixture was stirred at 20° C. for 2 h. LCMS showed desired mass. The mixture was purified by prep-TLC ($SiO_2$, pet.ether:EtOAc=1:1) to give the title compound. LCMS m/z (M+H)$^+$: $C_{29}H_{41}N_3O_5$ calc. 512.5, found 512.3.

Step 3. Preparation of Methyl (2R,3S)-3-(4-(hydroxymethyl)-1H-pyrazol-3-yl)-2-((((CIS)-4-phenylcyclohexyl)oxy)methyl)piperidine-1-carboxylate and (53) Methyl (2S,3R)-3-(4-(hydroxymethyl)-1H-pyrazol-3-yl)-2-((((CIS)-4-phenylcyclohexyl)oxy)methyl)piperidine-1-carboxylate (54)

To a mixture of methyl cis-3-(4-(hydroxymethyl)-1-(tetrahydro-2H-pyran-2-yl)-1H-pyrazol-3-yl)-2-((((CIS)-4-phenylcyclohexyl)oxy)methyl)piperidine-1-carboxylate (50 mg, 0.088 mmol) in THF (0.4 mL) and Water (0.2 mL) was added HCl (0.2 mL, 2.435 mmol) (37%), the mixture was stirred at 20° C. for 16 h. LCMS showed desired mass. The mixture was concentrated. The crude product was purified by prep-TLC ($SiO_2$, pet.ether:EtOAc=1:2) to give methyl cis-3-(4-(hydroxymethyl)-1H-pyrazol-3-yl)-2-((((CIS)-4-phenylcyclohexyl)oxy)methyl)piperidine-1-carboxylate, which was then separated to single enantiomers by SFC:

SFC method: Column: Chiralpak AD-3 150×4.6 mm I.D., 3 um. Mobile phase: A: $CO_2$ B: iso-propanol (0.05% DEA). Gradient: from 5% to 40% of B in 5 min and hold 40% for 2.5 min, then 5% of B for 2.5 min. Flow rate: 2.5 mL/min. Column temp.: 35° C. ABPR: 1500 psi Methyl (2S,3R)-3-(4-(hydroxymethyl)-1H-pyrazol-3-yl)-2-((((CIS)-4-phenylcyclohexyl) oxy) methyl)piperidine-1-carboxylate (54) (Rt=5.201 min): LCMS m/z (M+H)$^+$: $C_{24}H_{33}N_3O_4$ calc. 428.3, found 428.2. $^1$H NMR (400 MHz, $CD_3OD$) δ 7.66 (s, 1H), 7.30-7.21 (m, 2H), 7.19-7.09 (m, 3H), 4.79 (td, J=4.7, 9.4 Hz, 1H), 4.66-4.55 (m, 2H), 4.11 (br d, J=11.0 Hz, 1H), 3.72 (s, 4H), 3.46 (br s, 1H), 3.37-3.33 (m, 1H), 3.13 (br s, 2H), 2.54-2.39 (m, 1H), 2.30-2.15 (m, 1H), 2.00-1.84 (m, 3H), 1.83-1.59 (m, 4H), 1.55-1.39 (m, 4H) ppm.

Methyl (2R,3S)-3-(4-(hydroxymethyl)-1H-pyrazol-3-yl)-2-((((CIS)-4-phenylcyclohexyl) oxy) methyl)piperidine-1-carboxylate (53) (Rt=5.765 min): LCMS m/z (M+H)$^+$: $C_{24}H_{33}N_3O_4$ calc. 428.3, found 428.2. $^1$H NMR (400 MHz, $CD_3OD$) δ 7.67 (s, 1H), 7.28-7.21 (m, 2H), 7.21-7.15 (m, 2H), 7.15-7.09 (m, 1H), 4.79 (td, J=4.6, 9.3 Hz, 1H), 4.67-4.55 (m, 2H), 4.11 (br d, J=10.8 Hz, 1H), 3.72 (s, 4H), 3.69-3.68 (m, 1H), 3.46 (br s, 1H), 3.38-3.34 (m, 1H), 3.13 (br s, 2H), 2.54-2.39 (m, 1H), 2.29-2.14 (m, 1H), 1.98-1.84 (m, 3H), 1.82-1.60 (m, 4H), 1.56-1.37 (m, 4H) ppm.

Example 55 and 56

Methyl (2R,3S)-3-(4-(difluoromethyl)-1H-pyrazol-3-yl)-2-(((((CIS)-4-phenylcyclohexyl)oxy)methyl)piperidine-1-carboxylate (55) and Methyl (2S,3R)-3-(4-(difluoromethyl)-pH-pyrazol-3-yl)-2-(((((CIS)-4-phenylcyclohexyl)oxy)methyl) piperidine-1-carboxylate (56)

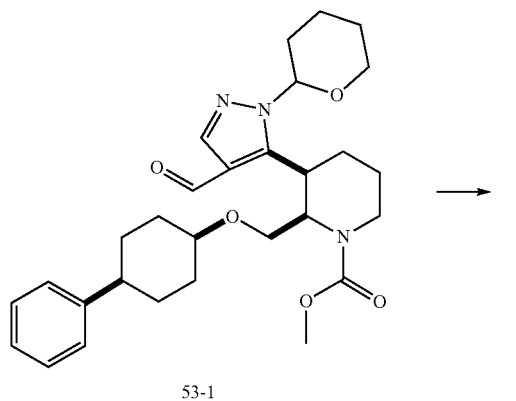

53-1

↓

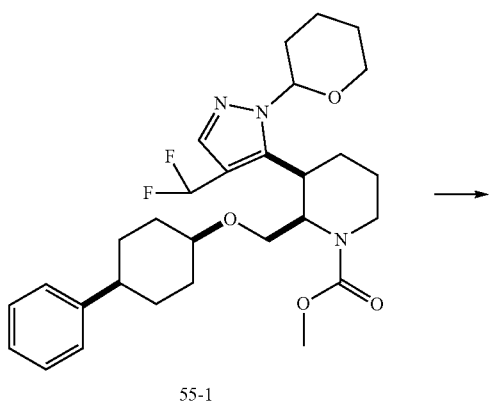

55-1

↓

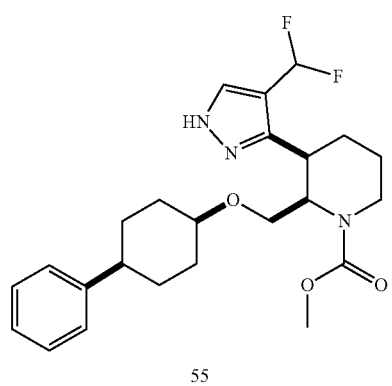

55

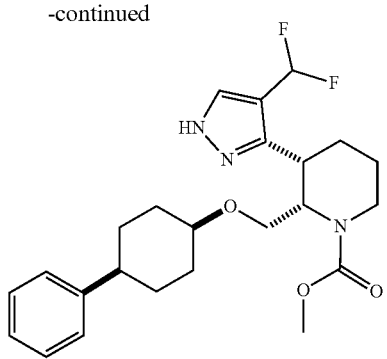

56

Step 1. Preparation of methyl cis-3-(4-(difluoromethyl-1-(tetrahydro-2H-pyran-2-yl-1H-pyrazol-3-yl)-2-(((((CIS)-4-phenylcyclohexyl)oxy)methyl)piperidine-1-carboxylate (55-1)

A mixture of methyl cis-3-(4-formyl-1-(tetrahydro-2H-pyran-2-yl)-1H-pyrazol-3-yl)-2-(((((CIS)-4-phenylcyclohexyl)oxy)methyl)piperidine-1-carboxylate (30 mg, 0.059 mmol) and DAST (0.5 mL, 3.78 mmol) was stirred at 20° C. for 16 h. LCMS showed desired mass and New spot was found on TLC. The reaction mixture was added to $H_2O$ (5 mL) slowly, then extracted with EtOAc (5 mL×3). The combined organic layers were washed with brine (5 mL), dried over $Na_2SO_4$, filtered and the filtrate was concentrated. The crude product was purified by prep-TLC ($SiO_2$, pet.ether:EtOAc=2:1) to give the title compound. LCMS m/z $(M+H)^+$: $C_{29}H_{39}F_2N_3O_4$ calc. 532.3, found 532.5.

Step 2. Preparation of Methyl (2R,3S)-3-(4-(difluoromethyl)-1H-pyrazol-3-yl)-2-(((((CIS)-4-phenylcyclohexyl)oxy)methyl)piperidine-1-carboxylate (55) and Methyl (2S,3R)-3-(4-(difluoromethyl)-1H-pyrazol-3-yl-2-(((((CIS)-4-phenylcyclohexyl)oxy)methyl) piperidine-1-carboxylate (56)

To a mixture of methyl cis-3-(4-(difluoromethyl)-1-(tetrahydro-2H-pyran-2-yl)-1H-pyrazol-3-yl)-2-(((((CIS)-4-phenylcyclohexyl)oxy)methyl)piperidine-1-carboxylate (25 mg, 0.042 mmol) in THF (0.4 mL) and Water (0.2 mL) was added HCl (0.2 mL, 2.435 mmol) (37%), the mixture was stirred at 20° C. for 16 h. The mixture was concentrated. The crude product was purified by prep-TLC ($SiO_2$, pet.ether:EtOAc=1:1) to give methyl cis-3-(4-(difluoromethyl)-1H-pyrazol-3-yl)-2-(((((CIS)-4-phenylcyclohexyl)oxy)methyl)piperidine-1-carboxylate, which was separated to single enantiomers by SFC:

SFC method: Column: Chiralpak AD-3 150×4.6 mm I.D., 3 um. Mobile phase: A: $CO_2$ B: iso-propanol (0.05% DEA). Gradient: from 5% to 40% of B in 5 min and hold 40% for 2.5 min, then 5% of B for 2.5 min. Flow rate: 2.5 mL/min. Column temp.: 35° C. ABPR: 1500 psi Methyl (2R,3S)-3-(4-(difluoromethyl)-1H-pyrazol-3-yl)-2-(((((CIS)-4-phenylcyclohexyl)-oxy)methyl) piperidine-1-carboxylate (55) (Rt=3.561 min): LCMS m/z $(M+H)^+$: $C_{24}H_{31}F_2N_3O_3$ calc. 448.3, found 448.1. $^1H$ NMR (400 MHz, $CD_3OD$) δ 7.82 (s, 1H), 7.27-7.22 (m, 2H), 7.20-7.16 (m, 2H), 7.15-7.09 (m, 1H), 7.07-6.76 (m, 1H), 4.81-4.73 (m, 1H), 4.17-4.05 (m, 1H), 3.72 (s, 4H), 3.50-3.43 (m, 1H), 3.35 (s, 1H), 3.25-3.01 (m, 2H), 2.52-2.42 (m, 1H), 2.25 (br d, J=13.0 Hz, 1H), 1.98-1.85 (m, 3H), 1.84-1.58 (m, 4H), 1.55-1.39 (m, 4H) ppm.

Methyl (2S,3R)-3-(4-(difluoromethyl)-1H-pyrazol-3-yl)-2-((((CIS)-4-phenylcyclohexyl)oxy) methyl) piperidine-1-carboxylate (56) (Rt=4.002 min): LCMS m/z (M+H)$^+$: $C_{24}H_{31}F_2N_3O_3$ calc. 448.3, found 448.1. $^1$H NMR 1010455-043-2 (400 MHz, CD$_3$OD) δ 7.82 (s, 1H), 7.28-7.22 (m, 2H), 7.21-7.16 (m, 2H), 7.15-7.10 (m, 1H), 7.07-6.76 (m, 1H), 4.83-4.75 (m, 1H), 4.11 (br d, J=14.2 Hz, 1H), 3.72 (s, 4H), 3.50-3.43 (m, 1H), 3.35 (br s, 1H), 3.24-3.02 (m, 2H), 2.53-2.42 (m, 1H), 2.25 (br d, J=13.4 Hz, 1H), 1.98-1.86 (m, 3H), 1.85-1.58 (m, 4H), 1.56-1.39 (m, 4H) ppm.

Example 57

Methyl cis-3-(4-(methoxymethyl)-1H-pyrazol-3-yl)-2-((((CIS)-4-phenylcyclohexyl)oxy)methyl)-piperidine-1-carboxylate (57)

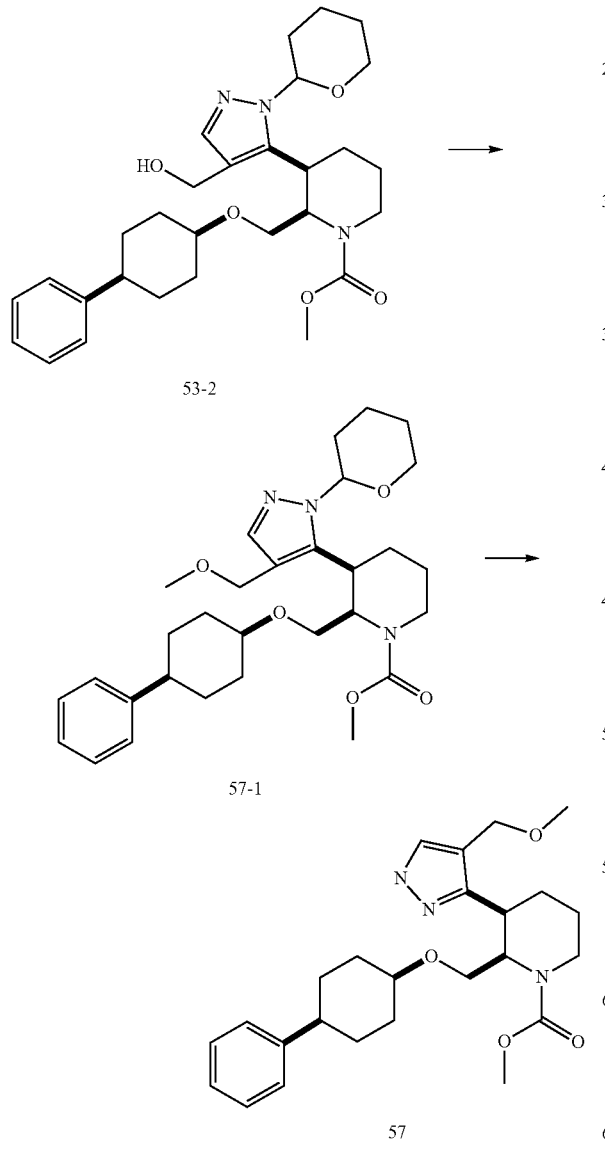

Step 1. Preparation of methyl cis-3-(4-(methoxymethyl)-1-(tetrahydro-2H-pyran-2-yl)-1H-pyrazol-3-yl)-2-((((CIS)-4-phenylcyclohexyl)oxy)methyl)piperidine-1-carboxylate (57-1)

To a solution of methyl cis-3-(4-(hydroxymethyl)-1-(tetrahydro-2H-pyran-2-yl)-1H-pyrazol-3-yl)-2-((((CIS)-4-phenylcyclohexyl)oxy)methyl)piperidine-1-carboxylate (20 mg, 0.039 mmol) in DMF (0.5 mL) was added NaH (1.876 mg, 0.047 mmol) (60%), the mixture was stirred at 0° C. for 10 mins. Then MeI (2.93 μl, 0.047 mmol) in DMF (0.1 mL) was added to the mixture. The mixture was stirred at 20° C. for 16 h. The reaction mixture was poured into water (5 mL) and extracted with EtOAc (5 mL×3). The combined organic layers were washed with brine (10 mL), dried over Na$_2$SO$_4$, filtered and the filtrate was concentrated. The crude product was purified by pre-TLC (SiO$_2$, pet.ether:EtOAc=1:1) to give the title compound. LCMS m/z (M+H)$^+$: $C_{30}H_{43}N_3O_5$ calc. 526.3, found 526.2.

Step 2. Preparation of methyl (CIS)-3-(4-(methoxymethyl)-1H-pyrazol-3-yl)-2-((((CIS)-4-phenylcyclohexyl)oxy)methyl)piperidine-1-carboxylate (57)

To a mixture of methyl cis-3-(4-(methoxymethyl)-1-(tetrahydro-2H-pyran-2-yl)-1H-pyrazol-3-yl)-2-((((CIS)-4-phenylcyclohexyl)oxy)methyl)piperidine-1-carboxylate (10 mg, 0.017 mmol) in THF (0.1 mL) and Water (0.1 mL) was added HCl (0.1 mL, 1.218 mmol) (37%), the mixture was stirred at 20° C. for 16 h. LCMS showed desired mass. New spots were found on TLC. The mixture was concentrated. The crude product was purified by prep-HPLC (TFA) to give the title compound. LCMS m/z (M+H)$^+$: $C_{25}H_{35}N_3O_4$ calc. 442.3, found, 442.6. $^1$H NMR 1010455-040-1 (400 MHz, CD$_3$OD) δ 7.72 (s, 1H), 7.27-7.21 (m, 2H), 7.20-7.10 (m, 3H), 7.10-7.09 (m, 1H), 4.85 (br s, 1H), 4.48-4.38 (m, 2H), 4.11 (br d, J=11.7 Hz, 1H), 3.72 (s, 4H), 3.46 (br s, 1H), 3.40 (s, 3H), 3.30-3.25 (m, 1H), 3.10 (br s, 2H), 2.51-2.41 (m, 1H), 2.28-2.15 (m, 1H), 1.97-1.85 (m, 3H), 1.81-1.59 (m, 4H), 1.54-1.38 (m, 4H) ppm.

Example 58, 59, 60, and 61

N-ethyl-2-(((4-isopropylcyclohexyl)oxy)methyl)-3-(4-methyl-1H-pyrazol-5-yl)piperidine-1-carboxamide (Chiral. Isomer A1) (58), N-ethyl-2-(((4-isopropylcyclohexyl)oxy)methyl)-3-(4-methyl-1H-pyrazol-5-yl)piperidine-1-carboxamide (Chiral. Isomer A2) (59), N-ethyl-2-(((4-isopropylcyclohexyl)oxy)methyl)-3-(4-methyl-1H-pyrazol-5-yl)piperidine-1-carboxamide (Chiral. Isomer B1) (60), and N-ethyl-2-(((4-isopropylcyclohexyl)oxy)methyl)-3-(4-methyl-1H-pyrazol-5-yl)piperidine-1-carboxamide (Chiral. Isomer B2) (61)

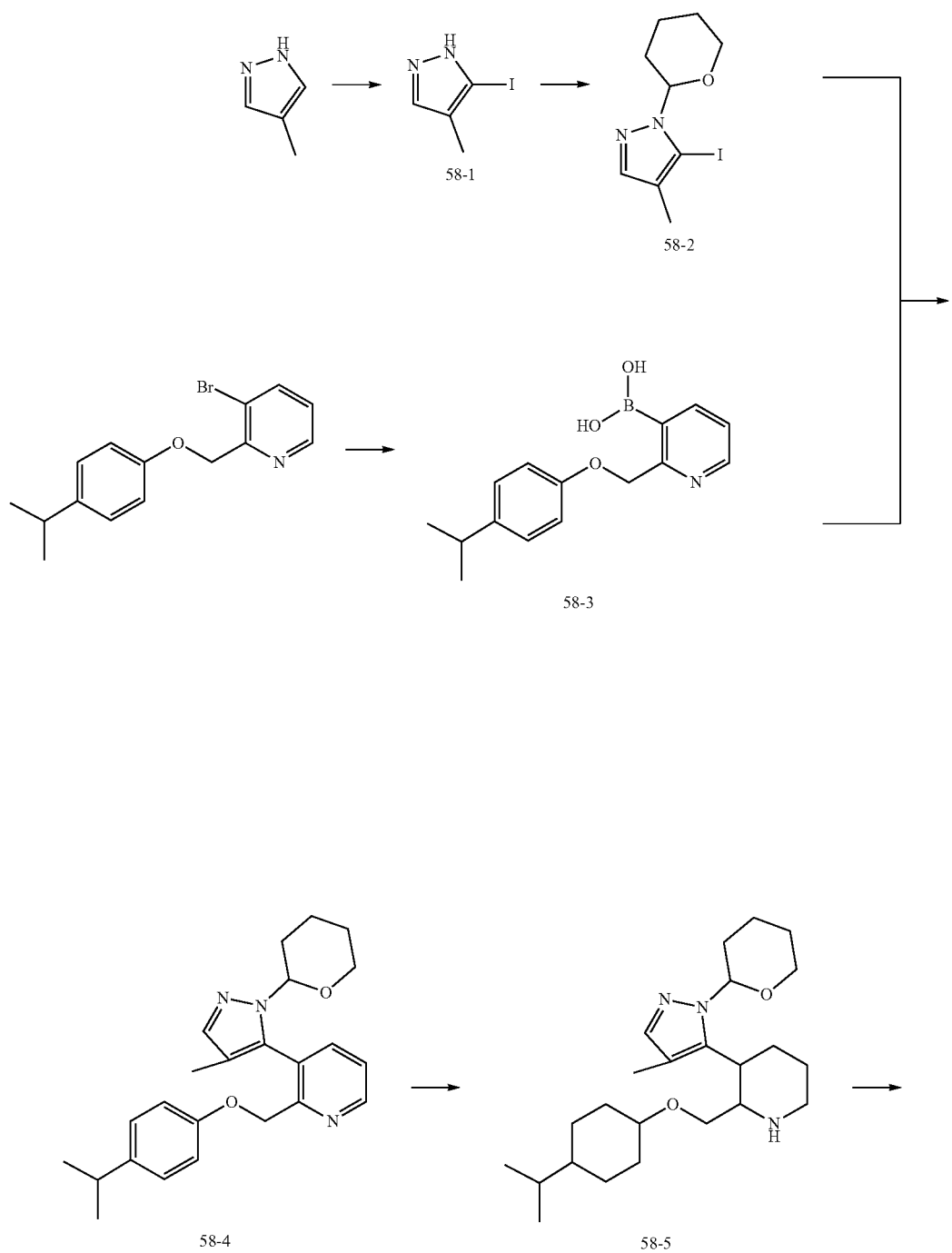

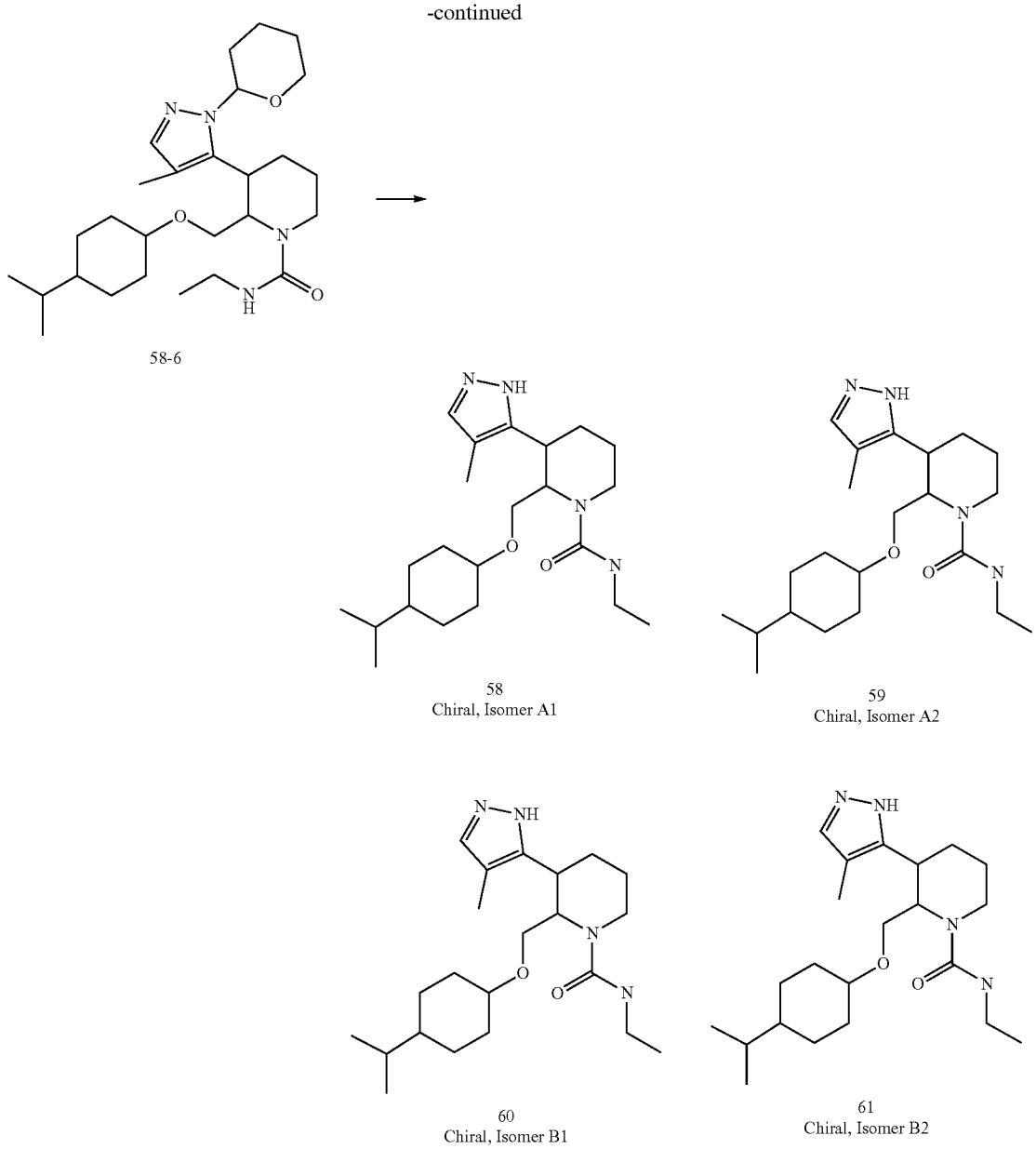

58-6

58
Chiral, Isomer A1

59
Chiral, Isomer A2

60
Chiral, Isomer B1

61
Chiral, Isomer B2

Step 1. Preparation of 3-iodo-4-methyl-1H-pyrazole (58-1)

1-Iodopyrrolidine-2,5-dione (5.62 g, 24.97 mmol) was added portion-wise to a solution of 4-methyl-1H-pyrazole (2.05 g, 24.97 mmol) in MeCN (50 mL). The mixture was heated at 60° C. for 30 minutes, and then cooled to 26° C. The mixture was partitioned between EtOAc (50 mL) and water (30 mL). The organic layer was washed with saturated sodium thiosulfate (20 mL), brine (20 mL), dried (MgSO4) and concentrated under reduced pressure. The residue was purified by silica gel column chromatography (Pet. ether:EtOAc, 1:1) to yield the title compound. LCMS m/z (M+H)$^+$: $C_4H_5IN_2$ calc. 208.9, found 208.9. $^1$H NMR (400 MHz, CDCl$_3$) δ 12.4 (brs, 1H), 7.39 (s, 1H), 2.05 (s, 3H) ppm.

Step 2. Preparation of 5-iodo-4-methyl-1-(tetrahydro-2H-pyran-2-yl)-1H-pyrazole (58-2)

2,2,2-Trifluoroacetic acid (16.45 mg, 0.144 mmol) was added in one portion to a stirred solution of 3-iodo-4-methyl-1H-pyrazole (300 mg, 1.442 mmol) and 3,4-dihydro-2H-pyran (182 mg, 2.163 mmol) dissolved in MeCN (10 mL). The resulting solution was stirred at 60° C. for 12 hours. The organic layer was washed with saturated sodium thiosulfate (20 mL), brine (20 mL), dried (MgSO4) and concentrated under reduced pressure. The residue was purified by silica gel column chromatography (Pet. ether:EtOAc, 1:1) to afford the title compound. LCMS m/z (M+H)$^+$: $C_9H_{13}IN_2O$ calc. 292.9, found 292.9. $^1$H NMR 1008412-070-1 (400 MHz, CDCl$_3$) δ 7.29 (s, 1H), 5.32-5.29 (m, 1H), 4.07-4.03 (m, 1H), 3.70-3.66 (m, 1H), 2.12-2.01 (m, 3H), 1.99 (s, 3H), 1.67-1.64 (m, 3H) ppm.

Step 3. Preparation of (2-((4-isopropylphenoxy) methyl)pyridin-3-yl)boronic acid (58-3)

3-Bromo-2-((4-isopropylphenoxy)methyl)pyridine (1 g, 3.27 mmol) was added to the solution 1,4-dioxane (10 mL) under nitrogen. Then 4,4,4',4',5,5,5',5'-octamethyl-2,2'-bi(1,3,2-dioxaborolane) (0.995 g, 3.92 mmol), [1,1'-Bis(diphenylphosphino)ferrocene]dichloropalladium (0.239 g, 0.327 mmol) and potassium acetate (0.641 g, 6.53 mmol) was added. The mixed solution of the above reactants was heated at a reaction temperature of 90° C. for 3 hours. The mixture was concentrated to give the crude product which was used for next step without purification. LCMS m/z (M+H)$^+$: $C_{15}H_{18}BNO_3$ calc. 272.1, found 272.1.

Step 4. Preparation of 2-((4-isopropylphenoxy) methyl)-3-(4-methyl-1-(tetrahydro-2H-pyran-2-yl)-1H-pyrazol-5-yl)pyridine (58-4)

To the solution of (2-((4-isopropylphenoxy)methyl)pyridin-3-yl)boronic acid THF (15 mL) and Water (2.5 mL) was added 5-iodo-4-methyl-1-(tetrahydro-2H-pyran-2-yl)-1H-pyrazole under nitrogen. Then $Na_2CO_3$ (391 mg, 3.69 mmol), (2-((4-isopropylphenoxy)methyl)pyridin-3-yl)boronic acid (500 mg, 1.844 mmol) and DTBPF G3 (121 mg, 0.184 mmol) were added. The mixed solution of the above reactants was heated under reflux at a reaction temperature of 60° C. for 12 hours. The mixture was poured into water (5 mL), extracted with EtOAc (10 mL*3). The combined organic phase was dried over $Na_2SO_4$, filtered and concentrated. The crude product was chromatographed over silica gel (Pet. ether:EtOAc=5:1) to give the title compound. LCMS m/z (M+H)$^+$: $C_{24}H_{29}N_3O_2$ calc. 379.1, found 379.1. $^1$H NMR (400 MHz, $CD_3OD$) δ 8.69 (d, J=4.4 Hz, 1H), 8.41 (d, J=7.6 Hz, 1H), 8.32 (br s, 1H), 7.38-7.35 (m, 1H), 7.09 (d, J=8.4 Hz, 2H), 6.88 (d, J=8.4 Hz, 2H), 5.65 (brs, 2H), 5.44-5.41 (m, 1H), 4.05-4.01 (m, 1H), 3.72-3.66 (m, 1H), 2.88-2.81 (m, 1H), 1.98-1.93 (m, 3H), 1.71-1.63 (m, 3H), 1.21 (d, J=7.2 Hz, 6H) ppm.

Step 5. Preparation of 2-(((4-isopropylcyclohexyl) oxy)methyl)-3-(4-methyl-1-(tetrahydro-2H-pyran-2-yl)-1H-pyrazol-5-yl)piperidine (58-5)

The mixture of 2-((4-isopropylphenoxy)methyl)-3-(4-methyl-1-(tetrahydro-2H-pyran-2-yl)-1H-pyrazol-5-yl)pyridine (250 mg, 0.629 mmol), rhodium (647 mg, 0.314 mmol) (rhodium 5 wt % on carbon, powder) in EtOH (10 mL)/AcOH (0.2 mL) and the mixture was stirred at 70° C. under $H_2$ (50 psi) overnight. The mixture was filtered. And the pH of the mixture was adjusted with sat aq $Na_2CO_3$ (5 mL). The mixture was filtered, washed with methanol, DCM. The filtrate was concentrated, dried to get 2-(((4-isopropylcyclohexyl)oxy)methyl)-3-(4-methyl-1-(tetrahydro-2H-pyran-2-yl)-1H-pyrazol-5-yl)piperidine. The crude product was used for next step without purification. LCMS m/z (M+H)$^+$: $C_{24}H_{41}N_3O_2$ calc. 404.2, found, 404.2.

Step 6. Preparation of N-ethyl-2-(((4-isopropylcyclohexyl)oxy)methyl)-3-(4-methyl-1-(tetrahydro-2H-pyran-2-yl)-1H-pyrazol-5-yl)piperidine-1-carboxamide (58-6)

Isocyanatoethane (69.7 mg, 0.981 mmol) was added to a stirred, cooled 0° C. mixture of 2-(((4-isopropylcyclohexyl) oxy)methyl)-3-(4-methyl-1-(tetrahydro-2H-pyran-2-yl)-1H-pyrazol-5-yl)piperidine (330 mg, 0.818 mmol), triethylamine (91 mg, 0.899 mmol) in DCM (10 mL)) and the mixture was stirred at room temperature for 15 min. The reaction was quenched with ethyl amine (0.5 mL 1M). The mixture was concentrated, dried to get the title compound. The crude product was used for next step without further purification. LCMS m/z (M+H)$^+$: $C_{27}H_{46}N_4O_3$ calc. 475.3, found 475.3.

Step 7. Preparation of N-ethyl-2-(((4-isopropylcyclohexyl)oxy)methyl)-3-(4-methyl-1H-pyrazol-5-yl)piperidine-1-carboxamide (Chiral. Isomer A1) (58), N-ethyl-2-(((4-isopropylcyclohexyl)oxy) methyl)-3-(4-methyl-1H-pyrazol-5-yl)piperidine-1-carboxamide (Chiral. Isomer A2) (59), N-ethyl-2-(((4-isopropylcyclohexyl)oxy)methyl)-3-(4-methyl-1H-pyrazol-5-yl)piperidine-1-carboxamide (Chiral. Isomer B1) (60), and N-ethyl-2-(((4-isopropylcyclohexyl)oxy)methyl)-3-(4-methyl-1H-pyrazol-5-yl) piperidine-1-carboxamide (Chiral. Isomer B2) (61)

N-ethyl-2-(((4-isopropylcyclohexyl)oxy)methyl)-3-(4-methyl-1-(tetrahydro-2H-pyran-2-yl)-1H-pyrazol-5-yl)piperidine-1-carboxamide (350 mg, 0.434 mmol) in 4M HCl Dioxnae (5 mL) was stirred at 28° C. for 12 h. The mixture was concentrated, dried, redissolved in MeCN (2 mL), filtered. The crude was purified by preparative HPLC (TFA) to give N-ethyl-2-(((4-isopropylcyclohexyl)oxy)methyl)-3-(4-methyl-1H-pyrazol-5-yl)piperidine-1-carboxamide Peak A and mixtures of N-ethyl-2-(((4-isopropylcyclohexyl)oxy) methyl)-3-(4-methyl-1H-pyrazol-5-yl)piperidine-1-carboxamide Peak B. LCMS m/z (M+H)$^+$: $C_{22}H_{38}N_4O_2$ calc. 391.2, found 391.2.

N-ethyl-2-(((4-isopropylcyclohexyl)oxy)methyl)-3-(4-methyl-1H-pyrazol-5-yl)piperidine-1-carboxamide Peak A was resolved by SFC (Method Set: AD_3_IPA_DEA_5_40_25ML) to afford two single compounds.

N-ethyl-2-(((4-isopropylcyclohexyl)oxy)methyl)-3-(4-methyl-1H-pyrazol-5-yl)piperidine-1-carboxamide Peak A1(58): Rt=3.66 min. LCMS m/z (M+H)$^+$: $C_{22}H_{38}N_4O_2$ calc. 391.2, found 391.2. $^1$H NMR (400 MHz, $CD_3OD$) δ 7.36 (s, 1H), 4.44 (brs, 1H), 4.00-3.91 (m, 1H), 3.76 (t, J=10.0 Hz, 1H), 3.22-3.16 (m, 3H), 3.12-3.07 (m, 1H), 3.05-2.96 (m, 2H), 2.16-2.09 (m, 3H), 1.95-1.82 (m, 4H), 1.71-1.69 (m, 2H), 1.62-1.58 (m, 1H), 1.41-1.31 (m, 2H), 1.17 (t, J=7.2 Hz, 3H), 1.02-0.92 (m, 5H), 0.85 (d, J=7.2 Hz, 6H) ppm.

N-ethyl-2-(((4-isopropylcyclohexyl)oxy)methyl)-3-(4-methyl-1H-pyrazol-5-yl)piperidine-1-carboxamide Peak A2 (59): Rt=4.25 min. LCMS m/z (M+H)$^+$: $C_{22}H_{35}N_4O_2$ calc. 391.2, found 391.2.

$^1$H NMR (400 MHz, $CD_3OD$) δ 7.36 (s, 1H), 4.44 (brs, 1H), 4.44 (brs, 1H), 4.01-3.96 (m, 1H), 3.76 (t, J=10.0 Hz, 1H), 3.23-3.14 (m, 3H), 3.12-3.08 (m, 1H), 3.05-2.96 (m, 2H), 2.18-2.09 (m, 3H), 1.95-1.82 (m, 4H), 1.71-1.69 (m, 2H), 1.64-1.56 (m, 1H), 1.43-1.27 (m, 2H), 1.17 (t, J=7.2 Hz, 3H), 1.05-0.88 (m, 5H), 0.84 (d, J=7.2 Hz, 6H) ppm.

N-ethyl-2-(((4-isopropylcyclohexyl)oxy)methyl)-3-(4-methyl-1H-pyrazol-5-yl)piperidine-1-carboxamide Peak B was resolved by SFC to give two products:

N-ethyl-2-(((4-isopropylcyclohexyl)oxy)methyl)-3-(4-methyl-1H-pyrazol-5-yl)piperidine-1-carboxamide Peak B1 (60): Rt=5.61 min. LCMS m/z (M+H)$^+$: $C_{22}H_{38}N_4O_2$ calc. 391.2, found 391.2. $^1$H NMR (400 MHz, $CD_3OD$) δ 7.36 (s, 1H), 4.45 (brs, 1H), 4.06-4.00 (m, 1H), 3.71 (t, J=10.0 Hz, 1H), 3.35-3.34 (m, 1H), 3.22-3.09 (m, 4H), 3.03-2.97 (m, 1H), 2.20-2.12 (m, 3H), 1.86-1.83 (m, 3H), 1.73-1.70 (m, 2H), 1.40-1.16 (m, 8H), 1.12 (t, J=7.2 Hz, 3H), 1.04-0.97 (m, 1H), 0.84 (d, J=6.0 Hz, 6H) ppm.

N-ethyl-2-(((4-isopropylcyclohexyl)oxy)methyl)-3-(4-methyl-1H-pyrazol-5-yl)piperidine-1-carboxamide Peak B1 (61): Rt=6.06 min. LCMS m/z (M+H)$^+$: $C_{22}H_{38}N_4O_2$ calc. 391.2, found 391.2. $^1$H NMR (400 MHz, CD$_3$OD) δ 7.36 (s, 1H), 4.44 (brs, 1H), 4.05-3.99 (m, 1H), 3.70 (t, J=10.0 Hz, 1H), 3.35-3.34 (m, 1H), 3.23-3.08 (m, 4H), 3.02-2.96 (m, 1H), 2.19-2.11 (m, 3H), 1.85-1.82 (m, 3H), 1.72-1.55 (m, 2H), 1.39-1.14 (m, 8H), 1.12 (t, J=7.2 Hz, 3H), 1.03-0.96 (m, 1H), 0.84 (d, J=6.0 Hz, 6H) ppm.

Example 62 and 63

N-ethyl-2-(((((CIS)-4-isopropylcyclohexyl)oxy)methyl)-3-(1H-1,2,4-triazol-3-yl)piperidine-1-carboxamide (Isomer A) (62), N-ethyl-2-(((((CIS)-4-isopropylcyclohexyl)oxy)methyl)-3-(1H-1,2,4-triazol-3-yl)piperidine-1-carboxamide (Isomer B) (63)

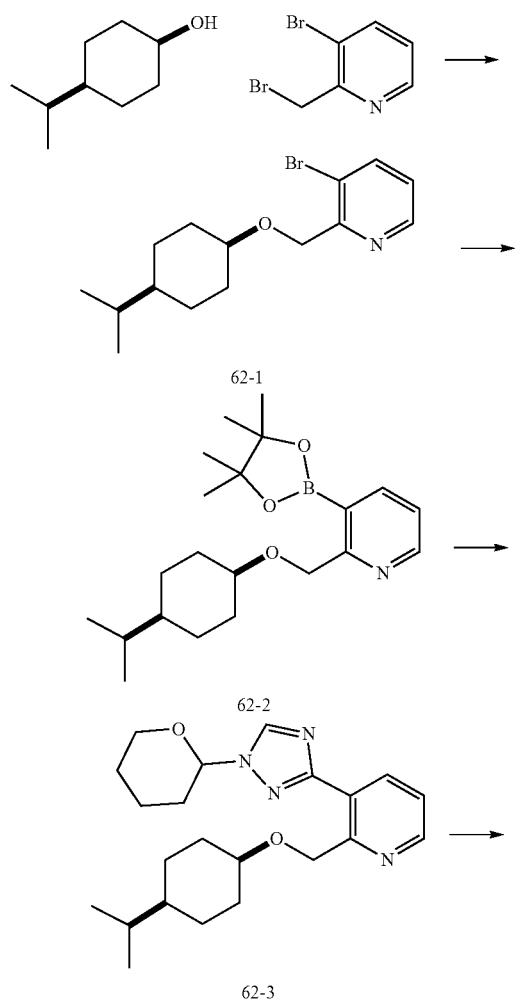

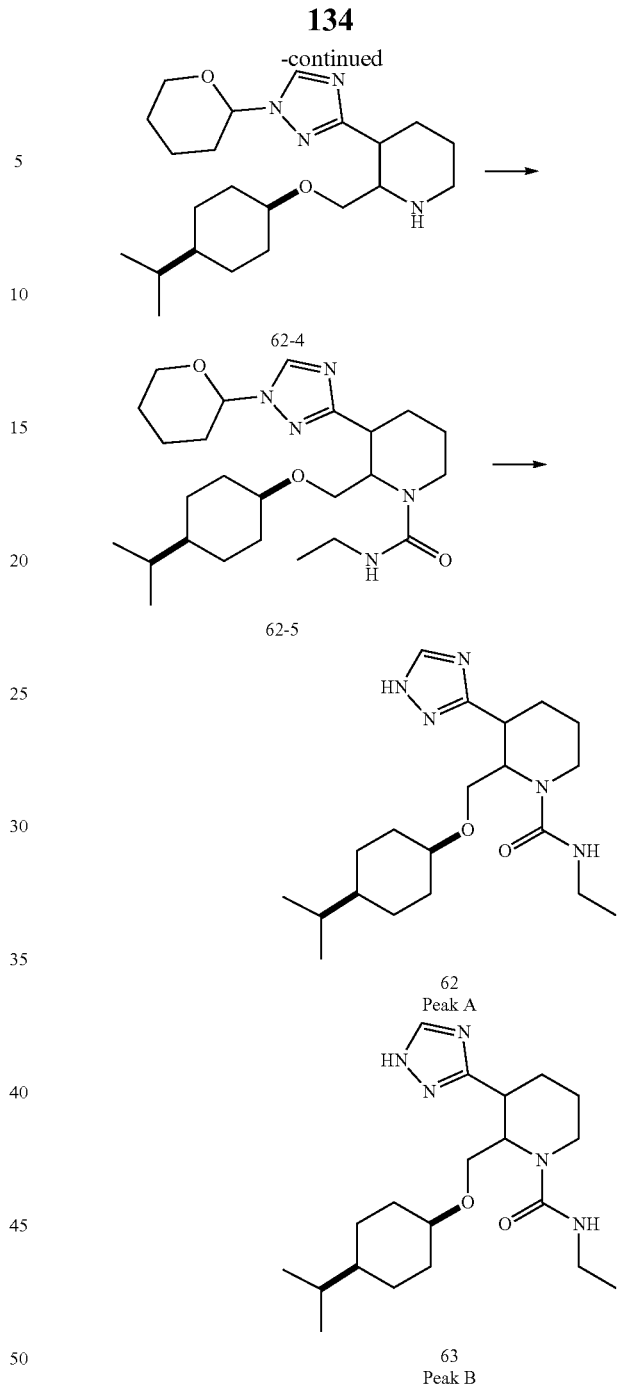

Step 1. Preparation of 3-bromo-2-(((((CIS)-4-isopropylcyclohexyl)oxy)methyl)pyridine (62-1)

To a solution of (cis)-4-isopropylcyclohexanol (200 mg, 1.406 mmol) in anhydrous DMF (5 mL) added NaH (84 mg, 2.109 mmol) and 3-bromo-2-bromomethyl pyridine (353 mg, 1.406 mmol) at 0° C. The resulting mixture was stirred at 0° C. for 2 h. 5 mL H$_2$O was added to the reaction mixture carefully. The mixture was extracted with EtOAc (5 mL×3). The organic phase was dried over Na$_2$SO$_4$, filtered and concentrated. The residue was purified by silica gel column chromatography (Pet.ether/EtOAc=5:1) to give the title compound.

Step 2. Preparation of 2-(((((CIS)-4-isopropylcyclohexyl)oxy)methyl)-3-(4,4,5,5-tetramethyl-1,3,2-dioxaborolan-2-yl)pyridinel, 3,2-dioxaborolan-2-yl)pyridine (62-2)

To a mixture of 3-bromo-2-(((((CIS)-4-isopropylcyclohexyl)oxy)methyl)pyridine (120 mg, 0.384 mmol) in 1,4-Dioxane (3 mL) were added 4,4,4',4',5,5,5',5'-octamethyl-2,2'-bi(1,3,2-dioxaborolane) (117 mg, 0.461 mmol), [1,1'-bis(diphenylphosphino)ferrocene]dichloropalladium(II) (28.1 mg, 0.038 mmol) and potassium acetate (75 mg, 0.769 mmol) at 20° C. under $N_2$. The mixed solution of the above reactants was heated at a reaction temperature of 90° C. for 3 hours. The mixture was concentrated to give the crude product and the crude product was used for next step without purification. LCMS m/z (M+H)$^+$: $C_{21}H_{34}BNO_3$ calc. 278.2, found, 278.1.

Step 3. Preparation of 2-(((((CIS)-4-isopropylcyclohexyl)oxy)methyl)-3-(1-(tetrahydro-2H-pyran-2-yl)-1H-1,2,4-triazol-3-yl)pyridine (62-3)

In a 50 mL three-necked flask, nitrogen was introduced, added 3-bromo-1-(tetrahydro-2H-pyran-2-yl)-1H-1,2,4-triazole (100 mg, 0.433 mmol) to the solution THF (10 mL) and Water (2 mL). Then $Na_2CO_3$ (76 mg, 0.722 mmol), 2-(((((CIS)-4-isopropylcyclohexyl)oxy)methyl)-3-(4,4,5,5-tetramethyl-1,3,2-dioxaborolan-2-yl)pyridine (100 mg, 0.361 mmol) and 1,1'-bis(di-tert-butylphosphino)ferrocene palladium dichloride (23.51 mg, 0.036 mmol) were added. The mixed solution of the above reactants was heated at of 60° C. for 12 hours. Then the mixture was concentrated and purified by prep-TLC (EtOAc) to give the title compound. LCMS m/z (M+H)$^+$: $C_{22}H_{32}N_4O_2$ calc. 385.2, found 385.2.

Step 4. Preparation of 2-(((((CIS)-4-isopropylcyclohexyl)oxy)methyl)-3-(1-(tetrahydro-2H-pyran-2-yl)-1H-1,2,4-triazol-3-yl)piperidine (62-4)

To a mixture of 2-(((((CIS)-4-isopropylcyclohexyl)oxy)methyl)-3-(1-(tetrahydro-2H-pyran-2-yl)-1H-1,2,4-triazol-3-yl)pyridine (100 mg, 0.260 mmol) in MeOH (5 mL) and AcOH (0.5 mL) was added rhodium (535 mg, 0.260 mmol) (rhodium 5 wt % on carbon, powder). Then the mixture was stirred at 70° C. under 50 psi $H_2$ for 48 h. The reaction mixture was filtrated and concentrated by vacuo to give the title compound. LCMS m/z (M+H)$^+$: $C_{22}H_{38}N_4O_2$ calc. 391.2, found 391.2.

Step 5. Preparation of N-ethyl-2-(((((CIS)-4-isopropylcyclohexyl)oxy)methyl)-3-(1-(tetrahydro-2H-pyran-2-yl)-1H-1,2,4-triazol-3-yl)piperidine-1-carboxamide (62-5)

Isocyanatoethane (10.92 mg, 0.154 mmol) was added to a stirred, cooled 0° C. mixture of 2-(((((CIS)-4-isopropylcyclohexyl)oxy)methyl)-3-(1-(tetrahydro-2H-pyran-2-yl)-1H-1,2,4-triazol-3-yl)piperidine (50 mg, 0.128 mmol), triethylamine (14.25 mg, 0.141 mmol) in DCM (10 mL)) and the mixture was stirred at 20° C. for 15 min. The reaction was quenched with ethyl amine (0.5 mL 1M). Then the reaction mixture was concentrated, dried and purified by prep-HPLC (water (0.04% $NH_3H_2O$+10 mM $NH_4HCO_3$)-ACN) to get the title compound. LCMS m/z (M+H)$^+$: $C_{25}H_{43}N_5O_3$ calc. 462.6, found 462.6.

Step 6. Preparation of N-ethyl-2-(((((CIS)-4-isopropylcyclohexyl)oxy)methyl-3-(1H-1,2,4-triazol-3-yl)piperidine-1-carboxamide (Isomer A) (62), N-ethyl-2-(((((CIS)-4-isopropylcyclohexyl)oxy)methyl-3-(1H-1,2,4-triazol-3-yl)piperidine-1-carboxamide (Isomer B) (63)

N-ethyl-2-(((((CIS)-4-isopropylcyclohexyl)oxy) methyl)-3-(1-(tetrahydro-2H-pyran-2-yl)-1H-1,2,4-triazol-3-yl)piperidine-1-carboxamide (20 mg, 0.043 mmol) in 4M HCl Dioxnae (5 mL) was stirred at 20° C. for 12 h. The mixture was then concentrated, dried, redissolved in MeCN (2 mL), filtered. The filtrate was purified by preparative HPLC (water (0.1% TFA)-ACN) to give N-ethyl-2-(((((CIS)-4-isopropylcyclohexyl)oxy)methyl)-3-(1H-1,2,4-triazol-3-yl)piperidine-1-carboxamide (16 mg, 0.038 mmol, 88% yield), which was then resolved by SFC: SFC condition: Instrument SFC-12. Method Column Phenomenex-Amylose-1 (250 mm*30 mm, 5 um). Condition 0.1% $NH_3H2O$ ETOH Begin B 15%. End B 15% Gradient Time (min). 100% B Hold Time (min) FlowRate (ml/min) 50

N-ethyl-2-(((((CIS)-4-isopropylcyclohexyl)oxy)methyl)-3-(1H-1,2,4-triazol-3-yl)piperidine-1-carboxamide Peak A (62): Rt=2.85 min. LCMS m/z (M+H)$^+$: $C_{20}H_{35}N_5O$ calc. 378.2, found 378.2. $^1$H NMR (400 MHz, CD3Cl) δ 8.07 (s, 1H), 5.48 (br s, 1H), 4.53 (br s, 1H), 4.26 (br d, J=12.5 Hz, 1H), 3.80-3.61 (m, 1H), 3.40-3.33 (m, 1H), 3.32-3.09 (m, 4H), 2.92 (br s, 1H), 2.18-1.94 (m, 2H), 1.92-1.72 (m, 2H), 1.71-1.51 (m, 2H), 1.45-1.30 (m, 3H), 1.29-1.20 (m, 3H), 1.20-1.06 (m, 4H), 1.02-0.90 (m, 1H), 0.80 (d, J=6.7 Hz, 6H) ppm.

N-ethyl-2-(((((CIS)-4-isopropylcyclohexyl)oxy)methyl)-3-(1H-1,2,4-triazol-3-yl)piperidine-1-carboxamide Peak B (63): Rt=3.08 min. LCMS m/z (M+H)$^+$: $C_{20}H_{35}N_5O$ calc. 378.2, found 378.2. $^1$H NMR (400 MHz, CD3Cl) δ 8.09 (s, 1H), 5.48 (br s, 1H), 4.54 (br s, 1H), 4.26 (br d, J=11.7 Hz, 1H), 3.68 (br t, J=9.6 Hz, 1H), 3.37 (br s, 1H), 3.33-3.10 (m, 4H), 2.93 (br t, J=12.7 Hz, 1H), 2.19-1.96 (m, 2H), 1.93-1.72 (m, 2H), 1.71-1.53 (m, 2H), 1.45-1.21 (m, 6H), 1.19-1.03 (m, 4H), 0.98 (dt, J=3.1, 6.8 Hz, 1H), 0.80 (d, J=6.7 Hz, 6H) ppm.

Example 64

Methyl (CIS)-3-(6-hydroxypyridin-2-yl)-2-(((((CIS)-4-phenylcyclohexyl)oxy)methyl)piperidine-1-carboxylate

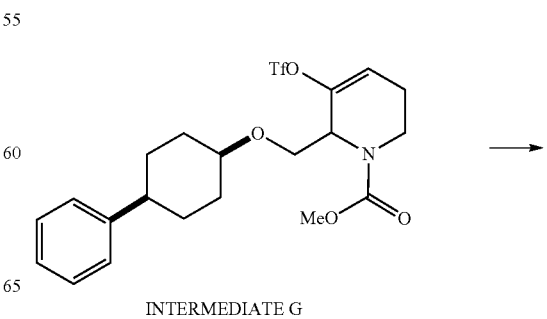

INTERMEDIATE G

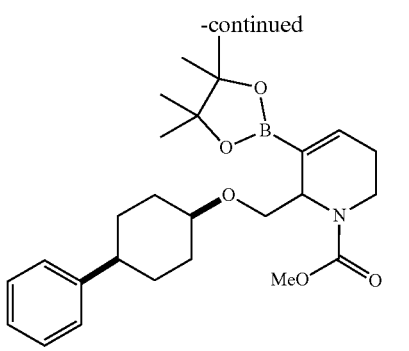

64-1

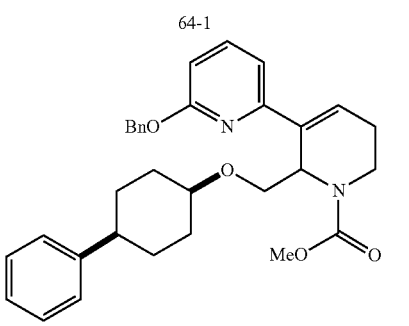

64-2

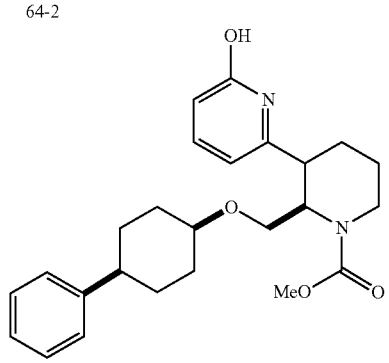

64

Step 1. Preparation of methyl 6-(((((CIS)-4-phenyl-cyclohexyl)oxy)methyl)-5-(4,4,5,5-tetramethyl-1,3,2-dioxaborolan-2-yl)-3,4-dihydropyridine-1(2H)-carboxylate (64-1)

To a mixture of methyl 6-(((((CIS)-4-phenylcyclohexyl)oxy)methyl)-5-(((trifluoromethyl)sulfonyl)oxy)-3,4-dihydropyridine-1(2H)-carboxylate Intermediate G (400 mg, 0.838 mmol), 4,4,4',4',5,5,5',5'-octamethyl-2,2'-bi(1,3,2-dioxaborolane) (319 mg, 1.257 mmol) and potassium acetate (247 mg, 2.51 mmol) in 1,4-Dioxane (10 mL) was added PdCl$_2$(dppf) (61.3 mg, 0.084 mmol), and the resulting mixture was stirred at 80° C. under N$_2$ protection for 4 h. The mixture was concentrated to afford the title compound, which was used in the next steps directly. LCMS m/z (M+H)$^+$: C$_{26}$H$_{38}$BNO$_5$ calc. 456.3, found 456.2.

Step 2. Preparation of methyl 6-(benzyloxy)-2'-(((((CIS)-4-phenylcyclohexyl)oxy)methyl)-5',6'-dihydro-[2,3'-bipyridine]-1'(4'H)-carboxylate (64-2)

To a mixture of methyl 6-(((((CIS)-4-phenylcyclohexyl)oxy)methyl)-5-(4,4,5,5-tetramethyl-1,3,2-dioxaborolan-2-yl)-3,4-dihydropyridine-1(2H)-carboxylate (80 mg, 0.088 mmol) (50% in 2 mL dioxane), 2-(benzyloxy)-6-bromopyridine (46.4 mg, 0.176 mmol) and Na$_2$CO$_3$ (27.9 mg, 0.264 mmol) in Water (0.5 mL) was added PdCl$_2$(dppf) (6.43 mg, 8.78 μmol), the resulting mixture was stirred at 120° C. under N$_2$ protection for 1 h. The reaction mixture was filtered and concentrated. The residue was purified by prep-TLC (SiO$_2$, pet.ether:EtOAc=5:1) to give the title compound. LCMS m/z (M+H)$^+$: C$_{32}$H$_{36}$N$_2$O$_4$ calc. 513.2, found 512.3.

Step 3. Preparation of methyl (CIS)-3-(6-hydroxy-pyridin-2-yl)-2-(((((CIS)-4-phenylcyclohexyl)oxy)methyl)piperidine-1-carboxylate (64)

To a mixture of methyl 6-(benzyloxy)-2'-(((((CIS)-4-phenylcyclohexyl)oxy)methyl)-5',6'-dihydro-[2,3'-bipyridine]-1'(4'H)-carboxylate (25 mg, 0.046 mmol) in MeOH (1 mL) and THF (1 mL) was added Pd—C (24.65 mg, 0.023 mmol) (10%), the resulting mixture was stirred at 30° C. under H$_2$ (excess) for 16 h. The reaction mixture was filtered and concentrated. The residue was purified by prep-HPLC (TFA) to give the title compound. LCMS m/z (M+H)$^+$: C$_{25}$H$_{32}$N$_2$O$_4$ calc. 425.2, found 425.2. $^1$H NMR 1012126-005-1 (400 MHz, CD$_3$OD) δ 7.62 (dd, J=7.0, 9.0 Hz, 1H), 7.31-7.21 (m, 2H), 7.21-7.08 (m, 3H), 6.55-6.41 (m, 2H), 4.76 (q, J=5.6 Hz, 1H), 4.11 (br d, J=11.7 Hz, 1H), 3.74 (s, 3H), 3.56 (dd, J=6.8, 10.0 Hz, 1H), 3.44 (br s, 1H), 3.15-2.97 (m, 2H), 2.54-2.42 (m, 1H), 2.27-2.10 (m, 1H), 1.98-1.85 (m, 3H), 1.81-1.40 (m, 9H).

Example 65

Methyl (CIS)-3-(2-hydroxythiazol-4-yl)-2-((CIS)-4-phenylcyclohexyl)oxy)methyl)piperidine-1-carboxylate

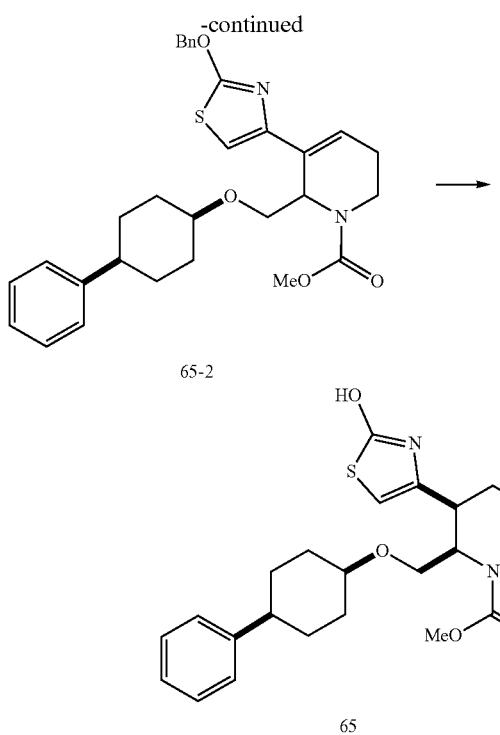

Step 1. Preparation of 2-(benzyloxy)-4-bromothiazole (65-1)

To a mixture of 2,4-dibromothiazole (1 g, 4.12 mmol) and phenylmethanol (0.445 g, 4.12 mmol) in DMF (5 mL) and tetrahydrofuran (5 mL) was added sodium hydride (0.119 g, 4.94 mmol) at 0° C., and the resulting mixture was stirred at 30° C. for 16 h. The reaction mixture was quenched with water (5 mL), then extracted with EtOAc (3 mL*5), washed with brine (3 mL*3). The organic layer was dried over $Na_2SO_4$, filtered and the filtrate was concentrated. The residue was purified by column chromatography on silica gel (ISCO®; 12 g SepaFlash® Silica Flash Column, eluent of 5% EtOAc gradient) to give the title compound. LCMS m/z (M+H)$^+$: $C_{10}H_8BrNOS$ calc. 270.0, found 270.0.

Step 2. Preparation of methyl 5-(2-(benzyloxy)thiazol-4-yl)-6-(((((CIS)-4-phenylcyclohexyl)oxy) methyl)-3,4-dihydropyridine-1(2H)-carboxylate (65-2)

To a mixture of methyl 6-(((((CIS)-4-phenylcyclohexyl) oxy)methyl)-5-(4,4,5,5-tetramethyl-1,3,2-dioxaborolan-2-yl)-3,4-dihydropyridine-1(2H)-carboxylate (64-1) (100 mg, 0.110 mmol), 2-(benzyloxy)-4-bromothiazole (59.3 mg, 0.220 mmol) and $Na_2CO_3$ (34.9 mg, 0.329 mmol) in 1,4-Dioxane (2 mL) and Water (0.5 mL) was added $PdCl_2$(dppf) (16.07 mg, 0.022 mmol), the resulting mixture was stirred at 110° C. under $N_2$ protection for 1 h. The mixture was concentrated and purified by prep-TLC (SiO$_2$, pet.ether:EtOAc=5:1) to give the title compound. LCMS m/z (M+H)$^+$: $C_{30}H_{34}N_2O_4S$ calc. 519.2, found 519.2.

Step 3. Methyl (CIS)-3-(2-hydroxythiazol-4-yl)-2-((((CIS)-4-phenylcyclohexyl)oxy)methyl)piperidine-1-carboxylate (65)

To a mixture of methyl 5-(2-(benzyloxy)thiazol-4-yl)-6-(((((CIS)-4-phenylcyclohexyl)oxy)methyl)-3,4-dihydropyridine-1(2H)-carboxylate (15 mg, 0.029 mmol) in EtOAc (1 mL) was added Pd—C (15.39 mg, 0.014 mmol) (10%), the resulting mixture was stirred at 25° C. under $H_2$ (excess) for 3 h. LCMS showed desired mass, the reaction mixture was filtered and concentrated. The residue was purified by prep-HPLC (TFA) to the title compound. LCMS m/z (M+H)$^+$: $C_{23}H_{30}N_2O_4S$ 431.2, found 431.2. $^1$H NMR (400 MHz, CD$_3$OD) δ 7.29-7.22 (m, 2H), 7.21-7.16 (m, 2H), 7.16-7.09 (m, 1H), 6.01 (d, J=1.2 Hz, 1H), 4.73 (br d, J=4.4 Hz, 1H), 4.08 (br d, J=12.5 Hz, 1H), 3.72 (s, 3H), 3.63 (br t, J=8.9 Hz, 1H), 3.51 (br s, 1H), 2.88-2.79 (m, 1H), 2.55-2.45 (m, 1H), 2.04-1.80 (m, 5H), 1.79-1.66 (m, 2H), 1.62-1.43 (m, 5H) ppm.

Example 66 methyl (CIS)-3-(6-hydroxy-3-methylpyridin-2-yl)-2-(((((CIS)-4-phenylcyclohexyl)oxy)methyl)piperidine-1-carboxylate

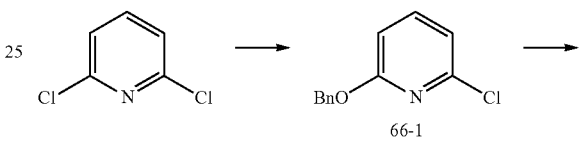

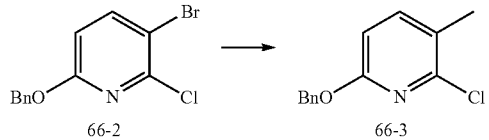

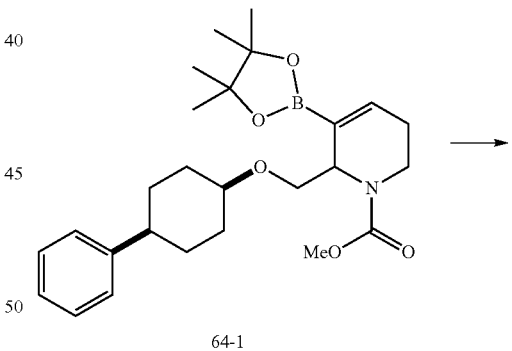

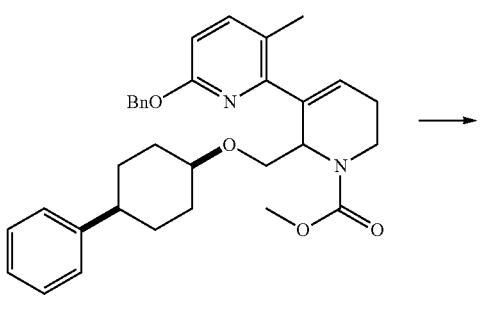

-continued

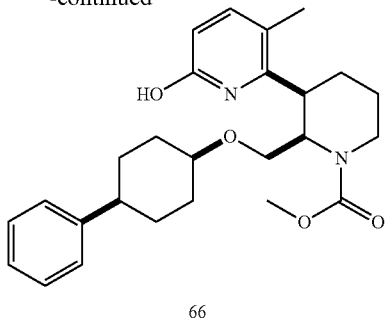

66

Step 1. Preparation of 2-(benzyloxy)-6-chloropyridine (66-1)

To a solution of 2,6-dichloropyridine (3 g, 23.16 mmol) in DMF (50 mL) were added K$_2$CO$_3$ (9.60 g, 69.5 mmol) and (bromomethyl)-benzene (3.30 mL, 27.8 mmol) at 25° C. The mixture was stirred at 25° C. for 1.5 hours. The mixture was poured into H$_2$O (150 mL), extracted with EtOAc (150 mL×3), washed with brine (100 mL). The organic layer dried over Na$_2$SO$_4$. After filtration and concentration, the residue was purified by flash silica gel chromatography (ISCO®; 40 g SepaFlash® Silica Flash Column, eluent of 1% ethyl acetate/pet. ether gradient @35 mL/min) to give the title compound. LCMS m/z (M+H)$^+$: 220.0 required, 220.0 found. $^1$H NMR (400 MHz, CDCl$_3$) δ 7.90-7.20 (m, 6H), 6.87 (d, J=7.6 Hz, 1H), 6.66 (d, J=7.8 Hz, 1H), 5.34-5.24 (m, 2H) ppm.

Step 2. Preparation of 6-(benzyloxy)-3-bromo-2-chloropyridine (66-2)

To a solution of 2-(benzyloxy)-6-chloropyridine (2.5 g, 11.38 mmol) in acetonitrile (25 mL) was added NBS (3.04 g, 17.07 mmol). The mixture was stirred at 85° C. for 13 hours. The mixture was poured into H$_2$O (100 mL), extracted with EtOAc (50 mL×3), washed with brine (100 mL). The organic layer was dried over Na$_2$SO$_4$, filtered and concentrated. The crude product was purified by flash silica gel chromatography (ISCO®; 40 g SepaFlash® Silica Flash Column, eluent of 1% ethyl acetate/pet. ether gradient @ 60 mL/min) to afford the title compound. LCMS m/z (M+H)$^+$: C$_{12}$H$_9$BrClNO calc. 299.9, found 299.9. $^1$H NMR (400 MHz, CDCl$_3$) δ 7.73 (d, J=8.6 Hz, 1H), 7.65-7.31 (m, 5H), 6.62 (d, J=8.6 Hz, 1H), 5.34-5.21 (m, 2H) ppm.

Step 3. Preparation of 6-(benzyloxy)-2-chloro-3-methylpyridine (66-3)

To a solution of 6-(benzyloxy)-3-bromo-2-chloropyridine (1 g, 3.35 mmol) and K$_2$CO$_3$ (1.389 g, 10.05 mmol) in dioxane (10 mL) and Water (2 mL) was added trimethyl-boroxine (1.261 g, 5.02 mmol). The mixture was stirred at 25° C. for 15 mins. And then 1,1'-bis(diphenylphosphino)ferrocene-palladium(ii)dichloride (0.137 g, 0.167 mmol) was added to the reaction mixture. The reaction mixture was stirred at 90° C. for 16 h. The mixture was poured into H$_2$O (50 mL), extracted with EtOAc (30 mL×3), washed with brine (30 mL). The organic layer was dried over Na$_2$SO$_4$, filtered and concentrated. The crude product was purified by flash silica gel chromatography (ISCO®; 20 g SepaFlash® Silica Flash Column, eluent of 0% ethyl acetate/pet. ether gradient @ 60 mL/min) to afford the title compound. LCMS m/z (M+H)$^+$: C$_{13}$H$_{12}$ClNO 233.9, found 233.9. $^1$H NMR (400 MHz, CDCl$_3$) δ 7.53-7.29 (m, 6H), 6.64 (d, J=8.3 Hz, 1H), 5.38-5.28 (m, 2H), 2.27 (s, 3H) ppm.

Step 4. Preparation of methyl 6-(benzyloxy)-3-methyl-2'-((((CIS)-4-phenylcyclohexyl)oxy)methyl)-5',6'-dihydro-[2,3'-bipyridine]-1'(4'H)-carboxylate (66-4)

To a mixture of methyl 6-((((CIS)-4-phenylcyclohexyl)oxy)methyl)-5-(4,4,5,5-tetramethyl-1,3,2-dioxaborolan-2-yl)-3,4-dihydropyridine-1(2H)-carboxylate (64-1) (95 mg, 0.209 mmol) (in 4 mL dioxane), were added 6-(benzyloxy)-2-chloro-3-methylpyridine (146 mg, 0.626 mmol), Na$_2$CO$_3$ (66.3 mg, 0.626 mmol), Water (0.5 mL) and Pd(dppf)Cl$_2$ (30.5 mg, 0.042 mmol). The resulting mixture was stirred at 110° C. under N$_2$ protection for 2 h. The mixture was poured into water (10 mL) and extracted with DCM (10 mL*3), washed with brine (10 mL). The combined organic layers were dried over Na$_2$SO$_4$, filtered and the filtrate was concentrated in vacuo to give the crude. The crude was purified by pre-TLC (Pet.ether:EtOAc=5:1) to give the title compound. LCMS m/z (M+H)$^+$: C$_{33}$H$_{38}$N$_2$O$_4$ calc. 527.8, found 527.8.

Step 5. Preparation of methyl (CIS)-3-(6-hydroxy-3-methylpyridin-2-yl)-2-((((CIS)-4-phenylcyclohexyl)oxy)methyl)piperidine-1-carboxylate (66)

To a mixture of methyl 6-(benzyloxy)-3-methyl-2'-((((CIS)-4-phenylcyclohexyl)oxy)methyl)-5',6'-dihydro-[2,3'-bipyridine]-1'(4'H)-carboxylate (35 mg, 0.060 mmol) in EtOAc (2 mL) was added Pd/C (30.3 mg, 0.028 mmol) (10% wt), the resulting mixture was stirred at 25° C. under for 2 h. LCMS showed desired mass was found, the reaction mixture was filtered and concentrated. The residue was purified by prep-HPLC (TFA) to give the title compound. LCMS m/z (M+H)$^+$: C$_{26}$H$_{34}$N$_2$O$_4$ calc. 439.3, found 439.3. $^1$H NMR (400 MHz, CD$_3$OD) δ 7.62 (br d, J=9.0 Hz, 1H), 7.30-7.20 (m, 2H), 7.19-7.11 (m, 3H), 6.54 (d, J=9.1 Hz, 1H), 4.63 (br d, J=4.9 Hz, 1H), 4.20-4.10 (m, 1H), 3.79-3.69 (m, 3H), 3.66-3.57 (m, 2H), 3.57-3.45 (m, 1H), 3.40-3.33 (m, 1H), 3.12 (br t, J=13.0 Hz, 1H), 2.57-2.33 (m, 2H), 2.29 (s, 3H), 2.04-1.88 (m, 2H), 1.82 (br d, J=10.5 Hz, 2H), 1.74-1.59 (m, 2H), 1.59-1.46 (m, 5H).

Example 67 and 68

Methyl 3-(5-chloro-2-hydroxythiazol-4-yl)-2-(((4-phenylcyclohexyl)oxy)methyl)piperidine-1-carboxylate (Peak A, 67) and Methyl 3-(5-chloro-2-hydroxythiazol-4-yl)-2-(((4-phenylcyclohexyl)oxy)methyl)piperidine-1-carboxylate (Peak B, 68)

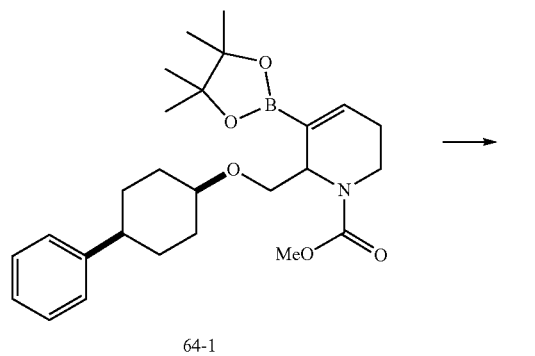

64-1

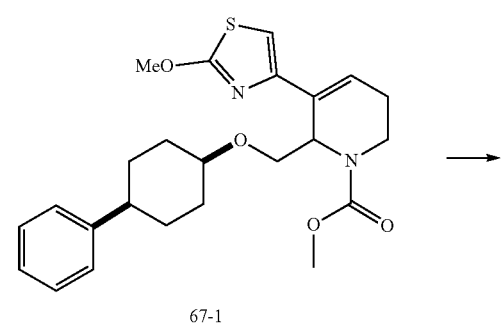

67-1

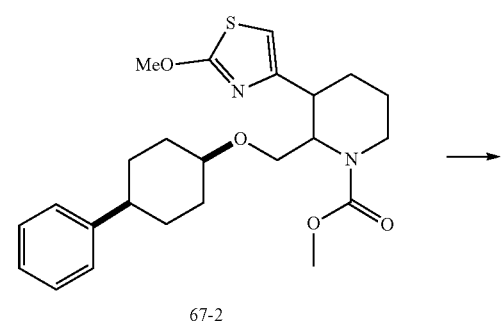

67-2

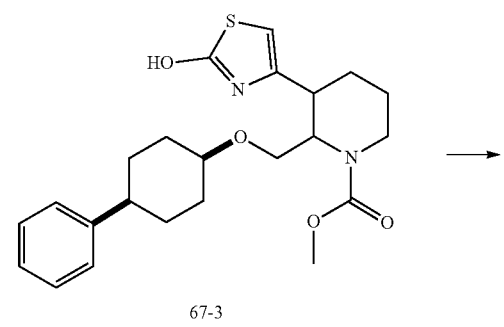

67-3

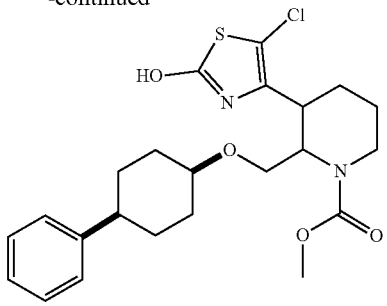

67
Peak A

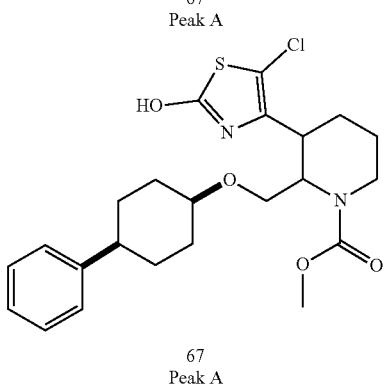

67
Peak A

Step 1. Preparation of methyl 5-(2-methoxythiazol-4-yl)-6-(((4-phenylcyclohexyl)oxy)methyl)-3,4-dihydropyridine-1(2H)-carboxylate (67-1)

To a mixture of methyl 6-(((((CIS)-4-phenylcyclohexyl)oxy)methyl)-5-(4,4,5,5-tetramethyl-1,3,2-dioxaborolan-2-yl)-3,4-dihydropyridine-1(2H)-carboxylate (64-1) (400 mg, 0.419 mmol) (50% in 8 mL dioxane), 4-bromo-2-methoxythiazole (163 mg, 0.838 mmol) and $Na_2CO_3$ (133 mg, 1.257 mmol) in Water (0.5 mL) was added $PdCl_2$ (dppf) (30.6 mg, 0.042 mmol), the resulting mixture was stirred at 100° C. under $N_2$ protection for 3 h. The reaction mixture was filtered and concentrated. The residue was purified by prep-TLC ($SiO_2$, pet.ether:EtOAc=5:1) to give the title compound. LCMS m/z (M+H)$^+$: $C_{24}H_{30}N_2O_4S$ calc. 443.2, found 443.2.

Step 2. Preparation of methyl 3-(2-methoxythiazol-4-yl)-2-(((4-phenylcyclohexyl)oxy) methyl)piperidine-1-carboxylate (67-2)

To a mixture of methyl 5-(2-methoxythiazol-4-yl)-6-(((4-phenylcyclohexyl)oxy)methyl)-3,4-dihydropyridine-1(2H)-carboxylate (160 mg, 0.325 mmol) in EtOAc (3 mL) was added Pd/C (69.3 mg, 0.065 mmol) (10%), the resulting mixture was stirred at 30° C. under $H_2$ (excess) (15 psi) for 16 h. The reaction mixture was filtered and concentrated. The crude product was purified by prep-TLC ($SiO_2$, pet.ether:EtOAc=5:1) to give the title compound.

Step 3. Preparation of methyl 3-(2-hydroxythiazol-4-yl)-2-(((4-phenylcyclohexyl) oxy)methyl)piperidine-1-carboxylate (67-3)

To a mixture of methyl 3-(2-methoxythiazol-4-yl)-2-(((4-phenylcyclohexyl)oxy) methyl)piperidine-1-carboxylate (30 mg, 0.067 mmol) in Water (0.1 mL) was added HCl-dioxane (0.1 mL, 0.400 mmol) (4 M), the resulting mixture was stirred at 30° C. for 2 h. The mixture was concentrated to give the title compound, which was used in the next steps directly. LCMS m/z (M+H)⁺: $C_{23}H_{30}N_2O_4S$ calc. 431.2, found 431.2.

Step 4. Preparation of Methyl 3-(5-chloro-2-hydroxythiazol-4-yl)-2-(((4-phenylcyclohexyl)oxy)methyl)piperidine-1-carboxylate (Peak A, 67) and Methyl 3-(5-chloro-2-hydroxythiazol-4-yl)-2-(((4-phenylcyclohexyl)oxy)methyl)piperidine-1-carboxylate (Peak B, 68)

To a mixture of methyl 3-(2-hydroxythiazol-4-yl)-2-(((4-phenylcyclohexyl) oxy)methyl)piperidine-1-carboxylate (30 mg, 0.059 mmol) in CH₂Cl₂ (1 mL) was added 1-chloropyrrolidine-2,5-dione (7.91 mg, 0.059 mmol), the resulting mixture was stirred at 30° C. under N₂ protection for 2 h. The mixture was concentrated and purified by prep-HPLC (TFA) to give the title compounds. LCMS m/z (M+H)⁺: $C_{23}H_{29}ClN_2O_4S$ calc. 465.2, found 465.2. 3-(5-chloro-2-hydroxythiazol-4-yl)-2-(((4-phenylcyclohexyl) oxy)methyl) piperidine-1-carboxylate Peak A (67): ¹H NMR (400 MHz, CD₃OD) δ 7.37-7.02 (m, 5H), 4.66 (br s, 1H), 4.08 (br d, J=10.8 Hz, 1H), 3.71 (br s, 3H), 3.64-3.35 (m, 4H), 3.23-2.91 (m, 2H), 2.50 (br s, 1H), 2.15-1.67 (m, 6H), 1.54 (br s, 5H).

3-(5-chloro-2-hydroxythiazol-4-yl)-2-(((4-phenylcyclohexyl) oxy)methyl)piperidine-1-carboxylate Peak B (68): ¹H NMR (400 MHz, CD₃OD) δ 7.39-7.08 (m, 5H), 4.20-4.05 (m, 1H), 4.01-3.91 (m, 1H), 3.72 (s, 3H), 3.66 (dd, J=5.5, 9.7 Hz, 1H), 3.60 (br s, 1H), 3.51-3.40 (m, 2H), 3.36 (br d, J=5.6 Hz, 1H), 2.53 (br t, J=12.2 Hz, 1H), 2.07-1.96 (m, 2H), 1.91-1.67 (m, 6H), 1.62-1.47 (m, 4H).

The following examples were prepared according to the general procedures herein and in an analogous manner to that used to synthesize the Example compounds using the appropriate intermediates. The starting materials were either prepared as described in the intermediates section, commercial available, or prepared from commercially available reagents using conventional reactions well known in the art.

| Example Number | Structure | Name | Observed Mass [M + H]⁺ |
|---|---|---|---|
| 69 | | ((CIS)-2-methylcyclopropyl)((2R,3S)-2-((((1s,4S)-4-phenylcyclohexyl)oxy)methyl)-3-(1H-pyrazol-3-yl)piperidin-1-yl)methanone | 422.5 |
| 70 | | ((TRANS)-2-methylcyclopropyl)((CIS)-2-((((CIS)-4-phenylcyclohexyl)oxy)methyl)-3-(1H-pyrazol-3-yl)piperidin-1-yl)methanone | 422.4 |
| 71 | | cyclopropyl((CIS)-2-((((CIS)-4-phenylcyclohexyl)oxy)methyl)-3-(1H-pyrazol-3-yl)piperidin-1-yl)methanone | 408.4 |

-continued

| Example Number | Structure | Name | Observed Mass [M + H]+ |
|---|---|---|---|
| 72 | | (S)-2-amino-1-((CIS)-2-(((((CIS)-4-isopropylcyclohexyl)oxy)methyl)-3-(1H-pyrazol-3-yl)piperidin-1-yl)-4-methoxybutan-1-one | 421.3 |
| 73 | | 1-((CIS)-2-(((((CIS)-4-isopropylcyclohexyl)oxy)methyl)-3-(1H-pyrazol-3-yl)piperidin-1-yl)-2-methylpropan-1-one | 376.3 |
| 74 | | 2-(oxetan-3-yl)-1-((CIS)-2-(((((CIS)-4-phenylcyclohexyl)oxy)methyl)-3-(1H-pyrazol-3-yl)piperidin-1-yl)ethan-1-one | 438.5 |
| 75 | | cyclopropyl((CIS)-2-(((((CIS)-4-isopropylcyclohexyl)oxy)methyl)-3-(1H-pyrazol-3-yl)piperidin-1-yl)methanone | 373.3 |
| 76 | | ((CIS)-2-(((((CIS)-4-isopropylcyclohexyl)oxy)methyl)-3-(1H-pyrazol-3-yl)piperidin-1-yl)(2-methylcyclopropyl)methanone | 387.4 |

| Example Number | Structure | Name | Observed Mass [M + H]+ |
|---|---|---|---|
| 77 | | 2-hydroxy-2-methyl-1-((CIS)-2-((((CIS)-4-phenylcyclohexyl)oxy)methyl)-3-(1H-pyrazol-3-yl)piperidin-1-yl)propan-1-one | 426.4 |
| 78 | | (1-hydroxycyclopropyl)((CIS)-2-((((CIS)-4-phenylcyclohexyl)oxy)methyl)-3-(1H-pyrazol-3-yl)piperidin-1-yl)methanone | 424.4 |
| 79 | | cyclobutyl((CIS)-2-((((CIS)-4-isopropylcyclohexyl)oxy)methyl)-3-(1H-pyrazol-3-yl)piperidin-1-yl)methanone | 388.3 |
| 80 | | (1-methylcyclopropyl)((CIS)-2-((((CIS)-4-phenylcyclohexyl)oxy)methyl)-3-(1H-pyrazol-3-yl)piperidin-1-yl)methanone | 422.4 |
| 81 | | (2,2-dimethylcyclopropyl)((CIS)-2-((((CIS)-4-isopropylcyclohexyl)oxy)methyl)-3-(1H-pyrazol-3-yl)piperidin-1-yl)methanone | 402.3 |

-continued

| Example Number | Structure | Name | Observed Mass [M + H]+ |
|---|---|---|---|
| 82 | | 1-((CIS)-2-((((CIS)-4-isopropylcyclohexyl)oxy)methyl)-3-(1H-pyrazol-3-yl)piperidin-1-yl)propan-1-one | 361.3 |
| 83 | | cyclopentyl((CIS)-2-((((CIS)-4-isopropylcyclohexyl)oxy)methyl)-3-(1H-pyrazol-3-yl)piperidin-1-yl)methanone | 402.3 |
| 84 | | 1-((CIS)-2-((((CIS)-4-isopropylcyclohexyl)oxy)methyl)-3-(1H-pyrazol-3-yl)piperidin-1-yl)but-3-en-1-one | 474.3 |
| 85 | | 1-((CIS)-2-((((CIS)-4-isopropylcyclohexyl)oxy)methyl)-3-(1H-pyrazol-3-yl)piperidin-1-yl)pent-4-yn-1-one | 386.3 |
| 86 | | 1-((CIS)-2-((((CIS)-4-isopropylcyclohexyl)oxy)methyl)-3-(1H-pyrazol-3-yl)piperidin-1-yl)hex-5-yn-1-one | 400.3 |

-continued

| Example Number | Structure | Name | Observed Mass [M + H]+ |
|---|---|---|---|
| 87 | | 2-methoxy-2-methyl-1-((CIS)-2-((((CIS)-4-phenylcyclohexyl)oxy)methyl)-3-(1H-pyrazol-3-yl)piperidin-1-yl)propan-1-one | 440.5 |
| 88 | | 3-cyclopropyl-1-((CIS)-2-((((CIS)-4-isopropylcyclohexyl)oxy)methyl)-3-(1H-pyrazol-3-yl)piperidin-1-yl)propan-1-one | 402.3 |
| 89 | | (S)-2-fluoro-1-((CIS)-2-((((CIS)-4-isopropylcyclohexyl)oxy)methyl)-3-(1H-pyrazol-3-yl)piperidin-1-yl)-2-methylpentan-1-one | 422.4 |
| 90 | | 5-((CIS)-1-((TRANS)-2-ethylcyclopropane-1-carbonyl)-2-((((CIS)-4-phenylcyclohexyl)oxy)methyl)piperidin-3-yl)-1H-pyrazol-2-ium 2,2,2-trifluoroacetate | 436.3 |
| 91 | | ((R)-2,2-dimethylcyclopropyl)((CIS)-2-((((CIS)-4-phenylcyclohexyl)oxy)methyl)-3-(1H-pyrazol-3-yl)piperidin-1-yl)methanone | 436.4 |

-continued

| Example Number | Structure | Name | Observed Mass [M + H]+ |
|---|---|---|---|
| 92 | 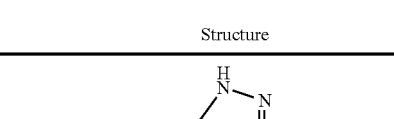 | (2,2-difluorocyclopropyl)(((CIS)-2-((((CIS)-4-phenylcyclohexyl)oxy)methyl)-3-(1H-pyrazol-3-yl)piperidin-1-yl)methanone | 444.3 |

Examples 93 Through 119

General Procedure for Parallel Synthesis of Carbamates

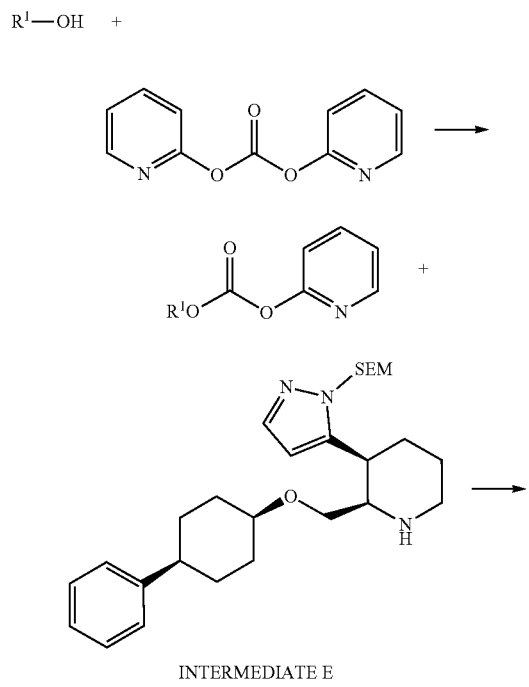

Alcohol monomers (0.03 mmol) were placed in 1 mL vials, to which was added 200 µL DCM per vial. A solution of di(pyridin-2-yl) carbonate (3.89 mg, 0.018 mmol per reaction, plus 20% extra) in 1,4-dioxane (100 µL per reaction, plus 20% extra) with Hunig's base (5.85 µL, 0.042 mmol per reaction, plus 20% extra) was prepared and dosed into each monomer vial (105.85 L). The monomer plate was then shaken at rt overnight to form monomer di(pyridin-2-yl) carbonate complex.

A solution of Intermediate E (3 mg, 0.006 mmol per reaction, plus 20% extra) in 1,4-dioxane (100 µL per reaction, plus 20% extra) was prepared. The core/dioxane solution was dosed to the monomer di(pyridin-2-yl) carbonate plate (100 µL, 0.006 mmol per reaction) and the reaction plate was shaken overnight @ rt. The reaction mixture was filtered and the solvent removed via evaporation to provide the protected product.

To the residue was added pre-mixed 4M HCl in dioxane and dioxane (1:1 V:V, 60 µL, 0.12 mmol per reaction, plus 20% extra) and the mixture was shaken overnight at rt. Following evaporation of the solvent, the residue was dissolved in 120 µL DMSO per vial, sonicated for 1 hour, then filtered and purified by preparative HPLC reverse phase (C-18), eluting with Acetonitrile/Water+0.1% TFA to afford the title compounds.

| Example Number | Structure | Name | Observed Mass [M + H]+ |
|---|---|---|---|
| 93 | | 2-chlorobenzyl (CIS)-2-((((CIS)-4-isopropylcyclohexyl)oxy)methyl)-3-(1H-pyrazol-3-yl)piperidine-1-carboxylate | 474.2 |
| 94 | | ((R)-4-methyl-5-oxomorpholin-2-yl)methyl (CIS)-2-((((CIS)-4-phenylcyclohexyl)oxy)methyl)-3-(1H-pyrazol-3-yl)piperidine-1-carboxylate | 511.3 |
| 95 | | prop-2-yn-1-yl (CIS)-2-((((CIS)-4-isopropylcyclohexyl)oxy)methyl)-3-(1H-pyrazol-3-yl)piperidine-1-carboxylate | 388.2 |
| 96 | | 2,2-difluoroethyl (CIS)-2-((((CIS)-4-phenylcyclohexyl)oxy)methyl)-3-(1H-pyrazol-3-yl)piperidine-1-carboxylate | 448.4 |

-continued

| Example Number | Structure | Name | Observed Mass [M + H]+ |
|---|---|---|---|
| 97 | | 2-oxopropyl (CIS)-2-(((((CIS)-4-phenylcyclohexyl)oxy)methyl)-3-(1H-pyrazol-3-yl)piperidine-1-carboxylate | 440.4 |
| 98 | | 2-methoxy-2-oxoethyl (CIS)-2-(((((CIS)-4-phenylcyclohexyl)oxy)methyl)-3-(1H-pyrazol-3-yl)piperidine-1-carboxylate | 456.5 |
| 99 | | 1,1-difluoropropan-2-yl (CIS)-2-(((((CIS)-4-phenylcyclohexyl)oxy)methyl)-3-(1H-pyrazol-3-yl)piperidine-1-carboxylate | 462.3 |
| 100 | | prop-2-yn-1-yl (CIS)-2-(((((CIS)-4-phenylcyclohexyl)oxy)methyl)-3-(1H-pyrazol-3-yl)piperidine-1-carboxylate | 422.4 |

-continued

| Example Number | Structure | Name | Observed Mass [M + H]⁺ |
|---|---|---|---|
| 101 | | pyridin-3-yl (CIS)-2-(((((CIS)-4-phenylcyclohexyl)oxy)methyl)-3-(1H-pyrazol-3-yl)piperidine-1-carboxylate | 461.2 |
| 102 | | 2,2,2-trifluoroethyl (CIS)-2-((((CIS)-4-phenylcyclohexyl)oxy)methyl)-3-(1H-pyrazol-3-yl)piperidine-1-carboxylate | 466.3 |
| 103 | | but-2-yn-1-yl (CIS)-2-((((CIS)-4-phenylcyclohexyl)oxy)methyl)-3-(1H-pyrazol-3-yl)piperidine-1-carboxylate | 436.4 |
| 104 | | cyclobutylmethyl (CIS)-2-((((CIS)-4-phenylcyclohexyl)oxy)methyl)-3-(1H-pyrazol-3-yl)piperidine-1-carboxylate | 452.5 |

-continued

| Example Number | Structure | Name | Observed Mass [M + H]+ |
|---|---|---|---|
| 105 | | isobutyl (CIS)-2-((((CIS)-4-phenylcyclohexyl)oxy)methyl)-3-(1H-pyrazol-3-yl)piperidine-1-carboxylate | 440.4 |
| 106 | | pent-3-yn-1-yl (CIS)-2-((((CIS)-4-phenylcyclohexyl)oxy)methyl)-3-(1H-pyrazol-3-yl)piperidine-1-carboxylate | 450.5 |
| 107 | | (S)-2-methylbutyl (CIS)-2-((((CIS)-4-phenylcyclohexyl)oxy)methyl)-3-(1H-pyrazol-3-yl)piperidine-1-carboxylate | 454.4 |
| 108 | | (R)-sec-butyl (CIS)-2-((((CIS)-4-phenylcyclohexyl)oxy)methyl)-3-(1H-pyrazol-3-yl)piperidine-1-carboxylate | 440.5 |

-continued

| Example Number | Structure | Name | Observed Mass [M + H]⁺ |
|---|---|---|---|
| 109 | | (5-methyloxazol-2-yl)methyl (CIS)-2-(((((CIS)-4-phenylcyclohexyl)oxy)methyl)-3-(1H-pyrazol-3-yl)piperidine-1-carboxylate | 479.3 |
| 110 | | 2,2-difluoropropyl (CIS)-2-(((((CIS)-4-phenylcyclohexyl)oxy)methyl)-3-(1H-pyrazol-3-yl)piperidine-1-carboxylate | 462.4 |
| 111 | | 2-fluoroethyl (CIS)-2-(((((CIS)-4-phenylcyclohexyl)oxy)methyl)-3-(1H-pyrazol-3-yl)piperidine-1-carboxylate | 430.3 |
| 112 | | cyclobutyl (CIS)-2-(((((CIS)-4-phenylcyclohexyl)oxy)methyl)-3-(1H-pyrazol-3-yl)piperidine-1-carboxylate | 438.4 |

-continued

| Example Number | Structure | Name | Observed Mass [M + H]⁺ |
|---|---|---|---|
| 113 | | 1,3-difluoropropan-2-yl (CIS)-2-((((CIS)-4-phenylcyclohexyl)oxy)methyl)-3-(1H-pyrazol-3-yl)piperidine-1-carboxylate | 462.4 |
| 114 | | 3-methoxy-3-oxopropyl (CIS)-2-((((CIS)-4-phenylcyclohexyl)oxy)methyl)-3-(1H-pyrazol-3-yl)piperidine-1-carboxylate | 470.3 |
| 115 | | (S)-but-3-yn-2-yl (CIS)-2-((((CIS)-4-phenylcyclohexyl)oxy)methyl)-3-(1H-pyrazol-3-yl)piperidine-1-carboxylate | 436.5 |
| 116 | | (S)-sec-butyl (CIS)-2-((((CIS)-4-phenylcyclohexyl)oxy)methyl)-3-(1H-pyrazol-3-yl)piperidine-1-carboxylate | 440.5 |

-continued

| Example Number | Structure | Name | Observed Mass [M + H]+ |
|---|---|---|---|
| 117 | | cyclopentyl (CIS)-2-((((CIS)-4-phenylcyclohexyl)oxy)methyl)-3-(1H-pyrazol-3-yl)piperidine-1-carboxylate | 452.5 |
| 118 | | 3-methoxypropyl (CIS)-2-((((CIS)-4-phenylcyclohexyl)oxy)methyl)-3-(1H-pyrazol-3-yl)piperidine-1-carboxylate | 456.4 |
| 119 | | (S)-2-methoxypropyl (CIS)-2-((((CIS)-4-phenylcyclohexyl)oxy)methyl)-3-(1H-pyrazol-3-yl)piperidine-1-carboxylate | 456.4 |

Examples 120 Through 127

General Procedure for Parallel Synthesis of Ureas

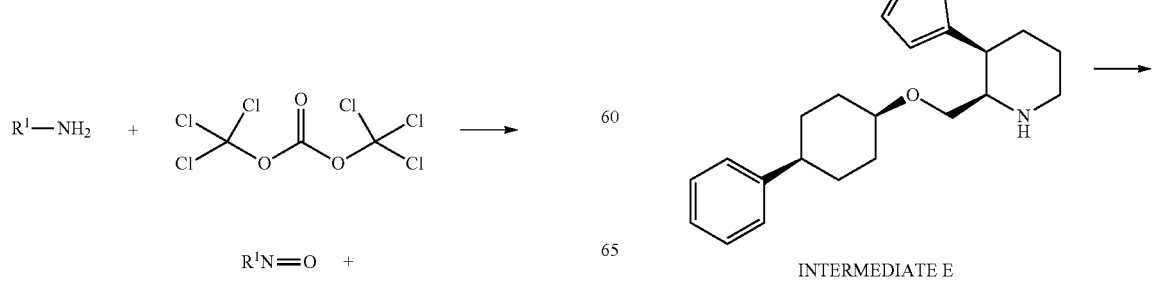

-continued

INTERMEDIATE E

-continued

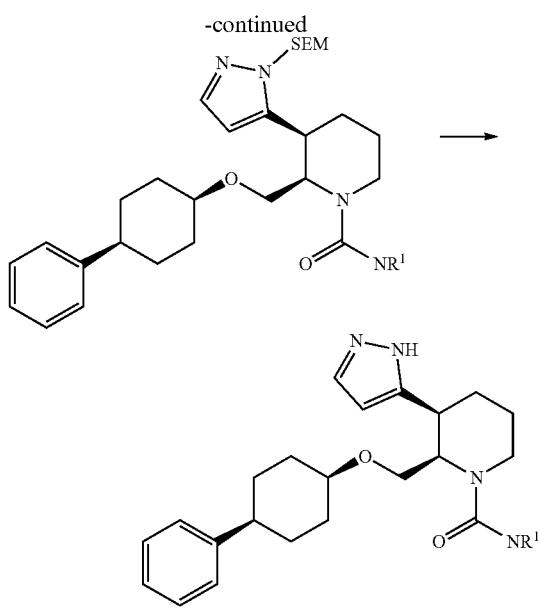

Amine monomers (0.018 mmol) were placed in 1 ml tubes and dissolved in 100 μL DCM and triethyl amine (7.5 μL, 0.054 mmol) per vial. The tubes were shaken at rt for 30 min. A solution of triphosgene ((5.341 mg, 0.018 mmol per reaction, plus 20% extra) and in DCM (100 μL per reaction, plus 20% extra) was prepared and the solution was then added to the monomer vials (100 μL/reaction) and shaken @ rt for 3h to provide the intermediate isocyanates.

A solution of Intermediate E (3 mg, 0.006 mmol per reaction, plus 20% extra) in DMF (100 μL per reaction, plus 20% extra) was prepared, dosed into the isocyanates (100 μL, 0.006 mmol per reaction) and shaken for 2 hr @ rt. The reaction mixture was filtered and concentrated to dryness to provide the protected products.

To the residue was added pre-mixed 4M HCl in dioxane and dioxane (1:1 V:V, 60 μL, 0.12 mmol per reaction, plus 20% extra) and the mixture was shaken at rt overnight. The solvent was concentrated and the resulting residue was dissolved in 120 μL DMSO and sonicated for 1 hour. Then resulting mixture was filtered and purified by preparative HPLC reverse phase (C-18), eluting with Acetonitrile/Water+0.1% TFA to afford the title compounds.

| Example Number | Structure | Name | Observed Mass [M + H]$^+$ |
|---|---|---|---|
| 120 | 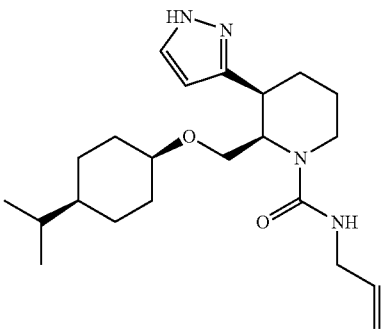 [SMILES: C=CCNC(=O)N1CCC[C@H](c2cc[nH]n2)[C@@H]1CO[C@H]1CC[C@@H](C(C)C)CC1] | (CIS)-N-allyl-2-((((CIS)-4-isopropylcyclohexyl)oxy)methyl)-3-(1H-pyrazol-3-yl)piperidine-1-carboxamide | 389.3 |
| 121 | 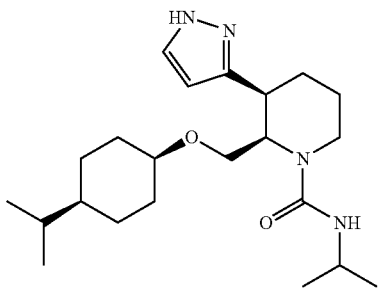 [SMILES: CC(C)NC(=O)N1CCC[C@H](c2cc[nH]n2)[C@@H]1CO[C@H]1CC[C@@H](C(C)C)CC1] | (CIS)-N-isopropyl-2-((((CIS)-4-isopropylcyclohexyl)oxy)methyl)-3-(1H-pyrazol-3-yl)piperidine-1-carboxamide | 391.4 |

-continued

| Example Number | Structure | Name | Observed Mass [M + H]+ |
|---|---|---|---|
| 122 | | (CIS)-N-benzyl-2-((((CIS)-4-isopropylcyclohexyl)oxy)methyl)-3-(1H-pyrazol-3-yl)piperidine-1-carboxamide | 438.3 |
| 123 | | (CIS)-N-(cyclohexylmethyl)-2-((((CIS)-4-isopropylcyclohexyl)oxy)methyl)-3-(1H-pyrazol-3-yl)piperidine-1-carboxamide | 444.4 |
| 124 | | (CIS)-N-cyclohexyl-2-((((CIS)-4-isopropylcyclohexyl)oxy)methyl)-3-(1H-pyrazol-3-yl)piperidine-1-carboxamide | 431.3 |
| 125 | | (CIS)-N-(cyclobutylmethyl)-2-((((CIS)-4-phenylcyclohexyl)oxy)methyl)-3-(1H-pyrazol-3-yl)piperidine-1-carboxamide | 451.3 |

| Example Number | Structure | Name | Observed Mass [M + H]+ |
|---|---|---|---|
| 126 | | (CIS)-N-(1-methoxypropan-2-yl)-2-((((CIS)-4-phenylcyclohexyl)oxy)methyl)-3-(1H-pyrazol-3-yl)piperidine-1-carboxamide | 455.3 |
| 127 | | (CIS)-N-(oxetan-3-yl)-2-((((CIS)-4-phenylcyclohexyl)oxy)methyl)-3-(1H-pyrazol-3-yl)piperidine-1-carboxamide | 439.4 |
| 128 | | (CIS)-N-((R)-sec-butyl)-2-((((CIS)-4-phenylcyclohexyl)oxy)methyl)-3-(1H-pyrazol-3-yl)piperidine-1-carboxamide | 439.3 |

The following table shows representative data for the compounds of the Examples as orexin receptor agonists as determined by the assays described herein.

| Example | OX2R Potency, EC$_{50}$ (nM) | % Inhibition |
|---|---|---|
| 1 | 67.3 | 102.6% |
| 2 | 15.1 | 101.9% |
| 3 | 675.9 | 99.9% |
| 4 | 275.9 | 100.6% |
| 5 | 3188 | 99.6% |
| 6 | 1271 | 96.6% |
| 7 | 1497 | 95.7% |
| 8 | 5837 | 80.9% |
| 9 | 249.7 | 100.7% |
| 10 | 4.8 | 100.8% |
| 11 | 2.3 | 100.1% |
| 12 | 413.6 | 100.0% |
| 13 | 4750 | 84.6% |
| 14 | 65.5 | 99.9% |
| 15 | 117.5 | 99.3% |
| 16 | 126.2 | 99.9% |
| 17 | 27.8 | 100.1% |
| 18 | 54.7 | 98.8% |
| 19 | 4805 | 63.1% |
| 20 | 681.8 | 97.4% |
| 21 | 2102 | 79.9% |
| 22 | 6005 | 83.7% |
| 23 | 211 | 98.6% |
| 24 | 347.8 | 100.4% |
| 25 | 878.8 | 92.8% |
| 26 | 2427 | 83.6% |
| 27 | 3508 | 82.5% |
| 28 | 5956 | 22.9% |
| 29 | 1357 | 81.4% |
| 30 | 2916 | 87.6% |
| 31 | 7436 | 72.7% |
| 32 | 3733 | 86.3% |
| 33 | 47.2 | 100.3% |
| 34 | 17.8 | 99.9% |

-continued

| Example | OX2R Potency, EC$_{50}$ (nM) | % Inhibition |
|---|---|---|
| 35 | 542 | 97.9% |
| 36 | 1027 | 96.3% |
| 37 | 5107 | 85.3% |
| 38 | 240.5 | 95.0% |
| 39 | 1977 | 94.8% |
| 40 | 1634 | 95.8% |
| 41 | 2363 | 95.4% |
| 42 | 41.2 | 100.8% |
| 43 | 163.1 | 100.4% |
| 44 | >10000 | 9.5% |
| 45 | 79.4 | 100.2% |
| 46 | >10000 | 0% |
| 47 | 356.7 | 99.2% |
| 48 | 922.1 | 97.6% |
| 49 | 795.4 | 99.0% |
| 50 | >10000 | 5.2% |
| 51 | 227 | 99.0% |
| 52 | >10000 | 0% |
| 53 | 104.2 | 100.5% |
| 54 | >10000 | 15.7% |
| 55 | 97.5 | 100.8% |
| 56 | 3066 | 66.9% |
| 57 | 351.4 | 99.6% |
| 58 | >10000 | 0% |
| 59 | 593.4 | 98.3% |
| 60 | 56.3 | 100% |
| 61 | 3511 | 87.4% |
| 62 | >10000 | 11.9% |
| 63 | 334 | 100.2% |
| 64 | 3060 | 68.1% |
| 65 | 174.2 | 98.1% |
| 66 | 807.9 | 98.8% |
| 67 | 226.6 | 99.9% |
| 68 | 6984 | 27.6% |
| 69 | 278.3 | 99.2% |
| 70 | 292.2 | 100.0% |
| 71 | 456.8 | 82.9% |
| 72 | 3106 | 99.5% |
| 73 | 3217 | 79.3% |
| 74 | 3280 | 94.3% |
| 75 | 3634 | 95.7% |
| 76 | 4135 | 94.6% |
| 77 | 4336 | 96.1% |
| 78 | 4429 | 92.6% |
| 79 | 5310 | 83.2% |
| 80 | 5552 | 87.5% |
| 81 | 5650 | 70.0% |
| 82 | 5742 | 98.1% |
| 83 | 7082 | 73.9% |
| 84 | 7135 | 71.1% |
| 85 | 7580 | 87% |
| 86 | 8386 | 64.7% |
| 87 | 8808 | 78.7% |
| 88 | 8976 | 79% |
| 89 | 9774 | 55.8% |
| 90 | 1135 | 90.7% |
| 91 | 6699 | 81% |
| 92 | 6900 | 88.6% |
| 93 | 5222 | 28.5% |
| 94 | 6638 | 93.5% |
| 95 | 8774 | 79.7% |
| 96 | 753.6 | 91.3% |
| 97 | 892 | 99.1% |
| 98 | 1022 | 98.7% |
| 99 | 1821 | 88.9% |
| 100 | 2363 | 61.8% |
| 101 | 2508 | 77.7% |
| 102 | 2929 | 40.7% |
| 103 | 3614 | 73.6% |
| 104 | 3849 | 65.1% |
| 105 | 3945 | 64.9% |
| 106 | 5077 | 71.4% |
| 107 | 5086 | 52.4% |
| 108 | 5272 | 60.7% |
| 109 | 5557 | 78.6 |
| 110 | 6226 | 58.5% |
| 111 | 6287 | 78.4% |
| 112 | 6361 | 61.6 |
| 113 | 6667 | 57.4% |
| 114 | 6779 | 80.5% |
| 115 | 7468 | 51.4% |
| 116 | 7760 | 56.1% |
| 117 | 8002 | 47.3% |
| 118 | 8959 | 47.9% |
| 119 | 9693 | 50.6% |
| 120 | 1137 | 97.8% |
| 121 | 1539 | 96.1% |
| 122 | 2416 | 93.6% |
| 123 | 6727 | 87.9% |
| 124 | 8198 | 92.3% |
| 125 | 22.4 | 99.1% |
| 126 | 944.2 | 100% |
| 127 | 4382 | 72% |
| 128 | 5945 | 69.6% |

With respect to other compounds such as those disclosed in US 2017/0226137, WO 2017/135306, WO 2018/164191, WO 2018/164192, WO 2019/027003, WO 2019/027058, WO2020/122092, WO2020/122093, WO 2020/158958, U.S. Pat. Nos. 9,527,807, 10,287,305, 10,428,023, or U.S. Pat. No. 10,508,083, it would be desirable that the present compounds exhibit unexpected properties, such as better drug-like properties and better physical and pharmacokinetic properties. For example, in contrast to compounds of US 2017/0226137, WO 2017/135306, WO 2018/164191, WO 2018/164192, WO 2019/027003, WO 2019/027058, WO2020/122092, WO2020/122093, WO 2020/158958, U.S. Pat. Nos. 9,527,807, 10,287,305, 10,428,023, or U.S. Pat. No. 10,508,083, the compounds of the present examples may possess improved potency and/or better metabolic stability and solubility.

As indicated by the data herein, the compounds of the present examples provide unexpected potency as orexin receptor agonists. The distinction in potency as orexin receptor agonists provides greater functional activity and potential for enhanced in vivo efficacy and may provide benefits over other orexin receptor agonists that are known in the art.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention.

What is claimed is:

1. A compound of the formula I:

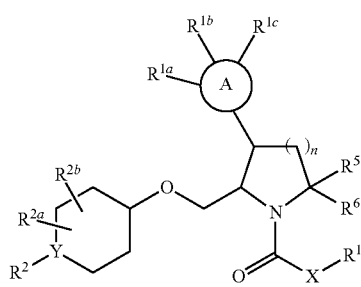

wherein:

n is 1 or 2;

A is a furanyl, imidazolyl, isoquinolinyl, isothiazolyl, isoxazolyl, oxadiazolyl, phenyl, pyrazinyl, pyrazolyl, pyridinyl, pyrimidinyl, pyrrolopyridinyl, furopyridinyl, isoxazolopyridinyl, tetrazolyl, 1,3,4-thiadiazol, thiazolyl, thiophenyl or triazolyl ring, or an N-oxide thereof, X is —O— or —NH—, or X may be a direct bond to $R^1$;

Y is N or CH;

$R^1$ is selected from:
- (1) —$C_{1-6}$alkyl, where the alkyl is unsubstituted or substituted with one to six substituents independently selected from $R^4$, and
- (2) —$C_{3-6}$cycloalkyl, where the cycloalkyl is unsubstituted or substituted with one to six substituents independently selected from $R^4$;
- (3) —$CH_2$—$C_{3-6}$cycloalkyl, where the cycloalkyl is unsubstituted or substituted with one to six substituents independently selected from $R^4$;
- (4) —$C_{2-6}$alkenyl, and
- (5) —$C_{2-6}$alkynyl;

$R^{1a}$, $R^{1b}$ and $R^{1c}$ as present are independently selected from:
- (1) hydrogen,
- (2) halogen,
- (3) hydroxyl,
- (4) $C_{1-6}$alkyl, which is unsubstituted or substituted with substituents selected from: hydroxy, fluoro and phenyl,
- (5) —O—$C_{1-6}$alkyl, which is unsubstituted or substituted with substituents selected from: fluoro and phenyl,
- (6) $C_{3-6}$cycloalkyl,
- (7) $C_{2-6}$alkynyl,
- (8) —$NH_2$,
- (9) —NH($C_{1-6}$alkyl),
- (10) —N($C_{1-6}$alkyl)$_2$,
- (11) —(CO)—O—$C_{1-6}$alkyl,
- (12) keto,
- (13) tetrahydropyranyl,
- (14) -phenyl,
- (15) -pyridyl, and
- (16) —CN;

$R^2$ is selected from:
- (1) hydrogen,
- (2) —$C_{1-6}$alkyl, where the alkyl is unsubstituted or substituted with one to six substituents independently selected from $R^4$,
- (3) —$C_{3-6}$cycloalkyl, where the cycloalkyl is unsubstituted or substituted with one to six substituents independently selected from $R^4$,
- (4) -phenyl, where the phenyl is unsubstituted or substituted with one to three substituents independently selected from $R^4$, and
- (5) -heteroaryl, where the heteroaryl is selected from: pyridyl, pyrimidinyl, and pyrazinyl, and the heteroaryl is unsubstituted or substituted with one to three substituents independently selected from $R^4$;

$R^{2a}$ and $R^{2b}$ are independently selected from:
- (1) hydrogen,
- (2) hydroxyl,
- (3) halogen, and
- (4) —$C_{1-6}$alkyl, where the alkyl is unsubstituted or substituted with one to six substituents independently selected from halogen;

$R^4$ is selected from:
- (1) hydroxyl,
- (2) halogen,
- (3) $C_{1-6}$alkyl, which is unsubstituted or substituted with one to six fluoro,
- (4) —$C_{3-6}$cycloalkyl,
- (5) —O—$C_{1-6}$alkyl,
- (6) —O(C=O)—$C_{1-6}$alkyl,
- (7) —(C=O)—$C_{1-6}$alkyl,
- (8) —$NH_2$,
- (9) —NH—$C_{1-6}$alkyl,
- (10) —$NO_2$,
- (11) oxetanyl,
- (12) phenyl, which is unsubstituted or substituted with one to three halo,
- (13) pyridyl,
- (14) oxazolyl, which is unsubstituted or substituted with —$C_{1-6}$alkyl,
- (15) oxomorpholinyl, which is unsubstituted or substituted with —$C_{1-6}$alkyl,
- (16) —$CO_2H$, and
- (17) —CN;

$R^5$ and $R^6$ are independently selected from:
- (1) hydrogen,
- (2) $C_{1-6}$alkyl, where the alkyl is unsubstituted or substituted with one to six substituents independently selected from $R^4$, and
- (3) —$C_{3-6}$cycloalkyl, where the cycloalkyl is unsubstituted or substituted with one to six substituents independently selected from $R^4$,
- or $R^5$ and $R^6$ are joined together with the carbon atoms to which they are attached to form a —$C_{3-6}$cycloalkyl ring, where the cycloalkyl is unsubstituted or substituted with one to six substituents independently selected from $R^4$;

or a pharmaceutically acceptable salt thereof.

2. The compound of claim 1 or a pharmaceutically acceptable salt thereof wherein n is 2.

3. The compound of claim 1 or a pharmaceutically acceptable salt thereof wherein A is a pyrazol-3-yl, pyrazol-4-yl, pyrazol-5-yl, thiazol-4-yl, or 1,2,4-triazol-5-yl ring.

4. The compound of claim 1 or a pharmaceutically acceptable salt thereof wherein X is —O—.

5. The compound of claim 1 or a pharmaceutically acceptable salt thereof wherein X is a direct bond to $R^1$.

6. The compound of claim 1 or a pharmaceutically acceptable salt thereof wherein $R^1$ is selected from:
- (1) methyl,
- (2) ethyl,
- (3) —$CH_2OH$,
- (4) —$CH_2CF_3$,
- (5) —$CH_2CHF_2$,
- (6) —$CH(CH_3)_2$,
- (7) —$CH_2CH_2CH_2F$,
- (8) cyclopropyl,
- (8) cyclopropyl-$CH_3$,
- (9) —$CH_2$-cyclopropyl,
- (10) —$CH_2$-cyclobutyl, and
- (11) —$CH_2O(C=O)CH_3$.

7. The compound of claim 1 or a pharmaceutically acceptable salt thereof wherein $R^2$ is selected from:
- (1) hydrogen,
- (2) —$CH_2(CH_3)_2$,
- (3) —$CF_3$,
- (4) —$CH_2CHF_2$,
- (5) —$CH_2CF_3$, and
- (6) phenyl, which is unsubstituted or substituted with —$CF_3$ or —$CH_2CF_3$.

8. The compound of claim 1 or a pharmaceutically acceptable salt thereof wherein $R^{2a}$ is hydrogen and $R^{2b}$ is hydrogen.

9. The compound of claim 1 or a pharmaceutically acceptable salt thereof wherein $R^5$ is hydrogen and $R^6$ is hydrogen.

10. A compound which is selected from:
(CIS)-N-ethyl-2-(((((CIS)-4-phenylcyclohexyl)oxy)methyl)-3-(1H-pyrazol-5-yl)piperidine-1-carboxamide;
methyl (CIS)-3-(2-hydroxy-5-methylthiazol-4-yl)-2-((((CIS)-4-phenyl-cyclohexyl)oxy)-methyl)piperidine-1-carboxylate;
(CIS)-N-ethyl-2-(((4-isopropylcyclohexyl)oxy)methyl)-3-(1H-pyrazol-5-yl)piperidine-1-carboxamide;
(2R,3S)—N-ethyl-2-((((CIS)-4-isopropylcyclohexyl)oxy)methyl)-3-(1H-pyrazol-5-yl)piperidine-1-carboxamide;
(2S,3R)—N-ethyl-2-((((CIS)-4-isopropylcyclohexyl)oxy)methyl)-3-(1H-pyrazol-5-yl)piperidine-1-carboxamide;
methyl (CIS)-3-(4-methyl-1H-pyrazol-3-yl)-2-(((1-(pyrimidin-2-yl)piperidin-4-yl)oxy)methyl)piperidine-1-carboxylate;
methyl (CIS)-2-(((1-(5-fluoropyrimidin-2-yl)piperidin-4-yl)oxy)methyl)-3-(4-methyl-1H-pyrazol-3-yl)piperidine-1-carboxylate;
methyl (CIS)-3-(4-methyl-1H-pyrazol-3-yl)-2-(((1-phenylpiperidin-4-yl)oxy)-methyl)piperidine-1-carboxylate;
isopropyl (CIS)-3-(4-methyl-1H-pyrazol-3-yl)-2-(((1-(pyrimidin-2-yl)piperidin-4-yl)oxy)methyl)piperidine-1-carboxylate;
(CIS)-N-ethyl-2-((((CIS)-4-(3-fluorophenyl)cyclohexyl)oxy)methyl)-3-(4-methyl-1H-pyrazol-3-yl)piperidine-1-carboxamide;
(2R,3S)—N-ethyl-2-((((CIS)-4-(3-fluorophenyl)cyclohexyl)oxy)methyl)-3-(4-methyl-1H-pyrazol-3-yl)piperidine-1-carboxamide;
(2S,3R)—N-ethyl-2-((((CIS)-4-(3-fluorophenyl)cyclohexyl)oxy)methyl)-3-(4-methyl-1H-pyrazol-3-yl)piperidine-1-carboxamide;
methyl (CIS)-2-((((S)-3'-fluoro-2,3,4,5-tetrahydro-[1,1'-biphenyl]-4-yl)oxy)methyl)-3-(4-methyl-1H-pyrazol-3-yl)piperidine-1-carboxylate;
cyclopropyl((CIS)-2-((((CIS)-4-(3-fluorophenyl)cyclohexyl)oxy)methyl)-3-(4-methyl-1H-pyrazol-3-yl)piperidin-1-yl)methanone;
methyl (CIS)-2-((((CIS)-4-(3-fluorophenyl)cyclohexyl)oxy)methyl)-3-(4-methyl-1H-pyrazol-3-yl)piperidine-1-carboxylate;
2,2-difluoroethyl (CIS)-2-((((CIS)-4-(3-fluorophenyl)cyclohexyl)oxy)methyl)-3-(4-methyl-1H-pyrazol-3-yl)piperidine-1-carboxylate;
(2R,3S)—N-ethyl-2-((((CIS)-4-phenylcyclohexyl)oxy)methyl)-3-(1H-pyrazol-3-yl)piperidine-1-carboxamide;
(CIS)-N-ethyl-2-((((CIS)-4-phenylcyclohexyl)oxy)methyl)-3-(1H-pyrazol-3-yl)piperidine-1-carboxamide;
(2S,3R)—N-ethyl-2-((((CIS)-4-phenylcyclohexyl)oxy)methyl)-3-(1H-pyrazol-3-yl)piperidine-1-carboxamide;
cyclopropyl((CIS)-2-((((CIS)-4-phenylcyclohexyl)oxy)methyl)-3-(1H-pyrazol-3-yl)piperidin-1-yl)methanone;
methyl (CIS)-2-((((CIS)-4-phenylcyclohexyl)oxy)methyl)-3-(1H-pyrazol-3-yl)piperidine-1-carboxylate;
(CIS)-N-ethyl-3-(1-methyl-1H-pyrazol-5-yl)-2-((((CIS)-4-phenylcyclohexyl)-oxy)-methyl)-piperidine-1-carboxamide;
methyl (CIS)-3-(4-methyl-1H-pyrazol-5-yl)-2-((((CIS)-4-phenylcyclohexyl)-oxy)methyl)-piperidine-1-carboxylate;
2,2-difluoroethyl (CIS)-3-(4-methyl-1H-pyrazol-5-yl)-2-(((((CIS)-4-phenyl-cyclohexyl)oxy)methyl)-piperidine-1-carboxylate;
methyl (CIS)-2-((((CIS)-4-phenylcyclohexyl)oxy)methyl)-3-(4-(trifluoromethyl)-1H-pyrazol-5-yl)piperidine-1-carboxylate;
methyl (CIS)-2-((((CIS)-4-phenylcyclohexyl)oxy)methyl)-3-(1H-1,2,4-triazol-5-yl)piperidine-1-carboxylate;
(CIS)-N-ethyl-3-(1-methyl-1H-pyrazol-3-yl)-2-((((CIS)-4-phenylcyclohexyl)-oxy)-methyl)piperidine-1-carboxamide;
(CIS)-N-ethyl-2-((((CIS)-4-phenylcyclohexyl)oxy)methyl)-3-(1H-pyrazol-3-yl)pyrrolidine-1-carboxamide;
methyl 3-(1H-pyrazol-5-yl)-2-((((CIS)-4-(2,3,6-trifluorophenyl)cyclohexyl)-oxy)methyl)piperidine-1-carboxylate;
2-fluoroethyl 3-(1H-pyrazol-5-yl)-2-((((CIS)-4-(2,3,6-trifluorophenyl)-cyclohexyl)oxy)methyl)piperidine-1-carboxylate;
2,2,2-trifluoroethyl 3-(1H-pyrazol-5-yl)-2-((((CIS)-4-(2,3,6-trifluorophenyl)-cyclohexyl)oxy)methyl)piperidine-1-carboxylate;
1-(3-(1H-pyrazol-5-yl)-2-((((CIS)-4-(2,3,6-trifluorophenyl)cyclohexyl)-oxy)methyl)piperidin-1-yl)-2-hydroxyethan-1-one;
N-ethyl-2-((((CIS)-4-(2,3,6-trifluorophenyl)cyclohexyl)oxy)methyl)-3-(1-((2-(trimethylsilyl)ethoxy)methyl)-1H-pyrazol-5-yl)piperidine-1-carboxamide;
3-(1H-pyrazol-5-yl)-N-(2,2,2-trifluoroethyl)-2-((((CIS)-4-(2,3,6-trifluorophenyl)cyclohexyl)-oxy)methyl)piperidine-1-carboxamide;
2,2-difluoroethyl 3-(1H-pyrazol-5-yl)-2-((((CIS)-4-(2,3,6-trifluorophenyl)-cyclohexyl)oxy)methyl)piperidine-1-carboxylate;
methyl (2R,5R)-5-methyl-3-(4-methyl-1H-pyrazol-5-yl)-2-((((CIS)-4-phenylcyclohexyl)oxy)methyl)pyrrolidine-1-carboxylate;
methyl (2R,5R)-5-methyl-2-((((CIS)-4-phenylcyclohexyl)oxy)methyl)-3-(1H-pyrazol-5-yl)pyrrolidine-1-carboxylate;
N-ethyl-2-(((4-isopropylcyclohexyl)oxy)methyl)-6-methyl-3-(1H-pyrazol-5-yl)piperidine-1-carboxamide;
(+/−) methyl (2R,3S,5S)-5-methyl-2-((((CIS)-4-phenylcyclohexyl)oxy)methyl)-3-(1H-pyrazol-5-yl)piperidine-1-carboxylate;
(+/−) methyl (2R,3R,5S)-5-methyl-2-((((CIS)-4-phenylcyclohexyl)oxy)methyl)-3-(1H-pyrazol-5-yl)piperidine-1-carboxylate;
(+/−) methyl (2R,3S,5R)-5-methyl-2-((((CIS)-4-phenylcyclohexyl)oxy)methyl)-3-(1H-pyrazol-5-yl)piperidine-1-carboxylate;
methyl cis-3-(4-iodo-1H-pyrazol-3-yl)-2-((((CIS)-4-phenylcyclohexyl)-oxy)methyl)piperidine-1-carboxylate;
methyl (2R,3S)-3-(4-ethyl-1H-pyrazol-3-yl)-2-((((CIS)-4-phenylcyclohexyl)-oxy)methyl)-piperidine-1-carboxylate;
(2S,3R)-3-(4-ethyl-1H-pyrazol-3-yl)-2-((((CIS)-4-phenylcyclohexyl)-oxy)methyl)piperidine-1-carboxylate;
methyl (2R,3S)-3-(4-chloro-1H-pyrazol-3-yl)-2-((((CIS)-4-phenylcyclohexyl)-oxy)methyl)-piperidine-1-carboxylate;

methyl (2S,3R)-3-(4-chloro-1H-pyrazol-3-yl)-2-(((((CIS)-4-phenylcyclohexyl)-oxy)methyl)-piperidine-1-carboxylate;
methyl cis-3-(4-chloro-1H-pyrazol-3-yl)-2-(((((CIS)-4-(2-chlorophenyl)-cyclohexyl)oxy)methyl)-piperidine-1-carboxylate;
methyl cis-3-(4-chloro-1H-pyrazol-3-yl)-2-(((((CIS)-4-(4-chlorophenyl)-cyclohexyl)oxy)methyl)-piperidine-1-carboxylate;
methyl (2R,3S)-3-(4-isopropyl-1H-pyrazol-3-yl)-2-(((((CIS)-4-phenylcyclohexyl)-oxy)-methyl)piperidine-1-carboxylate;
methyl (2S,3R)-3-(4-isopropyl-1H-pyrazol-3-yl)-2-(((((CIS)-4-phenylcyclohexyl)-oxy)methyl)-piperidine-1-carboxylate;
methyl (2R,3S)-3-(4-cyano-1H-pyrazol-3-yl)-2-(((((CIS)-4-phenylcyclohexyl)-oxy)methyl)-piperidine-1-carboxylate;
methyl (2S,3R)-3-(4-cyano-1H-pyrazol-3-yl)-2-(((((CIS)-4-phenylcyclohexyl)-oxy)methyl)-piperidine-1-carboxylate;
methyl (2R,3S)-3-(4-(hydroxymethyl)-1H-pyrazol-3-yl)-2-(((((CIS)-4-phenylcyclohexyl)oxy)-methyl)piperidine-1-carboxylate;
methyl (2S,3R)-3-(4-(hydroxymethyl)-1H-pyrazol-3-yl)-2-(((((CIS)-4-phenylcyclohexyl)oxy)methyl)-piperidine-1-carboxylate;
methyl (2R,3S)-3-(4-(difluoromethyl)-1H-pyrazol-3-yl)-2-(((((CIS)-4-phenylcyclohexyl)oxy)methyl)-piperidine-1-carboxylate;
methyl (2S,3R)-3-(4-(difluoromethyl)-1H-pyrazol-3-yl)-2-(((((CIS)-4-phenylcyclohexyl)oxy)methyl) piperidine-1-carboxylate;
methyl cis-3-(4-(methoxymethyl)-1H-pyrazol-3-yl)-2-(((((CIS)-4-phenylcyclohexyl)oxy)methyl)-piperidine-1-carboxylate;
N-ethyl-2-(((4-isopropylcyclohexyl)oxy)methyl)-3-(4-methyl-1H-pyrazol-5-yl)piperidine-1-carboxamide;
N-ethyl-2-(((((CIS)-4-isopropylcyclohexyl)oxy)methyl)-3-(1H-1,2,4-triazol-3-yl)piperidine-1-carboxamide;
methyl (CIS)-3-(6-hydroxypyridin-2-yl)-2-(((((CIS)-4-phenylcyclohexyl)oxy)-methyl)piperidine-1-carboxylate;
methyl (CIS)-3-(2-hydroxythiazol-4-yl)-2-(((((CIS)-4-phenylcyclohexyl)oxy)-methyl)piperidine-1-carboxylate;
methyl (CIS)-3-(6-hydroxy-3-methylpyridin-2-yl)-2-(((((CIS)-4-phenylcyclohexyl)oxy)methyl)piperidine-1-carboxylate;
methyl 3-(5-chloro-2-hydroxythiazol-4-yl)-2-(((4-phenylcyclohexyl)oxy)methyl)-piperidine-1-carboxylate;
((CIS)-2-methylcyclopropyl)((2R,3 S)-2-((((1s,4S)-4-phenylcyclohexyl)oxy-)methyl)-3-(1H-pyrazol-3-yl) piperidin-1-yl)methanone;
((TRANS)-2-methylcyclopropyl)((CIS)-2-(((((CIS)-4-phenylcyclohexyl)oxy)-methyl)-3-(1H-pyrazol-3-yl) piperidin-1-yl)methanone;
cyclopropyl((CIS)-2-(((((CIS)-4-phenylcyclohexyl)oxy) methyl)-3-(1H-pyrazol-3-yl)piperidin-1-yl)methanone;
(S)-2-amino-1-((CIS)-2-(((((CIS)-4-isopropylcyclohexyl) oxy)methyl)-3-(1H-pyrazol-3-yl)piperidin-1-yl)-4-methoxybutan-1-one;
1-((CIS)-2-(((((CIS)-4-isopropylcyclohexyl)oxy)methyl)-3-(1H-pyrazol-3-yl)piperidin-1-yl)-2-methylpropan-1-one;
2-(oxetan-3-yl)-1-((CIS)-2-(((((CIS)-4-phenylcyclohexyl) oxy)methyl)-3-(1H-pyrazol-3-yl)piperidin-1-yl)ethan-1-one;
cyclopropyl((CIS)-2-(((((CIS)-4-isopropylcyclohexyl) oxy)methyl)-3-(1H-pyrazol-3-yl)piperidin-1-yl)methanone;
((CIS)-2-(((((CIS)-4-isopropylcyclohexyl)oxy)methyl)-3-(1H-pyrazol-3-yl)piperidin-1-yl)(2-methylcyclopropyl)methanone;
2-hydroxy-2-methyl-1-((CIS)-2-(((((CIS)-4-phenylcyclohexyl)oxy)methyl)-3-(1H-pyrazol-3-yl)piperidin-1-yl) propan-1-one;
(1-hydroxycyclopropyl)((CIS)-2-(((((CIS)-4-phenylcyclohexyl)oxy)methyl)-3-(1H-pyrazol-3-yl)piperidin-1-yl) methanone;
cyclobutyl((CIS)-2-(((((CIS)-4-isopropylcyclohexyl)oxy) methyl)-3-(1H-pyrazol-3-yl)piperidin-1-yl)methanone;
(1-methylcyclopropyl)((CIS)-2-(((((CIS)-4-phenylcyclohexyl)oxy)methyl)-3-(1H-pyrazol-3-yl)piperidin-1-yl) methanone;
(2,2-dimethylcyclopropyl)((CIS)-2-(((((CIS)-4-isopropylcyclohexyl)oxy)methyl)-3-(1H-pyrazol-3-yl)piperidin-1-yl)methanone;
1-((CIS)-2-(((((CIS)-4-isopropylcyclohexyl)oxy)methyl)-3-(1H-pyrazol-3-yl)piperidin-1-yl)propan-1-one;
cyclopentyl((CIS)-2-(((((CIS)-4-isopropylcyclohexyl) oxy)methyl)-3-(1H-pyrazol-3-yl)piperidin-1-yl)methanone;
1-((CIS)-2-(((((CIS)-4-isopropylcyclohexyl)oxy)methyl)-3-(1H-pyrazol-3-yl)piperidin-1-yl)but-3-en-1-one;
1-((CIS)-2-(((((CIS)-4-isopropylcyclohexyl)oxy)methyl)-3-(1H-pyrazol-3-yl)piperidin-1-yl)pent-4-yn-1-one;
1-((CIS)-2-(((((CIS)-4-isopropylcyclohexyl)oxy)methyl)-3-(1H-pyrazol-3-yl)piperidin-1-yl)hex-5-yn-1-one;
2-methoxy-2-methyl-1-((CIS)-2-(((((CIS)-4-phenylcyclohexyl)oxy)methyl)-3-(1H-pyrazol-3-yl)piperidin-1-yl) propan-1-one;
3-cyclopropyl-1-((CIS)-2-(((((CIS)-4-isopropylcyclohexyl)oxy)methyl)-3-(1H-pyrazol-3-yl)piperidin-1-yl) propan-1-one;
(S)-2-fluoro-1-((CIS)-2-(((((CIS)-4-isopropylcyclohexyl) oxy)methyl)-3-(1H-pyrazol-3-yl)piperidin-1-yl)-2-methylpentan-1-one;
5-((CIS)-1-((TRANS)-2-ethylcyclopropane-1-carbonyl)-2-(((((CIS)-4-phenylcyclohexyl)oxy)methyl)piperidin-3-yl)-1H-pyrazol-2-ium;
((R)-2,2-dimethylcyclopropyl)((CIS)-2-(((((CIS)-4-phenylcyclohexyl)-oxy)methyl)-3-(1H-pyrazol-3-yl)piperidin-1-yl)methanone;
(2,2-difluorocyclopropyl)((CIS)-2-(((((CIS)-4-phenylcyclohexyl)oxy)methyl)-3-(1H-pyrazol-3-yl)piperidin-1-yl)methanone;
2-chlorobenzyl (CIS)-2-(((((CIS)-4-isopropylcyclohexyl) oxy)methyl)-3-(1H-pyrazol-3-yl)piperidine-1-carboxylate;
((R)-4-methyl-5-oxomorpholin-2-yl)methyl (CIS)-2-(((((CIS)-4-phenylcyclohexyl)oxy)methyl)-3-(1H-pyrazol-3-yl)piperidine-1-carboxylate;
prop-2-yn-1-yl (CIS)-2-(((((CIS)-4-isopropylcyclohexyl) oxy)methyl)-3-(1H-pyrazol-3-yl)piperidine-1-carboxylate;
2,2-difluoroethyl (CIS)-2-(((((CIS)-4-phenylcyclohexyl) oxy)methyl)-3-(1H-pyrazol-3-yl)piperidine-1-carboxylate;
2-oxopropyl (CIS)-2-(((((CIS)-4-phenylcyclohexyl)oxy) methyl)-3-(1H-pyrazol-3-yl)piperidine-1-carboxylate;

2-methoxy-2-oxoethyl (CIS)-2-((((CIS)-4-phenylcyclohexyl)oxy)methyl)-3-(1H-pyrazol-3-yl)piperidine-1-carboxylate;
1,1-difluoropropan-2-yl (CIS)-2-((((CIS)-4-phenylcyclohexyl)oxy)methyl)-3-(1H-pyrazol-3-yl)piperidine-1-carboxylate;
prop-2-yn-1-yl (CIS)-2-((((CIS)-4-phenylcyclohexyl)oxy)methyl)-3-(1H-pyrazol-3-yl)piperidine-1-carboxylate;
pyridin-3-yl (CIS)-2-((((CIS)-4-phenylcyclohexyl)oxy)methyl)-3-(1H-pyrazol-3-yl)piperidine-1-carboxylate;
2,2,2-trifluoroethyl (CIS)-2-((((CIS)-4-phenylcyclohexyl)oxy)methyl)-3-(1H-pyrazol-3-yl)piperidine-1-carboxylate;
but-2-yn-1-yl (CIS)-2-((((CIS)-4-phenylcyclohexyl)oxy)methyl)-3-(1H-pyrazol-3-yl)piperidine-1-carboxylate;
cyclobutylmethyl (CIS)-2-((((CIS)-4-phenylcyclohexyl)oxy)methyl)-3-(1H-pyrazol-3-yl)piperidine-1-carboxylate;
isobutyl (CIS)-2-((((CIS)-4-phenylcyclohexyl)oxy)methyl)-3-(1H-pyrazol-3-yl)piperidine-1-carboxylate;
pent-3-yn-1-yl (CIS)-2-((((CIS)-4-phenylcyclohexyl)oxy)methyl)-3-(1H-pyrazol-3-yl)piperidine-1-carboxylate;
(S)-2-methylbutyl (CIS)-2-((((CIS)-4-phenylcyclohexyl)oxy)methyl)-3-(1H-pyrazol-3-yl)piperidine-1-carboxylate;
(R)-sec-butyl (CIS)-2-((((CIS)-4-phenylcyclohexyl)oxy)methyl)-3-(1H-pyrazol-3-yl)piperidine-1-carboxylate;
(5-methyloxazol-2-yl)methyl (CIS)-2-((((CIS)-4-phenylcyclohexyl)oxy)methyl)-3-(1H-pyrazol-3-yl)piperidine-1-carboxylate;
2,2-difluoropropyl (CIS)-2-((((CIS)-4-phenylcyclohexyl)oxy)methyl)-3-(1H-pyrazol-3-yl)piperidine-1-carboxylate;
2-fluoroethyl (CIS)-2-((((CIS)-4-phenylcyclohexyl)oxy)methyl)-3-(1H-pyrazol-3-yl)piperidine-1-carboxylate;
cyclobutyl (CIS)-2-((((CIS)-4-phenylcyclohexyl)oxy)methyl)-3-(1H-pyrazol-3-yl)piperidine-1-carboxylate;
1,3-difluoropropan-2-yl (CIS)-2-((((CIS)-4-phenylcyclohexyl)oxy)methyl)-3-(1H-pyrazol-3-yl)piperidine-1-carboxylate;
3-methoxy-3-oxopropyl (CIS)-2-((((CIS)-4-phenylcyclohexyl)oxy)methyl)-3-(1H-pyrazol-3-yl)piperidine-1-carboxylate;
(S)-but-3-yn-2-yl (CIS)-2-((((CIS)-4-phenylcyclohexyl)oxy)methyl)-3-(1H-pyrazol-3-yl)piperidine-1-carboxylate;
(S)-sec-butyl (CIS)-2-((((CIS)-4-phenylcyclohexyl)oxy)methyl)-3-(1H-pyrazol-3-yl)piperidine-1-carboxylate;
cyclopentyl (CIS)-2-((((CIS)-4-phenylcyclohexyl)oxy)methyl)-3-(1H-pyrazol-3-yl)piperidine-1-carboxylate;
3-methoxypropyl (CIS)-2-((((CIS)-4-phenylcyclohexyl)oxy)methyl)-3-(1H-pyrazol-3-yl)piperidine-1-carboxylate;
(S)-2-methoxypropyl (CIS)-2-((((CIS)-4-phenylcyclohexyl)oxy)methyl)-3-(1H-pyrazol-3-yl)piperidine-1-carboxylate;
(CIS)-N-allyl-2-((((CIS)-4-isopropylcyclohexyl)oxy)methyl)-3-(1H-pyrazol-3-yl)piperidine-1-carboxamide;
(CIS)-N-isopropyl-2-((((CIS)-4-isopropylcyclohexyl)oxy)methyl)-3-(1H-pyrazol-3-yl)piperidine-1-carboxamide;
(CIS)-N-benzyl-2-((((CIS)-4-isopropylcyclohexyl)oxy)methyl)-3-(1H-pyrazol-3-yl)piperidine-1-carboxamide;
(CIS)-N-(cyclohexylmethyl)-2-((((CIS)-4-isopropylcyclohexyl)oxy)methyl)-3-(1H-pyrazol-3-yl)piperidine-1-carboxamide;
(CIS)-N-cyclohexyl-2-((((CIS)-4-isopropylcyclohexyl)oxy)methyl)-3-(1H-pyrazol-3-yl)piperidine-1-carboxamide;
(CIS)-N-(cyclobutylmethyl)-2-((((CIS)-4-phenylcyclohexyl)oxy)methyl)-3-(1H-pyrazol-3-yl)piperidine-1-carboxamide;
(CIS)-N-(1-methoxypropan-2-yl)-2-((((CIS)-4-phenylcyclohexyl)oxy)methyl)-3-(1H-pyrazol-3-yl)piperidine-1-carboxamide;
(CIS)-N-(oxetan-3-yl)-2-((((CIS)-4-phenylcyclohexyl)oxy)methyl)-3-(1H-pyrazol-3-yl)piperidine-1-carboxamide; and
(CIS)-N—((R)-sec-butyl)-2-((((CIS)-4-phenylcyclohexyl)oxy)methyl)-3-(1H-pyrazol-3-yl)piperidine-1-carboxamide;

or a pharmaceutically acceptable salt thereof.

11. A pharmaceutical composition which comprises an inert carrier and a compound of claim 1 or a pharmaceutically acceptable salt thereof.

12. A method for treating narcolepsy in a mammalian subject which comprises administering to the patient an effective amount of the compound of claim 1 or a pharmaceutically acceptable salt thereof.

13. A method for treating hypersomnia in a mammalian subject which comprises administering to the patient an effective amount of the compound of claim 1 or a pharmaceutically acceptable salt thereof.

* * * * *